(12) United States Patent
Kurigami et al.

(10) Patent No.: US 11,525,421 B2
(45) Date of Patent: Dec. 13, 2022

(54) HIGH-PRESSURE PUMP

(71) Applicant: DENSO CORPORATION, Kariya (JP)

(72) Inventors: Keita Kurigami, Kariya (JP);
Shinichiro Koshimoto, Kariya (JP);
Yoshihito Suzuki, Kariya (JP); Hiroshi Inoue, Kariya (JP); Tatsumi Oguri, Kariya (JP); Keigo Ohata, Kariya (JP);
Takayuki Makihara, Kariya (JP);
Taiki Kukita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/505,803

(22) Filed: Oct. 20, 2021

(65) Prior Publication Data

US 2022/0042480 A1 Feb. 10, 2022

Related U.S. Application Data

(60) Division of application No. 16/828,051, filed on Mar. 24, 2020, now Pat. No. 11,181,078, which is a
(Continued)

(30) Foreign Application Priority Data

Sep. 29, 2017 (JP) .............................. JP2017-190632
Sep. 29, 2017 (JP) .............................. JP2017-190633
(Continued)

(51) Int. Cl.
*F02M 21/02* (2006.01)
*F02M 37/00* (2006.01)
(Continued)

(52) U.S. Cl.
CPC .... *F02M 21/0245* (2013.01); *F02M 37/0041* (2013.01); *F02D 41/3845* (2013.01); *F02M 2037/087* (2013.01)

(58) Field of Classification Search
CPC ........... F02M 21/0245; F02M 37/0041; F02M 2037/087; F02M 59/366; F02D 41/3845
(Continued)

(56) References Cited

U.S. PATENT DOCUMENTS 5,996,227 A * 12/1999 Reiter ................. F16K 31/0651
239/585.4
6,198,369 B1 * 3/2001 Ward ................... F02M 59/466
335/278
(Continued)

FOREIGN PATENT DOCUMENTS

DE 10 2015 221 301 5/2017
JP 2002198217 7/2002
(Continued)

OTHER PUBLICATIONS

U.S. Appl. No. 16/828,081, inventor: Koshimoto, et al., entitled "High Pressure Pump", filed Mar. 24, 2020 (213 pages).
(Continued)

*Primary Examiner* — Sizo B Vilakazi
*Assistant Examiner* — Brian R Kirby
(74) *Attorney, Agent, or Firm* — Nixon & Vanderhye P.C.

(57) ABSTRACT

A high-pressure pump includes a pressurizing chamber forming portion, a suction passage forming portion, a seat member, a valve member, a cylindrical member, a needle, a movable core, a biasing member, a fixed core, and a coil including a winding portion. The coil generates an attractive force between the fixed core and the movable core when the winding portion is energized. The coil includes an outer cylindrical surface and multiple inner cylindrical surfaces that have different diameters. The multiple inner cylindrical surfaces are arranged in order of increasing diameter in a direction toward a pressurizing chamber. The movable core has an end surface that faces the fixed core, and the end
(Continued)

surface of the movable core is located between a center, in an axial direction, of a smallest diameter one of the plurality of inner cylindrical surfaces and a center, in an axial direction, of the outer cylindrical surface.

9 Claims, 68 Drawing Sheets

Related U.S. Application Data continuation of application No. PCT/JP2018/036340, filed on Sep. 28, 2018.

(30) Foreign Application Priority Data

| Sep. 29, 2017 | (JP) | JP2017-190634 |
| Sep. 29, 2017 | (JP) | JP2017-190635 |
| Sep. 20, 2018 | (JP) | JP2018-176287 |

(51) Int. Cl.
  *F02D 41/38* (2006.01)
  *F02M 37/08* (2006.01)

(58) Field of Classification Search
  USPC ....... 123/445, 446, 456, 206, 499, 500, 501, 123/502, 503, 504
  See application file for complete search history.

(56) References Cited

U.S. PATENT DOCUMENTS

| 6,345,608 | B1* | 2/2002 | Rembold | F04B 53/1082 |
| | | | | 123/456 |
| 6,375,113 | B1* | 4/2002 | Ishimaru | H01F 41/082 |
| | | | | 242/445.1 |
| 6,392,516 | B1* | 5/2002 | Ward | H01F 7/13 |
| | | | | 335/278 |
| 6,626,151 | B2* | 9/2003 | Boehm | F02M 59/34 |
| | | | | 251/129.02 |
| 6,631,706 | B1* | 10/2003 | Yamada | F04B 53/166 |
| | | | | 123/495 |
| 7,061,362 | B2* | 6/2006 | Myers | H02K 15/0435 |
| | | | | 29/605 |
| 7,131,426 | B2* | 11/2006 | Ichinose | F16K 31/0655 |
| | | | | 335/262 |
| 7,387,109 | B2* | 6/2008 | Rembold | F02M 59/34 |
| | | | | 137/513.5 |
| 7,398,764 | B2* | 7/2008 | Koehler | F02M 59/34 |
| | | | | 123/446 |
| 7,730,875 | B2* | 6/2010 | Mori | F02M 59/34 |
| | | | | 123/446 |
| 8,651,827 | B2* | 2/2014 | Usui | F02M 63/007 |
| | | | | 417/295 |
| 8,925,525 | B2 | 1/2015 | Wilms et al. | |
| 2004/0055580 | A1* | 3/2004 | Yamada | F02M 63/0035 |
| | | | | 123/495 |
| 2004/0227119 | A1* | 11/2004 | Mills | F16K 31/0631 |
| | | | | 251/129.14 |
| 2004/0238775 | A1* | 12/2004 | Mills | F16K 31/0665 |
| | | | | 251/129.14 |
| 2004/0252003 | A1* | 12/2004 | Linkner, Jr. | H01F 7/1607 |
| | | | | 336/208 |
| 2005/0218362 | A1 | 10/2005 | Furuta et al. | |
| 2006/0097830 | A1* | 5/2006 | Forsythe | F16K 31/0655 |
| | | | | 335/220 |
| 2006/0186976 | A1* | 8/2006 | Kamidate | F16K 31/0613 |
| | | | | 335/220 |
| 2006/0222518 | A1* | 10/2006 | Oda | F02M 63/0225 |
| | | | | 417/298 |
| 2012/0288389 | A1 | 11/2012 | Kuroyanagi et al. | |
| 2012/0312278 | A1* | 12/2012 | Usui | F02M 55/04 |
| | | | | 123/446 |
| 2013/0176628 | A1* | 7/2013 | Batchko | G02B 3/12 |
| | | | | 359/665 |
| 2015/0260296 | A1 | 9/2015 | Kuroyanagi et al. | |
| 2017/0058887 | A1 | 3/2017 | Kuroyanagi et al. | |
| 2017/0243684 | A1* | 8/2017 | Mott | H01F 7/1607 |
| 2018/0202435 | A1 | 7/2018 | Kuroyanagi et al. | |
| 2019/0186449 | A1* | 6/2019 | Cichon | F02M 59/48 |
| 2020/0224608 | A1 | 7/2020 | Kurigami et al. | |
| 2020/0224625 | A1 | 7/2020 | Ohata et al. | |
| 2020/0224653 | A1 | 7/2020 | Koshimoto et al. | |

FOREIGN PATENT DOCUMENTS

| JP | 2002198217 A | * | 7/2002 |
| JP | 2003-318019 | | 11/2003 |
| JP | 2010-107000 | | 5/2010 |
| JP | 2013-130265 | | 7/2013 |
| JP | 2015-119050 | | 6/2015 |
| JP | 2015119050 | | 6/2015 |
| JP | 2015119050 A | * | 6/2015 |
| WO | 2017/144185 | | 8/2017 |
| WO | 2019/065973 | | 4/2019 |
| WO | 2019/065992 | | 4/2019 |

OTHER PUBLICATIONS

U.S. Appl. No. 16/828,122, inventor: Koshimoto, et al., entitled "High Pressure Pump", filed Mar. 24, 2020 (214 pages).

* cited by examiner

HIGH-PRESSURE PUMP

CROSS REFERENCE TO RELATED APPLICATION

This is a divisional application of U.S. application Ser. No. 16/828,051, filed Mar. 24, 2020, which is a continuation application of International Patent Application No. PCT/JP2018/036340 filed on Sep. 28, 2018, which designated the U.S. and claims the benefit of priority from Japanese Patent Application No. 2017-190632 filed on Sep. 29, 2017, Japanese Patent Application No. 2017-190633 filed on Sep. 29, 2017, Japanese Patent Application No. 2017-190634 filed on Sep. 29, 2017, Japanese Patent Application No. 2017-190635 filed on Sep. 29, 2017, and Japanese Patent Application No. 2018-176287 filed on Sep. 20, 2018. The entire disclosure of all of the above applications are incorporated herein by reference.

TECHNICAL FIELD

The present disclosure relates to a high-pressure pump.

BACKGROUND ART

A high-pressure pump which pressurizes fuel and supplies the fuel to an internal combustion engine is conventionally known. The high-pressure pump generally includes a valve member on a low pressure side of a pressurizing chamber. The valve member allows a fuel, to be sucked into the pressurizing chamber, to flow therethrough by separating from a valve seat to open the valve member, and restricts the fuel to flow from the pressurizing chamber to the low pressure side of the pressurizing chamber by contacting the valve seat to close the valve member. For example, a high-pressure pump includes an electromagnetic driving unit disposed on a side of the valve member opposite to the pressurizing chamber, and controls the valve member to open and close to control an amount of fuel pressurized in the pressurizing chamber and an amount of fuel discharged from the high-pressure pump.

SUMMARY

A high-pressure pump in this disclosure includes a pressurizing chamber forming portion, suction passage forming portion, a seat member, valve member, a cylindrical member, a needle, a movable core, a biasing member, a fixed core, and a coil. The pressurizing forming portion defines a pressurizing chamber in which fuel is pressurized. The suction passage forming portion defines a suction passage through which the fuel sucked into the pressurizing chamber flows. The seat member is disposed in the suction passage and includes a communication path passing through the seat member between one surface and the other surface of the seat member. The valve member is disposed between the seat member and the pressurizing chamber. The valve member is capable of allowing the fuel to flow in the communication path by separating from the seat member to open the communication path and of restricting the fuel to flow in the communication path by contacting the seat member to close the communication path.

The cylindrical member is disposed on a side of the seat member opposite to the pressurizing chamber. The needle is disposed movable in the cylindrical member in an axial direction and has an end capable of contacting a surface of the valve member facing away from the pressurizing chamber. The movable core is disposed on a side of the cylindrical member and the movable core opposite to the pressurizing chamber. The coil includes a winding portion formed in a cylindrical shape by winding a wire around a winding forming portion. The coil generates an attractive force between the fixed core and the movable core to move the movable core and the needle in a closing direction when the winding portion is energized.

The coil includes an outer cylindrical surface in contact with an outer circumferential surface of the winding portion and multiple inner cylindrical surfaces that have different diameters in contact with an inner circumferential surface of the winding portion. The multiple inner cylindrical surfaces are arranged in order of increasing diameter in a direction toward the pressurizing chamber. The end of the movable core facing the fixed core is located between a center, in an axial direction, of a smallest diameter one of the multiple inner cylindrical surfaces and a center, in an axial direction, of the outer cylindrical surfaces.

BRIEF DESCRIPTION OF DRAWINGS

These and other objects, features and advantages of the present disclosure will become more apparent from the following detailed description with reference to the accompanying drawings.

DESCRIPTION OF EMBODIMENTS

Figure 1:
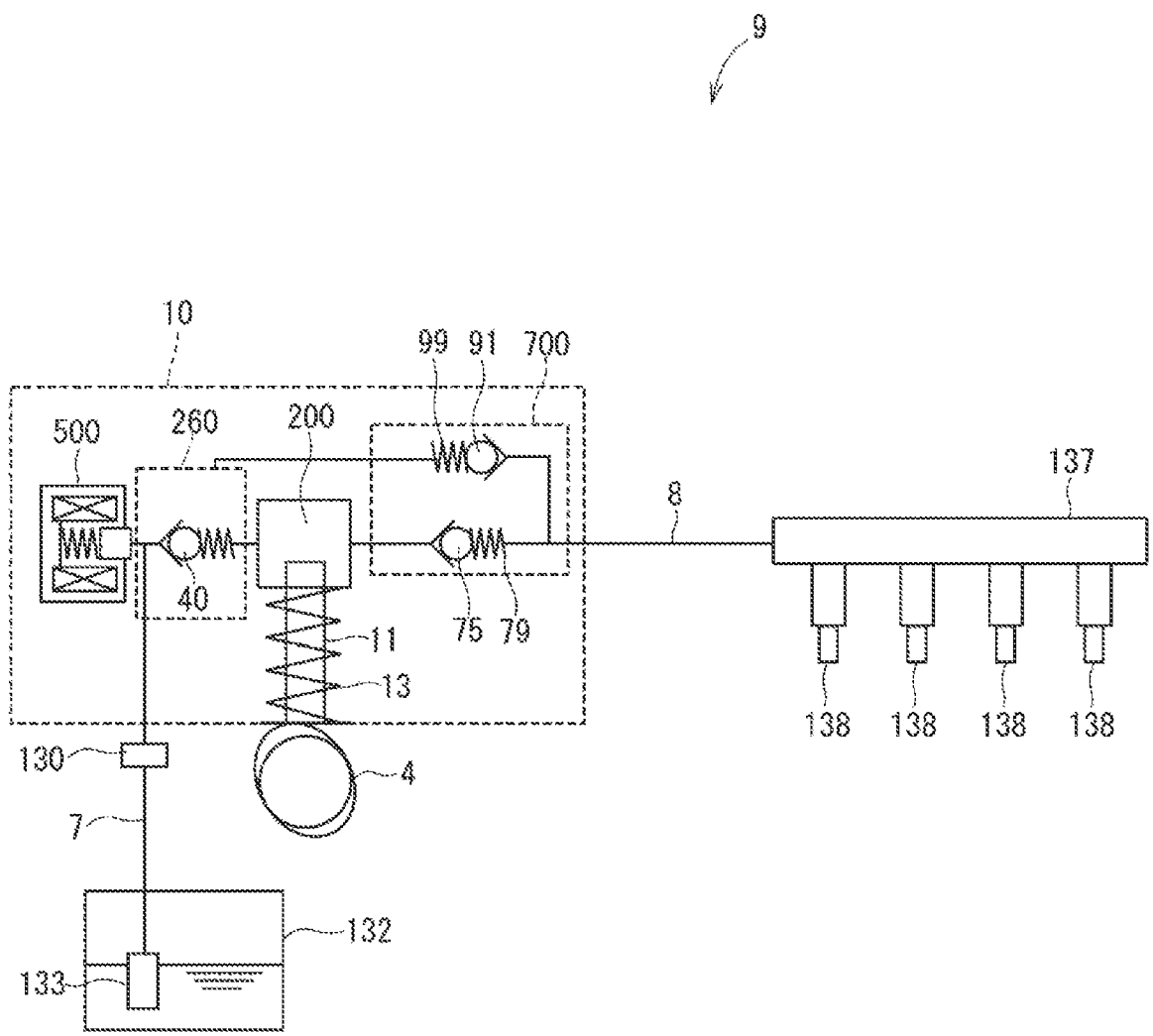
FIG. 1 is a schematic diagram showing a fuel supply system to which a high-pressure pump according to a first embodiment is applied.

To begin with, examples of relevant techniques will be described.

A high-pressure pump which pressurizes fuel and supplies the fuel to an internal combustion engine is conventionally known. The high-pressure pump generally includes a valve member on a low pressure side of a pressurizing chamber. The valve member allows a fuel, to be sucked into the pressurizing chamber, to flow therethrough by separating from a valve seat to open the valve member, and restricts the fuel to flow from the pressurizing chamber to the low pressure side of the pressurizing chamber by contacting the valve seat to close the valve member. For example, a high-pressure pump includes an electromagnetic driving unit disposed on a side of the valve member opposite to the pressurizing chamber, and controls the valve member to open and close to control an amount of fuel pressurized in the pressurizing chamber and an amount of fuel discharged from the high-pressure pump.

Generally, magnetic flux density is maximized at a center of a coil of the electromagnetic driving unit in an axial direction of the coil. All directions of magnetic flux are parallel to an axis of the coil, and extend from the pressurizing chamber toward a fixed core. Accordingly, an attractive force acting on a movable core during energization of the coil increases as an end surface of the movable core facing the fixed core is disposed at a position closer to the center of the coil in the axial direction.

According to the high-pressure pump described above, however, the end surface of the movable core facing the movable core is located between the pressurizing chamber and the center of the coil in the axial direction, and an end surface of the movable core facing the pressurizing chamber is located between the pressurizing chamber and an end surface of the coil facing the pressurizing chamber. In this case, the attractive force acting on the movable core may decrease during energization of the coil. As a result, responsiveness of the movable core may drop. When a current flowing through the coil is increased herein to secure the responsiveness of the movable core, power consumed by the electromagnetic driving unit may increase.

The present disclosure provides a high-pressure pump that improves responsiveness of an electromagnetic driving unit.

<B> A high-pressure pump in this disclosure includes a pressurizing chamber forming portion, suction passage forming portion, a seat member, valve member, a cylindrical member, a needle, a movable core, a biasing member, a fixed core, and a coil. The pressurizing forming portion defines a pressurizing chamber in which fuel is pressurized. The suction passage forming portion defines a suction passage through which the fuel sucked into the pressurizing chamber flows. The seat member is disposed in the suction passage and includes a communication path passing through the seat member between one surface and the other surface of the seat member. The valve member is disposed between the seat member and the pressurizing chamber. The valve member is capable of allowing the fuel to flow in the communication path by separating from the seat member to open the communication path and of restricting the fuel to flow in the communication path by contacting the seat member to close the communication path.

The cylindrical member is disposed on a side of the seat member opposite to the pressurizing chamber. The needle is disposed movable in the cylindrical member in an axial direction and has an end capable of contacting a surface of the valve member facing away from the pressurizing chamber. The movable core is disposed on a side of the cylindrical member and the movable core opposite to the pressurizing chamber. The coil includes a winding portion formed in a cylindrical shape by winding a wire around a winding forming portion. The coil generates an attractive force between the fixed core and the movable core to move the movable core and the needle in a closing direction when the winding portion is energized.

The coil includes an outer cylindrical surface in contact with an outer circumferential surface of the winding portion and multiple inner cylindrical surfaces that have different diameters in contact with an inner circumferential surface of the winding portion. The multiple inner cylindrical surfaces are arranged in order of increasing diameter in a direction toward the pressurizing chamber. The end of the movable core facing the fixed core is located between a center, in an axial direction, of a smallest diameter one of the multiple inner cylindrical surfaces and a center, in an axial direction, of the outer cylindrical surfaces. Thus, the attractive force acting on the movable core is increased when the coil is energized, thereby improving a responsiveness of the movable core.

A high-pressure pump according to embodiments will be hereinafter described with reference to drawings. In the embodiments, substantially identical constituent parts are given identical reference numerals, and are not repeatedly explained. Moreover, in the embodiments, substantially identical constituent parts offer identical or similar actions and effects.

First Embodiment

Figure 2:
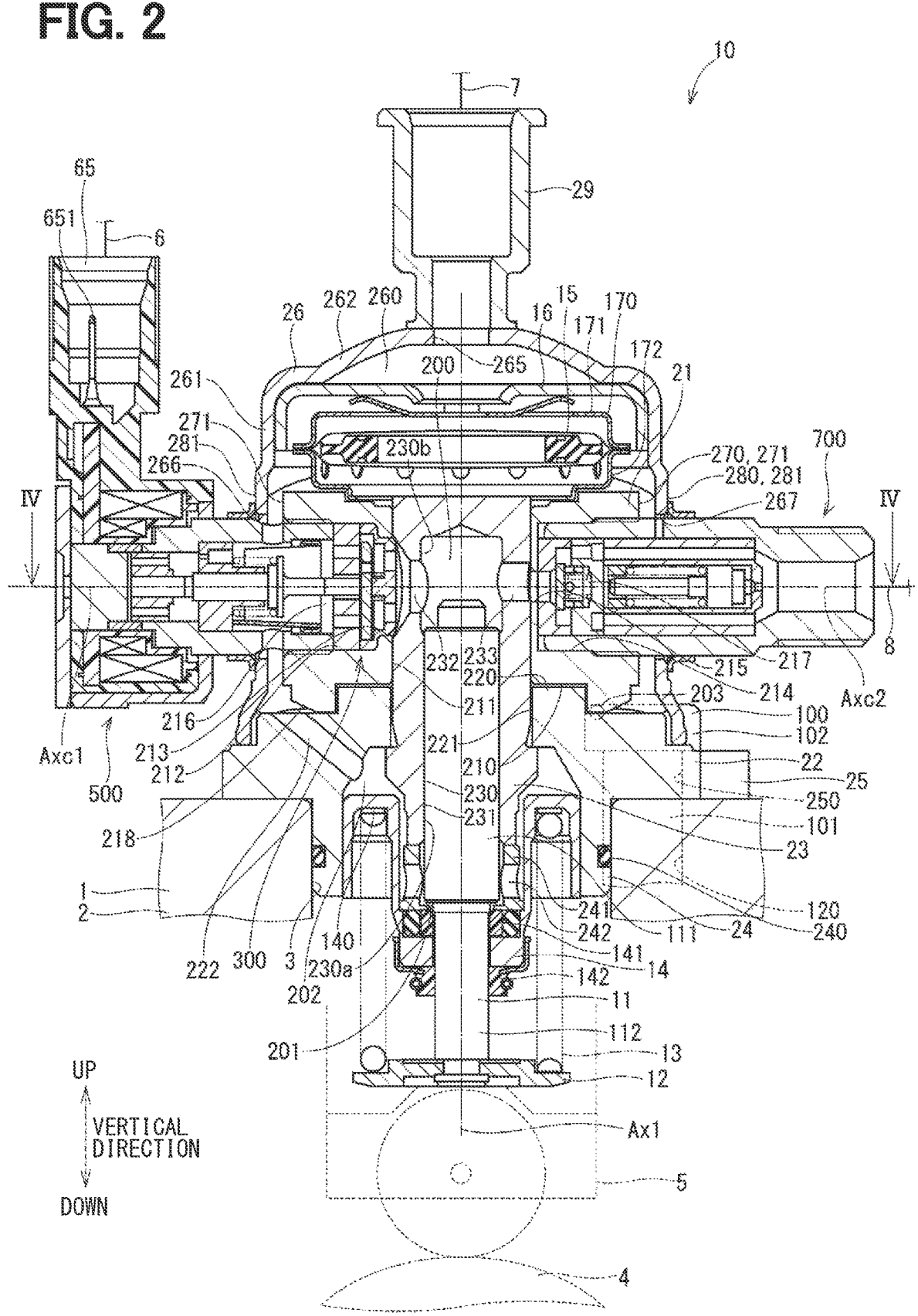
FIG. 2 is a cross-sectional view of the high-pressure pump according to the first embodiment.

FIGS. 1 and 2 show a high-pressure pump according to a first embodiment.

The high-pressure pump 10 in the present embodiment is applied to a fuel supply system 9 that includes fuel injection valves 138 for supplying fuel to an internal combustion engine 1 (not shown). Hereinafter, the internal combustion engine is referred to as "engine". The high-pressure pump 10 is attached to an engine head 2 of the engine 1 or a housing movable by a crankshaft.

As shown in FIG. 1, gasoline or the like as fuel is stored in a fuel tank 132 mounted in the vehicle. A fuel pump 133 pumps up and discharges the fuel in the fuel tank 132. A supply fuel pipe 7 fluidly connects the fuel pump 133 and the high-pressure pump 10. Accordingly, the fuel pumped up and discharged by the fuel pump 133 flows into the high-pressure pump 10 via the supply fuel pipe 7.

The engine 1 includes a fuel rail 137 as well as the high-pressure pump 10. For example, the engine 1 is a 4-cylinder gasoline engine. The fuel rail 137 is provided on the engine head 2 of the engine 1. The fuel injection valves 138 are provided such that an injection hole of each of the fuel injection valves 138 is exposed to an interior of a combustion chamber of the engine 1. For example, the four fuel injection valves 138 are provided in correspondence with the number of cylinders of the engine 1. The four fuel injection valves 138 are fluidly connected to the fuel rail 137.

The high-pressure pump 10 and the fuel rail 137 are connected by a high-pressure fuel pipe 8. Fuel flowing into the high-pressure pump 10 from the supply fuel pipe 7 is pressurized by the high-pressure pump 10, and supplied to the fuel rail 137 via the high-pressure fuel pipe 8. In this manner, the fuel in the fuel rail 137 is kept at a relatively high pressure. Each of the fuel injection valves 138 opens and closes in response to a command from an electronic control unit (ECU) functioning as a controller, and injects fuel in the fuel rail 137 into the combustion chamber of the engine 1. The ECU is not shown in drawings. Accordingly, the fuel injection valves 138 are so-called direct injection type (DI) fuel injection valves.

A sensor 130 is provided between the high pressure pump 10 of the supply fuel pipe 7 and the fuel tank 132. The sensor 130 is capable of detecting a pressure of fuel in the supply fuel pipe 7 (i.e., a fuel pressure) and a temperature of the fuel (i.e., a fuel temperature), and of transmitting corresponding signals to the ECU. The ECU determines a target pressure of the fuel discharged out of the fuel pump 133 based on the fuel pressure and the fuel temperature in the supply fuel pipe 7 that are detected by the sensor 130. The ECU controls an operation of a motor of the fuel pump 133 such that fuel at the target pressure is discharged from the fuel pump 133.

As shown in FIG. 2, the high-pressure pump 10 includes an upper housing 21, a lower housing 22, a fixed portion 25, a cylinder 23, a holder supporter 24, a cover 26, a plunger 11, a suction valve unit 300, an electromagnetic driving unit 500, a discharge passage portion 700, and others.

Each of the upper housing 21, the lower housing 22, the fixed portion 25, the cylinder 23, and the holder supporter 24 is made of, for example, metal such as stainless steel. The upper housing 21 and the lower housing 22 correspond to a "housing".

The upper housing 21 has a substantially octagonal columnar shape. The upper housing 21 includes a housing outer peripheral wall 270 having an octagonal columnar shape. The housing outer peripheral wall 270 has flat portions 271 each having a flat shape. The eight flat portions 271 are formed in a circumferential direction of the housing outer peripheral wall 270 (see FIG. 4).

The upper housing 21 includes a hole portion 211, a suction hole portion 212, a suction hole portion 213, a discharge hole portion 214, and a discharge hole portion 215. The hole portion 211 has a cylindrical shape and passes through a center of the upper housing 21 along an axis of the upper housing 21.

The suction hole portion 212 has a substantially cylindrical shape that extends from one of the flat portions 271 of the housing outer peripheral wall 270 of the upper housing 21 toward the hole portion 211. The suction hole portion 213 has a substantially cylindrical shape in communication with the suction hole portion 212 and the hole portion 211. The suction hole portion 212 and the suction hole portion 213 are coaxially formed. Each of the axes of the suction hole portion 212 and the suction hole portion 213 is orthogonal to the axis of the hole portion 211. An inner diameter of the suction hole portion 213 is smaller than an inner diameter of the suction hole portion 212 (see FIG. 5). A suction passage 216 is defined by the suction hole portion 212 and the suction hole portion 213 of the upper housing 21. The upper housing 21 corresponds to a "suction passage forming portion".

The discharge hole portion 214 has a substantially cylindrical shape which extends toward the hole portion 211 from the flat portion 271 located opposite to the flat portion 271, at which the suction hole portion 212 is formed, of the housing outer peripheral wall 270 of the upper housing 21. The discharge hole portion 215 has a substantially cylindrical shape in communication with the discharge hole portion 214 and the hole portion 211. The discharge hole portion 214 and the discharge hole portion 215 are coaxially formed. Each of the axes of the discharge hole portion 214 and the discharge hole portion 215 is orthogonal to the axis of the hole portion 211. An inner diameter of the discharge hole portion 215 is smaller than an inner diameter of the discharge hole portion 214 (see FIG. 6). A discharge passage 217 is defined by the discharge hole portion 214 and the discharge hole portion 215. The discharge hole portion 214 and the discharge hole portion 215 of the upper housing 21 correspond to a "discharge passage forming portion". The discharge hole portion 215 is smaller than a discharge hole 233. The center axis of the discharge hole portion 215 is disposed below the center axis of the discharge hole 233 in the vertical direction.

The suction hole portion 212 and the suction hole portion 213, and the discharge hole portion 214 and the discharge hole portion 215 are coaxially formed. In other words, respective axes of the suction hole portion 212, the suction hole portion 213, the discharge hole portion 214, and the discharge hole portion 215 are located on a common plane (see FIGS. 2 to 4).

The upper housing 21 includes a housing recess 210 at a lower part of the upper housing 21. The housing recess 210 is recessed from an end surface of the upper housing 21 in the axial direction. The housing recess 210 has a substantially cylindrical shape.

The lower housing 22 has a substantially disk shape. The lower housing 22 has a hole portion 221 and a hole portion 222. The lower housing 22 includes a housing protrusion 220 at an upper part of the lower housing 22. The housing protrusion 220 protrudes from a center of one surface of the lower housing 22. The housing protrusion 220 has a substantially cylindrical shape.

The hole portion 221 passes through the centers of the lower housing 22 and the housing protrusion 220 in a plate thickness direction of the lower housing 22. An inner diameter of the hole portion 221 is slightly larger than an inner diameter of the hole portion 211. The hole portion 222 is formed radially outside the hole portion 221 to pass through the lower housing 22 between an outer surface of the lower housing 22 radially outside the housing protrusion 220 and an inner surface of the lower housing 22.

The lower housing 22 is integrally provided with the upper housing 21 such that the housing protrusion 220 fits into the housing recess 210. An outer diameter of the housing protrusion 220 is larger than an inner diameter of the housing recess 210. Accordingly, the upper housing 21 and the lower housing 22 are fixed by press-fitting the housing protrusion 220 into the housing recess 210. A surface of the upper housing 21 facing the lower housing 22 in the axial direction and a surface of the lower housing 22 facing the upper housing 21 in the axial direction are in contact with each other. A contact surface between the lower housing 22 and the upper housing 21 is referred as a contact portion 203 shown in FIG. 2.

The upper housing 21 includes a relief portion 218 at an outer edge of the surface facing the lower housing 22 not to close an opening of the hole portion 222 facing the upper housing 21. The relief portion 218 has a tapered surface to have both of the contact portion 203 and a communication path between the relief portion 218 and the hole portion 222.

The fixed portion 25 has a plate shape extending from the outer edge of the lower housing 22 radially outward. The fixed portion 25 is integrally formed with the lower housing 22. In other words, the fixed portion 25 is connected to the lower housing 22 and the upper housing 21. According to the present embodiment, the fixed portion 25 is one of multiple fixed portions, and the multiple fixed portions 25 is two fixed portions 25. The two fixed portions 25 are located at equal intervals each other in a circumferential direction of the lower housing 22. The two fixed portions 25 each has a bolt hole 250. The bolt hole 250 has a substantially cylindrical shape that passed through the fixed portion 25 in a plate thickness direction of the fixed portion.

When the high-pressure pump 10 is attached to the engine 1, the fixed portions 25 are fixed to the engine head 2 of the engine 1 by bolts 100 provided in correspondence with the bolt holes 250 (see FIG. 2). Each of the bolts 100 has a shaft portion 101 and a head portion 102. The shaft portion 101 has a substantially columnar shape. An outer diameter of the shaft portion 101 is slightly smaller than an inner diameter of each of the bolt holes 250.

The head portion 102 is integrally formed with the shaft portion 101 such that the head portion is connected to an end of the shaft portion 101. The outer diameter of the head portion 102 is larger than the outer diameter of the shaft portion 101. When the high-pressure pump 10 is attached to the engine 1, the shaft portion 101 of each of the bolts 100 is inserted into one of the bolt holes 250 of the fixed portion 25, and is screwed to a fixing hole portion 120 of the engine head 2. During the screwing, an axial force toward the engine head 2 acts on the fixed portion 25 from the head portion 102 of the bolt 100. In this case, appropriate flatness is secured at least around the head portion 102 of the bolt 100 to securely bring the lower housing 22 into close contact with the engine head 2 at the time of tightening the bolts 100.

The cylinder 23 has a cylinder hole portion 231. The cylinder hole portion 231 has a substantially cylindrical shape extending from an end surface of a cylindrical member toward the other end surface of the cylindrical member. In other words, the cylinder 23 has a bottomed cylindrical shape which has a cylindrical portion and a bottom portion closing one end of the cylindrical portion. A cylindrical inner peripheral wall 230 constituting an inner peripheral wall of the cylinder hole portion 231 has a substantially cylindrical shape. The cylindrical inner peripheral wall 230 has a sliding surface 230a, an enlarged diameter surface 230b, and others. The sliding surface 230a has a cylindrical shape and is adjacent to an opening of the cylindrical inner peripheral wall 230. The enlarged diameter surface 230b has a cylindrical shape, and is located at aside of the sliding surface opposite to the opening of the cylindrical inner peripheral wall 230. The sliding surface 230a and the enlarged diameter surface 230b are coaxially formed. A diameter of the enlarged diameter surface 230b is larger than a diameter of the sliding surface 230a.

An outer diameter of the cylinder 23 is slightly larger than an inner diameter of the hole portion 211 of the upper housing 21. The cylinder 23 is integrally provided with the upper housing 21 and the lower housing 22 such that the cylinder 23 is inserted in the hole portion 221 of the lower housing 22 and an outer circumferential wall of the cylinder facing the bottom portion is fit into the hole portion 221 of the upper housing 21. The cylinder 23 has a suction hole 232 and a discharge hole 233. The suction hole 232 connects the enlarged diameter surface 230b at an end of the cylinder hole portion 231 facing the bottom portion and the suction hole portion 213 of the upper housing 21. The discharge hole 233 connects the enlarged diameter surface 230b at the end of the cylinder hole portion 231 facing the bottom portion and the discharge hole portion 215 of the upper housing 21. In other words, the suction hole 232 and the discharge hole 233 face each other relative to an axis Ax1 of the cylindrical inner peripheral wall 230 of the cylinder hole portion 231 interposed between the suction hole 232 and the discharge hole 233. Accordingly, the suction hole 232 and the discharge hole 233 are disposed on a common plane (see FIGS. 2 to 4).

The holder supporter 24 extends from a radially outer portion of the hole portion 221 of the lower housing 22 away from the upper housing 21. According to the present embodiment, the holder supporter 24 is integrally formed with the lower housing 22. The holder supporter 24 is coaxial with the cylinder 23 at the radially outer side of an end of the cylinder 23. When the high-pressure pump 10 is attached to the engine 1, the holder supporter 24 is inserted into an attachment hole portion 3 formed at the engine head 2 (see FIG. 2).

The plunger 11 has a substantially cylindrical shape, and is made of metal such as stainless steel. The plunger 11 includes a large diameter portion 111 and a small diameter portion 112. An outer diameter of the small diameter portion 112 is smaller than an outer diameter of the large diameter portion 111. The large diameter portion 111 of the plunger 11 is inserted into the cylinder hole portion 231 of the cylinder 23. A pressurizing chamber 200 is formed between a bottom wall of the cylinder hole portion 231 and the enlarged diameter surface 230b of the cylindrical inner peripheral wall 230, and an end of the plunger 11 facing to the large diameter portion 111. Accordingly, the cylinder 23 forms the pressurizing chamber 200. The cylinder 23 has the cylindrical inner peripheral wall 230 having a cylindrical shape and forming the pressurizing chamber 200. The cylinder 23 corresponds to a "pressurizing chamber forming portion". The pressurizing chamber 200 is connected to the suction hole 232 and the discharge hole 233.

An outer diameter of the plunger 11 is slightly smaller than an inner diameter of the cylinder 23, i.e., an inner diameter of the cylinder hole portion 231. Accordingly, the plunger 11 is allowed to reciprocate in the axial direction within the cylinder hole portion 231 with an outer peripheral wall of the large diameter portion 111 sliding on the sliding surface 230a of the cylindrical inner peripheral wall 230 of the cylinder hole portion 231. When the plunger 11 reciprocates in the cylinder hole portion 231, a volume of the pressurizing chamber 200 increases or decreases. In this manner, the plunger 11 has an end located in the pressurizing chamber, and movable in the cylindrical inner peripheral wall 230 in the axial direction.

According to the present embodiment, a seal holder 14 is provided in the holder supporter 24. The seal holder 14 has a tubular shape, and is made of metal such as stainless steel. The seal holder 14 is provided such that an outer wall of the seal holder 14 is fit into an inner wall of the holder supporter 24. An intermediate columnar member 241 is provided between the cylinder 23 and the seal holder 14. The intermediate columnar member 241 has a substantially cylindrical shape, and is coaxially provided with the cylinder 23. An inner diameter of the intermediate columnar member 241 is larger than an inner diameter of the cylinder hole portion 231. The intermediate columnar member 241 has hole portions 242 connecting the inner peripheral wall and the outer peripheral wall of the intermediate columnar member 241. A plurality of the hole portions 242 are formed in the circumferential direction of the intermediate columnar member 241.

The seal holder 14 defines a substantially cylindrical space surrounded by an inner wall of the seal holder 14, the end surface of the intermediate columnar member 241 facing away from the cylinder 23, and the outer peripheral wall of the small diameter portion 112 of the plunger 11. A seal 141 having an annular shape is provided in the cylindrical space. The seal 141 is formed of a ring made of fluoropolymer and a ring made of rubber. The ring made of fluoropolymer is located radially inward of the ring made of rubber. A thickness of a fuel oil film on the plunger 11 around the small diameter portion 112 is controlled by the seal 141 to reduce fuel leakage to the engine 1. An oil seal 142 is provided at the end of the seal holder 14 facing away from the cylinder 23. The oil seal 142 controls a thickness of an oil film on the plunger 11 around the small diameter portion 112 to reduce oil leakage. A variable volume chamber 201 whose volume is variable during reciprocation of the plunger 11 is formed between a step surface between the large diameter portion 111 and the small diameter portion 112 of the plunger 11, and the intermediate columnar member 241 and the seal 141.

An annular space 202, which is an annular space, is defined by outer peripheral walls of the lower housing 22 and the cylinder 23, an inner peripheral wall of the holder supporter 24, and the seal holder 14. The annular space 202 is connected to the hole portion 222 of the lower housing 22. The annular space 202 is connected to the variable volume chamber 201 via a cylindrical space defined by an inner peripheral wall of the seal holder 14, an outer peripheral wall of the cylinder 23, and an outer peripheral wall of the intermediate columnar member 241, and the hole portion 242.

A substantially disk-shaped spring seat 12 is provided at the end of the small diameter portion 112 of the plunger 11 facing away from the large diameter portion 111. A spring 13 is provided between the seal holder 14 and the spring seat 12. The spring 13 is a coil spring, for example, and is provided such that one end of the spring 13 contacts the spring seat 12 and the other end of the spring 13 contacts the seal holder 14 via a spacer 140. The seal holder 14 is made of a material capable of being welded and thus has relatively low hardness. Therefore, the seal holder 14 is prevented from be worn by providing the spacer 140 having relatively high hardness. The spring 13 biases the plunger 11 away from the pressurizing chamber 200 via the spring seat 12. When the high-pressure pump 10 is attached to the engine head 2 of the engine 1, a lifter 5 is attached to the end of the small diameter portion 112 of the plunger 11 facing away from the large diameter portion 111.

When the high-pressure pump 10 is attached to the engine 1, the lifter 5 comes into contact with a cam 4 of a camshaft that rotates in accordance with a driving shaft of the engine 1. As a result, the plunger 11 reciprocates in the axial direction in accordance with the rotation of the cam 4 during rotation of the engine 1. At this time, each of the volumes of the pressurizing chamber 200 and the variable volume chamber 201 periodically varies.

As shown in FIG. 2, the end of the outer peripheral wall of the large diameter portion 111 of the plunger 11 facing away from the small diameter portion 112 is located between the enlarged diameter surface 230b and the end of the sliding surface 230a facing the enlarged diameter surface 230b when the plunger 11 is located at a bottom dead center. At this time, the end, facing the small diameter portion 112, of the outer peripheral wall of the large diameter portion 111 of the plunger 11 is located on a side of the end of the sliding surface 230a facing away from the enlarged diameter surface 230b, opposite to the enlarged diameter surface 230b.

Figure 3:
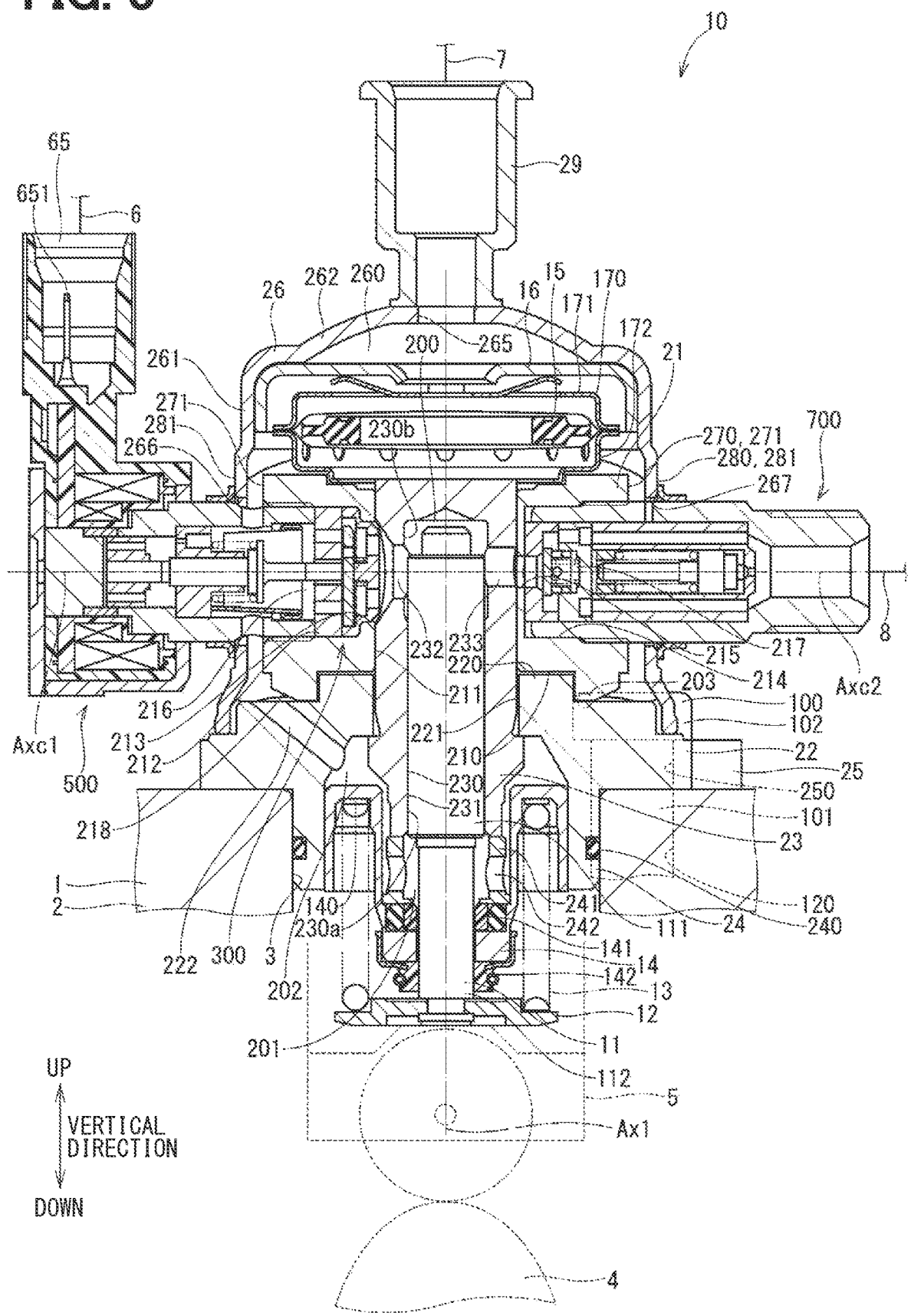
FIG. 3 is a cross-sectional view of the high-pressure pump according to the first embodiment.

As shown in FIG. 3, the end, facing away from the small diameter portion 112, of the outer peripheral wall of the large diameter portion 111 of the plunger 11 is located between the enlarged diameter surface 230b and the end of the sliding surface 230a facing the enlarged diameter surface 230b when the plunger 11 is located at a top dead center. At this time, the end, facing the small diameter portion 112, of the outer peripheral wall of the large diameter portion 111 of the plunger 11 is located on a side of the end of the sliding surface 230a of the sliding surface 230a facing away from the enlarged diameter surface 230b, the side opposite to the enlarged diameter surface 230b.

As described above, regardless of the position of the plunger 11 in the range from the bottom dead center to the top dead center, the end, facing away from the small diameter portion 112, of the outer peripheral wall of the large diameter portion 111 of the plunger 11 is located between the enlarged diameter surface 230b and the end of the sliding surface 230a facing the enlarged diameter surface 230b, and the end of the outer peripheral wall of the large diameter portion 111 of the plunger 11 facing the small diameter portion 112 is located on a side of the end of the sliding surface 230a facing away from the enlarged diameter surface 230b, the side opposite to the enlarged diameter surface 230b.

The cover 26 is made of metal such as stainless steel. The cover 26 includes a cover columnar portion 261 and a cover bottom portion 262. The cover columnar portion 261 has a substantially octagonal columnar shape. The cover columnar portion 261 has a cover outer peripheral wall 280 having an octagonal columnar shape. The cover outer peripheral wall 280 includes flat portions 281 having a flat shape. The eight flat portions 281 are formed in the circumferential direction of the cover outer peripheral wall 280.

The cover bottom portion 262 is integrally formed with the cover columnar portion 261 to close one end of the cover columnar portion 261. In other words, the cover 26 has a bottomed columnar shape. According to the present embodiment, the cover 26 is formed by pressing a plate-shaped material, for example. Accordingly, a thickness of the cover 26 is relatively small. The cover 26 does not constitute a high pressure chamber. Accordingly, the thickness of the cover 26 is allowed to be smaller.

The cover 26 has a cover hole portion 265, a cover hole portion 266, and a cover hole portion 267. The cover hole portion 265 has a substantially cylindrical shape which passes through the center of the cover bottom portion 262 in a thickness direction of the cover bottom portion. Each of the cover hole portion 266 and the cover hole portion 267 has a substantially cylindrical shape which connects an inner peripheral wall of the cover columnar portion 261 and an outer peripheral wall of the cover columnar portion 261, i.e., the flat portions 281 of the cover outer peripheral wall 280. The cover hole portion 266 and the cover hole portion 267 are coaxially formed substantially such that the cover hole portion 226 faces the cover hole portion 267 relative to an axis of the cover columnar portion 261 interposed between the cover hole portion 266 and the cover hole portion 267.

The cover 26 houses the upper housing 21 therein, and the end of the cover columnar portion 261 facing away from the cover bottom portion 262 comes into contact with the surface of the lower housing 22 facing the upper housing 21. The cover 26 defines a fuel chamber 260 with the upper housing 21, the lower housing 22, and the cylinder 23. The end of the cover columnar portion 261 and the lower housing 22 are joined with each other in entire region in the circumferential direction by welding, for example. In this manner, the space between the cover columnar portion 261 and the lower housing 22 is kept liquid-tight. The cover 26 is provided such that the cover hole portion 266 corresponds to the suction hole portion 212 of the upper housing 21, and that the cover hole portion 267 corresponds to the discharge hole portion 214 of the upper housing 21. An operating sound is emitted from a top portion of the cover 26, i.e., from the cover bottom portion 262, wherefore the cover bottom portion 262 preferably has high rigidity. According to the present embodiment, rigidity of the cover bottom portion 262 is increased by providing the cover bottom portion 262 having a dome shape. However, the rigidity of the cover bottom portion 262 may be increased by providing ribs or the like on the cover bottom portion 262 having a flat shape.

As described above, the cover 26 covers at least a part of the cylinder 23, the upper housing 21, and the lower housing 22, and defines the fuel chamber 260 with the cylinder 23, the upper housing 21, and the lower housing 22. The fuel chamber 260 has a substantially octagonal columnar shape between an inner peripheral wall of the cover columnar portion 261 and the housing outer peripheral wall 270.

The cover 26 includes a supply passage portion 29. The supply passage portion 29 has a columnar shape, and is provided such that one end of the supply passage portion 29 is connected to an outer wall, around the cover hole portion 265, of the cover bottom portion 262. The supply passage portion 29 is provided such that a space inside the supply passage portion 29 is in communication with the fuel chamber 260 via the cover hole portion 265. The supply passage portion 29 and the cover bottom portion 262 are welded to each other in the entire area in the circumferential direction of the supply passage portion 29. The supply fuel pipe 7 is connected to the other end of the supply passage portion 29. Accordingly, fuel discharged from the fuel pump 133 flows into the fuel chamber 260 via the supply fuel pipe 7 and the supply passage portion 29.

Figure 5:
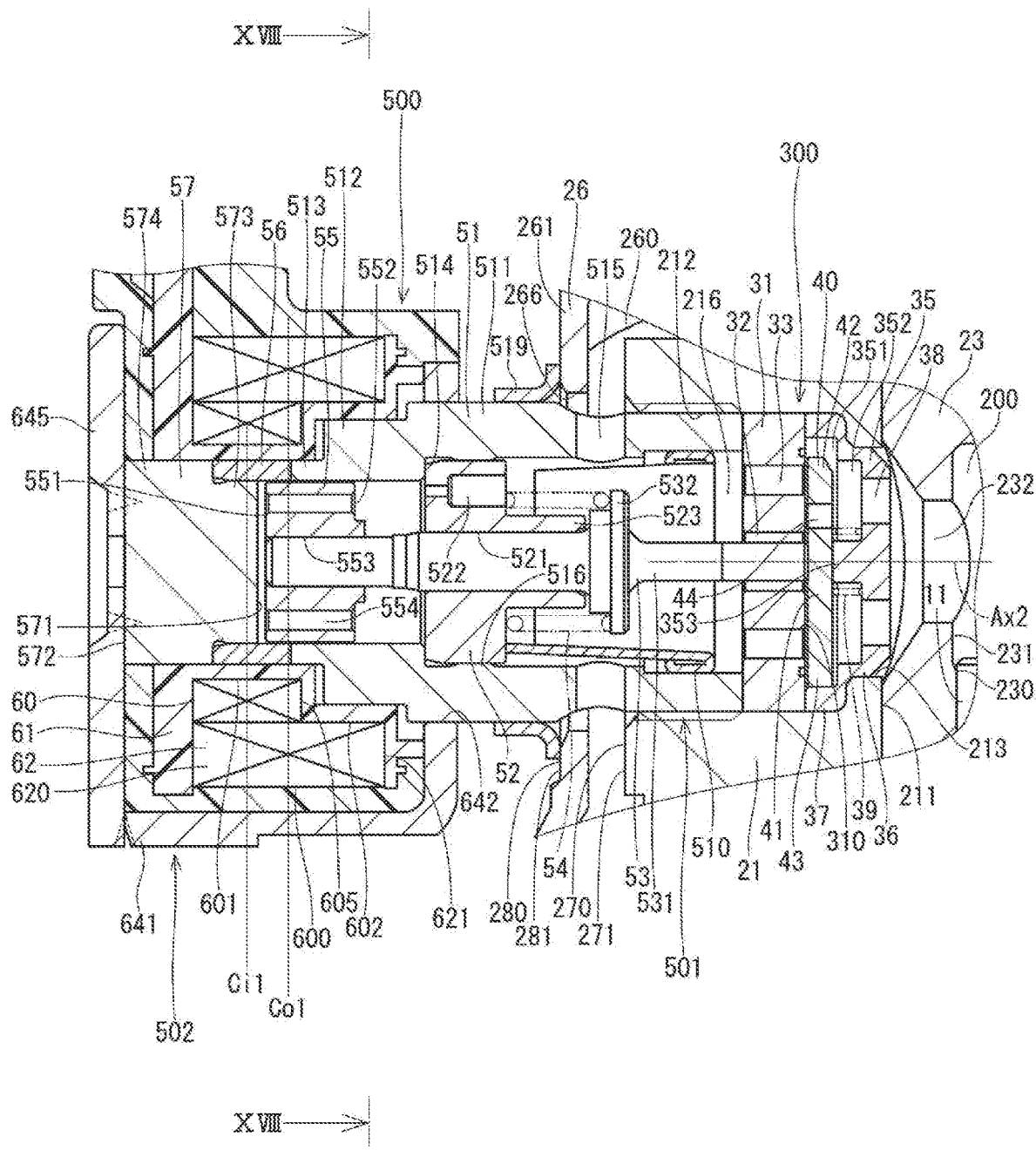
FIG. 5 is a cross-sectional view showing a suction valve unit and an electromagnetic driving unit of the high-pressure pump according to the first embodiment.

As shown in FIG. 5, the suction valve unit 300 is provided inside the suction hole portion 212 and the suction hole portion 213 of the upper housing 21, i.e., in the suction passage 216. The suction valve unit 300 includes a seat member 31, a stopper 35, a valve member 40, a spring 39, and others.

The seat member 31 has a substantially disk shape, and is made of metal such as stainless steel, for example. The seat member 31 is provided in the suction passage 216 inside the suction hole portion 212 such that the seat member 31 is substantially coaxial with the suction hole portion 212. An outer peripheral wall of the seat member 31 is press-fitted into an inner peripheral wall of the suction hole portion 212.

The seat member 31 includes a communication path 32, multiple communication paths 33, and valve seats 310. The communication path 32 has a substantially cylindrical shape that passes through the seat member 31 between one surface and the other surface of the seat member 31 at a center of the seat member 31. The communication path 32 is substantially coaxial with the seat member 31.

Each of the communication paths 33 has a substantially cylindrical shape that passes through the seat member 31 between one surface and the other surface of the seat member 31. The communication paths 33 are located radially outside the communication path 32. The multiple communication paths 33 are formed in a circumferential direction of the seat member 31. According to the present embodiment, the multiple communication paths is twelve communication paths 33, and arranged at equal intervals therebetween in the circumferential direction. Fuel uniformly flows in a state in which the communication paths 33 are formed at equal intervals as described above. Accordingly, behaviors of the valve member 40 described below are stabilized. The communication paths 33 are disposed on a virtual circle centered at an axis of the seat member 31.

The valve seats 310 are annularly formed around the communication path 32 and the multiple communication paths 33 on the surface of the seat member 31 facing the pressurizing chamber 200. In other words, multiple valve seats 310 are formed on the surface of the seat member 31 facing the pressurizing chamber 200.

The stopper 35 is made of metal such as stainless steel for example. The stopper 35 is located between the pressurizing chamber 200 and the seat member 31 in the suction passage 216. The stopper 35 includes a stopper small diameter portion 36, a stopper large diameter portion 37, a stopper recess 351, a stopper recess 352, a stopper protrusion 353, communication holes 38, and others.

The stopper small diameter portion 36 has a substantially cylindrical shape. An outer diameter of the stopper small diameter portion 36 is slightly smaller than an inner diameter of the suction hole portion 213. The stopper large diameter portion 37 has a substantially cylindrical shape. An outer diameter of the stopper large diameter portion 37 is larger than an outer diameter of the stopper small diameter portion 36, and slightly smaller than an inner diameter of the suction hole portion 212. The stopper large diameter portion 37 is formed integrally with the stopper small diameter portion 36. The stopper large diameter portion 37 is located at a side of the stopper small diameter portion 36 opposite to the pressurizing chamber 200, and coaxial with the stopper small diameter portion 36.

The stopper 35 is provided in the suction passage 216 such that the stopper small diameter portion 36 is located inside the suction hole portion 213, and that the stopper large diameter portion 37 is located inside the suction hole portion 212. In other words, the stopper 35 is located in the suction passage 216, and substantially coaxial with the suction hole portion 212 and the suction hole portion 213 inside the suction hole portion 212 and the suction hole portion 213.

An annular step surface between the stopper small diameter portion 36 and the stopper large diameter portion 37 is in contact with an annular step surface between the suction hole portion 212 and the suction hole portion 213. In this manner, movement of the stopper 35 toward the pressurizing chamber 200 is regulated.

The surface of the stopper large diameter portion 37 of the stopper 35 facing away from the pressurizing chamber 200 is in contact with the surface of the seat member 31 facing the pressurizing chamber 200. In this manner, movement of the stopper 35 away from the pressurizing chamber 200 is regulated.

The stopper recess 351 is recessed from the surface of the stopper large diameter portion 37 facing the seat member 31 toward the pressurizing chamber 200. The stopper recess has a substantially cylindrical shape. The stopper recess 351 substantially coaxial with the stopper large diameter portion 37. An inner diameter of the stopper recess 351 is smaller than an outer diameter of the stopper large diameter portion 37, and larger than an outer diameter of the stopper small diameter portion 36.

The stopper recess 352 is recessed from a bottom surface of the stopper recess 351 toward the pressurizing chamber 200. The stopper recess 352 has a substantially cylindrical shape. The stopper recess 352 is substantially coaxial with the stopper recess 351. An inner diameter of the stopper recess 352 is smaller than an inner diameter of the stopper recess 351 and an outer diameter of the stopper small diameter portion 36.

The stopper protrusion 353 protrudes from the center of the bottom surface of the stopper recess 352 toward the seat member 31. The stopper protrusion 353 has a substantially cylindrical shape. The stopper protrusion 353 is substantially coaxial with the stopper recess 352. The end surface of the stopper protrusion 353 facing the seat member 31 is located between the seat member 31 and the bottom surface of the stopper recess 351.

Each of the communication holes 38 has a substantially cylindrical shape that passes through the stopper small diameter portion 36 between the bottom surface of the stopper recess 352 and the surface of the stopper small diameter portion 36 facing the pressurizing chamber 200. The communication holes are located radially outside the stopper protrusion 353. The multiple communication holes 38 are formed at equal intervals in the circumferential direction of the stopper small diameter portion 36. According to the present embodiment, the four communication holes 38 are formed. The communication holes 38 are disposed on a virtual circle centered at an axis of the stopper small diameter portion 36.

The suction passage 216 is defined by the communication path 32 and the communication paths 33 of the seat member 31, the stopper recess 351 and the stopper recess 352 of the stopper 35, and the communication holes 38. Accordingly, fuel in the fuel chamber 260 is allowed to enter the pressurizing chamber 200 via the suction passage 216 defined by the communication path 32, the communication paths 33, the stopper recess 351, the stopper recess 352, and the communication holes 38, and the suction hole 232.

The valve member 40 is provided inside the stopper recess 351, i.e., the valve member 40 is located between the pressurizing chamber 200 and the seat member 31. The valve member 40 includes a valve body 41, tapered portions 42, guide portions 43, and communication holes 44. The valve body 41, the tapered portions 42, and the guide portions 43 are made of metal such as stainless steel, and integrally formed with each other. The valve body 41 has a substantially disk shape.

Each of the tapered portions 42 has a substantially annular shape, and is formed integrally with the valve body 41 on the radially outside of the valve body 41. Each of the tapered portions 42 has a tapered shape such that the surface of the tapered portion 42 facing the pressurizing chamber 200 tapers toward an axis Ax2 of the valve body 41.

The guide portions 43 each protrude radially outward from the valve body 41 to separate the tapered portions 42 in the circumferential direction, and are each formed integrally with the valve body 41 and the tapered portions 42. According to the present embodiment, the three guide portions 43 are formed at equal intervals therebetween in the circumferential direction of the valve body 41 to separate the three tapered portions 42 in the circumferential direction. An end of each of the guide portions 43 facing away from the valve body 41 is located on the radially outside an outer edge of the tapered portion 42. Each of the guide portions 43 can guide movement of the valve member 40 in the axial direction by sliding between the end of the guide portions 43 facing away from the valve body 41 and an inner peripheral wall of the stopper recess 351.

Each of the communication holes 44 passes through the valve body 41 between one surface and the other surface of the valve body 41. The communication holes 44 are located at equal intervals in the circumferential direction of the valve body 41. According to the present embodiment, the nine communication holes 44 are formed. The communication holes 44 are disposed on a virtual circle centered at the axis Ax2 of the valve body 41.

A plate thickness of each of the valve body 41 and the guide portions 43 of the valve member 40 is smaller than the distance between the surface of the seat member 31 facing the pressurizing chamber 200 and the end surface of the stopper protrusion 353 facing the seat member 31.

The surface of the valve member 40 facing the seat member 31 is configured to come into contact with the surface of the seat member facing the pressurizing chamber 200, i.e., the valve seats 310. A center of the surface of the valve member 40 facing the stopper 35 is configured to come into contact with the end surface of the stopper protrusion 353 facing the seat member 31.

The valve member 40 is movable in the axial direction in range of difference between the plate thickness of the valve body 41 and the guide portions 43 and the distance between the surface of the seat member 31 facing the pressurizing chamber 200 and the end surface of the stopper protrusion 353 facing the seat member 31.

When the surface of the valve member 40 facing the seat member 31 is separated from the surface of the seat member 31 facing the pressurizing chamber 200, i.e., the surface of the valve member 40 facing the seat member 31 is separated from the valve seats 310, the valve member 40 allows the fuel to flow in the communication path 32 and the communication paths 33 by opening the communication path 32 and the communication paths 33. When the surface of the valve member 40 facing the seat member 31 comes into contact with the valve seats 310, the valve member 40 restrict the fuel to flow in the communication paths 33 by closing the communication paths 33. Accordingly, the valve member 40 is a multi-seat-type valve body which comes into contact with the multiple valve seats 310.

When the valve member 40 opens, the fuel is allowed to flow through the communication path 32, the communication paths 33, the communication holes 44, and the stopper recess 351. Accordingly, the fuel flowing in the fuel chamber 260 is allowed to flow toward the pressurizing chamber 200 through the communication path 32, the communication paths 33, the communication holes 44, the stopper recess 351, the stopper recess 352, the communication holes 38, and the suction hole 232. The fuel flowing in the pressurizing chamber 200 is also allowed to flow toward the fuel chamber 260 through the suction hole 232, the communication holes 38, the stopper recess 352, the stopper recess 351, the communication holes 44, the communication paths 33, and the communication path 32. At this time, the fuel flows through the communication holes 44 of the valve member 40 and around the valve member 40.

When the valve member 40 closes, the fuel is restricted to flow between the communication path 32 and the communication path 33, and between the communication holes 44 and the stopper recess 351. Accordingly, the fuel flowing in the fuel chamber 260 is restricted to flow through the communication path 32, the communication paths 33, the communication holes 44, the stopper recess 351, the stopper recess 352, the communication holes 38, and the suction hole 232, toward the pressurizing chamber 200. The fuel is also restricted to flow from the pressurizing chamber 200 toward the fuel chamber 260 through the suction hole 232, the communication holes 38, the stopper recess 352, the stopper recess 351, the communication holes 44, the communication paths 33, and the communication path 32.

The spring 39 is, for example, a coil spring, and is provided on the radially outside of the stopper protrusion 353. One end of the spring 39 is in contact with the bottom surface of the stopper recess 352, and the other end is in contact with the surface of the valve member 40 facing the pressurizing chamber 200. The spring 39 biases the valve member 40 toward the seat member 31.

As shown in FIG. 5, the electromagnetic driving unit 500 protrudes from the suction hole portion 212 of the upper housing 21 radially outward the cover outer peripheral wall 280 via the cover hole portion 266 of the cover 26.

The electromagnetic driving unit 500 includes a cylindrical member 51, a guide member 52, a needle 53, a spring 54 as a biasing member, a movable core 55, a magnetic throttle portion 56, a fixed core 57, a coil 60, a yoke 641, a yoke 645, a connector 65, and others.

The cylindrical member 51 includes a first cylindrical portion 511, a second columnar portion 512, and a third cylindrical portion 513. Each of the first cylindrical portion 511, the second columnar portion 512, and the third cylindrical portion 513 is made of magnetic material, for example. The first cylindrical portion 511 has a substantially cylindrical shape.

The second columnar portion 512 has a columnar shape. The second columnar portion 512 is formed substantially coaxially and integrally with the first cylindrical portion 511 such that an end of the second columnar portion 512 is connected to an end of the first cylindrical portion 511. The maximum outer diameter of the second columnar portion 512 is smaller than the outer diameter of the end of the first cylindrical portion 511 facing the second columnar portion 512.

The third cylindrical portion 513 has a substantially cylindrical shape. The third cylindrical portion 513 is formed substantially coaxially and integrally with the second columnar portion 512 such that an end of the third cylindrical portion 513 is connected to the end of the second columnar portion 512 facing away from the first cylindrical portion 511. An outer diameter of the third cylindrical portion 513 is smaller than the maximum outer diameter of the second columnar portion 512.

Screw threads are formed in an outer peripheral wall of the end of the first cylindrical portion 511 facing away from the second columnar portion 512. Thread grooves corresponding to the screw threads of the first cylindrical portion 511 are formed in an inner peripheral wall of the end, facing away from the suction hole portion 213, of the suction hole portion 212 of the upper housing 21.

The cylindrical member 51 is provided such that the threads of the first cylindrical portion 511 are screwed into the thread grooves of the upper housing 21. The end surface, facing the pressurizing chamber 200, of the first cylindrical portion 511 of the cylindrical member 51 biases the seat member 31 and the stopper 35 toward the pressurizing chamber 200. Accordingly, the seat member 31 and the stopper 35 are in contact with each other to regulate movement of the seat member 31 and the stopper 35 in the axial direction. The step surface between the stopper small diameter portion 36 and the stopper large diameter portion 37 is pressed against the step surface between the suction hole portion 213 and the suction hole portion 212. Accordingly, an axial force from the step surface between the stopper small diameter portion 36 and the stopper large diameter portion 37 toward the pressurizing chamber 200 acts on the step surface between the suction hole portion 213 and the suction hole portion 212.

The outer peripheral wall of the second columnar portion 512 has a columnar shape having flat surfaces, such as a hexagonal columnar shape. Accordingly, for screwing the cylindrical member 51 into the suction hole portion 212 of the upper housing 21, a tool corresponding to the outer peripheral wall of the second columnar portion 512 may be used to screw the cylindrical member 51 into the suction hole portion 212 relatively easily.

The first cylindrical portion 511 of the cylindrical member 51 is located inside the cover hole portion 266 of the cover 26. Accordingly, the end of the first cylindrical portion 511 facing the pressurizing chamber 200 is located inside the cover columnar portion 261 The end of the first cylindrical portion 511 facing away from the pressurizing chamber 200, the second columnar portion 512, and the third cylindrical portion 513 are located outside the cover columnar portion 261. The cylindrical member 51 is provided such that an axis of the cylindrical member 51 is orthogonal to an axis Ax1 of the cylindrical inner peripheral wall 230 of the cylinder 23.

An inner diameter of a portion of the cylindrical member 51 facing the pressurizing chamber 200 is larger than an inner diameter of a portion of the cylindrical member 51 facing away from the pressurizing chamber 200. A step surface 514 having a substantially annular shape and facing the pressurizing chamber 200 is formed inside the cylindrical member 51. The step surface 514 is positioned slightly toward the pressurizing chamber 200 with respect to a connecting portion between the first cylindrical portion 511 and the second columnar portion 512 in the axial direction of the cylindrical member 51 to secure a sufficient wall thickness.

The first cylindrical portion 511 includes hole portions 515 that passes through the first cylindrical portion 511 between the inner peripheral wall and the outer peripheral wall of the first cylindrical portion 511. The hole portions 515 are formed at equal intervals in the circumferential direction of the first cylindrical portion 511. According to the present embodiment, the six hole portions 515 are formed. The hole portions 515 are located approximately between the housing outer peripheral wall 270 and the cover outer peripheral wall 280 in the axial direction of the first cylindrical portion 511. Accordingly, the fuel in the fuel chamber 260 is allowed to flow into the first cylindrical portion 511 via the hole portions 515, and flow toward the pressurizing chamber 200 via the suction passage 216.

A filter 510 having a tubular shape is provided at a position corresponding to the hole portions 515 inside the first cylindrical portion 511. The filter 510 is capable of collecting foreign matters contained in the fuel flowing from the fuel chamber 260 toward the pressurizing chamber 200. An end of the filter 510 facing the outer peripheral portion of the pressurizing chamber 200 is press-fitted into the inner peripheral wall of the first cylindrical portion 511, and an end of the filter 510 facing away from the pressurizing chamber 200 is in contact with the guide member 52. Accordingly, the fuel flowing in the fuel chamber 260 further flows into the suction passage 216 only after passing through the filter 510. The filter 510 is assembled with slightly crushed to achieve a secure contact with the guide member 52.

A welding ring 519 is provided outside the cover 26 on the radially outside of the first cylindrical portion 511 of the cylindrical member 51. The welding ring 519 has a substantially cylindrical shape, and is made of metal, for example. The welding ring 519 is formed such that an end of the welding ring 519 facing the pressurizing chamber 200 extends radially outward, and comes into contact with a periphery of the cover hole portion 266 of the flat portion 281 of the cover outer peripheral wall 280. The end of the welding ring 519b facing the pressurizing chamber 200 is welded to the flat portion 281 of the cover outer peripheral wall 280 in entire range in the circumferential direction. A portion of the welding ring 519 facing away from the pressurizing chamber 200 is welded to the outer peripheral wall of the first cylindrical portion 511 in the entire range in the circumferential direction. This configuration reduces leakage of the fuel from the fuel chamber 260 to the outside of the cover 26 via a clearance between the cover hole portion 266 and the outer peripheral wall of the first cylindrical portion 511. A load during a high pressure operation is received by a screw of the cylindrical member 51, thus no stress acts on the welding ring 519.

The guide member 52 is provided inside the first cylindrical portion 511. The guide member 52 has a substantially cylindrical shape, and made of metal, for example. The guide member 52 is fixed to the inside of the first cylindrical portion 511 such that an outer peripheral wall of the guide member 52 is fitted to an inner peripheral wall of the first cylindrical portion 511, and that an outer edge of one end surface of the guide member 52 comes into contact with the step surface 514 of the cylindrical member 51. A reduced diameter portion 516 is formed in a portion corresponding to the guide member 52 in the inner peripheral wall of the first cylindrical portion 511. The reduced diameter portion 516 protrudes radially inward from the inner peripheral wall of the first cylindrical portion 511. Accordingly, the inner peripheral wall of the first cylindrical portion 511 has a smaller inner diameter at the reduced diameter portion 516. The guide member 52 is therefore allowed to be press-fitted into the reduced diameter portion 516.

The guide member 52 has an axial hole 521 and a communication hole 522. The axial hole 521 passes through a center of the guide member 52 in the axial direction. The axial hole 521 is substantially coaxial with the guide member 52.

The communication hole 522 passes through the guide member 52 between a surface of the guide member 52 facing the pressurizing chamber 200 and the surface of the guide member 52 facing away from the pressurizing chamber 200. The communication hole 522 is located radially outside the axial hole 521. The communication hole 522 is in communication with an inner space of the first cylindrical portion 511 from the guide member 52 toward the pressurizing chamber 200 and an inner space of the first cylindrical portion 511 adjacent to an end of the guide member 52 facing away from the pressurizing chamber 200. The guide member 52 includes a cylindrical portion 523 that protrudes toward the pressurizing chamber 200 from the periphery of the axial hole 521 on the end surface of the guide member 52 facing the pressurizing chamber 200.

The needle 53 is provided inside the cylindrical member 51. The needle 53 is made of metal, for example. The needle 53 includes a needle body 531 and a stopping portion 532. The needle body 531 has a substantially cylindrical shape. The stopping portion 532 is formed integrally with the needle body 531, and extends from an outer peripheral wall of the needle body 531 to the radially outside. The stopping portion 532 has a substantially annular shape.

The needle 53 is provided such that the needle body 531 is inserted through the axial hole 521 of the guide member 52, and that the stopping portion 532 is located between the pressurizing chamber 200 and the guide member 52. An end of the needle body 531 facing the pressurizing chamber 200 is located inside the communication path 32 of the seat member 31, and is configured to come into contact with the surface of the valve member 40 facing away from the pressurizing chamber 200. The end of the needle body 531 facing away from the pressurizing chamber 200 is located on a side, opposite to the pressurizing chamber 200, of the end surface of the third cylindrical portion 513 facing away from the second columnar portion 512.

An outer diameter of a portion of the needle body 531 corresponding to the axial hole 521 is slightly smaller than an inner diameter of the axial hole 521. An outer diameter of the stopping portion 532 is larger than an outer diameter of the axial hole 521. The needle 53 is capable of reciprocating in the axial direction inside the cylindrical member 51. An outer peripheral wall of the needle body 531 is capable of sliding on the axial hole 521. Accordingly, the guide member 52 is capable of guiding the needle 53 to move in the axial direction. A relief portion is formed at an outer peripheral end of the guide member 52 to prevent deformation of an end of the axial hole 521 of the guide member 52. The relief portion is not press-fitted.

The spring 54 may be a coil spring, and is provided radially outside the needle body 531. One end of the spring 54 is in contact with the surface of the guide member 52 facing the pressurizing chamber 200, and the other end of the spring 54 is in contact with the surface of the stopping portion 532 facing away from the pressurizing chamber 200. In other words, the stopping portion 532 stops the other end of the spring 54. The spring 54 biases the needle 53 toward the pressurizing chamber 200. The biasing force of the spring 54 is larger than the biasing force of the spring 39. Accordingly, the spring 54 biases the valve member 40 toward the pressurizing chamber 200 via the needle 53 to press the surface of the valve member 40 facing the pressurizing chamber 200 against the stopper protrusion 353. In this state, the valve member 40 is separated from the valve seats 310 of the seat member 31 to open.

The movable core 55 has a substantially cylindrical shape, and is made of magnetic material, for example. The movable core 55 includes an axial hole 553 and a communication hole 554. The axial hole 553 passes through a center of the movable core 55 in the axial direction. The axial hole 553 is substantially coaxial with the movable core 55. An inner diameter of the axial hole 553 is smaller than an outer diameter of the end of the needle body 531 facing away from pressurizing chamber 200.

The movable core 55 is provided integrally with the needle 53 such that an inner peripheral wall of the axial hole 553 is fit into an outer peripheral wall of the needle body 531 at the end of the needle body 531 facing away from the pressurizing chamber 200. The movable core 55 is press-fitted into the needle 53, and restricted to move relative to the needle 53. An end surface 551 of the movable core 55 facing away from the pressurizing chamber 200 is located substantially on a common plane as the end surface of the needle body 531 facing away from the pressurizing chamber 200.

The communication hole 554 passes through the movable core 55 between the end surface 551 facing away from the pressurizing chamber 200 and the end surface 552 facing the pressurizing chamber 200. The communication hole 554 is located radially outward the axial hole 553. The communication hole 554 reduces fluid resistance generated during reciprocation of the movable core 55, and thereby allows the movable core 55 to move with high response. The communication hole 554 enables the fuel to flow in a space between the movable core 55 and the fixed core 57. Accordingly, dynamic change in pressure is restricted, thereby reducing cavitation erosion. The movable core 55 includes a cylindrical portion that protrudes toward the pressurizing chamber 200 from the periphery of the axial hole 553 at the end surface 552 of the movable core 55 facing the pressurizing chamber 200.

According to the present embodiment, the center of gravity of each of the needle 53 and the movable core 55, which are integrally provided, is always located on the axis of the needle 53 and inside the guide member 52 from opening to closing of the valve. Accordingly, the movements of the needle 53 and the movable core 55 in the axial direction can be stabilized.

The magnetic throttle portion 56 has a substantially cylindrical shape, and is made of nonmagnetic member, for example. An inner diameter and an outer diameter of the magnetic throttle portion 56 are substantially the same as the inner diameter and the outer diameter of the third cylindrical portion 513. The magnetic throttle portion 56 is provided on a side of the cylindrical member 51 opposite to the pressurizing chamber 200. The magnetic throttle portion 56 is substantially coaxial with the third cylindrical portion 513. The magnetic throttle portion 56 and the third cylindrical portion 513 are joined to each other by welding, for example. The end surface 551 of the movable core 55 facing away from the pressurizing chamber 200 is located inside the magnetic throttle portion 56.

The fixed core 57 is made of magnetic material, for example. The fixed core 57 includes a fixed core small diameter portion 573 and a fixed core large diameter portion 574. The fixed core small diameter portion 573 has a substantially cylindrical shape. An outer diameter of the fixed core small diameter portion 573 is slightly larger than an inner diameter of the magnetic throttle portion 56. The fixed core small diameter portion 573 is press-fitted into the magnetic throttle portion 56.

The fixed core large diameter portion 574 has a substantially cylindrical shape, and is formed integrally with the fixed core small diameter portion 573. An end of the fixed core large diameter portion 574 in the axial direction is connected to an end of the fixed core small diameter portion 573 such that the fixed core large diameter portion 574 is coaxial with the fixed core small diameter portion 573. An outer diameter of the fixed core large diameter portion 574 is larger than an outer diameter of the fixed core small diameter portion 573, and is substantially equal to an outer diameter of the magnetic throttle portion 56.

The fixed core 57 is located at a side of the cylindrical member 51 opposite to the pressurizing chamber 200 such that the fixed core small diameter portion 573 is located inside the end of the magnetic throttle portion 56 facing away from the cylindrical member 51. The fixed core 57 and the magnetic throttle portion 56 are joined to each other by welding, for example. An annular step surface between the fixed core small diameter portion 573 and the fixed core large diameter portion 574 is in contact with the end surface of the magnetic throttle portion 56 facing away from the cylindrical member 51. An end surface 571 of the fixed core 57 facing the pressurizing chamber 200 is located between the pressurizing chamber 200 and the end surface of the magnetic throttle portion 56 facing away from the cylindrical member 51. The fixed core 57 is substantially coaxial with the magnetic throttle portion 56. In a state in which the valve member 40 is separated from the valve seats 310 with the needle 53 biased by the spring 54 toward the pressurizing chamber 200, a clearance is generated between the end surface 571 of the fixed core 57 facing the pressurizing chamber 200 and the end surface 551 of the movable core 55 facing away from the pressurizing chamber 200.

According to the present embodiment, the cylindrical member 51, the guide member 52, the spring 54, the needle 53, the movable core 55, the magnetic throttle portion 56, the fixed core 57, and the filter 510 are assembled into one body in advance to provide subassembly constituting a first electromagnetic driving unit 501.

Specifically, the spring 54 and the needle 53 are initially assembled to the guide member 52, and the movable core 55 is press-fitted into the needle 53. Subsequently, the magnetic throttle portion 56 is press-fitted and welded to the fixed core small diameter portion 573 of the fixed core 57 to weld the magnetic throttle portion 56 and the cylindrical member 51. Thereafter, the guide member 52 in the state described above is press-fitted into the cylindrical member 51 in the state described above. At this time, the filter 510 is press-fitted into the inside of the first cylindrical portion 511 until the end of the filter 510 comes into contact with the surface of the guide member 52 facing the pressurizing chamber 200. Sub-assembling of the first electromagnetic driving unit 501 is completed by the foregoing steps.

The coil 60 includes a spool 61 and a winding portion 62. The spool 61 has a substantially cylindrical shape, and is made of resin, for example. The spool 61 is substantially coaxially with the cylindrical member 51, and is located radially outside the end of the cylindrical member 51 facing away from the pressurizing chamber 200, and the ends, facing the pressurizing chamber 200, of the movable core 55, the magnetic throttle portion 56, and the fixed core 57. The spool 61 has a part, in the axial direction, located on the radially outside of the movable core 55.

The winding portion 62 is constituted by a wire 620. The wire 620 has a linear shape, and is made of electrically conductive material such as copper. The winding portion 62 has a substantially cylindrical shape formed by winding the wire 620 around an outer peripheral wall of the spool 61. The coil 60 includes an outer cylindrical surface 600 that is a virtual surface that is in contact with an outer peripheral surface of the winding portion 62, and an inner cylindrical surface 601 and an inner cylindrical surface 602 which are virtual surfaces that are in contact with an inner peripheral surface of the winding portion 62. A diameter of the inner cylindrical surface 601 is different from that of the inner cylindrical surface 602. The spool 61 corresponds to a "winding forming portion".

The outer cylindrical surface 600 has a substantially cylindrical shape. The inner cylindrical surface 601 has a substantially cylindrical shape, and is located inside a portion of the outer cylindrical surface 600 facing away from the pressurizing chamber 200. The inner cylindrical surface 602 has a substantially cylindrical shape, and is positioned between the pressurizing chamber 200 and the inner cylindrical surface 601 inside a portion of the outer cylindrical surface 600 facing the pressurizing chamber 200. A diameter of the inner cylindrical surface 602 is larger than a diameter of the inner cylindrical surface 601. The inner cylindrical surface 601 and the inner cylindrical surface 602 are located on the outer peripheral wall of the spool 61. In other words, the portion of the spool 61 facing the pressurizing chamber 200 in the axial direction has an outer diameter different from an outer diameter of the portion of the spool 61 facing away from the pressurizing chamber 200.

The coil 60 includes a connecting surface 605 that is a virtual surface between the inner cylindrical surface 601 and the inner cylindrical surface 602. The connecting surface 605 is located on the outer peripheral wall of the spool 61, and at least a part of the connecting surface 605 is perpendicular to the axis of the spool 61. In this manner, the wire 620 is wound around the outer peripheral wall of the spool 61 to constitute the winding portion 62 having a cylindrical shape. In other words, the wire 620 is wound around the inner cylindrical surface 601, the inner cylindrical surface 602, and the connecting surface 605 radially outward.

Each of the yoke 641 and the yoke 645 is made of magnetic material, for example. The yoke 641 has a bottomed cylindrical shape. A yoke hole portion 642 has a substantially circular shape and is formed at a center of the bottom of the yoke 641. The yoke 641 has a small clearance between the yoke 641 and the outer peripheral wall of the first cylindrical portion 511. This clearance is set so that the clearance allows the inner peripheral wall of the yoke hole portion 642 in the bottom portion of the yoke 641 to contact with the outer peripheral wall of the first cylindrical portion 511, or that the clearance does not decrease an attractive force. A cylindrical portion of the yoke 641 is located on the radially outside of the coil 60. A space between the yoke 641 and the coil 60 is filled with resin.

The yoke 645 has a plate shape, and closes an end of the cylindrical portion of the yoke 641 facing away from the bottom portion. An outer edge of the end surface of the yoke 645 facing the pressurizing chamber 200 is in contact with the cylindrical portion of the yoke 641. A center of the end surface of the yoke 645 facing the pressurizing chamber 200 is in contact with an end surface 572 of the fixed core 57 facing away from the pressurizing chamber 200, and is welded to the end surface 572 of the fixed core 57.

The connector 65 protrudes radially outward from a notch formed in a part of the cylindrical portion of the yoke 641 in the circumferential direction (see FIG. 2). The connector 65 has a terminal 651. The terminal 651 is electrically connected to the wire 620 of the coil 60. A harness 6 is connected to the connector 65. This configuration allows power supply to the winding portion 62 of the coil 60 via the harness 6 and the terminal 651.

According to the present embodiment, the coil 60, the yoke 641, and the connector 65 are assembled in advance into a sub-assembly constituting a second electromagnetic driving unit 502.

Specifically, the terminal 651 is initially press-fitted into the spool 61. Subsequently, the wire 620 are wound around the spool 61, and the terminal 651 and the wire 620 are welded. In other words, the terminal 651 and the wire 620 are fused. In a state in which the spool 61 and others assembled as described above have been inserted into the yoke 641, resin is filled to constitute the connector 65. Thereafter, the outer edge of the yoke 645 is welded to the cylindrical portion of the yoke 641. Sub-assembling of the second electromagnetic driving unit 502 is completed by the foregoing steps.

A clearance is formed between the end surface of the resin portion inside the yoke 641 facing away from the pressurizing chamber 200 and the end surface of the yoke 645 facing the pressurizing chamber 200. Accordingly, assembly between the yoke 641 and the yoke 645 is improved. Moreover, the clearance is small enough to prevent water from flowing therethrough. This configuration therefore reduces entrance of water into the yoke 641, thereby reducing corrosion of components such as the fixed core 57 and the cylindrical member 51.

The coil 60 generates an electromagnetic force when energized via the harness 6 and the terminal 651 in accordance with a command from the ECU. As a result, a magnetic circuit is formed in areas of the yoke 641, the yoke 645, the fixed core 57, the movable core 55, and the cylindrical member 51 except for the magnetic throttle portion 56. In this case, an attractive force is generated between the fixed core 57 and the movable core 55, thus the movable core 55 is attracted toward the fixed core 57 together with the needle 53. Accordingly, the valve member 40 moves toward the valve seats 310 of the seat member 31 by biasing force of the spring 39. As a result, the valve member 40 comes into contact with the valve seats 310 and is closed. As described above, the electromagnetic driving unit 500 generates an electromagnetic force when the coil 60 is energized. In this case, an attractive force is generated between the fixed core 57 and the movable core 55. Accordingly, the movable core 55 and the needle 53 move in a closing direction of the valve member 40 to close the valve member 40.

In this manner, the coil 60 is capable of generating an attractive force between the fixed core 57 and the movable core 55 by energization of the winding portion 62, and of moving the movable core 55 and the needle 53 in the closing direction. When the movable core 55 and the needle 53 move in the closing direction, the cylindrical portion 523 of the guide member 52 comes into contact with the stopping portion 532 of the needle 53. Accordingly, movement of the movable core 55 and the needle 53 in the closing direction is regulated. When movement of the movable core 55 and the needle 53 in the closing direction is regulated by the contact between the cylindrical portion 523 and the stopping portion 532, the movable core 55 and the fixed core 57 are separated from each other. In other words, according to the present embodiment, the movable core 55 and the fixed core 57 do not come into contact with each other even when the movable core 55 and the needle 53 are attracted toward the fixed core 57.

The communication hole 522 has an orifice to cause a damper action on a part of the guide member 52 facing away from the pressurizing chamber 200. A negative pressure generated in an opposite direction of the damper action can reduce a collision speed at the time of collision between the cylindrical portion 523 and the stopping portion 532, thereby reducing NV.

When the coil 60 is not energized, the valve member 40 is open. In this case, the fuel chamber 260 is in communication with the pressurizing chamber 200. When the plunger 11 moves away from the pressurizing chamber 200 in this state, the volume of the pressurizing chamber 200 increases. Accordingly, the fuel in the fuel chamber 260 flows through the hole portion 515 into the first cylindrical portion 511. The fuel is then sucked into the pressurizing chamber 200 through the suction hole 232. When the plunger 11 moves toward the pressurizing chamber 200 in an open state of the valve member 40, the volume of the pressurizing chamber 200 decreases. In this case, the fuel in the pressurizing chamber 200 flows through the suction hole 232 toward the valve member 40.

When the coil 60 is energized during movement of the plunger 11 toward the pressurizing chamber 200, the valve member 40 is closed and the fuel is thereby prevented from flowing between the fuel chamber 260 and the pressurizing chamber 200. When the plunger 11 further moves toward the pressurizing chamber 200 in a state in which the valve member 40 is closed, the volume of the pressurizing chamber 200 further decreases. In this state, the fuel in the pressurizing chamber 200 is pressurized.

In this manner, the amount of fuel pressurized in the pressurizing chamber 200 is controlled by closing the valve member 40 using the electromagnetic driving unit 500 at any timing during movement of the plunger 11 toward the pressurizing chamber 200. According to the present embodiment, the suction valve unit 300 and the electromagnetic driving unit 500 constitute a normally open type valve device.

According to the present embodiment, the communication holes 44 are formed in the valve member 40 on the radially inward a center of each of the communication holes 38 of the stopper 35. This configuration branches the fuel returned from the pressurizing chamber 200 into parts inside and outside the valve member 40 to prevent self-closure. An edge of the valve member 40 facing the seat member 31 is chamfered. This configuration allows the fuel to flow smoothly, and improves a self-closure limit.

According to the present embodiment, the coil 60 is not energized when the fuel injection valves 138 do not inject fuel. In other words, the coil 60 is not energized when the fuel is cut off. In this state, the fuel discharged from the high-pressure pump 10 is zero. A load of the spring 54 in this state is set to prevent the valve member 40 from being self-closed.

When the coil 60 is not energized, i.e., the coil is in a non-energization state, the end surface 551 of the movable core 55 facing away from the pressurizing chamber 200, i.e., the end surface 551 of the movable core facing the fixed core 57, is located between a center Ci1 of the inner cylindrical surface 601 in the axial direction, which is an inner cylindrical surface having the smallest diameter, and a center Co1 of the outer cylindrical surface 600 in the axial direction as shown in FIG. 5. In addition, an end surface 552 of the movable core 55 facing the pressurizing chamber 200 is located between the fixed core 57 and the end surface 621 of the winding portion 62 facing the pressurizing chamber 200.

According to the present embodiment, the end surface 551 of the movable core 55 facing the fixed core 57 is located between the center Ci1 and the center Co1 even when the movable core 55 is in a closest position to the fixed core 57 during energization of the coil 60. In other words, the end surface 551 of the movable core 55 facing the fixed core 57 is always located between the center Ci1 and the center Co1 regardless of the energization state of the coil 60.

Figure 6:
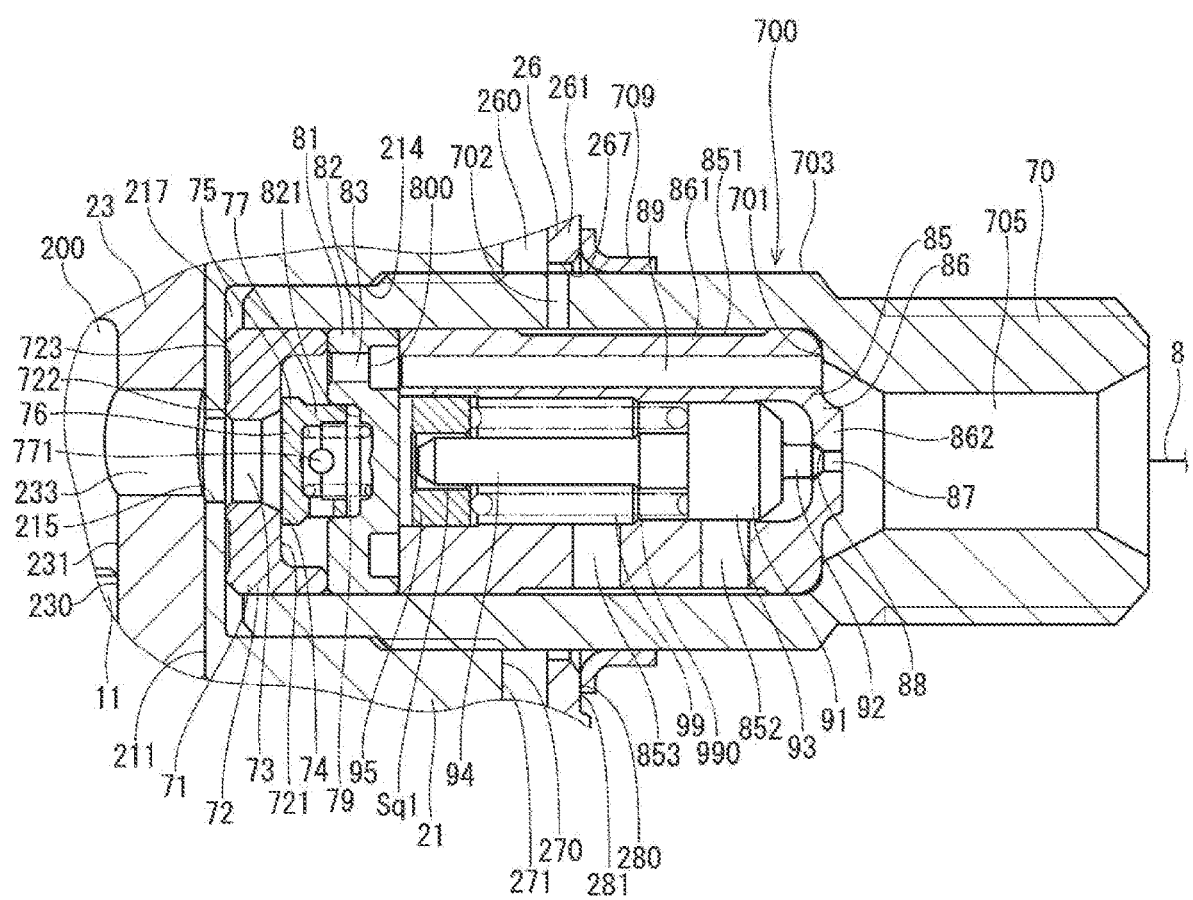
FIG. 6 is a cross-sectional view showing a discharge passage portion of the high-pressure pump according to the first embodiment.

As shown in FIG. 6, the discharge passage portion 700 protrudes from the discharge hole portion 214 of the upper housing 21 toward the radially outside of the cover outer peripheral wall 280 via the cover hole portion 267 of the cover 26.

The discharge passage portion 700 includes a discharge joint 70, a discharge seat member 71, an intermediate member 81, a relief seat member 85, a discharge valve 75, a spring 79 as a discharge valve biasing member, a relief valve 91, a spring 99 as a relief valve biasing member, and a stopping member 95.

The discharge joint 70 has a substantially cylindrical shape, and is made of metal such as stainless steel, for example. Screw threads are formed on an outer peripheral wall of a portion of the discharge joint 70 at a predetermined distance away from one end toward the other end of the discharge joint 70. Thread grooves corresponding to the threads of the discharge joint 70 are formed in an inner peripheral wall of the end of the discharge hole portion 214 of the upper housing 21 facing away from the discharge hole portion 215. The discharge joint 70 is provided such that the screw threads are screwed into the screw grooves of the upper housing 21.

The discharge joint 70 is provided inside the cover hole portion 267 of the cover 26. The end of the discharge joint 70 facing the pressurizing chamber 200 is located in the discharge hole portion 214 inside the cover columnar portion 261, i.e., in the discharge passage 217, and the end of the discharge joint 70 facing away from the pressurizing chamber 200 is located outside the cover columnar portion 261. The discharge joint 70 is provided such that an axis of the discharge joint 70 is orthogonal to the axis Ax1 of the cylindrical inner peripheral wall 230 of the cylinder 23. According to the present embodiment, the discharge joint 70 is substantially coaxial with the cylindrical member 51.

An inner diameter of a portion of the discharge joint 70 facing the pressurizing chamber 200 is larger than an inner diameter of a portion of the discharge joint 70 facing away from the pressurizing chamber 200. Accordingly, a step surface 701 having a substantially annular shape and facing the pressurizing chamber 200 is formed inside the discharge joint 70. The step surface 701 is located between the pressurizing chamber 200 and the cover outer peripheral wall 280.

The discharge joint 70 has a discharge passage 705 therein. The fuel discharged from the pressurizing chamber 200 flows through the discharge passage 705. The discharge joint 70 corresponds to a "discharge passage forming portion".

The discharge joint 70 includes a lateral hole portion 702 that passes through the discharge joint 70 between an inner peripheral wall and an outer peripheral wall of the discharge joint 70. The discharge joint 70 may include multiple lateral hole portions 702 formed at equal intervals in the circumferential direction of the discharge joint 70. In this embodiment, the discharge joint 70 includes one lateral hole portion 702. The lateral hole portion 702 is located between the housing outer peripheral wall 270 and the cover outer peripheral wall 280 in the axial direction of the discharge joint 70. Accordingly, the fuel in the discharge passage 705 is allowed to flow toward the fuel chamber 260 via the relief valve 91 described below and the lateral hole portion 702.

The discharge seat member 71 includes a discharge member body 72, a discharge hole 73, and a discharge valve seat 74. The discharge member body 72 has a substantially disk shape, and is made of metal, for example. An outer diameter of the discharge member body 72 is slightly larger than an inner diameter of the end of the discharge joint 70 facing the pressurizing chamber 200. The discharge member body 72 is provided in the discharge passage 705 such that an outer peripheral wall of the discharge member body 72 is press-fitted into the inner peripheral wall at the end of the discharge joint 70 facing the pressurizing chamber 200.

The discharge member body 72 includes a discharge recess 721, an inner projection 722, and an outer projection 723. The discharge recess 721 is recessed from a center of the end surface of the discharge member body 72 facing away from the pressurizing chamber 200 toward the pressurizing chamber 200. The discharge recess 721 has a substantially cylindrical shape. The inner projection 722 projects from the end surface of the discharge member body 72 facing the pressurizing chamber 200 toward the pressurizing chamber 200. The inner projection 722 has a substantially annular shape. The outer projection 723 protrudes from the end surface of the discharge member body 72 facing the pressurizing chamber 200 toward the pressurizing chamber 200. The outer projection 723 has a substantially annular shape and is located radially outward the inner projection 722.

The discharge hole 73 passes through the discharge seat member 71 between the end surface of the discharge member body 72 facing the pressurizing chamber 200 and a bottom surface of the discharge recess 721. The discharge hole 73 has a substantially cylindrical shape and is located radially inward the inner projection 722. The discharge valve seat 74 has a substantially annular shape and is located around the discharge hole 73 on the bottom surface of the discharge recess 721.

The discharge recess 721, the inner projection 722, the outer projection 723, the discharge hole 73, and the discharge valve seat 74 are substantially coaxial with the discharge member body 72. The inner projection 722 and the outer projection 723 are in contact with the periphery of the discharge hole portion 215 on the bottom surface of the discharge hole portion 214 of the upper housing 21.

The intermediate member 81 includes an intermediate member body 82 and first passages 83. The intermediate member body 82 has a substantially disk shape, and is made of metal, for example. The intermediate member body 82 in the discharge passage 705 is disposed on a side of the discharge seat member 71 opposite to the pressurizing chamber 200. An outer diameter of the intermediate member body 82 is slightly smaller than an inner diameter of the end of the discharge joint 70 facing the pressurizing chamber 200. The intermediate member body 82 is substantially coaxial with the discharge member body 72 such that the end surface of the intermediate member body 82 facing the pressurizing chamber 200 comes into contact with the end surface of the discharge member body 72 facing away from the pressurizing chamber 200.

An intermediate recess 821 is formed in the intermediate member body 82. The intermediate recess 821 is recessed away from the pressurizing chamber 200 from a center of the end surface of the intermediate member body 82 facing the pressurizing chamber 200. The intermediate recess 821 is substantially coaxial with the intermediate member body 82.

The first passages 83 pass through the intermediate member body 82 between the end surface of the intermediate member body 82 facing the pressurizing chamber 200 side and the end surface of the intermediate member body 82 facing away from the pressurizing chamber 200. Each of the first passages 83 has a substantially cylindrical shape and is located radially outward the intermediate recess 821. The first passages 83 are formed at equal intervals in the circumferential direction of the intermediate member body 82. According to the present embodiment, the multiple first passages 83 are the five first passages 83. The first passages 83 each in communication with the pressurizing chamber 200 via the discharge recess 721, the discharge hole 73, the discharge hole portion 215, and the discharge hole 233.

The relief seat member 85 includes a relief member body 86, a relief hole 87, a relief valve seat 88, second passages 89, a relief outer peripheral recess 851, a relief lateral hole 852, and a lateral hole 853. The relief member body 86 is made of metal, for example. The relief member body 86 has a relief member cylindrical portion 861 and a relief member bottom portion 862.

The relief member cylindrical portion 861 has a substantially cylindrical shape. The relief member bottom portion 862 is formed integrally with the relief member cylindrical portion 861 such that the relief member bottom portion 862 closes an end of the relief member cylindrical portion 861. In other words, the relief member body 86 has a bottomed cylindrical shape.

The relief member body 86 in the discharge passage 705 is located at a side of the intermediate member 81 opposite to the pressurizing chamber 200. An outer diameter of the relief member cylindrical portion 861 is slightly smaller than an inner diameter of a portion of the discharge joint 70 located between the pressurizing chamber 200 and the step surface 701. Accordingly, the relief member body 86 is provided inside the discharge joint 70 with a clearance fit. The relief member body 86 is substantially coaxial with the intermediate member body 82 such that the end surface of the relief member cylindrical portion 861 facing the pressurizing chamber 200 contacts on an outer edge of the end surface of the intermediate member body 82 facing away from the pressurizing chamber 200, and that an outer edge of the end surface of the relief member cylindrical portion 861 facing away from the pressurizing chamber 200 contacts the step surface 701 of the discharge joint 70.

The relief hole 87 passes through the relief member bottom portion 862 between a center of a surface of the relief member bottom portion 862 facing the pressurizing chamber 200 and the surface of the relief member bottom portion 862 facing away from the pressurizing chamber 200. The relief hole 87 has a substantially cylindrical shape. The relief valve seat 88 is located around the relief hole 87 on the surface of the relief seat member bottom portion 862 facing the pressurizing chamber 200. The relief valve seat 88 has an annular shape. The relief valve seat 88 tapers toward an axis of the relief member cylindrical portion 861 in a direction away from the pressurizing chamber 200. The relief hole 87 and the relief valve seat 88 are substantially coaxial with the relief member body 86.

The second passages 89 pass through the relief member cylindrical portion 861 between the end surface of the relief member cylindrical portion 861 facing the pressurizing chamber 200 and the end surface of the relief member cylindrical portion 861 opposite to the pressurizing chamber 200. Each of the second passages has a substantially cylindrical shape. The second passages 89 are formed at equal intervals in the circumferential direction of the relief member cylindrical portion 861. According to the present embodiment, the multiple second passages 89 are the four second passages 89. According to the present embodiment, a length of the intermediate member body 82 in the axial direction is smaller than a length of the relief member cylindrical portion 861 in the axial direction. Accordingly, the length of each of the first passages 83 is smaller than the length of each of the second passages 89.

The relief outer peripheral recess 851 is recessed radially inward from the outer peripheral wall of the relief member cylindrical portion 861 and has a substantially cylindrical shape. The relief outer peripheral recess 851 is in communication with the fuel chamber 260 via the lateral hole portion 702 of the discharge joint 70. The relief lateral hole 852 passes through the relied member cylindrical portion 861 between the relief outer peripheral recess 851 and an inner peripheral wall of the relief member cylindrical portion 861.

The lateral hole 853 passes through the relief member cylindrical portion 861 between the relief outer peripheral recess 851 and the inner peripheral wall of the relief member cylindrical portion 861. The lateral hole 853 has a substantially cylindrical shape and is located between the pressurizing chamber 200 and the relief lateral hole 852. In this case, a space in the discharge passage 705 adjacent to the end of the relief member bottom portion 862 facing away from the pressurizing chamber 200 is in communication with the fuel chamber 260 through the relief hole 87, the relief lateral hole 852, the relief outer peripheral recess 851, and the lateral hole portion 702.

According to the present embodiment, an annular recess 800 is formed in the intermediate member 81. The annular recess 800 is recessed toward the pressurizing chamber 200 from the end surface of the intermediate member body 82 facing away from the pressurizing chamber 200. In other words, the annular recess is recessed from the surface of the intermediate member body 82 facing the relief seat member 85 toward the pressurizing chamber 200. The annular recess has a substantially annular shape. The annular recess 800 is substantially coaxial with the intermediate member body 82. The annular recess 800 fluidly connects the ends of all the first passages 83 facing away from the pressurizing chamber 200 and the ends of all the second passages 89 facing the pressurizing chamber 200. In other words, the first passages 83 and the second passages 89 are in communication with each other through the annular recess 800. The first passages 83 and the second passages 89 are in communication with each other through the annular recess 800 regardless of a manner that the intermediate member 81 and the relief seat member 85 relatively rotate around the axis.

Accordingly, the pressurizing chamber 200 is in communication with the space in the discharge passage 705 on a side of the relief member cylindrical portion 861 opposite to the pressurizing chamber 200 through the discharge hole 233, the discharge hole portion 215, the discharge hole 73, the discharge recess 721, the first passages 83, the annular recess 800, and the second passages 89.

When fuel flows between the first passages 83 and the second passages 89 via the annular recess 800, the fuel flows through the annular recess 800 in the radial direction. The depth of the annular recess 800 is set to be equal to or longer than a diameter of each of the first passages 83 to secure a flow path area.

As described above, the discharge joint 70 is provided such that the screw threads formed on the outer peripheral wall are screwed into the screw grooves of the upper housing 21. A clearance is formed between the end of the discharge joint 70 facing the pressurizing chamber 200 and the bottom surface of the discharge hole portion 214. The step surface 701 of the discharge joint 70 biases the relief seat member 85, the intermediate member 81, and the discharge seat member 71 toward the pressurizing chamber 200. Accordingly, the relief seat member 85, the intermediate member 81, and the discharge seat member 71 are in contact with each other, and movements of the respective members 85, 81, and 71 in the axial direction is regulated. Moreover, the inner projection 722 and the outer projection 723 of the discharge seat member 71 are pressed against the step surface between the discharge hole portion 214 and the discharge hole portion 215, i.e., the periphery of the discharge hole portion 215 in the bottom surface of the discharge hole portion 214. Accordingly, an axial force from the inner projection 722 and the outer projection 723 toward the pressurizing chamber 200 acts on the periphery of the discharge hole portion 215 on the bottom surface of the discharge hole portion 214.

The discharge joint 70 includes a polygonal columnar surface 703. The polygonal columnar surface 703 has a substantially hexagonal columnar shape. The polygonal columnar surface 703 is located substantially at a position radially outside the step surface 701 in the axial direction of the outer peripheral wall of the discharge joint 70. For screwing the discharge joint 70 into the discharge hole portion 214 of the upper housing 21, a tool fit to the polygonal columnar surface 703 of the discharge joint 70 may be used. In this case, the discharge joint 70 is screwed into the discharge hole portion 214 relatively easily.

A welding ring 709 is located outside the cover 26 and radially outside the discharge joint 70. The welding ring 709 has a substantially cylindrical shape, and is made of metal, for example. The welding ring 709 is formed such that an end of the welding ring 709 facing the pressurizing chamber 200 extends radially outward, and comes into contact with a periphery of the cover hole portion 267 of the flat portion 281 of the cover outer peripheral wall 280. The end of the welding ring 709 facing the pressurizing chamber 200 is welded to the flat portion 281 of the cover outer peripheral wall 280 in the entire range in the circumferential direction. A portion of the welding ring 709 facing away from the pressurizing chamber 200 is welded to the outer peripheral wall of the discharge joint 70 in the entire range in the circumferential direction. This configuration reduces leakage of the fuel from the fuel chamber 260 to the outside of the cover 26 via a clearance between the cover hole portion 267 and the outer peripheral wall of the discharge joint 70.

The high-pressure fuel pipe 8 is connected to the end of the discharge joint 70 facing away from the pressurizing chamber 200. In this configuration, the fuel having entered the fuel chamber 260 from the supply fuel pipe 7 via the supply passage portion 29 of the high-pressure pump 10 is pressurized in the pressurizing chamber 200, and discharged into the high-pressure fuel pipe 8 via the discharge passage 705 inside the discharge joint 70. The high pressure fuel discharged into the high-pressure fuel pipe 8 is supplied to the fuel rail 137 via the high-pressure fuel pipe 8.

The discharge valve 75 is disposed between the discharge seat member 71 and the intermediate member 81. The discharge valve 75 is made of metal, for example. The discharge valve 75 includes a discharge valve contact portion 76 and a discharge valve sliding portion 77.

The discharge valve contact portion 76 has a substantially disk shape. An outer diameter of the discharge valve contact portion 76 is smaller than an inner diameter of the discharge recess 721, and larger than an inner diameter of the intermediate recess 821. The discharge valve contact portion 76 is disposed inside the discharge recess 721 such that an outer edge of a surface of the discharge valve contact portion 76 can contact the discharge valve seat 74 or be separated from the discharge valve seat 74.

When the discharge valve contact portion 76 is separated from the discharge valve seat 74, the discharge valve 75 is opened and allows the fuel to flow in the discharge hole 73. When the discharge valve contact portion 76 contacts the discharge valve seat 74, the discharge valve 75 is closed and restrict the fuel to flow in the discharge hole 73.

The discharge valve sliding portion 77 is formed integrally with the discharge valve contact portion 76. The discharge valve sliding portion 77 protrudes from the other surface of the discharge valve contact portion 76, and has a substantially cylindrical shape. The discharge valve sliding portion 77 is substantially coaxial with the discharge valve contact portion 76. An outer diameter of the discharge valve sliding portion 77 is slightly smaller than an inner diameter of the intermediate recess 821.

The discharge valve 75 is movable in the axial direction while an outer peripheral wall of the discharge valve sliding portion 77 slides on an inner peripheral wall of the intermediate recess 821. The end of the discharge valve sliding portion 77 facing away from the discharge valve contact portion 76 can contact an outer edge of a bottom surface of the intermediate recess 821, or be separated from the outer edge of the bottom surface of the intermediate recess 821. The intermediate member 81 is capable of regulating the discharge valve 75 from moving in the opening direction when the discharge valve sliding portion 77 of the discharge valve 75 contacts the bottom surface of the intermediate recess 821.

Holes 771 are formed in the discharge valve sliding portion 77. The holes 771 passes through the discharge valve sliding portion 77 between the inner peripheral wall and the outer peripheral wall of the discharge valve sliding portion 77. Each of the holes 771 has a substantially cylindrical shape. The holes 771 are formed at equal intervals in the circumferential direction of the discharge valve sliding portion 77. According to the present embodiment, the multiple holes 771 are the four holes 771. The holes 771 fluidly connect a space inside the discharge valve sliding portion 77 with a space outside the discharge valve sliding portion 77. Accordingly, the discharge valve 75 is capable of smoothly reciprocating in the axial direction. At least a part of the holes 771 is located between the pressurizing chamber 200 and the end surface of the intermediate member 81 facing the pressurizing chamber 200 even in a state in which the discharge valve 75 is in contact with the bottom surface of the intermediate recess 821 of the intermediate member 81. Accordingly, at least a part of the holes 771 is located between the pressurizing chamber 200 and the end surface of the intermediate member 81 facing the pressurizing chamber 200 to fluidly connect the space inside the discharge valve sliding portion 77 and the space outside the discharge valve sliding portion 77 regardless of the position of the discharge valve 75 in a range in which the discharge valve 75 is movable between the discharge seat member 71 and the intermediate member 81.

The spring 79 is a coil spring, for example, and is disposed inside the discharge valve sliding portion 77. One end of the spring 79 is in contact with a recessed spring seat formed at the center of a bottom surface of the intermediate recess 821, while the other end is in contact with the end surface of the valve contact portion 76 facing the discharge valve sliding portion 77. The spring 79 biases the discharge valve 75 toward the discharge valve seat 74.

When a fuel pressure in the pressurizing chamber 200 increases to a predetermined value or more, the discharge valve 75 moves toward the high-pressure fuel pipe 8 while resisting a biasing force of the spring 79. In this case, the discharge valve 75 is separated from the discharge valve seat 74 and is opened. Accordingly, the fuel flowing between the discharge seat member 71 and the pressurizing chamber 200 flows toward the high-pressure fuel pipe 8 through the discharge hole 73, the discharge valve seat 74, the discharge recess 721, the first passages 83, the annular recess 800, and the second passages 89.

The relief valve 91 is disposed inside the relief member cylindrical portion 861. The relief valve 91 is made of metal, for example. The relief valve 91 includes a relief valve contact portion 92, a relief valve sliding portion 93, and a relief valve protruding portion 94.

The relief valve contact portion 92 has a substantially cylindrical shape. The relief valve contact portion 92 has a tapered shape such that an outer peripheral wall of one end of the relief valve contact portion 92 tapers toward the axis in the axial direction. The relief valve contact portion 92 is disposed such that the one end can contact the relief valve seat 88 or be separated from the relief valve seat 88.

When the relief valve contact portion 92 is separated from the relief valve seat 88, the relief valve 91 is opened and allows the fuel to flow in the relief hole 87. When the relief valve contact portion 92 contacts the relief valve seat 88, the relief valve 91 is closed and restrict the fuel to flow in the relief hole 87.

The relief valve sliding portion 93 has a substantially cylindrical shape. The relief valve sliding portion 93 is formed integrally with the relief valve contact portion 92 such that one end of the relief valve sliding portion 93 is connected to the other end of the relief valve contact portion 92. The relief valve sliding portion 93 is substantially coaxial with the relief valve contact portion 92. An outer diameter of the relief valve sliding portion 93 is slightly smaller than an inner diameter of the relief member cylindrical portion 861. An outer peripheral wall of the relief valve sliding portion 93 is capable of sliding on an inner peripheral wall of the relief member cylindrical portion 861.

When the clearance between the outer peripheral wall of the relief valve sliding portion 93 and the inner peripheral wall of the relief member cylindrical portion 861 is excessively large, the fuel pressure may be released through the clearance. In this case, the relief valve 91 may be closed. According to the present embodiment, therefore, the size of the clearance is set such that the fuel pressure is not released through the clearance.

The relief valve sliding portion 93 has a tapered shape such that an outer peripheral wall of an end of the relief valve sliding portion 93 facing the relief valve contact portion 92 tapers toward the axis in a direction toward the relief valve contact portion 92. When the relief valve contact portion 92 is in contact with the relief valve seat 88, the relief lateral hole 852 of the relief seat member 85 is closed by the outer peripheral wall of the relief valve sliding portion 93 (see FIG. 6).

The relief valve protruding portion 94 has a substantially cylindrical shape. The relief valve protruding portion 94 is formed integrally with the relief valve sliding portion 93 such that one end of the relief valve protruding portion 94 is connected to the center of the end surface of the relief valve sliding portion 93 facing away from the relief valve contact portion 92. The relief valve protruding portion 94 is formed substantially coaxial with the relief valve sliding portion 93. An outer diameter of the relief valve protruding portion 94 is smaller than an outer diameter of the relief valve sliding portion 93. When the relief valve contact portion 92 is in contact with the relief valve seat 88, the end surface of the relief valve protruding portion 94 facing the pressurizing chamber 200 is located between the relief member bottom portion 862 and the end surface of the relief member cylindrical portion 861 facing the pressurizing chamber 200 (see FIG. 6).

The stopping member 95 has a substantially cylindrical shape, and is made of metal, for example. An outer diameter of the stopping member 95 is slightly larger than an inner diameter of the relief member cylindrical portion 861. The stopping member 95 is disposed inside the relief member cylindrical portion 861 such that an outer peripheral wall of the stopping member 95 is fitted to an inner peripheral wall of the relief member cylindrical portion 861. In other words, the stopping member 95 is substantially coaxial with the relief member cylindrical portion 861. The stopping member 95 is positioned in the vicinity of the end of the relief member cylindrical portion 861 facing the pressurizing chamber 200 in the axial direction of the relief member cylindrical portion 861. A clearance is formed between the stopping member 95 and the intermediate member 81.

An inner diameter of the stopping member 95 is larger than an outer diameter of the relief valve protruding portion 94. When the relief valve contact portion 92 is in contact with the relief valve seat 88, the end surface of the relief valve protruding portion 94 facing the pressurizing chamber 200 is located inside the stopping member 95 (see FIG. 6). A substantially cylindrical clearance is formed between the inner peripheral wall of the stopping member 95 and the outer peripheral wall of the relief valve protruding portion 94. Accordingly, the inner peripheral wall of the stopping member 95 and the outer peripheral wall of the relief valve protruding portion 94 do not slide on each other.

The relief valve 91 is disposed such that the outer peripheral wall of the relief valve sliding portion 93 can reciprocate in the axial direction while sliding on the inner peripheral wall of the relief member cylindrical portion 861. The end of the relief valve protruding portion 94 facing away from the relief valve sliding portion 93 can contact the end surface of the intermediate member 81 facing the relief seat member 85, or be separated from the end surface of the intermediate member 81 facing the relief seat member 85. The intermediate member 81 is capable of regulating the relief valve 91 from moving in the opening direction when the relief valve protruding portion 94 is in contact with the intermediate member 81.

When the relief valve contact portion 92 is separated from the relief valve seat 88 by a predetermined distance, closure of the relief lateral hole 852 by the outer peripheral wall of the relief valve sliding portion 93 is cancelled. Accordingly, the relief hole 87 is in communication with the fuel chamber 260 via the relief lateral hole 852, the relief outer peripheral recess 851, and the lateral hole portion 702.

When the relief valve 91 reciprocates in the axial direction inside the relief member cylindrical portion 861, the fuel inside the relief member cylindrical portion 861 is allowed to flow back and forth between the relief member cylindrical portion 861 and the relief outer peripheral recess 851 via the lateral hole 853. Accordingly, the relief valve 91 is capable of smoothly reciprocating in the axial direction.

The spring 99 is a coil spring, for example, and is disposed radially outside the relief valve protruding portion 94. One end of the spring 99 is in contact with the outer edge of the end surface of the relief valve sliding portion 93 facing the pressurizing chamber 200, and the other end is in contact with the end surface of the stopping member 95 facing away from the pressurizing chamber 200. Accordingly, the stopping member 95 stops the other end of the spring 99. The spring 99 biases the relief valve 91 toward the relief valve seat 88.

According to the present embodiment, an inner peripheral portion of the one end of the spring 99 is guided by an outer peripheral wall of the end of the relief valve protruding portion 94 facing the relief valve sliding portion 93. An inner peripheral wall of the relief member cylindrical portion 861 is formed such that an inner diameter of a portion of the relief member cylindrical portion 861 between the pressurizing chamber 200 and a sliding portion of the relief member cylindrical portion 861 on the relief valve sliding portion 93 is larger than an inner diameter of the sliding portion (see FIG. 6). This configuration reduces contact between the outer peripheral portion of the spring 99 and the inner peripheral wall of the relief member cylindrical portion 861, thereby stabilizing behaviors of the spring 99 and the relief valve 91.

When a fuel pressure in the discharge passage at a side of the relief member bottom portion 862 facing the high-pressure fuel pipe 8 increases to an abnormal value, the relief valve 91 moves toward the pressurizing chamber 200 while resisting the biasing force of the spring 99. As a result, the relief valve 91 is separated from the relief valve seat 88 and opened. Accordingly, the fuel in the discharge passage 705 at a side of the relief member bottom portion 862 facing the high-pressure fuel pipe 8 is returned toward the fuel chamber 260 via the relief hole 87, the relief lateral hole 852, the relief outer peripheral recess 851, and the lateral hole portion 702. This operation of the relief valve 91 prevents an abnormal increase in the fuel pressure flowing in the high-pressure fuel pipe 8.

According to the present embodiment, as described above, when the fuel in the discharge passage 705 at a side of the relief member bottom portion 862 facing the high-pressure fuel pipe 8 has an abnormal value in pressure, the fuel is sent not toward the pressurizing chamber 200, which is a high pressure side, but toward the fuel chamber 260, which is a low pressure side.

According to the present embodiment, the flow path area of the lateral hole portion 702 is larger than the flow path area of the relief hole 87 in a full-open state of the relief valve 91. The flow path area of the relief lateral hole 852 varies in accordance with the position of the relief valve sliding portion 93 relative to the relief lateral hole 852. Accordingly, the relief lateral hole 852 functions as a variable orifice. According to the present embodiment, the flow path area of the lateral hole portion 702 on the downstream side of the relief lateral hole 852 functioning as a variable orifice is larger than the flow path area of the relief hole 87 on the upstream side of the relief lateral hole 852. Accordingly, when the fuel pressure at a side of the discharge passage 705 facing the high-pressure fuel pipe 8 becomes an abnormal value, the fuel pressure can be quickly reduced, and stabilized to a lower pressure value.

According to the present embodiment, the discharge seat member 71, the intermediate member 81, and the relief seat member 85 are disposed in this order from the pressurizing chamber 200 toward the outside (see FIG. 6). In this case, the discharge valve 75 is disposed between the pressurizing chamber 200 and the relief valve 91. Accordingly, a dead volume in communication with the pressurizing chamber 200 can be reduced.

According to the present embodiment, the discharge joint 70, the discharge seat member 71, the intermediate member 81, the relief seat member 85, the discharge valve 75, the spring 79, the relief valve 91, the spring 99, and the stopping member 95 are integrally assembled in advance into subassembly constituting the discharge passage portion 700.

Described hereinbelow will be steps for assembling the discharge passage portion 700.

The relief valve 91 and the spring 99 are initially inserted into the relief seat member 85. Subsequently, the stopping member 95 is fitted or pressed into the inner peripheral wall of the relief seat member 85 to control a valve opening pressure.

Next, the relief seat member 85 to which the relief valve 91, the spring 99, and the stopping member 95 are assembled is inserted into the discharge joint 70. Subsequently, the intermediate member 81 is inserted into the discharge joint 70.

Thereafter, the spring 79 and the discharge valve 75 are set in the intermediate recess 821 of the intermediate member 81. Subsequently, the discharge seat member 71 is fitted or press-fitted into the inner peripheral wall of the discharge joint 70.

Assembling of the discharge passage portion 700, i.e., sub-assembling of the discharge passage portion 700 is completed in the foregoing manner. In the state of subassembly of the discharge passage portion 700, the discharge joint 70 houses the discharge seat member 71, the intermediate member 81, the relief seat member 85, the discharge valve 75, the spring 79, the relief valve 91, the spring 99, and the stopping member 95 inside. In addition, the step surface 701 of the discharge joint 70, the relief seat member 85, the intermediate member 81, and the discharge seat member 71 are in contact with each other.

Figure 4:
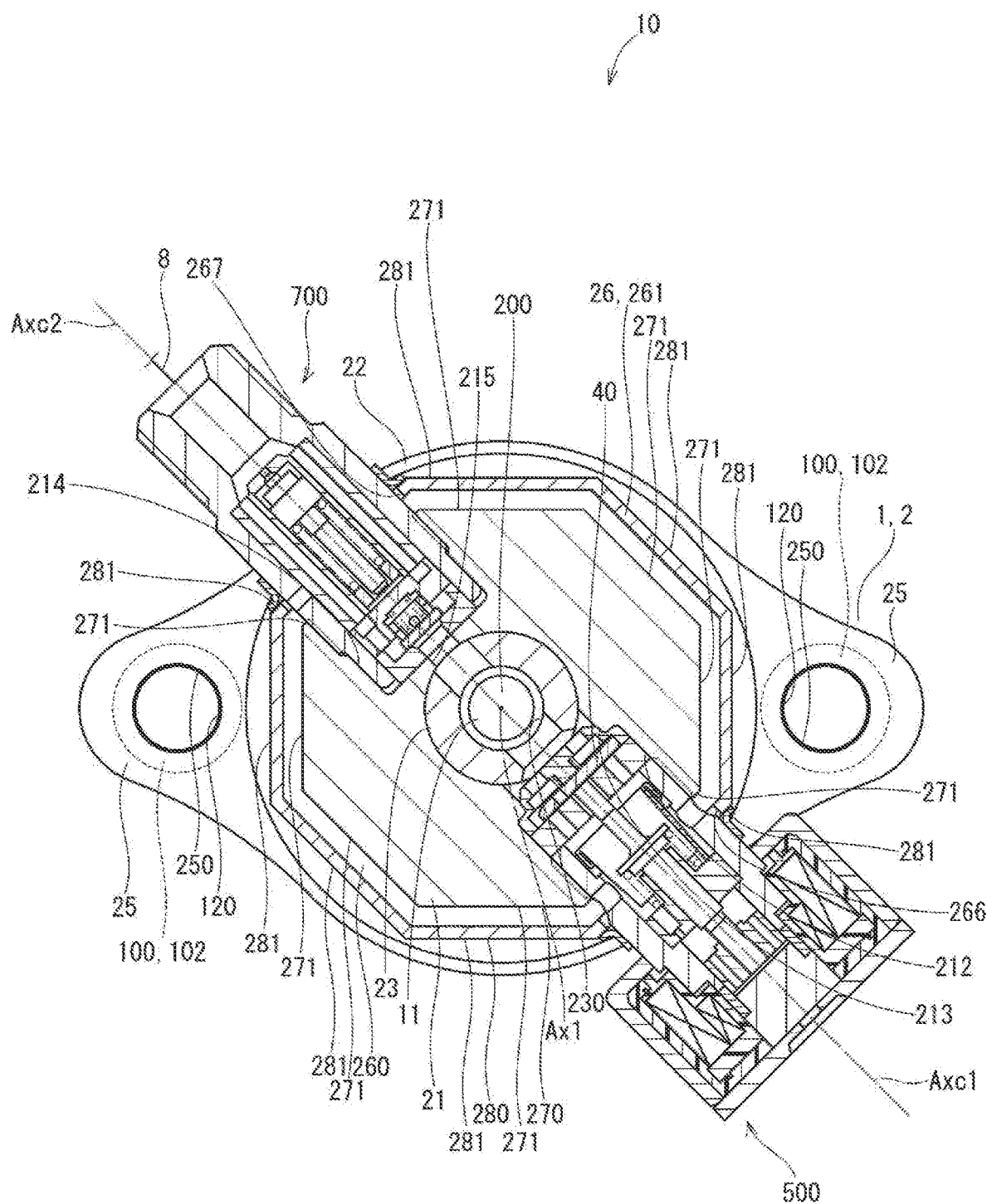
FIG. 4 is a cross-sectional view taken along a line IV-IV in FIG. 2.

As shown in FIGS. 2 to 4, a center axis Axc1 of the electromagnetic driving unit 500 and a center axis Axc2 of the discharge passage portion 700 are located on the common plane. This configuration reduces an increase in the size of the high-pressure pump 10 in the direction of the axis Ax1 of the cylindrical inner peripheral wall 230 of the cylinder 23. The center axis Axc1 of the electromagnetic driving unit 500 herein coincides with the axis of the cylindrical member 51. The center axis Axc2 of the discharge passage portion 700 coincides with the axis of the discharge joint 70.

According to the present embodiment, the high-pressure pump 10 further includes a pulsation damper 15, a support member 16, an upper supporter 171, and a lower supporter 172. For example, the pulsation damper 15 is produced by combining two metal thin plates each having a circular dish shape and joining outer edges of the two plates by welding. A gas such as nitrogen or argon having a predetermined pressure is filled in the pulsation damper 15.

The support member 16 has a bottomed cylindrical shape, and is made of metal, for example. The support member 16 is provided in the fuel chamber 260 such that an outer edge of a bottom portion of the support member 16 comes into contact with an outer edge of the cover bottom portion 262, and that an outer peripheral wall of a cylindrical portion of the support member 16 comes into contact with an inner peripheral wall of the cover columnar portion 261. A hole portion formed at a center of a bottom portion of the support member 16 passes through the bottom portion in the plate thickness direction.

Each of the upper supporter 171 and the lower supporter 172 has a ring shape, and is made of metal, for example. The pulsation damper 15 is sandwiched between outer edges of the upper supporter 171 and the lower supporter 172 such that the respective outer edges of the upper supporter 171 and the lower supporter 172 come into contact with an outer edge of the pulsation damper 15. The outer edges of the upper supporter 171 and the lower supporter 172 are welded to each other. In this manner, the pulsation damper 15, the upper supporter 171, and the lower supporter 172 are assembled into one unit in advance of subassembly constituting a damper unit 170.

The damper unit 170 is provided between the upper housing 21 and the support member 16 such that the upper supporter 171 contacts the bottom of the support member 16, and that the lower supporter 172 contacts a surface of the upper housing 21 facing the cover bottom portion 262. The support member 16, the upper supporter 171, and the lower supporter 172 support the pulsation damper 15 in the fuel chamber 260. The lower supporter 172 is disposed in a recess formed in the end surface of the upper housing 21 facing away from the lower housing 22. The support member 16 increases rigidity of the cover 26 and contributes to reduction of NV. A plurality of holes are formed in the lower supporter 172 in the circumferential direction to spread fuel above and below the pulsation damper 15 through the holes.

In the present embodiment, the cover 26 covers respective joining portions such that a joining portion between the cylinder 23 and the upper housing 21 forming the pressurizing chamber 200, a joining portion between the upper housing 21 and the cylindrical member 51, and a joining portion between the upper housing 21 and the discharge joint 70 are located in the fuel chamber 260. Accordingly, high-pressure fuel can be retained in the fuel chamber 260 even when the fuel leaks from the pressurizing chamber 200.

A "high pressure chamber" that is pressurized by sliding of the plunger 11 and ranges from the valve member 40 to the discharge valve 75 is defined by the cylinder 23, the upper housing 21, the stopper 35, the valve member 40, and the discharge seat member 71. A "low pressure chamber" is defined by the lower housing 22, the cover 26, the welding rings 519 and 709, the outer peripheral surface of the discharge joint 70, the seal holder 14, and the seal 141 such that the low pressure chamber covers the "high pressure chamber". Accordingly, the fuel in the "high pressure chamber" does not flow to the outside by linkage with the "low pressure chamber" even when the fuel leaks from the "high pressure chamber". The "low pressure chamber" and the outside are sealed by welding. Accordingly, no fuel leaks to the outside. The "high pressure chamber" is sealed by a tightening force produced by screws of the cylindrical member 51 and the discharge joint 70. Accordingly, an excessive external force produced by the high pressure does not act on a welded portion which seals the "low pressure chamber" and the outside.

Next, the cylinder 23 of the present embodiment will be more specifically described.

Figure 7:
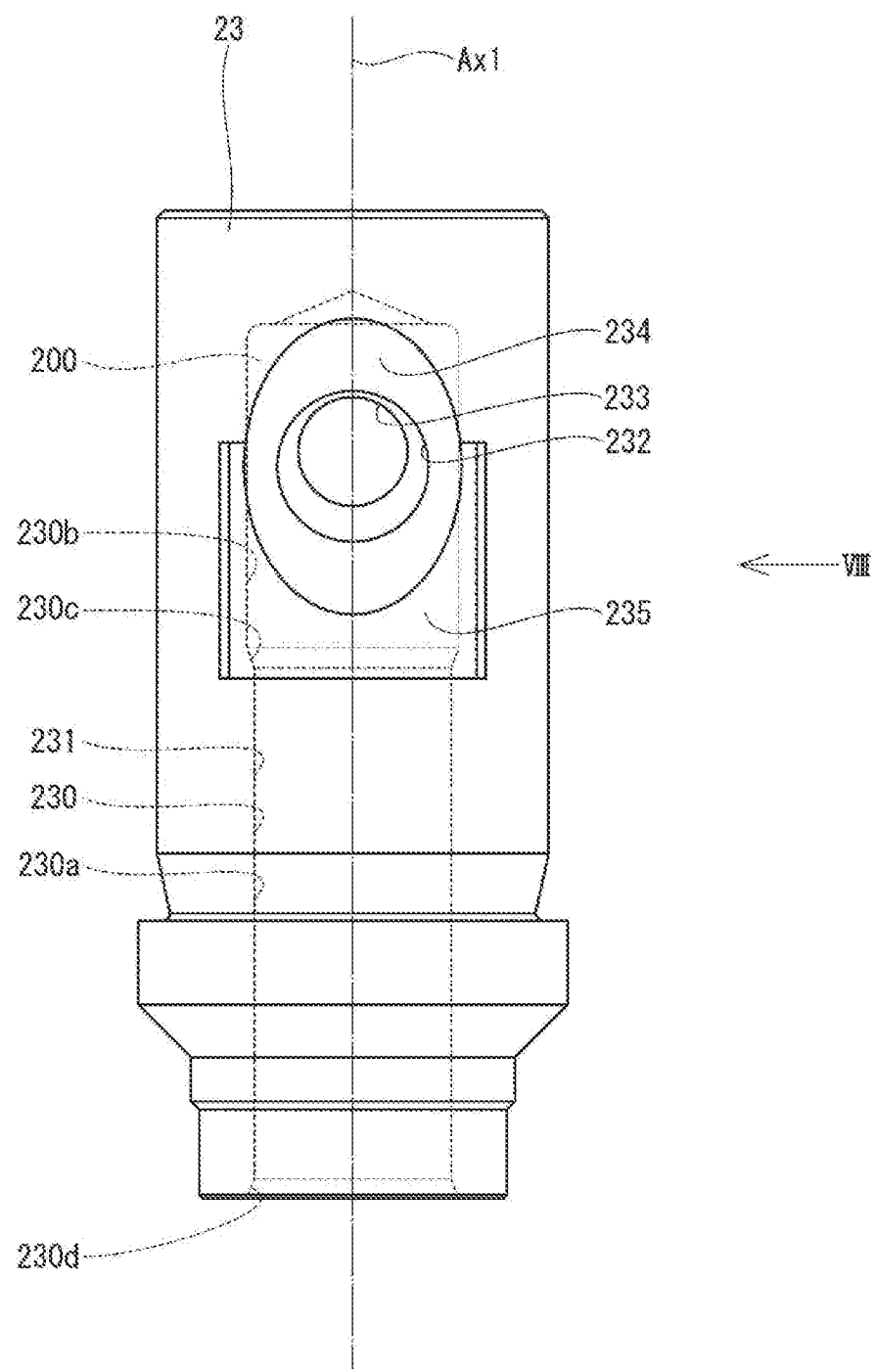
FIG. 7 is a front view of a cylinder of the high-pressure pump according to the first embodiment.
Figure 8:
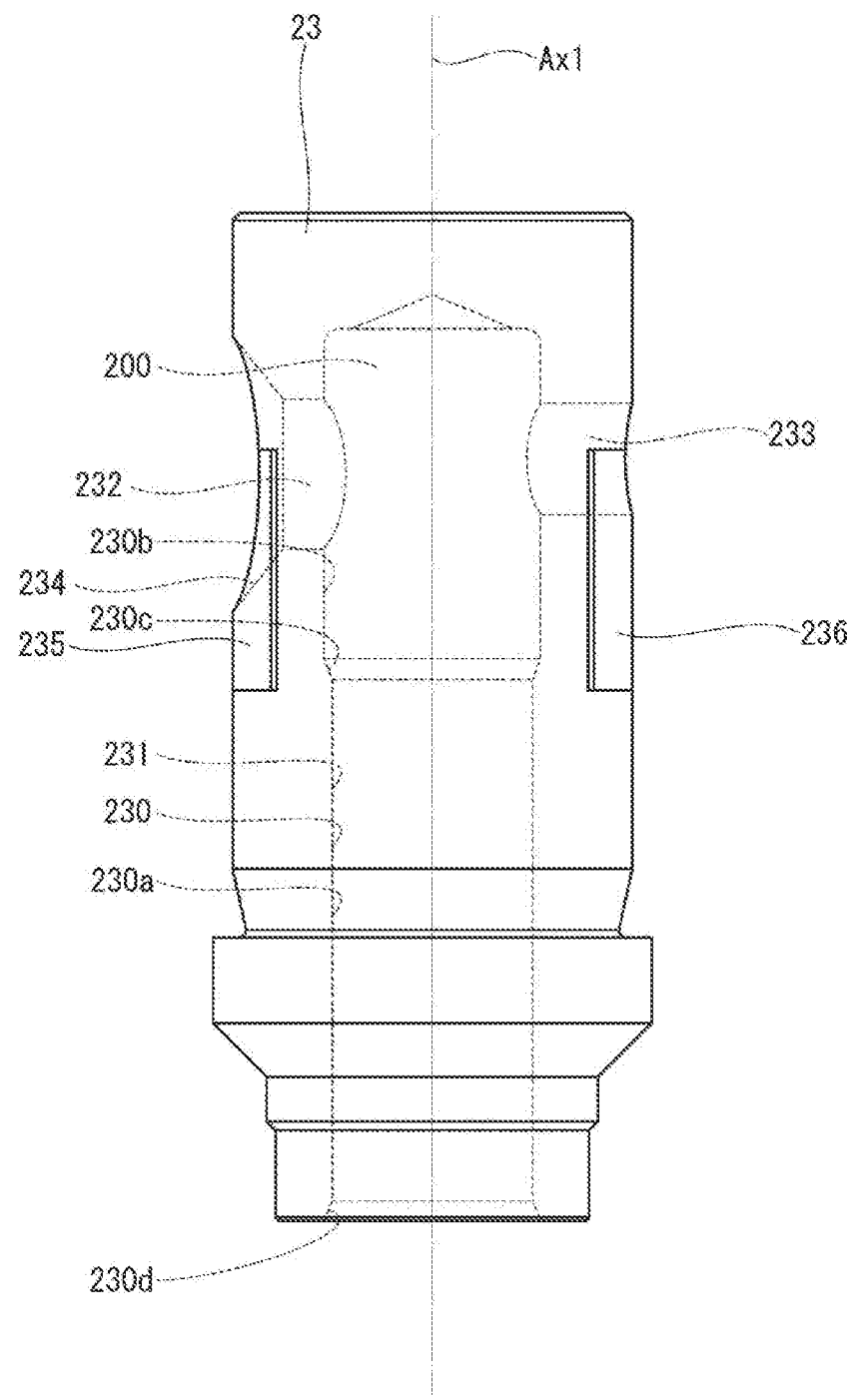
FIG. 8 is a view of FIG. 7 as viewed in a direction of an arrow VIII.
Figure 9:
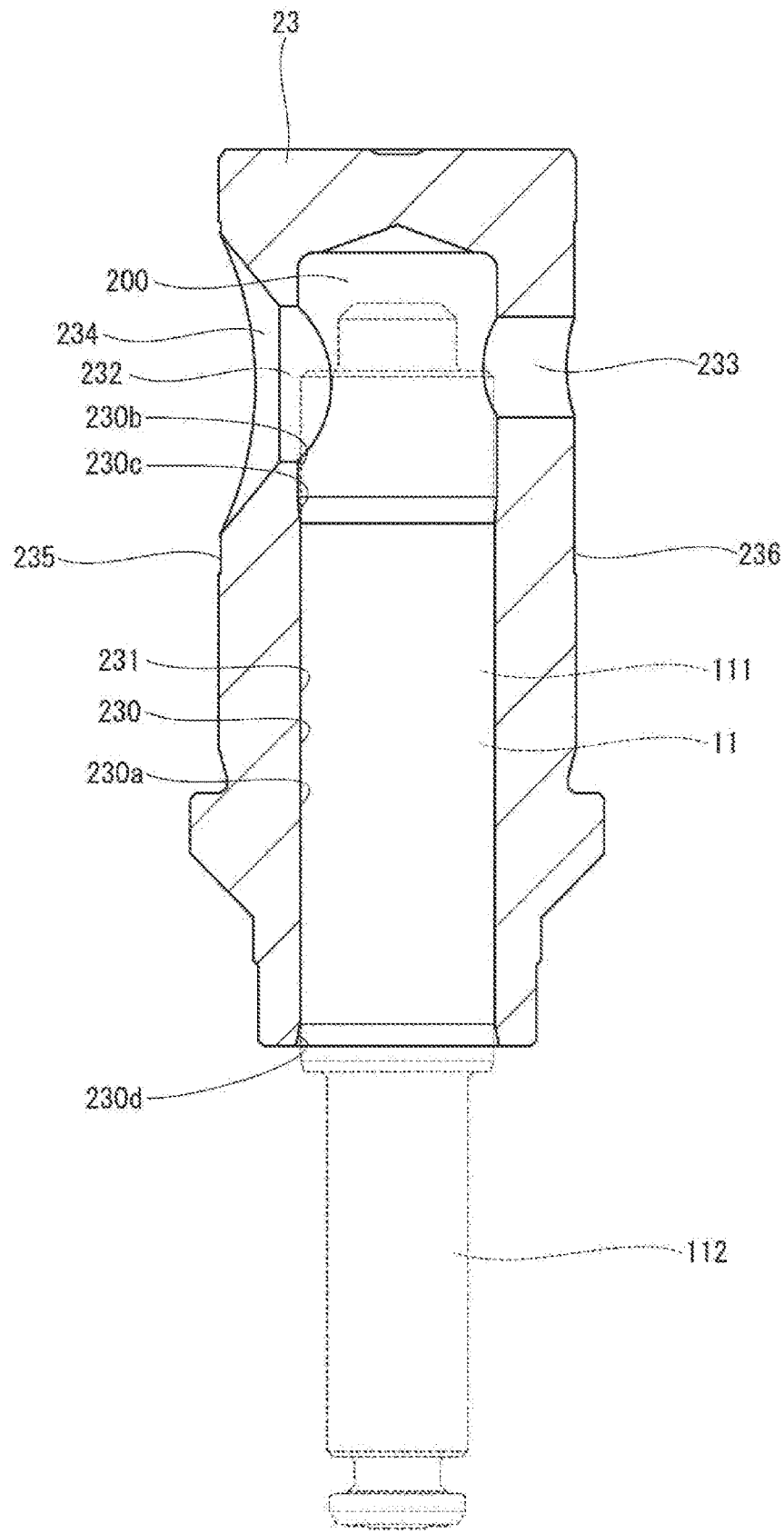
FIG. 9 is a cross-sectional view of the cylinder of the high-pressure pump according to the first embodiment.

As shown in FIGS. 7 to 9, the cylinder 23 has a tapered surface 234, an outer peripheral recess 235, and an outer peripheral recess 236.

The tapered surface 234 is formed at the end of the suction hole 232 facing away from the pressurizing chamber 200.

The tapered surface 234 tapers away from the axis of the suction hole 232 in a direction away from the pressurizing chamber 200.

The cylindrical inner peripheral wall 230, which is the inner peripheral wall of the cylinder hole portion 231, has inner tapered surfaces 230c and 230d in addition to the sliding surface 230a and the enlarged diameter surface 230b. The inner tapered surface 230c connects the sliding surface 230a and the enlarged diameter surface 230b. The inner tapered surface 230c tapers away from the axis Ax1 in a direction from the sliding surface 230a toward the enlarged diameter surface 230b.

The inner tapered surface 230d connects the sliding surface 230a and an opening of the cylindrical inner peripheral wall 230. The inner tapered surface 230d tapers away from the axis Ax1 in a direction from the sliding surface 230a toward the opening of the cylindrical inner peripheral wall 230.

As shown in FIG. 9, regardless of the position of the plunger 11 in range from the bottom dead center to the top dead center, the end, facing away from the small diameter portion 112, of the outer peripheral wall of the large diameter portion 111 of the plunger 11 is located between the enlarged diameter surface 230b and the end of the sliding surface 230a facing the enlarged diameter surface 230b. The end, facing the small diameter portion 112, of the outer peripheral wall of the large diameter portion 111 of the plunger 11 is located on a side, opposite to the enlarged diameter surface 230b, of the end of the sliding surface 230a facing away from the enlarged diameter surface 230b. Accordingly, the sliding surface 230a is capable of sliding on the outer peripheral wall of the large diameter portion 111 in the entire axial range regardless of the position of the plunger 11.

In a state in which the plunger 11 is disposed in the cylindrical inner peripheral wall 230, an annular clearance is formed between the outer peripheral wall of the large diameter portion 111 of the plunger 11 and the inner tapered surface 230c and the inner tapered surface 230d. Accordingly, during reciprocation of the plunger 11 inside the cylindrical inner peripheral wall 230, the fuel in this clearance is guided between the outer peripheral wall of the large diameter portion 111 and the sliding surface 230a. This configuration easily forms an oil film between the outer peripheral wall of the large diameter portion 111 and the sliding surface 230a, thereby reducing uneven wear and seizure between the outer peripheral wall of the large diameter portion 111 and the sliding surface 230a.

Angles formed by each of the inner tapered surfaces 230c and 230d and the axis Ax1 and the outer peripheral wall of the large diameter portion 111 are set to be 10 degrees or smaller, for example. Corners at both ends of the large diameter portion 111 of the plunger 11 in the axial direction are chamfered.

The outer peripheral recess 235 and the outer peripheral recess 236 are each recessed radially inward at a predetermined depth from the outer peripheral wall of the cylinder 23. The outer peripheral recess 235 is formed in a range including all of the suction hole 232, i.e., the tapered surface 234 in the circumferential direction of the cylinder 23. The outer peripheral recess 235 is formed in a range from a position at a side of the axis of the suction hole 232 slightly toward the bottom portion of the cylinder 23 to a position from a lower end of the tapered surface 234 away from the bottom portion of the cylinder 23 by a predetermined distance in the axial direction of the cylinder 23 as viewed in the axial direction of the suction hole 232. The outer peripheral recess 235 is formed to have a substantially rectangular shape as viewed in the axial direction of the suction hole 232. At least a part of the outer peripheral recess 235 is formed in a range overlapping with the sliding surface 230a in a lower portion of the cylinder 23 in the axial direction as viewed in the axial direction of the suction hole 232 (see FIG. 7).

The outer peripheral recess 236 is formed in a range including all of the discharge hole 233 in the circumferential direction of the cylinder 23. The outer peripheral recess 236 is formed in a range from a position at a side of the axis of the discharge hole 233 slightly toward the bottom portion of the cylinder 23 to a position from the lower end of the discharge hole 233 away from the bottom portion of the cylinder 23 by a predetermined distance in the axial direction of the cylinder 23 as viewed in the axial direction of the discharge hole 233. The outer peripheral recess 236 is formed to have a substantially rectangular shape as viewed in the axial direction of the discharge hole 233. At least a part of the outer peripheral recess 236 is formed in a range overlapping with the sliding surface 230a in a lower portion of the cylinder 23 in the axial direction as viewed in the axial direction of the discharge hole 233 (see FIG. 8).

The outer peripheral recesses 235 and 236 leave a portion fitted to the upper housing 21, i.e., a shrink fitting portion, in an axially upper portion of the cylinder 23 as viewed in the axial direction of the suction hole 232 or the discharge hole 233 (see FIGS. 7 and 8).

As described above, when the cylindrical member 51 of the electromagnetic driving unit 500 is screwed into the suction hole portion 212 of the upper housing 21, an axial force in a direction from the step surface between the stopper small diameter portion 36 and the stopper large diameter portion 37 toward the pressurizing chamber 200 acts on the stepped surface between the suction hole portion 213 and the suction hole portion 212. Accordingly, the inner peripheral wall of the hole portion 211 of the upper housing 21 may be slightly deformed radially inward around the suction hole portion 213. In contrast, according to the present embodiment, the outer peripheral recess 235 is formed at a position corresponding to the suction hole portion 213 of the outer peripheral wall of the cylinder 23. Accordingly, a surface pressure generated by the deformation and acting on the outer peripheral wall of the cylinder 23 can be reduced even when the inner peripheral wall of the hole portion 211 of the upper housing 21 is deformed radially inward. In this manner, radially inward deformation of the cylindrical inner peripheral wall 230 of the cylinder hole portion 231 can be reduced. Accordingly, a constant clearance between the cylindrical inner peripheral wall 230 and the outer peripheral wall of the plunger 11 can be maintained, wherefore uneven wear and seizure between the cylindrical inner peripheral wall 230 and the outer peripheral wall of the plunger 11 can be reduced.

Furthermore, the inner peripheral wall of the hole portion 211 of the upper housing 21 is deformed radially inward as an effect of the axial force described above. Accordingly, an increase in the pressure of the pressurizing chamber 200 can be easily handled by a rise of a surface pressure generated at the boundary of the outer peripheral recess 235 of the cylinder 23.

When the discharge joint 70 of the discharge passage portion 700 is screwed into the discharge hole portion 214 of the upper housing 21, an axial force generated from the inner projection 722 and the outer projection 723 toward the pressurizing chamber 200 acts on the periphery of the discharge hole portion 215 in the bottom surface of the discharge hole portion 214. Accordingly, the inner peripheral wall of the hole portion 211 of the upper housing 21 may be slightly deformed radially inward around the discharge hole portion 215. According to the present embodiment, however, the outer peripheral recess 236 is formed at a position corresponding to the discharge hole portion 215 of the outer peripheral wall of the cylinder 23. Accordingly, a surface pressure generated by the deformation and acting on the outer peripheral wall of the cylinder 23 can be reduced even when the inner peripheral wall of the hole portion 211 of the upper housing 21 is deformed radially inward. In this manner, radially inward deformation of the cylindrical inner peripheral wall 230 of the cylinder hole portion 231 can be reduced. Accordingly, a constant clearance between the cylindrical inner peripheral wall 230 and the outer peripheral wall of the plunger 11 can be maintained, wherefore uneven wear and seizure between the cylindrical inner peripheral wall 230 and the outer peripheral wall of the plunger 11 can be reduced.

Furthermore, the inner peripheral wall of the hole portion 211 of the upper housing 21 is deformed radially inward as an effect of the axial force described above. Accordingly, an increase in the pressure of the pressurizing chamber 200 can be easily handled by a rise of a surface pressure generated at the boundary of the outer peripheral recess 236 of the cylinder 23.

Assembly of the high-pressure pump 10 will be next described.

For example, the high-pressure pump 10 is assembled in following steps.

The cylinder 23 is initially inserted into the hole portion 221 of the lower housing 22.

Subsequently, the cylinder 23 is inserted into the hole portion 211 of the upper housing 21 together with the lower housing 22 such that the suction hole 232 comes to a position corresponding to the suction hole portion 213, and that the discharge hole 233 comes to a position corresponding to the discharge hole portion 215. The cylinder 23 herein is inserted into the hole portion 211 in a state in which the upper housing 21 is heated in advance to enlarge the inner diameter of the hole portion 211. When the upper housing 21 is cooled, the inner diameter of the hole portion 211 is reduced to allow fixation between the upper housing 21 and the cylinder 23. Similarly, an outer diameter portion of the lower housing 22 on the upper side is fixed to the upper housing 21 by a decrease in an inner diameter portion of the upper housing 21 on the lower side. In other words, the cylinder 23 and the lower housing 22 are fixed to the upper housing 21 by shrink fitting or cold fitting. At this time, the lower housing 22 is stopped between the upper end of the outermost diameter of the cylinder 23 and the lowermost end of the upper housing 21. In this case, positions of the upper housing 21, the lower housing 22, and the cylinder 23 in the vertical direction are defined, and the upper housing 21, the lower housing 22, and the cylinder 23 are assembled into one body.

Subsequently, the stopper 35 is inserted into the suction hole portion 213 and the suction hole portion 212. Subsequently, the spring 39 is disposed in the stopper recess 352, and the valve member 40 is disposed in the stopper recess 351. Thereafter, the seat member 31 is press-fitted at a side of the stopper 35 of the suction hole portion 212 facing away from the pressurizing chamber 200, and both end surfaces of the stopper 35 are brought into contact with a recess of the upper housing 21 and the seat member 31. The sliding portion 430 of the valve member 40 overlaps with the inner peripheral wall of the stopper recess 351 in a state in which the spring 39 has a natural length. Accordingly, the assembly is improved.

Subsequently, the damper unit 170 including the pulsation damper 15, the upper supporter 171, and the lower supporter 172 is disposed in the recess of the upper housing 21, i.e., at a side of the upper housing facing away from the lower housing 22.

Subsequently, the cover 26 on which the support member 16 has been provided in advance is attached to cover the upper housing 21. The cover 26 is disposed such that the cover hole portion 266 comes to a position corresponding to the suction hole portion 212, and the cover hole portion 267 comes to a position corresponding to the discharge hole portion 214.

Subsequently, the first electromagnetic driving unit 501 in a state of sub-assembly is inserted into the cover hole portion 266, and the cylindrical member 51 is screwed into the suction hole portion 212 of the upper housing 21. At this time, the cylindrical member 51 is screwed into the suction hole portion 212 using a not-shown tool corresponding to the second columnar portion 512 of the cylindrical member 51. In this case, an axial force from the cylindrical member 51 toward the pressurizing chamber 200 acts on the seat member 31, the stopper 35, and the step surface of the upper housing between the suction hole portion 212 and the suction hole portion 213 of the upper housing 21.

Subsequently, the discharge passage portion 700 in a sub-assembly state is inserted into the cover hole portion 267, and the discharge joint 70 is screwed into the discharge hole portion 214 of the upper housing 21. At this time, the discharge joint 70 is screwed into the discharge hole portion 214 using a not-shown tool corresponding to the polygonal columnar surface 703 of the discharge joint 70. In this case, an axial force from the step surface 701 of the discharge joint 70 toward the pressurizing chamber 200 acts on the relief seat member 85, the intermediate member 81, the discharge seat member 71, and the step surface between the discharge hole portion 214 and the discharge hole portion 215 of the upper housing 21.

Subsequently, the end of the cover columnar portion 261 facing away from the cover bottom portion 262 and the lower housing 22 are welded to each other entirely in the circumferential direction of the cover columnar portion 261. The welding ring 709 is then disposed on the radially outside the discharge joint 70. The welding ring 709, the cover outer peripheral wall 280, and the outer peripheral wall of the discharge joint 70 are welded to each other entirely in the circumferential direction of the welding ring 709. The welding ring 519 is subsequently disposed on the radially outside of the first cylindrical portion 511 of the cylindrical member 51. The welding ring 519, the cover outer peripheral wall 280, and the outer peripheral wall of the first cylindrical portion 511 are welded to each other entirely in the circumferential direction of the welding ring 519.

Thereafter, the seal 141, the intermediate columnar member 241, and the plunger 11 are inserted into the seal holder 14 in this order, and welded to each other entirely in the circumferential direction after the seal holder 14 is assembled to the inside of the holder supporter 24. The oil seal 142 is then assembled to the seal holder 14.

Thereafter, the seal member 240 is assembled to the holder supporter 24. The spacer 140 is then disposed on the seal holder 14. The spring 13 is disposed at a side of the seal holder 14 opposite to the upper housing 21. The spring seat 12 is assembled to the plunger 11.

Subsequently, one end of the supply passage portion 29 is disposed at a position in contact with the outer peripheral portion of the cover hole portion 265 of the cover bottom portion 262. The supply passage portion 29 and the cover bottom portion 262 are welded to each other entirely in the circumferential direction of the supply passage portion 29.

Thereafter, the second electromagnetic driving unit 502 in a sub-assembly state is provided at the end of the first electromagnetic driving unit 501 opposite to the pressurizing chamber 200 such that the magnetic throttle portion 56 and the fixed core 57 are located inside the coil 60. The second electromagnetic driving unit 502 herein is disposed such that the connector 65 faces away from the fixed portion 25, and becomes substantially parallel to the axis Ax1 of the cylindrical inner peripheral wall 230 of the cylinder 23.

Subsequently, the center of the yoke 645 is welded to the end surface 572 of the fixed core 57 facing away from the pressurizing chamber 200. Assembly of the high-pressure pump 10 is completed by the foregoing steps.

Attachment of the high-pressure pump 10 to the engine 1 will be next described.

According to the present embodiment, the high-pressure pump 10 is attached to the engine 1 such that the holder supporter 24 is inserted into the attachment hole portion 3 of the engine head 2 (see FIG. 2). The high-pressure pump 10 is fixed to the engine 1 by fixation of the fixed portion 25 to the engine head 2 using the bolts 100. The high-pressure pump 10 herein is attached to the engine 1 in such a posture that the axis Ax1 of the cylindrical inner peripheral wall 230 of the cylinder 23 extends in the vertical direction.

For example, the high-pressure pump 10 is attached to the engine 1 by following steps. Initially, the lifter 5 is inserted into the attachment hole portion 3 of the engine head 2. Subsequently, the holder supporter 24 of the high-pressure pump 10 is inserted into the attachment hole portion 3 of the engine head 2. The position of each of the bolt holes 250 of the fixed portion 25 is set to be corresponding to the position of the corresponding fixing hole portion 120 of the engine head 2.

Subsequently, the bolts 100 are inserted into the bolt holes 250 to screw the bolts 100 into the fixing hole portions 120. At this time, the bolts 100 are screwed into the fixing hole portions 120 using a not-shown tool corresponding to the head portions 102 of the bolts 100. In this manner, the fixed portion 25 is fixed to the engine head 2. Attachment of the high-pressure pump 10 to the engine 1 is completed by the foregoing steps.

An operation of the high-pressure pump 10 of the present embodiment will be next described with reference to FIGS. 2 to 6.

"Suction Step"

During a stop of supply of power to the coil 60 of the electromagnetic driving unit 500, the valve member 40 is biased toward the pressurizing chamber 200 by the spring 54 and the needle 53. Accordingly, the valve member 40 is separated from the valve seats 310, i.e., the valve is open. When the plunger 11 moves away from the pressurizing chamber 200 in this state, the volume of the pressurizing chamber 200 increases. In this case, and the fuel at a side of the valve seats 310 opposite to the pressurizing chamber 200, i.e., the fuel in the fuel chamber 260 is sucked into the pressurizing chamber 200 via the communication path 33.

"Amount-Control Process"

When the plunger 11 moves toward the pressurizing chamber 200 in the open state of the valve member 40, the volume of the pressurizing chamber 200 decreases. In this case, the fuel between the pressurizing chamber 200 and the valve seats 310 is returned toward the fuel chamber 260 from the valve seats 310. When power is supplied to the coil 60 during the amount-control step, the movable core 55 is attracted toward the fixed core 57 together with the needle 53. In this case, the valve member 40 is biased by the spring 39 to come into contact with the valve seats 310 and is closed. An amount of fuel returned from the pressurizing chamber 200 toward the fuel chamber 260 is controlled by closing the valve member 40 in accordance with movement of the plunger 11 toward the pressurizing chamber 200. As a result, the amount of fuel pressurized in the pressurizing chamber 200 is determined. The amount-control process for returning the fuel from the pressurizing chamber 200 to the fuel chamber 260 is completed by closure of the valve member 40.

When the fuel injection valves 138 do not inject fuel, i.e., during cutoff of the fuel, the coil 60 is not energized. Accordingly, no fuel is discharged from the high-pressure pump 10. The valve member 40 is in the open state at this time. Accordingly, the fuel in the pressurizing chamber 200 moves back and forth between the pressurizing chamber 200 and the fuel chamber 260 in accordance with reciprocation of the plunger 11.

"Pressurization Process"

When the plunger 11 further moves toward the pressurizing chamber 200 with the valve member 40 closed, the volume of the pressurizing chamber 200 decreases. As a result, the fuel in the pressurizing chamber 200 is compressed and pressurized. When the pressure of the fuel in the pressurizing chamber 200 becomes equal to or higher than an opening pressure of the discharge valve 75, the discharge valve 75 is opened. In this case, the fuel is discharged from the pressurizing chamber 200 toward the high-pressure fuel pipe 8, i.e., the fuel rail 137.

When the plunger 11 moves away from the pressurizing chamber 200 by stopping power supply to the coil 60, the valve member 40 again opens. In this manner, the pressurization process for pressurizing the fuel is completed, and the suction process for sucking the fuel from the fuel chamber 260 to the pressurizing chamber 200 is restarted.

By repeating the above "suction process", "amount-control process", and "pressurization process", the high-pressure pump 10 pressurizes and discharges the fuel sucked into the pressurizing chamber 200 from the fuel chamber 260, and is supplied to the fuel rail 137. The amount of fuel supplied from the high-pressure pump 10 to the fuel rail 137 is controlled by controlling the timing or the like of supplying power to the coil 60 by the electromagnetic driving unit 500.

When the plunger 11 reciprocates in the open state of the valve member 40, such as the "suction process" and "amount-control process" described above, pressure pulsation may be produced in the fuel within the fuel chamber 260 in accordance with increase and decrease of the volume of the pressurizing chamber 200. The pulsation damper 15 provided in the fuel chamber 260 is capable of reducing pressure pulsation of the fuel in the fuel chamber 260 by elastic deformation in accordance with a change of the fuel pressure in the fuel chamber 260.

Moreover, during reciprocation of the plunger 11, pressure pulsation may be produced in accordance with increase and decrease in the volume of the variable volume chamber 201. In this case, the pulsation damper 15 provided in the fuel chamber 260 is similarly capable of reducing pressure pulsation of the fuel in the fuel chamber 260 by elastic deformation in accordance with a change of the fuel pressure in the fuel chamber 260.

When the plunger 11 moves downward away from the pressurizing chamber 200, the volume of the variable volume chamber 201 decreases in accordance with a lowering speed of the plunger 11. In this case, the fuel is pushed toward the fuel chamber 260. As a result, the fuel in the fuel chamber 260 is easily introduced into the pressurizing chamber 200 during lowering of the plunger 11. When the plunger 11 moves upward toward the pressurizing chamber 200, the volume of the variable volume chamber 201 described above increases. In this case, the fuel returned from the pressurizing chamber 200 is easily discharged into the variable volume chamber 201 during the amount control. Pulsation of the fuel chamber 260 thus decreases by the functions described above.

When the plunger 11 reciprocates, the volume of the variable volume chamber 201 increases or decreases. In this case, the fuel flows back and forth between the fuel chamber 260 and the hole portion 222, the annular space 202, and the variable volume chamber 201. Accordingly, the low-temperature fuel can cool the cylinder 23 and the plunger 11 each heated to a high temperature by heat generated by sliding between the plunger 11 and the cylinder 23, and heat generated by pressurizing the fuel in the pressurizing chamber 200. The seizure of the plunger 11 and the cylinder 23 can be therefore reduced.

A part of the fuel having a high pressure in the pressurizing chamber 200 flows into the variable volume chamber 201 via the clearance between the plunger 11 and the cylinder 23. In this manner, an oil film is formed between the plunger 11 and the cylinder 23, and effectively reduces seizure of the plunger 11 and the cylinder 23. The fuel flowing from the pressurizing chamber 200 into the variable volume chamber 201 returns to the fuel chamber 260 via the annular space 202 and the hole portion 222.

<A-1> The suction valve unit 300 will be next described in detail.

Figure 10:
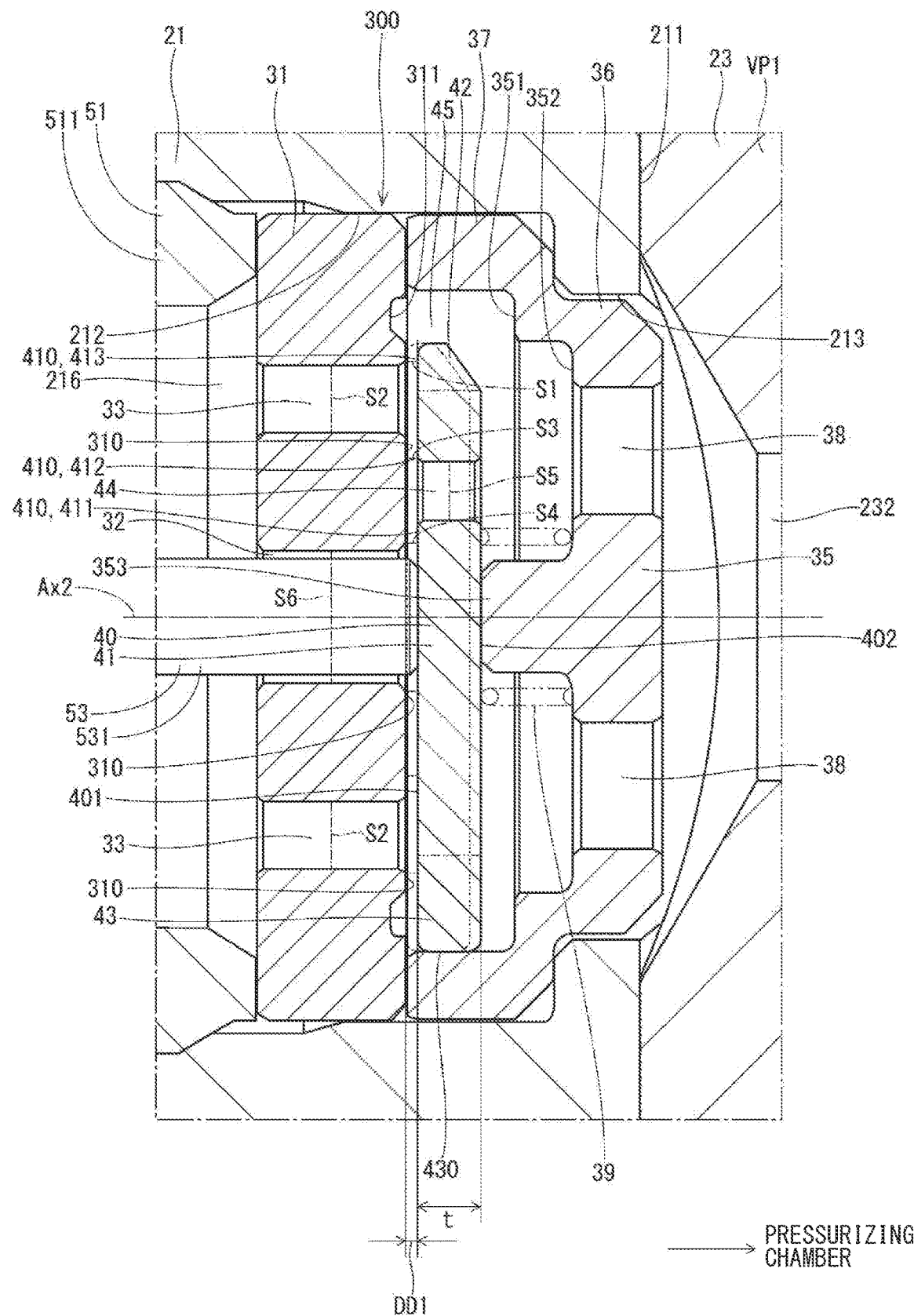
FIG. 10 is an enlarged cross-sectional view of the suction valve unit of the high-pressure pump according to the first embodiment.
Figure 11:
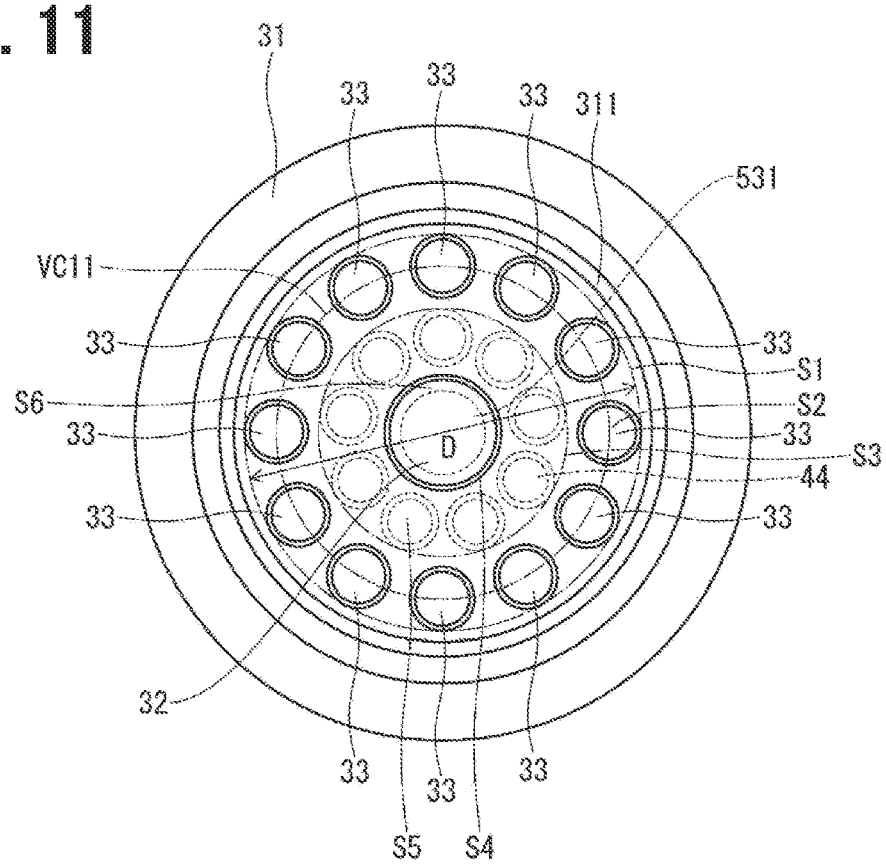
FIG. 11 is a schematic view of a seat member of the high-pressure pump according to the first embodiment.

As shown in FIGS. 10 and 11, the seat member 31 has a substantially disk shape. The seat member 31 is disposed in the suction passage 216 inside the suction hole portion 212 such that the seat member 31 is substantially coaxial with the suction hole portion 212. An outer peripheral wall of the seat member 31 is press-fitted into an inner peripheral wall of the suction hole portion 212.

The seat member 31 includes the communication path 32, communication paths 33, and valve seats 310. The communication path 32 passes through the seat member 31 between one surface and the other surface of the seat member 31 at a center of the seat member 31. The communication path 32 is substantially coaxial with the seat member 31. An inner diameter of the communication path 32 is larger than an outer diameter of the end of the needle body 531 facing the pressurizing chamber 200. Accordingly, a substantially cylindrical clearance is produced between the inner peripheral wall of the communication path 32 and the outer peripheral wall of the needle body 531 such that fuel can flow through the clearance.

Each of the communication paths 33 has a substantially cylindrical shape and passes through the seat member 31 between one surface and the other surface of the seat member 31. The communication paths 33 are located radially outward the communication path 32. In this embodiment, the twelve communication paths 33 are formed at equal intervals in the circumferential direction of the seat member 31. The arrangement of the communication paths 33 formed at equal intervals stabilize a flow of the fuel and behaviors of the valve member 40. The communication paths 33 are disposed on a virtual circle VC11 centered at the axis of the seat member 31 (see FIG. 11). An inner diameter of each of the communication paths 33 is smaller than an inner diameter of the communication path 32.

The communication path 32 corresponds to an "inner communication path", while each of the communication paths 33 corresponds to an "outer communication path".

The valve seats 310 are annularly formed on a surface of the seat member 31 facing the pressurizing chamber 200 around the communication path 32 and the multiple communication paths 33. In other words, the valve seats 310 are formed on the surface of the seat member 31 facing the pressurizing chamber 200. Specifically, one of the valve seats 310 is disposed between the communication path 32 and the communication holes 44, one of the valve seats 310 is disposed between the communication holes 44 and the communication paths 33, and one of the valve seats 310 is provided radially outside the communication paths 33. Accordingly, the multiple valve seats are three valve seats 310. The three valve seats 310 are concentrically provided.

The seat member 31 includes an annular recess 311. The annular recess 311 has a substantially annular shape and is recessed from the end surface of the seat member 31 facing the pressurizing chamber 200 toward the cylindrical member 51. The annular recess 311 is located outward the communication paths 33 in the radial direction of the seat member 31. The annular recess 311 is substantially coaxial with the seat member 31 (see FIGS. 10 and 11). In this manner, the annular recess 311 is located outward the communication paths 33 in the radial direction of the seat member 31. Accordingly, flowability of the fuel during amount-control improves. A pressure of fuel in the annular recess 311 is applied to the valve member 40 in the valve opening direction. Accordingly, closure of the valve by a dynamic pressure can be reduced.

Figure 12:
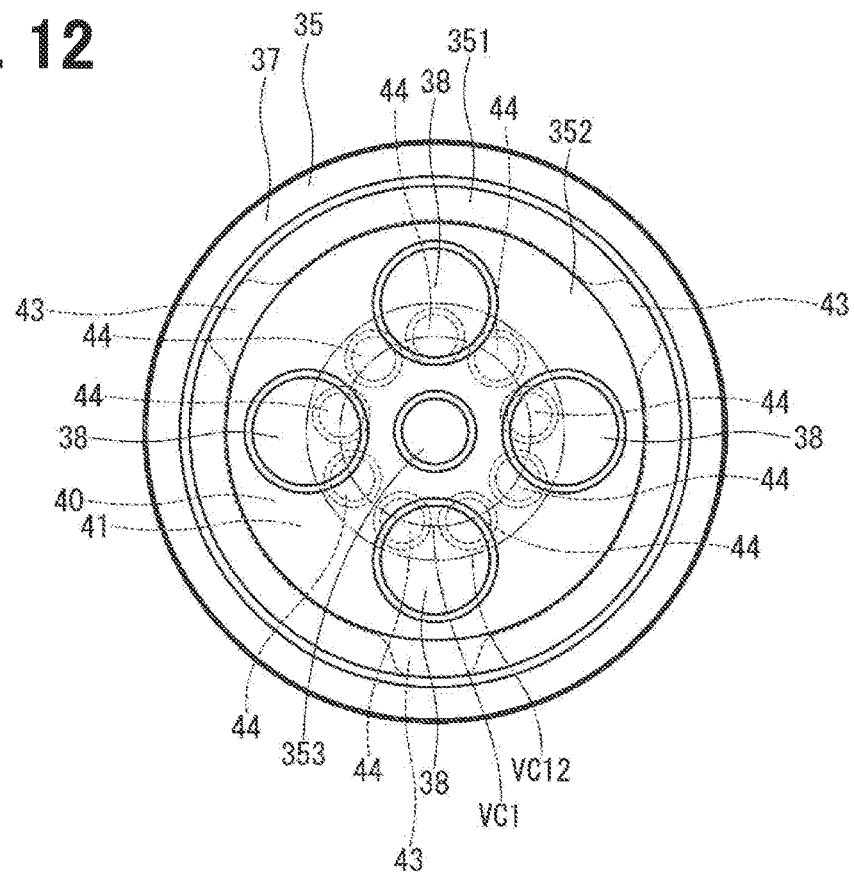
FIG. 12 is a schematic view of a stopper of the high-pressure pump according to the first embodiment.

As shown in FIGS. 10 and 12, the stopper 35 has the stopper small diameter portion 36, the stopper large diameter portion 37, the stopper recess 351, the stopper recess 352, the stopper protrusion 353, the communication holes 38, and others.

The stopper small diameter portion 36 has a substantially cylindrical shape. An outer diameter of the stopper small diameter portion 36 is slightly smaller than an inner diameter of the suction hole portion 213. The stopper large diameter portion 37 has a substantially cylindrical shape. An outer diameter of the stopper large diameter portion 37 is larger than an outer diameter of the stopper small diameter portion 36, and slightly smaller than an inner diameter of the suction hole portion 212. The stopper large diameter portion 37 is formed integrally with the stopper small diameter portion 36 to be coaxial with a portion of the stopper small diameter portion 36 facing away from the pressurizing chamber 200.

The stopper 35 is disposed in the suction passage 216 such that the stopper small diameter portion 36 is located inside the suction hole portion 213, and that the stopper large diameter portion 37 is located inside the suction hole portion 212. An annular step surface between the stopper small diameter portion 36 and the stopper large diameter portion 37 is in contact with an annular step surface between the suction hole portion 212 and the suction hole portion 213. In this manner, the stopper 35 is restricted to move toward the pressurizing chamber 200.

The surface of the stopper large diameter portion 37 of the stopper 35 facing away from the pressurizing chamber 200 is in contact with the surface of the seat member 31 facing the pressurizing chamber 200. In this manner, the stopper 35 is restricted to move away from the pressurizing chamber 200.

The stopper recess 351 is recessed from the surface of the stopper large diameter portion 37 facing the seat member 31 toward the pressurizing chamber 200. The stopper recess has a substantially cylindrical shape. The stopper recess 351 is substantially coaxial with the stopper large diameter portion 37. An inner diameter of the stopper recess 351 is smaller than an outer diameter of the stopper large diameter portion 37, and larger than an outer diameter of the stopper small diameter portion 36.

The stopper recess 352 is recessed in from a bottom surface of the stopper recess 351 toward the pressurizing chamber 200. The stopper recess 352 has a substantially cylindrical shape. The stopper recess 352 is substantially coaxial with the stopper recess 351. An inner diameter of the stopper recess 352 is smaller than an inner diameter of the stopper recess 351 and an outer diameter of the stopper small diameter portion 36. Note that the bottom surface of the stopper recess 352 is located closer to the pressurizing chamber 200 than the step surface between the stopper small diameter portion 36 and the stopper large diameter portion 37.

The stopper protrusion 353 protrudes from the center of the bottom surface of the stopper recess 352 toward the seat member 31, and has a substantially cylindrical shape. The stopper protrusion 353 is substantially coaxial with the stopper recess 352. The end surface of the stopper protrusion 352 facing the seat member 31 is located between the seat member 31 and the bottom surface of the stopper recess 351.

Each of the communication holes 38 passes through the stopper 35 between the bottom surface of the stopper recess 352 and the surface of the stopper small diameter portion 36 facing the pressurizing chamber 200. The communication holes 38 are located radially outside the stopper protrusion 353. The four communication holes 38 are formed at equal intervals in a circumferential direction of the stopper small diameter portion 36. The communication holes 38 are disposed on a virtual circle VC12 around an axis of the stopper small diameter portion 36 (see FIG. 12). A diameter of the virtual circle VC12 is smaller than a diameter of the virtual circle VC11.

The suction passage 216 is defined in the communication path 32 and the communication paths 33 of the seat member 31, the stopper recess 351 and the stopper recess 352 of the stopper 35, and the communication holes 38. Accordingly, fuel in the fuel chamber 260 is allowed to enter the pressurizing chamber 200 via the suction passage 216 formed in the communication path 32, the communication paths 33, the stopper recess 351, the stopper recess 352, and the communication holes 38, and the suction hole 232. Each of the seat member 31 and the stopper 35 corresponds to a "suction passage forming portion".

As shown in FIG. 10, the valve member 40 is disposed inside the stopper recess 351. In other words, the valve member is located in the suction passage 216 between the pressurizing chamber 200 and the seat member 31. As shown in FIGS. 10 and 13 to 16, the valve member 40 includes the valve body 41, the tapered portions 42, the guide portions 43, and the communication holes 44.

The valve body 41, the tapered portions 42, and the guide portions 43 are made of metal such as stainless steel, and integrally formed with each other. The valve body 41 has a substantially disk shape.

Each of the tapered portions 42 has a substantially annular shape, and is formed integrally with the valve body 41 on the radially outside of the valve body 41. Each of the tapered portions 42 has a tapered shape such that the surface of the tapered portion 42 facing the pressurizing chamber 200 tapers toward the axis Ax2 in a direction toward the pressurizing chamber (see FIGS. 10, 15, and 16).

Each of the guide portions 43 protrudes radially outward from the valve body 41 to divide the tapered portions 42 in the circumferential direction, and is formed integrally with the valve body 41 and the tapered portions 42. According to the present embodiment, the three guide portions 43 are formed at equal intervals in the circumferential direction of the valve body 41 to divide the three tapered portions 42 in the circumferential direction. The end of each of the guide portions 43 facing away from the valve body 41 is located on the radially outside of an outer edge of the tapered portion 42 (see FIGS. 13 and 14). The guide portion 43 is capable of guiding axial movement of the valve member 40 by sliding of a sliding portion 430 formed at the end of the guide portion 43 facing away from the valve body 41 and sliding on the inner peripheral wall of the stopper recess 351 of the stopper 35 as the suction passage forming portion.

Each of the communication holes 44 passes through the valve body 41 between one surface and the other surface of the valve body 41. The nine communication holes 44 are formed at equal intervals in the circumferential direction of the valve body 41. The communication holes 44 are disposed on a virtual circle VC1 centered at the axis Ax2 of the valve body 41 (see FIGS. 13 and 14).

Figure 13:
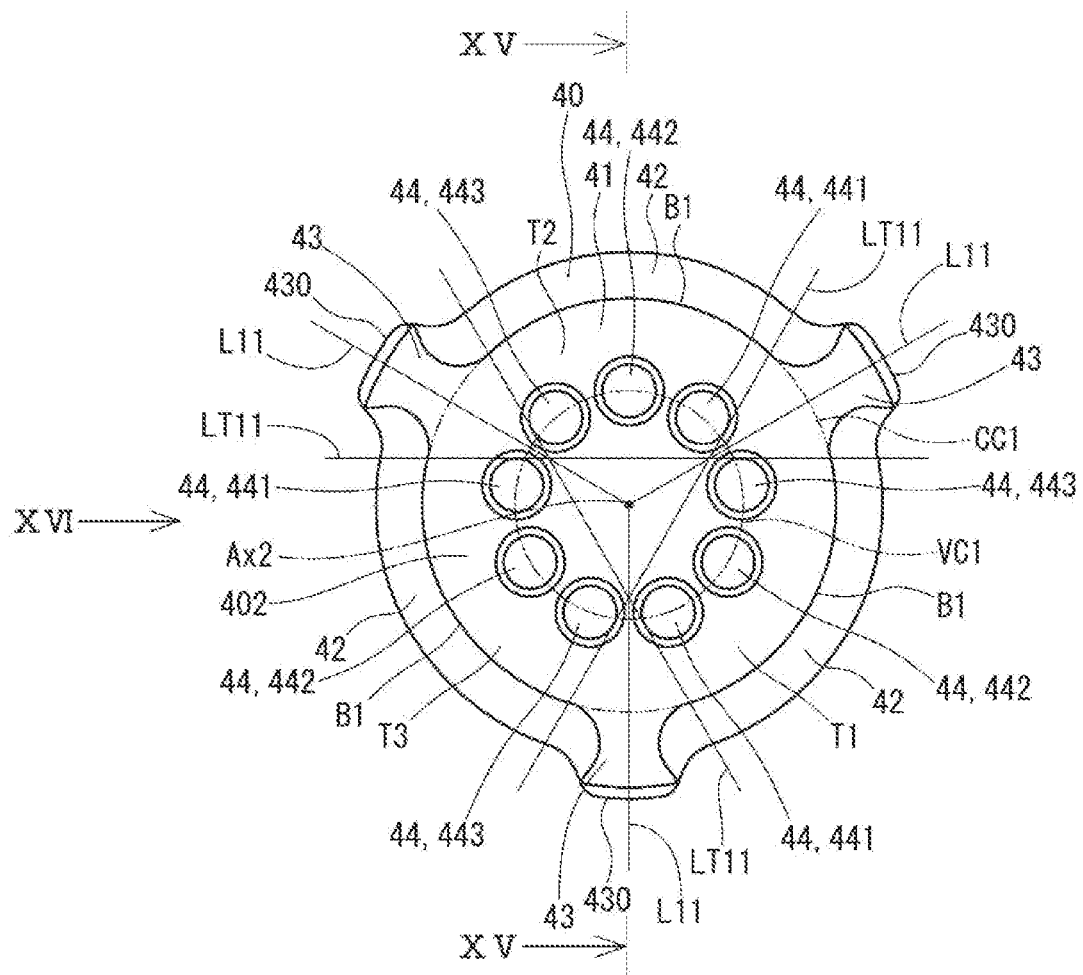
FIG. 13 is a schematic view of a valve member of the high-pressure pump according to the first embodiment as viewed from the pressurizing chamber.

As shown in FIG. 13, a boundary line B1 between inner edges of the three tapered portions 42 and an outer edge of the valve body 41 is formed along a concentric circle CC1 corresponding to the virtual circle VC1.

As shown in FIG. 3, three straight lines L11 from a center of the valve body 41 to respective centers of the three guide portions 43 defines a first region T1, a second region T2, and a third region T3. The three communication holes 44 are disposed in each of the first region T1, the second region T2, and the three region T3 of the valve body 41.

Assuming that the number h of the communication holes 44 is nine (h=9), and that the number g of the guide portions 43 is three, (g=3), the number of the communication holes 44 facing an inner edge of one of the tapered portions 42 separated by the guide portions 43 is three (h/g=9/3=3).

Assuming that the three communication holes 44 formed in each of the first region T1, the second region T2, and the third region T3 are a communication hole 441, a communication hole 442, and a communication hole 443 disposed in this order in the circumferential direction of the virtual circle VC1, the boundary line B1 in the first region T1 between the inner edge of the tapered portion 42 and the outer edge of the valve body 41 is located between a tangent line LT11 closer to the third region T3 in two tangent lines between the outer edge of the communication hole 441 of the first region T1 and the outer edge of the communication hole 443 in the second region T2 that is line-symmetric with the communication hole 441 in the first region T1 with respect to a straight line L11 between the first region T1 and the second region T2, and a tangent line LT11 closer to the second region T2 in two tangent lines between the outer edge of the communication hole 443 in the first region T1 and the outer edge of the communication hole 441 in the third region T3 that is line-symmetric with the communication hole 443 in the first region T1 with respect to a straight line L11 between the first region T1 and the third region T3.

The boundary line B1 between the inner edge of the tapered portion 42 in the second region T2 of the valve body 41 and the outer edge of the valve body 41, and the boundary line B1 in the third region T3 of the valve body 41 between the inner edge of the tapered portion 42 and the outer edge of the valve body 41 are formed similarly to the above boundary line B1.

In other words, according to the present embodiment, the boundary line B1 between the inner edge of the one tapered portion 42 sandwiched between the two guide portions 43 and the outer edge of the valve body 41 is formed in a range between the two tangent lines LT11 between the outer edges of the end communication holes (441, 443) that are two of the communication holes 44 located at both ends facing the inner edge of one of the tapered portions 42, and the outer edges of the communication holes 44 (443, 441) that are line-symmetric with the respective end communication holes (441, 443) with respect to the straight line L11 extending from the center of the valve body 41 in the center of the guide portion 43.

According to the present embodiment, each of a surface 401 (one surface 401) of the valve member 40, i.e., the surface of the valve body 41 facing away from the pressurizing chamber 200, the surface of the guide portion 43 facing away from the pressurizing chamber 200, and the surface of the tapered portion 42 facing away from the pressurizing chamber 200 has a flat shape and is formed on the common plane as shown in FIG. 10. Each of a surface (the other surface) 402 of the valve member 40, i.e., the surface of the valve body 41 facing the pressurizing chamber 200, and the surface of the guide portion 43 facing the pressurizing chamber 200 has a flat shape and is formed on the common plane.

According to the present embodiment, the plate thickness of the valve body 41 and the guide portion 43 of the valve member 40, i.e., the distance between the one surface 401 and the other surface 402 of the valve member 40 is smaller than the distance between the surface of the seat member 31 facing the pressurizing chamber 200 and an end surface of the stopper protrusion 353 facing the seat member 31 as shown in FIG. 10.

The one surface 401, which is the surface of the valve member 40 facing the seat member 31, is configured to come into contact with the surface of the seat member 31 facing the pressurizing chamber 200 (i.e., the plurality of valve seats 310). The center of the other surface 402, which is the surface of the valve member 40 facing the stopper 35, is configured to come into contact with the end surface of the stopper protrusion 353 facing the seat member 31.

The valve member 40 is capable of reciprocating in the axial direction in a range of a difference DD1 between the plate thickness of the valve body 41 and the guide portion 43, i.e., the distance between the one surface 401 and the other surface 402, and the distance between the surface of the seat member 31 facing the pressurizing chamber 200 and the end surface of the stopper protrusion 353 facing the seat member 31 side end surface of the stopper protrusion 353.

When the one surface 401, which is the surface of the valve member 40 facing the seat member 31, is separated from the surface of the seat member 31 facing the pressurizing chamber 200, i.e., the valve seats 310, the valve member 40 is opened to allow the fuel to flow in the communication path 32 and the communication paths 33. When the one surface 401, which is the surface of the valve member 40 facing the seat member 31, comes into contact with the valve seats 310, the valve member 40 is closed to restrict the fuel to flow in the communication paths 33.

When the valve member 40 is opened, the fuel is allowed to flow between the communication path 32 and the communication paths 33 and the stopper recess 351. Accordingly, the fuel from the fuel chamber 260 is allowed to flow toward the pressurizing chamber 200 via the communication path 32, the communication paths 33, the stopper recess 351, the stopper recess 352, the communication holes 38, and the suction hole 232. The fuel from the pressurizing chamber 200 is also allowed to flow toward the fuel chamber 260 via the suction hole 232, the communication holes 38, the stopper recess 352, the stopper recess 351, the communication paths 33, and the communication path 32. At this time, the fuel flows through the communication holes 44 of the valve member 40, the periphery of the valve member 40, the surface of the valve member 40, and the boundary line B1 between the inner edge of the tapered portion 42 and the outer edge of the valve body 41.

When the valve member 40 is closed, the fuel is restricted to flow between the communication path 32 and the communication paths 33 and the stopper recess 351. Accordingly, the fuel is restricted to flow from the fuel chamber 260 toward the pressurizing chamber 200 via the communication path 32, the communication paths 33, the stopper recess 351, the stopper recess 352, the communication holes 38, and the suction hole 232. The fuel is also restricted to flow from the pressurizing chamber 200 toward the fuel chamber 260 side via the suction hole 232, the communication holes 38, the stopper recess 352, the stopper recess 351, the communication paths 33, and the communication path 32.

As shown in FIG. 10, the spring 39 is disposed on the radially outside of the stopper protrusion 353. One end of the spring 39 is in contact with the bottom surface of the stopper recess 352, and the other end is in contact with the other surface 402 that is the surface of the valve member 40 facing the pressurizing chamber 200. The spring 39 biases the valve member 40 toward the seat member 31.

The valve member 40 includes multiple seal portions 410 formed at positions corresponding to the valve seats 310 located on the seat member 31. Each of the seal portions 410 includes a first seal portion 411 having an annular shape and sealing between the communication path 32 as the inner communication path and the communication holes 44, a second seal portion 412 having an annular shape and sealing between the communication paths 33 as the outer communication path and the communication holes 44, and a third seal portion 413 having an annular shape and sealing between the communication paths 33 and a radially outward flow path 45 extending radially outward of the valve body 41 of the valve member 40 and formed between the valve body 41 and the stopper recess 351.

A relationship between flow path areas of the communication path 32 and the communication paths 33 formed in the seat member 31, and the communication holes 44 formed in the valve member 40 will be described herein.

In a state of contact between the valve member 40 and the stopper 35, i.e., during full lift, assuming that an area of an annular flow path formed between a wall surface defined by a minimum circle covering all of the communication paths 33 formed on the wall surface of the seat member 31 facing the valve member 40 and a wall surface (third seal portion 413) of the valve member 40 is a first passage area S1, that a total flow path area of the communication paths 33 is a second passage area S2, and an area of an annular flow path between a wall surface (second seal portion 412) defined by a minimum circle covering all of the communication holes 44 formed on the surface of the valve member 40 facing the seat member 31 and the wall surface of the seat member 31 is a third flow path area S3, the second passage area S2 is larger than the total area of the first passage area S1 and the third flow path area S3 as shown in FIGS. 10 and 11.

Assuming that the area of an annular flow path between the opening of the communication path 32 facing the wall surface of the valve member 40 and the wall surface (the first seal portion 411) of the valve member 40 is a fourth flow path area S4, and that a total flow path area of the communication holes 44 formed in the valve member 40 is a fifth flow path area S5, the fifth flow path area S5 is larger than the total are of the third flow path area S3 and the fourth flow path area S4.

Furthermore, assuming that a flow path area of the communication path 32 formed in the seat member 31 is a sixth flow path area S6, the sixth flow path area S6 is larger than the fourth flow path area S4.

By setting the relationship between the flow path areas of the communication path 32 and the communication paths 33 formed in the seat member 31, and the communication holes 44 formed in the valve member 40 to the foregoing relationship, the flow path formed between the valve member 40 and the seat member 31 becomes a throttle path.

The plate thickness of the valve member 40 will be next described.

As shown in FIG. 10, the plate thickness of the valve body 41 of the valve member 40 is smaller than the plate thickness of the seat member 31. In this case, the valve body 41 deforms in accordance with the seat member 31, wherefore sealing ability is improved. It is preferable that the valve body 41 has such a shape capable of making a surface pressure applied to the seat member 31 even during pressure reception.

According to the present embodiment, the maximum injection pressure of fuel injected by the fuel injection valves 138, i.e., the system fuel pressure of the fuel supply system 9 is 20 MPa or higher. Accordingly, the pressure of the pressurizing chamber 200 may increase to approximately 40 MPa due to a pressure loss. For securing sufficient strength and sealing ability of the valve member 40 under such high fuel pressure environment, a plate thickness ratio t/D is preferably expressed by following Formula 1.

$$0.06 \leq t/D \leq 0.13 \quad \text{Formula 1}$$

Figure 14:
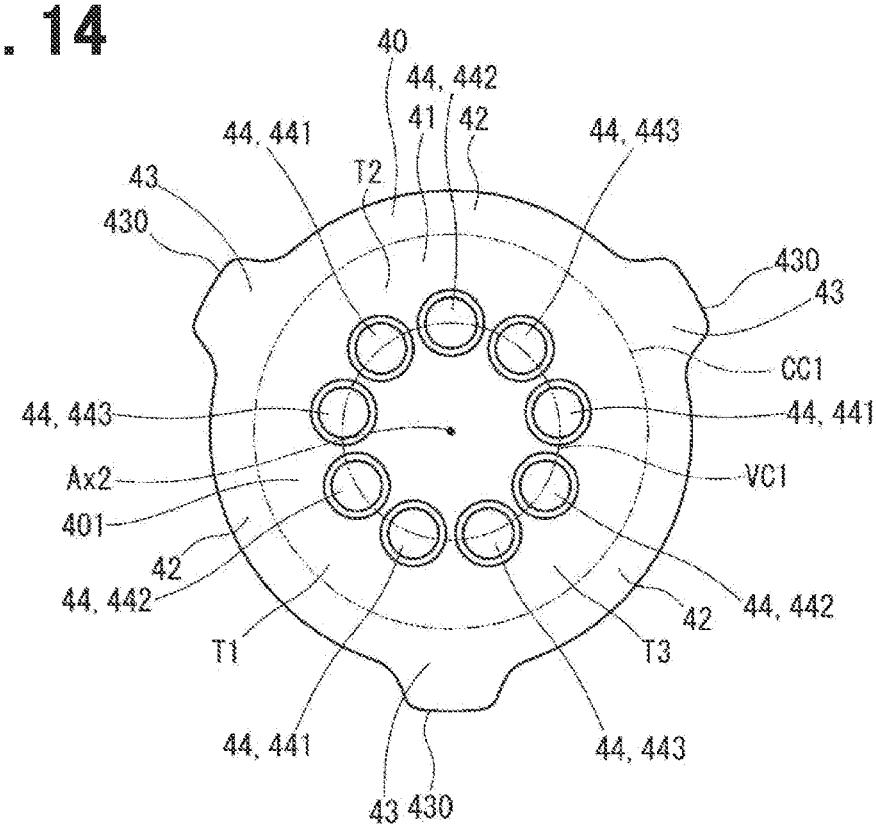
FIG. 14 is a schematic view of the valve member of the high-pressure pump according to the first embodiment as viewed from the seat member.
Figure 15:
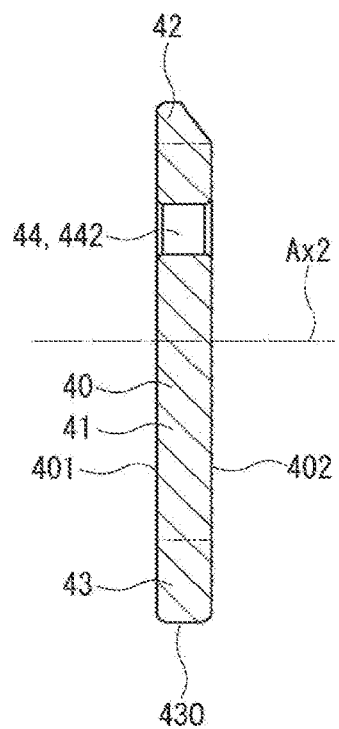
FIG. 15 is a cross-sectional view taken along a line XV-XV in FIG. 13.
Figure 16:
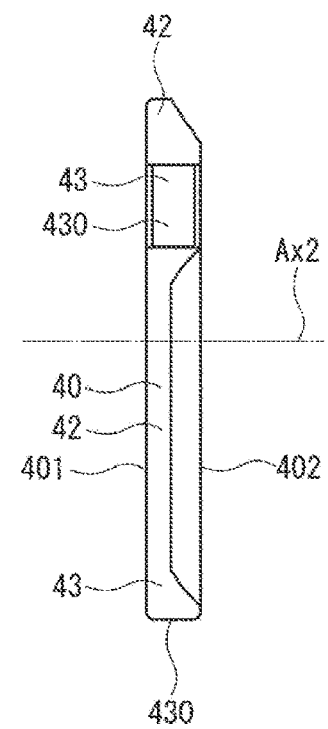
FIG. 16 is a view of FIG. 13 as viewed in a direction of an arrow XVI.

In above Formula 1, D is a diameter of the third seal portion 413 that seals between the radially outward flow path 45 and the communication paths 33 (see FIGS. 11 and 14). In addition, t is a plate thickness of the valve body 41 (see FIG. 10). In the present embodiment, t is 1 mm, for example.

The significance of setting the plate thickness ratio t/D to the value expressed as above Formula 1 will be described with reference to FIG. 17. A graph of FIG. 17 shows a relationship between the plate thickness ratio t/D, a seal surface pressure (two-dot chain line), and a limit pressure (material strength, one-dot chain line).

Figure 17:
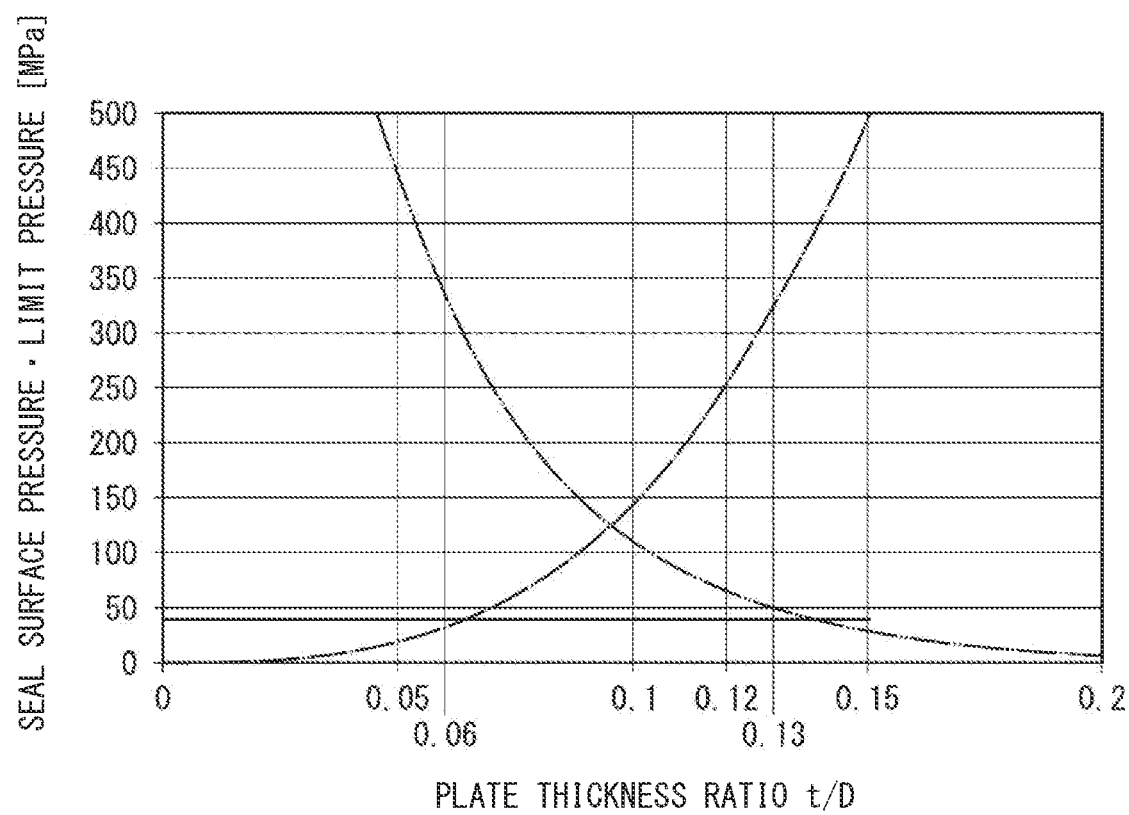
FIG. 17 is a graph showing a relationship between a plate thickness ratio t/D of the valve member of the high-pressure pump according to the first embodiment, a seal surface pressure, and a limit pressure.

When the plate thickness ratio t/D is 0.06 or larger, desired material strength, i.e., approximately 40 MPa, which is a peak fuel pressure of the pressurizing chamber 200, can be secured as shown in FIG. 17. When the plate thickness ratio t/D is 1.13 or smaller, a desired seal surface pressure (40 MPa or higher) can be secured.

The valve body 41 easily deforms under a high fuel pressure environment, wherefore the plate thickness t of the valve body 41 is preferably large to increase strength. However, when the valve member 40 has the multiple seal portions 410 as in the present embodiment, the multiple flow paths need to be sealed. In this case, sufficient sealing ability also needs to be secured. For improving sealing ability, the thickness t needs to be reduced. According to the present embodiment, therefore, the plate thickness ratio t/D is set to the value expressed as above Formula 1 based on the graph shown in FIG. 17 to improve sealing ability while securing strength of the valve member 40. For further improvement of sealing ability, the plate thickness ratio t/D is preferably expressed as following Formula 2 to set the sealing surface pressure to 60 MPa or higher, for example.

$$0.06 \leq t/D \leq 0.12 \quad \text{Formula 2}$$

As described above, (A1) the high-pressure pump 10 of the present embodiment includes the cylinder 23 as the pressurizing chamber forming portion, the upper housing 21 and the stopper 35 as the suction passage forming portion, the seat member 31, and the valve member 40.

The cylinder 23 defines the pressurizing chamber 200 in which fuel is pressurized. The upper housing 21 and the stopper 35 defines the suction passage 216 through which fuel sucked into the pressurizing chamber 200 flows.

The seat member 31 is disposed in the suction passage 216, and includes the communication path 32 that passes through the seat member 31 between one surface and the other surface of the seat member 31, and the communication paths 33 that passes through the seat member 31 between the one surface and the other surface of the seat member 31. The communication paths 33 are located radially outward the communication path 32. The valve member 40 is disposed between the pressurizing chamber 200 and the seat member 31. The valve member 40 is capable of allowing the fuel to flow in the communication path 32 by separating from the seat member 31 for opening the communication path 32 and of restricting the fuel to flow in the communication path 32 by contacting the seat member 31 for closing the communication path 32.

The valve member 40 includes the valve body 41 having a plate shape, the communication holes 44, the tapered portions 42, and the guide portions 43. The communication holes 44 passes through the valve body 41 between one surface and the other surface of the valve body 41. The communication holes 44 are located between the communication paths 33 and the communication path 32 in the radial direction. The tapered portions 42 is located radially outside the valve body 41 and each includes the surface that faces the pressurizing chamber 200 and tapers toward the axis Ax2 of the valve body 41 in a direction toward the pressurizing chamber 200. The guide portions 43 protrudes radially outward from the valve body 41 to divide the tapered portions 42 in the circumferential direction, and capable of guiding the valve member 40 to move by sliding on the stopper recesses 351 of the stopper 35. The communication holes 44 are disposed on the virtual circle VC1 centered at the axis Ax2 of the valve body 41.

According to the present embodiment, the seat member 31 includes the communication path 32 disposed radially inside the seat member 31, and the communication paths 33 disposed radially outside the communication path 32. The valve member 40 is configured to come into contact with and be separated from the seat member 31, and has the communication holes 44 positioned between the communication path 32 and the communication paths 33 in the radial direction. The fuel flows in a route disposed radially outside the valve member 40, passing between the valve member 40 and the stopper recess 351, and reaching the communication paths 33 of the seat member 31, a route passing through the communication hole 44 of the valve member 40 and the communication path 32 of the seat member 31, and a route passing through the communication holes 44 of the valve member 40 and the communication paths 33 of the seat member 31.

In this case, even when the lift amount of the valve member 40 from the seat member 31 is reduced more than an amount of a configuration having only a flow path between the valve member 40 and the stopper recess 351, a flow path area equivalent to a flow path area of the configuration having only the flow path between the valve member 40 and the stopper recess 351 can be secured. Accordingly, the lift amount of the valve member 40 from the seat member 31 can be reduced. As a result, a driving force for lifting the valve member 40 from the seat member 31 can be set to a small force, and the maximum output from the electromagnetic driving unit 500 can be reduced. Size reduction of the electromagnetic driving unit 500 is therefore achieved. Moreover, collision noise between the valve member 40 and the needle body 531 can be reduced by reduction of the lift amount. Furthermore, responsiveness of the electromagnetic driving unit 500 can be raised by reducing the lift amount. In this manner, excessive fuel backflow during amount-control can be reduced, wherefore discharge efficiency during high-speed operation increases.

According to the present embodiment, the boundary line B1 between inner edges of the tapered portions 42 and the outer edge of the valve body 41 is formed along the concentric circle CC1 corresponding to the virtual circle VC1. This configuration reduces the distance between both ends of each of the boundary lines B1 and the communication holes 44. In this case, portions in the vicinity of both ends of each of the boundary lines B1 do not produce resistance for fuel flowing on the surface of the valve member 40. Accordingly, a sufficient amount of fuel sucked into the pressurizing chamber 200 can be secured. Similarly, a sufficient amount of fuel returned from the pressurizing chamber 200 to the fuel chamber 260 can be secured.

(A2) According to the present embodiment, assuming that the number of the communication holes 44 is h, and that the number of the guide portions 43 is g, the number of the communication holes 44 facing the inner edge of one of the tapered portions 42 divided by the guide portions 43 is uniformly set to a value of h/g. In this case, the communication holes 44 can be arranged in a balanced manner in correspondence with each of the tapered portions 42. Accordingly, a fuel flow passing through the valve member 40 can be stabilized.

(A3) According to the present embodiment, the boundary line B1 between the inner edge of the one tapered portion 42 sandwiched between the two guide portions 43 and the outer edge of the valve body 41 is formed in a range between the two tangent lines LT1 between the outer edges of the end communication holes (441, 443) which are located both ends of the communication holes 44 facing the inner edge of one of the tapered portions 42, and the outer edges of the communication holes 44 (443, 441) that are line-symmetric with the end communication holes (441, 443) with respect to the straight line L11 extending from the center of the valve body 41 at the center of the guide portion 43. In this case, the distance between both ends of each of the boundary lines B1 and the communication holes 44 can be reduced while securing the length of each of the boundary lines B1. Accordingly, portions in the vicinity of both ends of each of the boundary lines B1 do not produced resistance for a fuel flow.

(A9) The high-pressure pump 10 in the present embodiment is applied to the fuel supply system 9 that includes the fuel injection valves 138 for supplying fuel to the engine 1. The valve member 40 includes the third seal portion 413 that has an annular shape and seals between the communication paths 33 and the radially outward flow path 45 located on the radially outside the valve member 40 in the fuel supply system 9 in which maximum injection pressure of the fuel injected by the fuel injection valves 138 is 20 MPa or higher. Assuming that the diameter of the third seal portion 413 is D, that the plate thickness of the valve member 40 is t, the plate thickness ratio t/D falls within a range shown in $0.06 \leq t/D \leq 0.13$.

Accordingly, the sealing ability improves under a high fuel pressure environment while securing strength of the valve member 40 having the seal portions 410.

<B-1> The electromagnetic driving unit 500 will be next described in detail.

Figure 18:
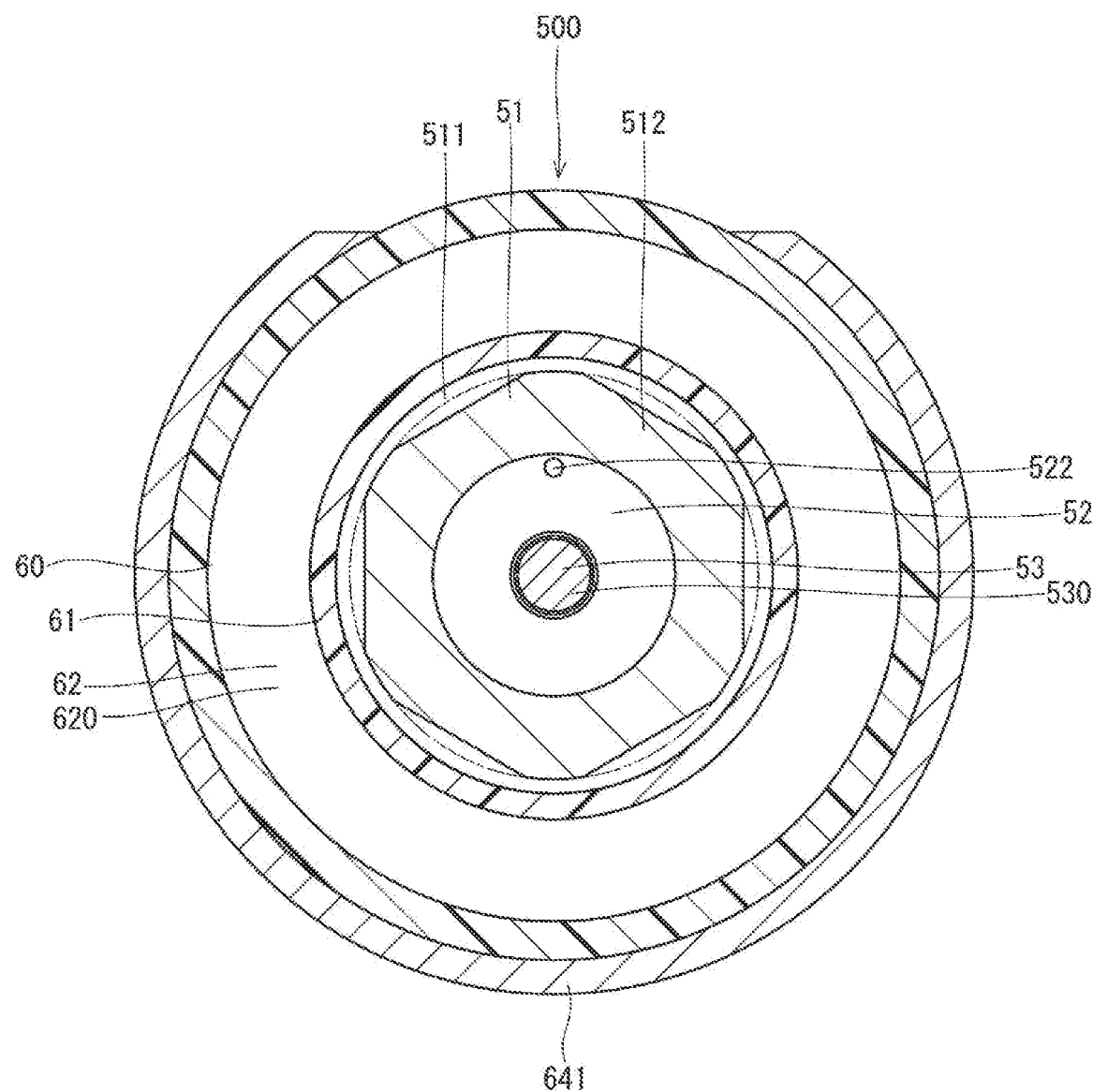
FIG. 18 is a cross-sectional view taken along a line XVIII-XVIII in FIG. 5.

As shown in FIG. 18, the outer peripheral wall of the second columnar portion 512 of the cylindrical member 51 has a substantially hexagonal columnar shape. Specifically, each of the six corners of the outer peripheral wall of the second columnar portion 512 in the circumferential direction has a curved shape located on a virtual cylindrical surface centered at the axis of the second columnar portion 512. A clearance is formed between a flat portion of the outer peripheral wall of the second columnar portion 512 and the inner peripheral wall of the spool 61.

According to the present embodiment, for screwing the cylindrical member 51 into the suction hole portion 212 of the upper housing 21 by screw connection, a wall surface of a tool is applied to the outer peripheral wall of the second columnar portion 512 and rotated to screw the cylindrical member 51 into the suction hole portion 212.

According to the present embodiment, the second columnar portion 512 of the cylindrical member 51 is located inside the inner cylindrical surface 602 of the coil 60, i.e., inside the end of the spool 61 facing the pressurizing chamber 200 as shown in FIGS. 5 and 18. In this case, lengths of the cylindrical member 51 and the needle 53 in the axial direction can be shortened more than those lengths of a configuration in which a hexagonal columnar outer peripheral wall to which a wall surface of a tool is applied for screwing the cylindrical member 51 into the suction hole portion 212 is formed in the outer peripheral wall of the cylindrical member 51 between the pressurizing chamber 200 and the spool 61. In this case, an inertial mass decreases, wherefore improvement of responsiveness and reduction of NV is achieved.

According to the present embodiment, the coil 60 has the inner cylindrical surface 601 and the inner cylindrical surface 602 that have different diameters. The wire 620 is wound around the inner cylindrical surface 601 and the inner cylindrical surface 602 radially outward. As described above, the second columnar portion 512 of the cylindrical member 51 is located inside the inner cylindrical surface 602 of the coil 60. In this case, the thickness of the second columnar portion 512 in the radial direction is allowed to increase, wherefore the second columnar portion 512 does not become a magnetic throttle.

If the coil 60 does not includes the inner cylindrical surface 601 but only the inner cylindrical surface 602, and the wire 620 are wound in the radial direction a same number of times starting from the inner cylindrical surface 602 in the present embodiment, a length of the winding portion 62 in the axial direction increases. In addition, the lengths of the fixed core 57 and the needle 53 in the axial direction increase. Accordingly, NV increases, and resistance of the winding portion 62 also increases, wherefore power consumption of the coil 60 may increase.

If the coil 60 does not include the inner cylindrical surface 602 but has only the inner cylindrical surface 601 and the wire 620 is wound in the radial direction a same number of times in the present embodiment, the same problems as described above may be occur. Moreover, the thickness of the second columnar portion 512 of the cylindrical member 51 in the radial direction may decrease, wherefore the second columnar portion 512 may become a magnetic throttle. In this case, an attractive force between the fixed core 57 and the movable core 55 is insufficient, wherefore required responsiveness may not be obtained.

Figure 19:
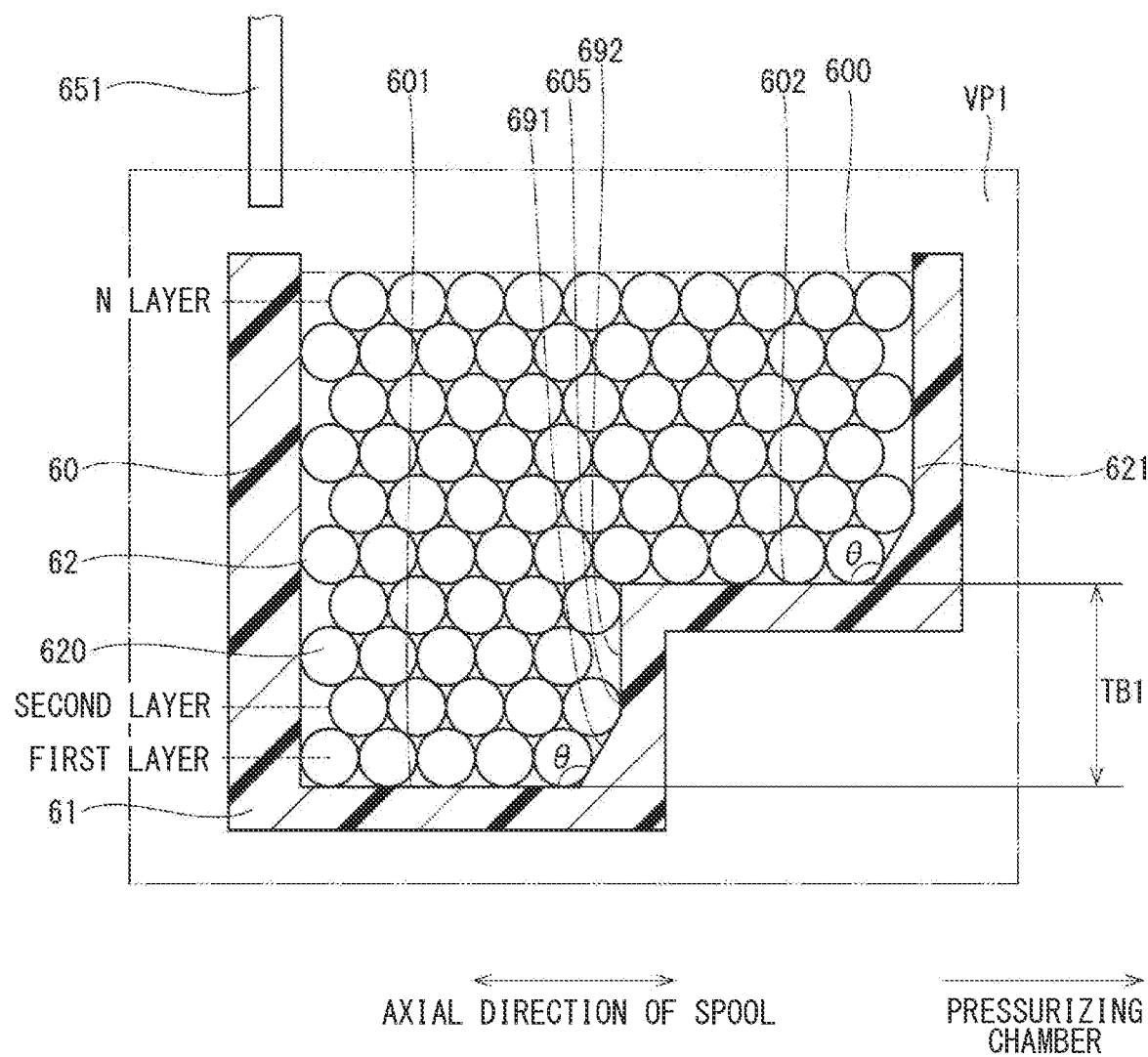
FIG. 19 is a schematic cross-sectional view of a coil of the high-pressure pump according to the first embodiment.

FIG. 19 schematically shows a part of the coil 60 in the present embodiment. Accordingly, relative lengths, sizes, and others of respective members and parts constituting the coil 60 are different from actual ones. In addition, the number of times in which the wire 620 is wound around the outer peripheral wall of the spool 61 is also smaller than the actual number for simplification.

As shown in FIG. 19, the coil 60 includes a connecting surface 605 that is a virtual surface connecting the inner cylindrical surface 601 and the inner cylindrical surface 602. The connecting surface 605 has a substantially annular shape. The inner cylindrical surface 601, the inner cylindrical surface 602 and the connecting surface 605 are located on the outer peripheral wall of the spool 61. The connecting surface 605 has a part that tapes toward the axis pf the spool 61 in a direction away from the pressurizing chamber 200.

More specifically, the connecting surface 605 has two connecting portion connected to the inner cylindrical surface 601 having the smallest diameter and connected to the inner cylindrical surface 602 having the largest diameter. The connecting portion connected to the inner cylindrical surface 602 has a tapered shape. The other part of the connecting surface 605 except for the connecting portion connected to the inner cylindrical surface 602, i.e., the connecting portion connected to the inner cylindrical surface 602 is perpendicular to the axis of the spool 61. The tapering connection portion of the connecting surface 605 that is connected to the inner cylindrical surface 601 is referred as a tapering surface portion 691, and left portion of the connecting portion that is perpendicular to the axis of the spool 61 is referred as a vertical surface portion 692.

As shown in FIG. 19, an angle formed by the inner cylindrical surface 601 and the connecting surface 605, i.e., a minor angle θ formed by the inner cylindrical surface 601 and the tapering surface portion 691 is 120 degrees in a cross section taken along a virtual plane VP1 on which the axis of the spool 61 extends.

According to the present embodiment, an end surface 621 of the winding portion 62 facing the pressurizing chamber 200 tapers at a connecting portion with the inner cylindrical surface 602. The connecting portion and the inner cylindrical surface 602 forms an angle of 120 degrees.

As shown in FIG. 19, the wire 620 are wound starting from the inner cylindrical surface 601 to form N layers stacked in a radial direction. The inner cylindrical surface 601 has the smallest diameter of the two inner cylindrical surface 601 and 602. According to the present embodiment, N is an even number. In FIG. 19, N=10, that is, the wire is wound starting from the inner cylindrical surface 601 in the radial direction 10 times to form N layers.

Figure 22:
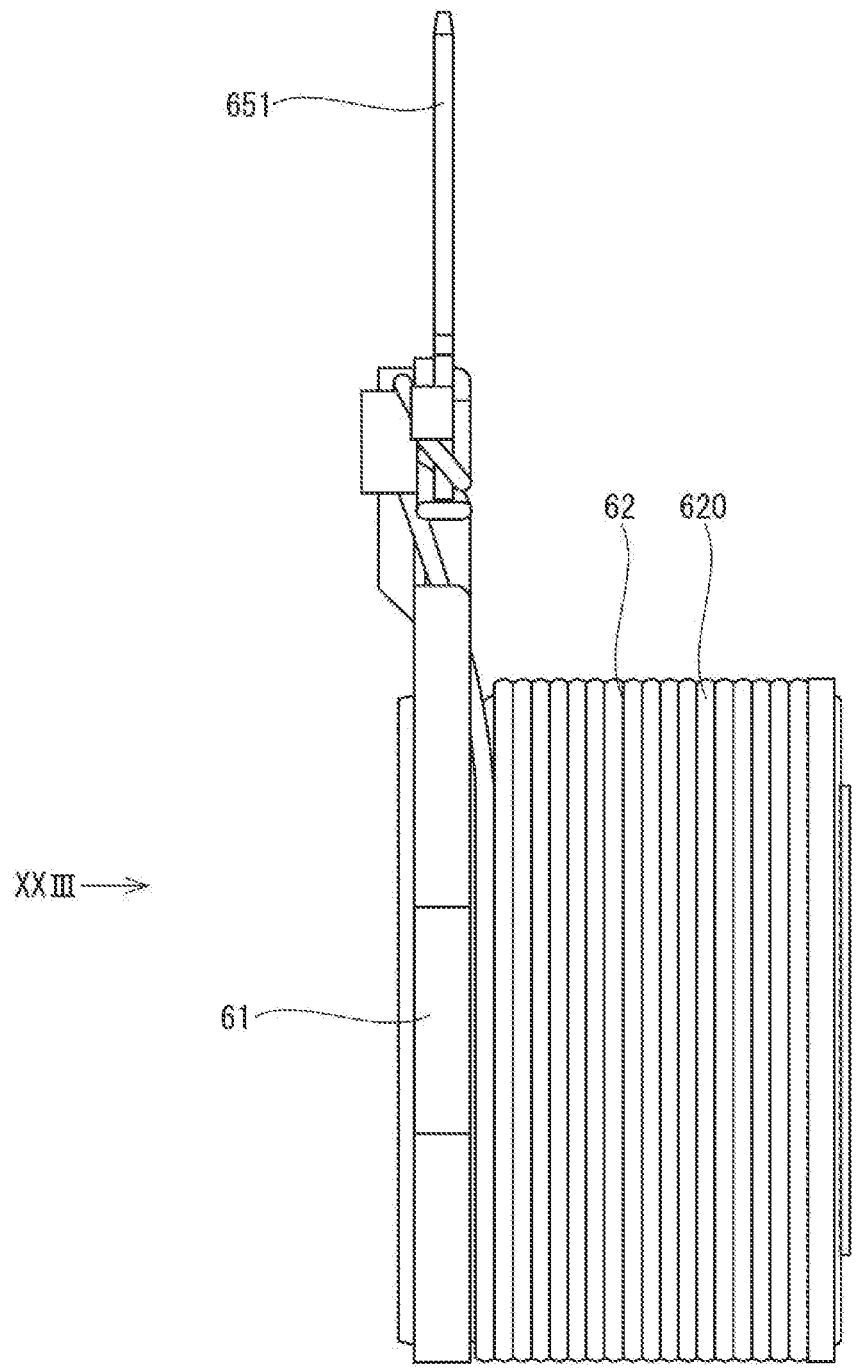
FIG. 22 is a view of the coil of the high-pressure pump according to the first embodiment.
Figure 23:
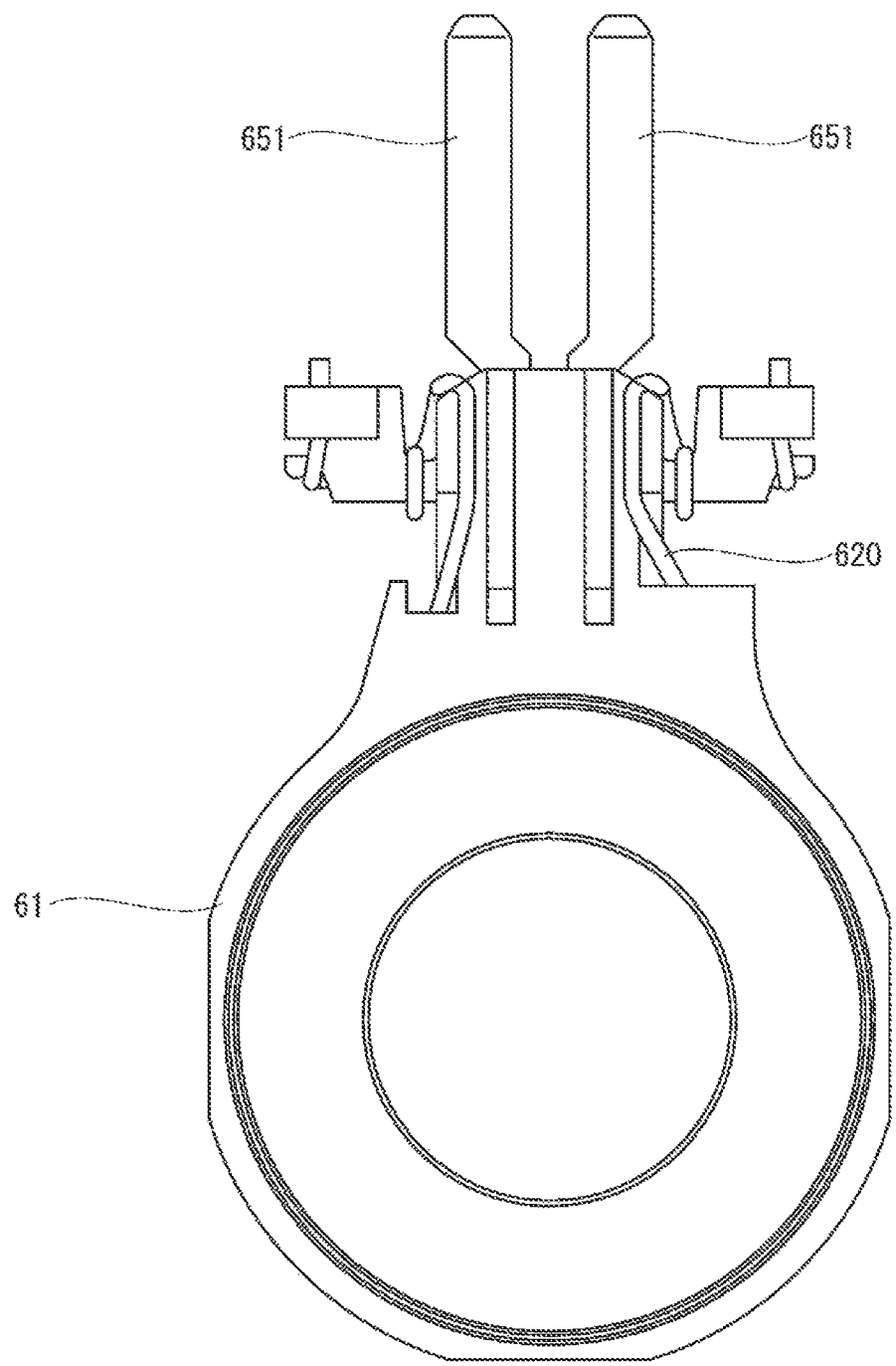
FIG. 23 is a view of FIG. 22 as viewed in a direction of an arrow XXIII.

According to the present embodiment, the wire 620 is wound around the outer peripheral wall of the spool 61 in the axial direction of the spool 61 toward the pressurizing chamber 200 for the first layer, in the axial direction of the spool 61 away from the pressurizing chamber 200 for the second layer, in the axial direction of the spool 61 toward the pressurizing chamber 200 for the third layer, and repeated to be wound to form N layers. As described above, when N is an even number, a start end of the wire 620 and the other end of the wire 620 can be disposed at the end of the spool 61 facing away from the pressurizing chamber 200 in the axial direction. This configuration facilitates connection of the wire 620 to the terminal 651 (see FIGS. 22 and 23).

As shown in FIG. 19, the wire 620 is wound in the axial direction the same number of times for the first layer and the second layer. The first layer is located radially inward the second layer. FIG. 19 shows a state more simplified than the actual state, presenting a case in which the wire 620 is wound in the axial direction five times for the first layer and the second layer. In this case, the wire 620 for the second layer is located between the wire 620 wound for the first layer in the radial direction.

According to the present embodiment, the tapering surface portion 691 is in contact with portions of the wire 620 that is wound for the first layer and located closest to the pressurizing chamber 200 in the axial direction of the spool 61 in the first layer and that is wound for the second layer and located closest to the pressurizing chamber 200 in the axial direction in the second layer. A connecting portion of the vertical surface portion 692 connected to the tapering surface portion 691 is in contact with a portion of the wire 620 that is wound for the second layer and located closest to the pressurizing chamber 200 in the axial direction of the spool 61. Accordingly, the boundary between the tapering surface portion 691 and the vertical surface portion 692 is located in the second layer of the wire 620 that is wound starting from the inner cylindrical surface 601 in the radial direction.

As shown in FIG. 19, the wire 620 is wound in the axial direction the same number of times for each layer in a range TB1 between the inner cylindrical surface 601 having the smallest diameter and the inner cylindrical surface 602 having the largest diameter of the two inner cylindrical surfaces 601 and 602. FIG. 19 shows a case in which four layers of the wire 620 are formed in the radial direction in the range TB1 between the inner cylindrical surface 601 and the inner cylindrical surface 602. The wire 620 is wound in the axial direction five times for all layers in the range TB1 from the first to fourth layers. In this case, the wire 620 for the (m+1)th layer are located between the wire 620 for the mth layer adjacent to each other in the axial direction.

Next described will be a comparison between the coil 60 in the present embodiment and the coil 60 in a comparative example at superior pints in the present embodiment over the comparative example.

Figure 20:
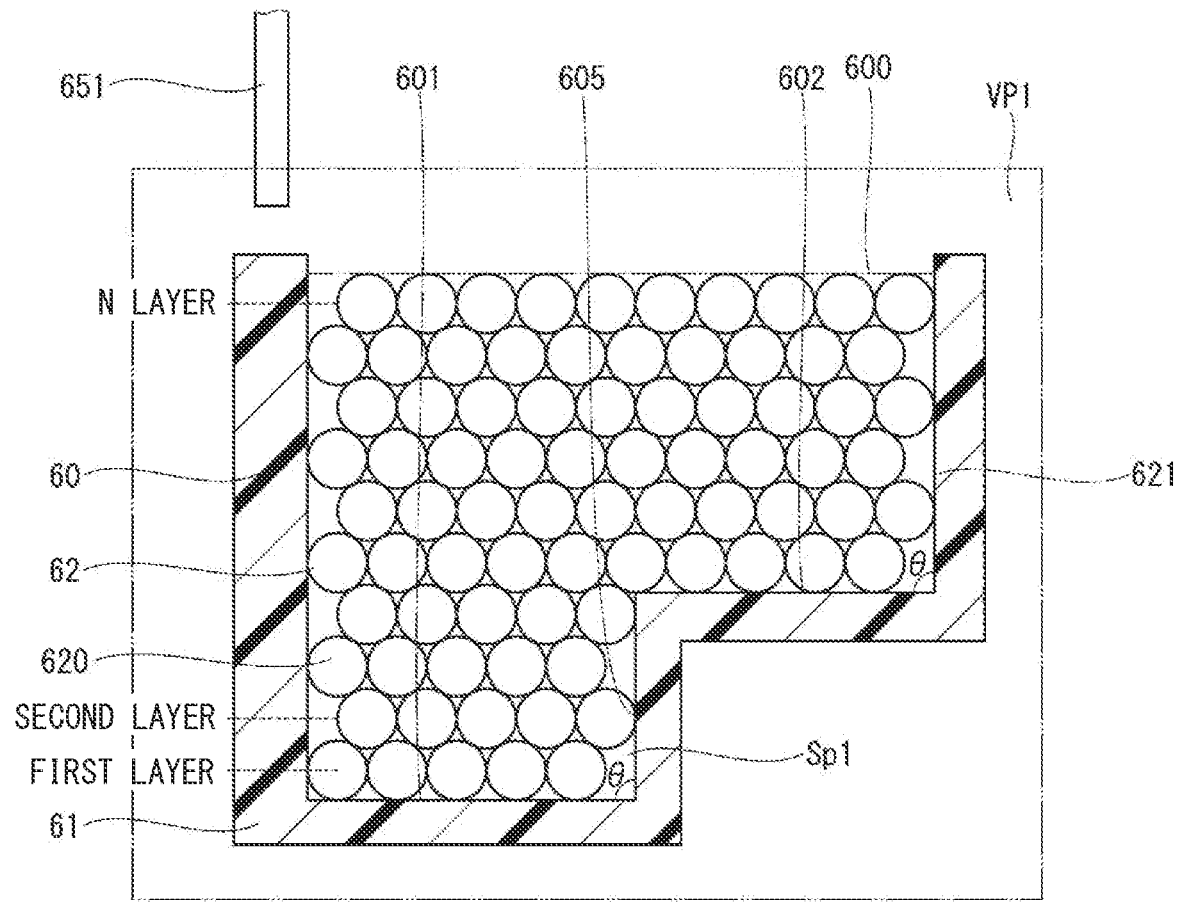
FIG. 20 is a schematic cross-sectional view of a coil according to a first comparative example.
Figure 21:
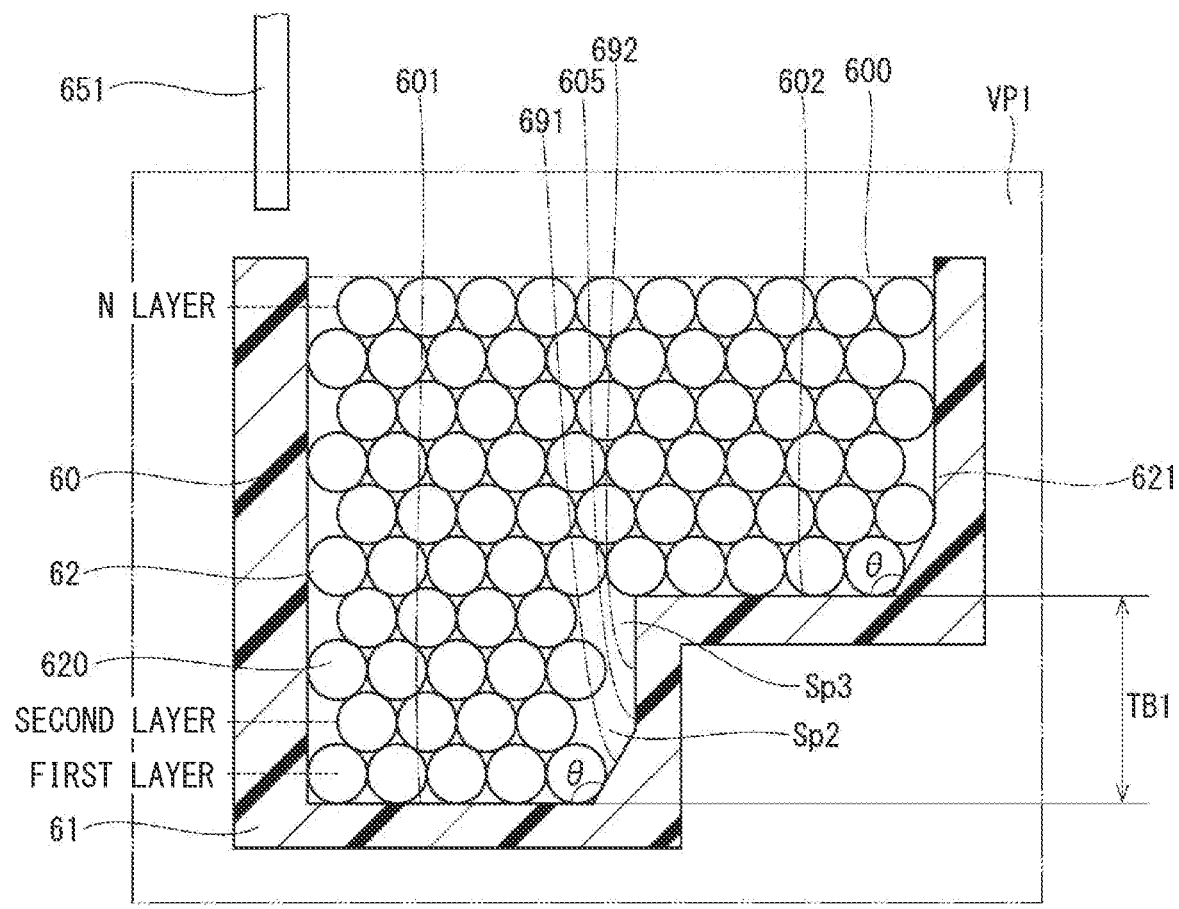
FIG. 21 is a schematic cross-sectional view of a coil according to a second comparative example.

FIG. 20 shows the coil 60 according to a first comparative example, while FIG. 21 shows the coil 60 according to a second comparative example.

As shown in FIG. 20, the coil 60 according to the first comparative example is different from the coil 60 according to the present embodiment in the shape of the connecting surface 605. According to the coil 60 of the first comparative example, the connecting surface 605 has a flat shape formed such that the whole part is perpendicular to the axis of the spool 61. A minor angle θ formed by the inner cylindrical surface 601 and the connecting surface 605 is 90 degrees. Accordingly, a clearance Sp1 is formed between the connecting surface 605 and the wire 620 for the first layer located closest to the pressurizing chamber 200 in the axial direction of the spool 61. In this case, the wire 620 for the first layer located closest to the pressurizing chamber 200 in the axial direction of the spool 61 may be shifted toward the clearance Sp1. As a result, the wire 620 for the second layer in contact with the wire 620 for the first layer located closest to the pressurizing chamber 200 in the axial direction of the spool 61 may be shift in the radial direction of the spool 61.

Accordingly, the state of the wire 620 wound around the spool 61 may become unstable.

According to the coil 60 of the present embodiment, in contrast, an angle formed by the inner cylindrical surface 601 and the connecting surface 605, i.e., a minor angle θ formed by the inner cylindrical surface 601 and the tapering surface portion 691 is 120 degrees in a cross section of a virtual plane VP1 on which the axis of the spool 61 extends as shown in FIG. 19. In this case, the tapering surface portion 691 is in contact with the part of the wire 620 for the first layer located closest to the pressurizing chamber 200 in the axial direction of the spool 61, and the part of the wire 620 for the second layer located closest to the pressurizing chamber 200 in the axial direction of the spool 61. Accordingly, the coil 60 of the present embodiment does not include the clearance Sp1 that is formed in the coil 60 of the first comparative example. The connecting portion of the vertical surface portion 692 connected to the tapering surface portion 691 is in contact with the wire 620 for the second layer located closest to the pressurizing chamber 200 in the axial direction of the spool 61. This configuration of the coil 60 in the present embodiment reduces positional deviation of the part of the wire 620 for the first layer located closest to the pressurizing chamber 200 in the axial direction of the spool 61, and the wire 620 for the second layer in contact with the part of the wire 620, thereby stabilizing the state of the wire 620 wound around the spool 61.

According to the coil 60 of the second comparative example, the wire 620 is wound in the axial direction a different number of times for layers in the range TB1 between the inner cylindrical surface 601 and the inner cylindrical surface 602 as shown in FIG. 21, which is the different point from the present embodiment. In the coil 60 in the second comparative example, the wire 620 is wound in the axial direction 5 times for the first layer and the third layer, while the wire 620 is wound in the axial direction 4 times for the second layer and the fourth layer. Accordingly, a clearance Sp2 is formed between the connecting surface 605 and the wire 620 for the second layer closest to the pressurizing chamber 200 in the axial direction of the spool 61. Moreover, a clearance Sp3 is formed between the connecting surface 605 and the wire 620 for the fourth layer located closest to the pressurizing chamber 200 in the axial direction of the spool 61. In this case, the wire 620 for the third layer located closest to the pressurizing chamber 200 in the axial direction of the spool 61 may be shifted toward the clearance Sp2. Moreover, the wire 620 for the fifth layer facing the clearance Sp3 may be shifted toward the clearance Sp3. Accordingly, the state of the wire 620 wound around the spool 61 may become unstable.

In the case of the coil 60 in the present embodiment, in contrast, the wire 620 is wound in the axial direction the same number times for each layer in the range TB1 between the inner cylindrical surface 601 and the inner cylindrical surface 602 as shown in FIG. 19. Accordingly, the coil 60 of the present embodiment does not include the clearance Sp2 and the clearance Sp3 that are formed in the coil 60 of the second comparative example. This configuration of the coil 60 in the present embodiment reduces positional deviation of the wire 620 for the third layer located closest to the pressurizing chamber 200 in the axial direction of the spool 61, and the wire 620 for the fifth layer, thereby stabilizing the state of the wire 620 wound around the spool 61.

Figure 24:
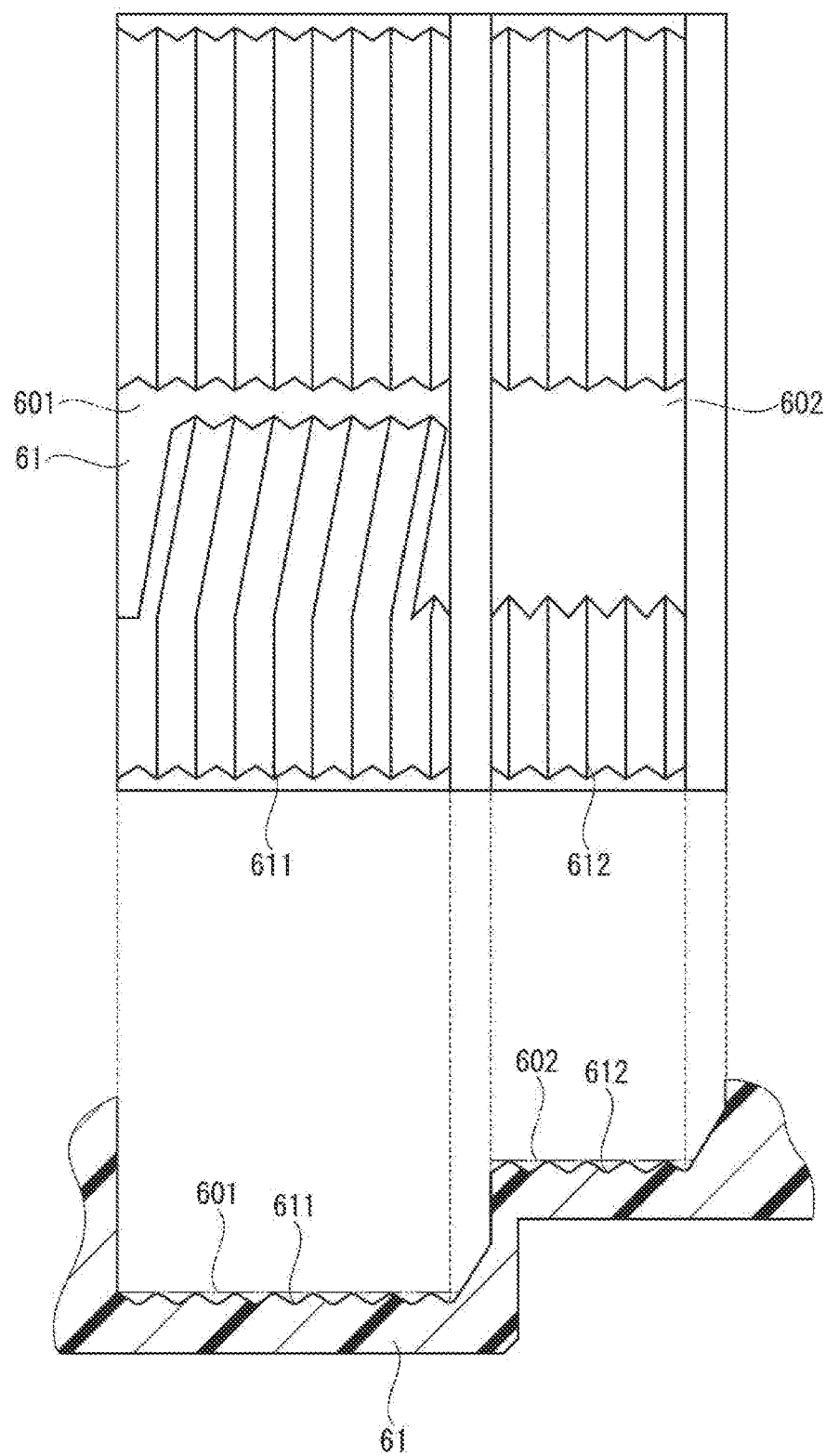
FIG. 24 is a development view and a sectional view of an outer peripheral wall of a winding forming portion of the high-pressure pump according to the first embodiment.

As shown in FIG. 24, spool grooves 611 and 612 are formed in the outer peripheral wall of the spool 61. An upper part of FIG. 24 shows a developed view of the outer peripheral wall of the spool 61, while a lower part of FIG. 24 shows a cross-sectional view of the spool 61.

The spool groove 611 is recessed radially inward from the outer peripheral wall of the spool 61 and extends in the circumferential direction of the spool 61. The spool is formed at a position of the spool corresponding to the inner cylindrical surface 601. The spool groove 611 is formed substantially in the entire range of the spool 61 in the circumferential direction except for a part in the circumferential direction of the spool 61.

The spool groove 612 extends in the circumferential direction of the spool 61 while recessed radially inward from a portion corresponding to the inner cylindrical surface 602 in the outer peripheral wall of the spool 61. The spool groove 612 is formed approximately in a range from 90 degrees to 360 degrees in the circumferential direction of the spool 61. Accordingly, the spool groove 612 is not formed in a region in the outer peripheral wall of the spool 61 and corresponding to the inner cylindrical surface 602 (in a range from 0 to approximately 90 degrees) in the circumferential direction.

The spool groove 611 in a part in the outer peripheral wall of the spool 61 and corresponding to the inner cylindrical surface 601 (in a range from 0 to approximately 90 degrees) in the circumferential direction is inclined to a part of the spool groove 611 (in a range from approximately 90 degrees to 360 degrees) other than the foregoing part in the circumferential direction.

The wire 620 is wound around the spool 61 with a part of the wire 620 inserted into the spool grooves 611 and 612. In this manner, the wire 620 can be stabilized in the spool 61. The positions of the wire 620 wound around the spool 61 may vary at the time of switching of the wire 620 from a portion corresponding to the inner cylindrical surface 601 to a portion corresponding to the inner cylindrical surface 602 in the outer peripheral wall of the spool 61. According to the present embodiment, as described above, the spool groove 612 is not formed in a part of a portion in the outer peripheral wall of the spool 61 and corresponding to the inner cylindrical surface 602 in the circumferential direction. Accordingly, the variations in the position of the wire 620 described above can be absorbed by the portion where the spool groove 612 is not formed in the outer peripheral wall of the spool 61.

As described above, (B1) the high-pressure pump 10 of the present embodiment includes the cylinder 23 as the pressurizing chamber forming portion, the upper housing 21 as the suction passage forming portion, the seat member 31, the valve member 40, the cylindrical member 51, the needle 53, the movable core 55, and the spring 54 as the biasing member, the fixed core 57, and the coil 60. The cylinder 23 defines the pressurizing chamber 200 in which the fuel is pressurized.

The upper housing 21 defines the suction passage 216 through which the fuel sucked into the pressurizing chamber 200 flows. The seat member 31 is disposed in the suction passage 216, and includes the communication path 32 and the communication paths 33 that pass through the seat member 31 between one surface and the other surface of the seat member 31. The valve member 40 is disposed between the pressurizing chamber 200 and the seat member 31, and capable of allowing the fuel to flow in the communication path 32 and the communication paths 33 by being separated from the seat member 31 to open the communication path 32 and the communication paths 33 and of restricting the fuel to flow in the communication path 32 and the communication paths 33 by contacting the seat member 31 to close the communication path 32 and the communication paths 33.

The cylindrical member 51 is disposed on a side of the seat member 31 opposite to the pressurizing chamber 200. The needle 53 is movable in the cylindrical member 51 in the axial direction. The needle 53 has on end capable of contacting the surface of the valve member 40 facing away from the pressurizing chamber 200. The movable core 55 is disposed at the other end of the needle 53.

The spring 54 biases the needle 53 toward the pressurizing chamber 200. The fixed core 57 is disposed on a side of the cylindrical member 51 opposite to the pressurizing chamber 200. The coil 60 has the winding portion 62 formed into a cylindrical shape by winding the wire 620 around the spool 61. The coil 60 generates an attractive force between the fixed core 57 and the movable core 55 to move the movable core 55 and the needle 53 in the closing direction when the winding portion is energized.

The coil 60 includes the outer cylindrical surface 600 in contact with the outer peripheral surface of the winding portion 62, and the inner cylindrical surface 601 and the inner cylindrical surface 602 that are in contact with the inner peripheral surface of the winding portion 62. The diameter of the inner cylindrical surface 601 is different from that of the inner cylindrical surface 602. The inner cylindrical surfaces 601 and 602 are arranged in order of increasing diameter in a direction toward the pressurizing chamber 200.

During non-energization of at least the coil 60, the end surface 551 of the movable core 55 facing the fixed core 57 is located between the center Ci1 of the inner cylindrical surface 601 in the axial direction, which is an inner cylindrical surface having the smallest diameter, and the center Co1 of the outer cylindrical surface 600 in the axial direction. This configuration can increase the attractive force acting on the movable core 55 during energization of the coil 60. Accordingly, responsiveness of the movable core 55 improves. Moreover, with high responsiveness of the movable core 55, the current flowing through the coil 60 can be reduced without reducing the attractive force acting on the movable core 55. Accordingly, power consumption of the electromagnetic driving unit including the coil 60 can be reduced.

(B2) According to the present embodiment, the end surface 552 of the movable core 55 facing the pressurizing chamber 200 is located between the fixed core 57 and the end surface 621 of the winding portion 62 facing the pressurizing chamber 200. This configuration can reduce the axial length of the movable core 55, thereby reducing the weight of the movable core 55. Accordingly, improvement of responsiveness of the movable core 55, and reduction of NV are achievable.

(B3) According to the present embodiment, the coil 60 includes the connecting surface 605 connecting the inner cylindrical surface 601 and the inner cylindrical surface 602. The inner cylindrical surface 601, the inner cylindrical surface 602 and the connecting surface 605 are located on the outer peripheral wall of the spool 61. The connecting surface 605 is configured such that at least a part of the connecting surface 605, i.e., the vertical surface portion 692 becomes perpendicular to the axis of the spool 61. This configuration can reduce positional deviation of the wire 620 wound radially outside of the inner cylindrical surface 601. Accordingly, this configuration facilitates manufacturing of the coil 60.

(B4) According to the present embodiment, at least a part of the connecting surface 605, i.e., the tapering surface portion 691 tapers toward the axis of the spool 61 in the direction away from the pressurizing chamber 200. Accordingly, the tapering surface portion 691 of the connecting surface 605 can be brought into contact with the wire 620 for each of the layers located closest to the pressurizing chamber 200 in the axial direction of the spool 61. This configuration reduces positional deviation of the wire 620.

(B5) According to the present embodiment, the connecting portion of the connecting surface 605 connecting with the inner cylindrical surface 601 having the smallest diameter, i.e., the tapering surface portion 691, has a tapering shape. In a cross section taken along the virtual plane VP1 on which the axis of the spool 61 extends, the angle formed by the inner cylindrical surface 601 and the tapering surface portion 691 of the connecting surface 605 is 120 degrees. In this case, the tapering surface portion 691 of the connecting surface 605 can be brought into contact with the wire 620 for the first layer located closest to the pressurizing chamber 200 in the axial direction of the spool 61, and the wire 620 for the second layer located closest to the pressurizing chamber 200 in the axial direction of the spool 61. This configuration reduces positional deviation of the wire 620 particularly at the connecting portion between the inner cylindrical surface 601 and the connecting surface 605. This configuration therefore stabilizes the state of the wire 620 wound around the spool 61.

(B7) According to the present embodiment, the wire 620 are wound starting from the inner cylindrical surface 601 having the smallest diameter in the radial direction for N layers. In this case, N is an even number. The winding start position and winding end position of the wire 620 are therefore disposed at the axial end of the spool 61 facing away from the pressurizing chamber 200, for example. This configuration can fix the wire 620 along the spool 61. Accordingly, this configuration reduces an excessive tension applied to the wire 620, thereby reducing disconnection of the wire 620 caused by thermal fatigue even when the spool 61 is deformed by heat. Moreover, connection between the terminal 651 and the wire 620 is facilitated by setting N to an even number.

(B8) According to the present embodiment, the wire 620 is wound starting from the inner cylindrical surface 601 having the smallest diameter in the axial direction the same number of times for the first layer and the second layer. Accordingly, the wire 620 for the second layer can be disposed between the wire 620 disposed axially adjacent to each other for the first layer. Moreover, the connecting surface 605 and the wire 620 located closest to the pressurizing chamber 200 in the axial direction of the spool 61 in the wire 620 of the second layer can be brought into contact with each other. This configuration can reduce positional deviation of the wire 620 located closest to the pressurizing chamber 200 in the axial direction of the spool 61 in the wire 620 particularly in the third layer. This configuration therefore stabilizes the state of the wire 620 wound around the spool 61.

(B9) In the case of the wire 620 of the present embodiment, the wire 620 is wound in the axial direction the same number of times for each layer in the range TB1 between the inner cylindrical surface 601 having the smallest diameter and the inner cylindrical surface 602 having the largest diameter. Accordingly, the wire 620 in the (N+1)th layer can be disposed between the wire 620 disposed axially adjacent to each other in the Nth layer. Moreover, the connecting surface 605 and the wire 620 located closest to the pressurizing chamber 200 in the axial direction of the spool 61 in the wire 620 of the even-numbered layer can be brought into contact with each other. This configuration reduces positional deviation of the wire 620. This configuration therefore stabilizes the state of the wire 620 wound around the spool 61.

<C-1> The discharge joint 70, the discharge seat member 71, the intermediate member 81, the relief seat member 85, the discharge valve 75, the relief valve 91, the spring 79, and the spring 99 constituting the discharge passage portion 700 will be individually described next.

Figure 25:
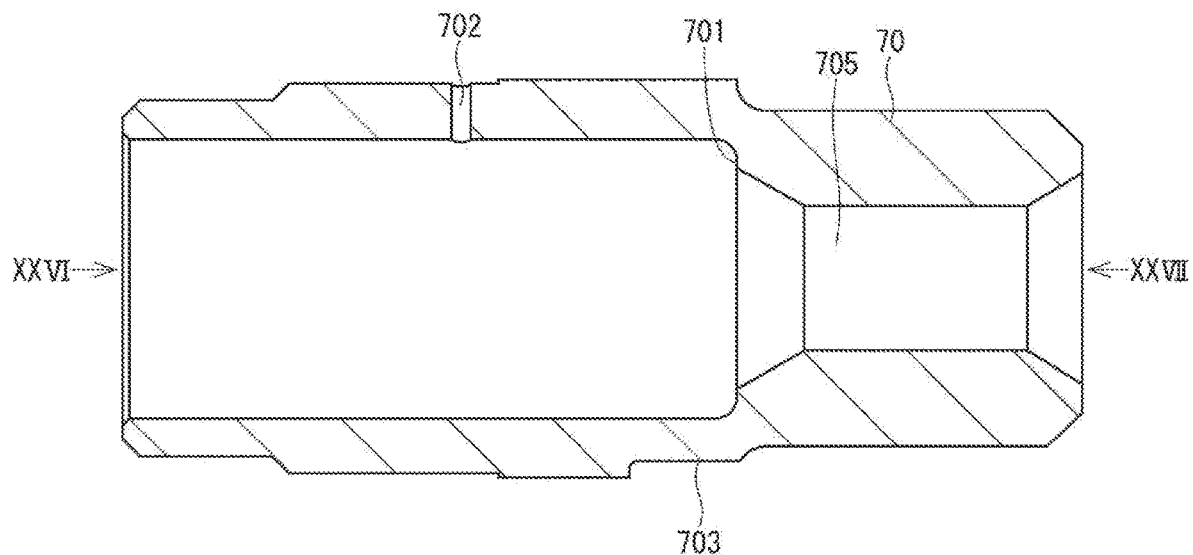
FIG. 25 is a cross-sectional view of a discharge joint of the high-pressure pump according to the first embodiment.
Figure 26:
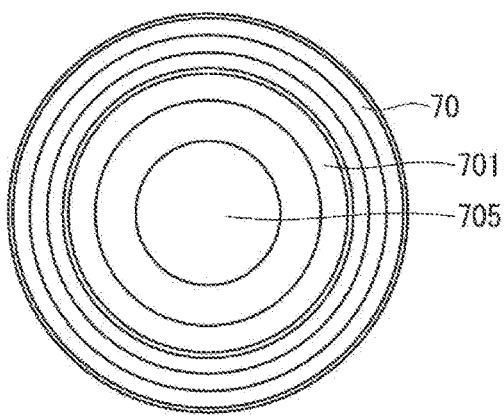
FIG. 26 is a view of FIG. 25 as viewed in a direction of an arrow XXVI.
Figure 27:
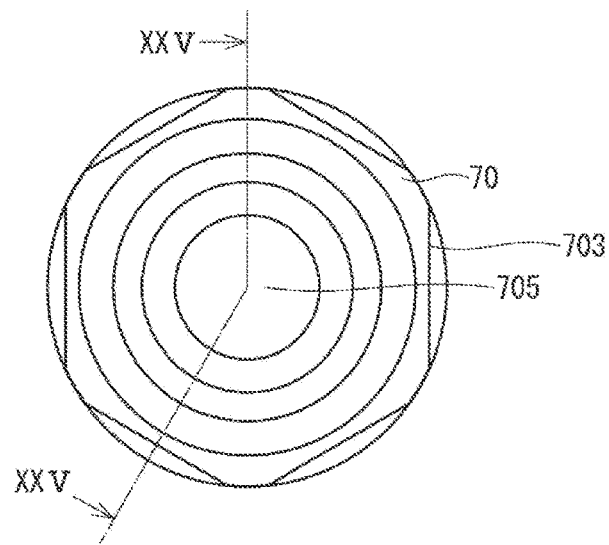
FIG. 27 is a view of FIG. 25 as viewed in a direction of an arrow XXVII.

As shown in FIGS. 25 to 27, the discharge joint 70 has a substantially cylindrical shape. The step surface 701 having a substantially annular shape is formed inside the discharge joint 70. The discharge joint 70 has a discharge passage 705 inside. The discharge joint 70 includes a lateral hole portion 702 that passes through the discharge joint 70 between an inner peripheral wall and an outer peripheral wall of the discharge joint 70. The one lateral hole portion 702 is formed in the circumferential direction of the discharge joint 70. The discharge joint 70 includes the polygonal columnar surface 703 having a substantially hexagonal columnar shape. The polygonal columnar surface 703 is located substantially at a position radially outside the step surface 701 in the axial direction of the outer peripheral wall of the discharge joint 70.

Figure 28:
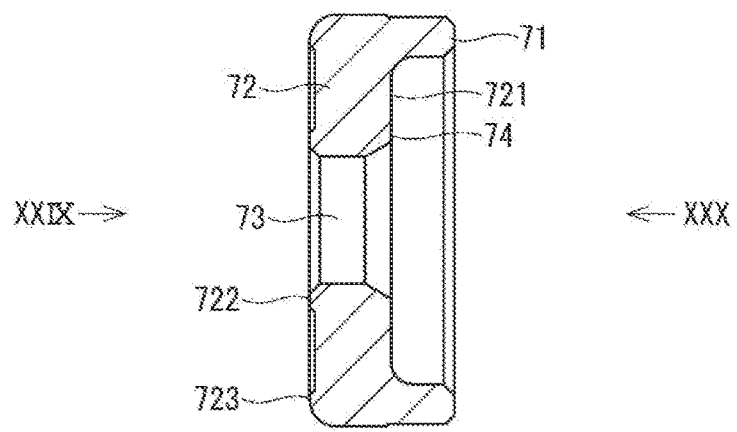
FIG. 28 is a cross-sectional view of a discharge seat member of the high-pressure pump according to the first embodiment.
Figure 29:
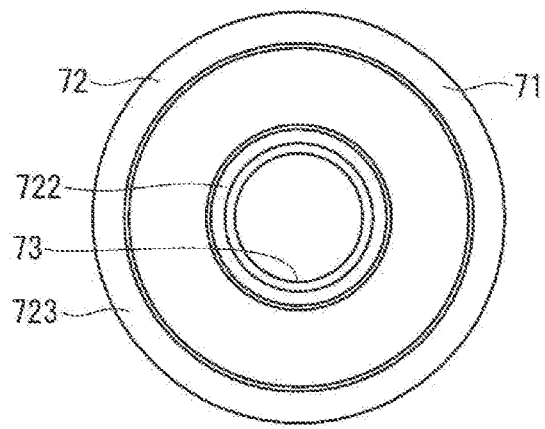
FIG. 29 is a view of FIG. 28 as viewed in a direction of an arrow XXIX.
Figure 30:
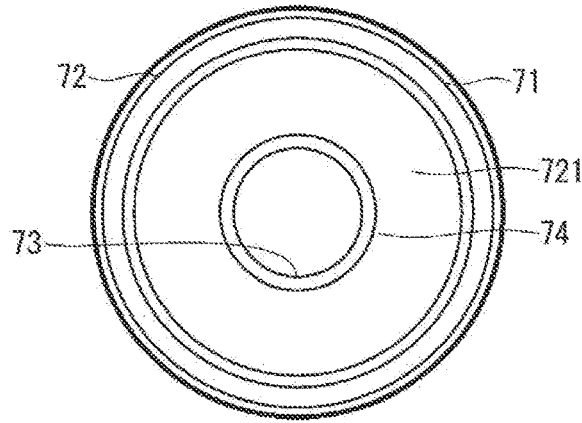
FIG. 30 is a view of FIG. 28 as viewed in a direction of an arrow XXX.

As shown in FIGS. 28 to 30, the discharge seat member 71 includes the discharge member body 72, the discharge hole 73, and the discharge valve seat 74. The discharge member body 72 has a substantially disk shape. An outer diameter of the discharge member body 72 is slightly larger than an inner diameter of one end of the discharge joint 70. The discharge member body 72 is provided inside the discharge joint 70 such that an outer peripheral wall of the discharge member body 72 is fitted to the inner peripheral wall at the one end of the discharge joint 70.

The discharge member body 72 includes a discharge recess 721, an inner projection 722, and an outer projection 723. The discharge recess 721 is recessed in a substantially cylindrical shape from the center of the one end surface of the discharge member body 72 toward the other end surface. The inner projection 722 projects in a substantially annular shape from the other end surface of the discharge member body 72. The outer projection 723 projects in a substantially annular shape from the other end surface of the discharge member body 72 on the radially outside of the inner projection 722.

The discharge hole 73 has a substantially cylindrical shape and passes through the discharge seat member 71 between the end surface of the discharge member body 72 and the bottom surface of the discharge recess 721. The discharge hole 73 is located on the radially inside of the inner projection 722. The discharge valve seat 74 has a substantially annular shape and is disposed on the bottom surface of the discharge recess 721 around the discharge hole 73. The discharge recess 721, the inner projection 722, the outer projection 723, the discharge hole 73, and the discharge valve seat 74 are substantially coaxial with the discharge member body 72.

Figure 31:
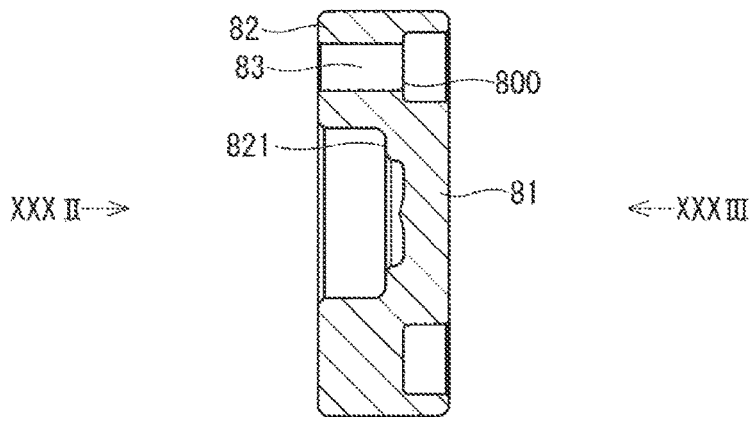
FIG. 31 is a cross-sectional view of an intermediate member of the high-pressure pump according to the first embodiment.
Figure 32:
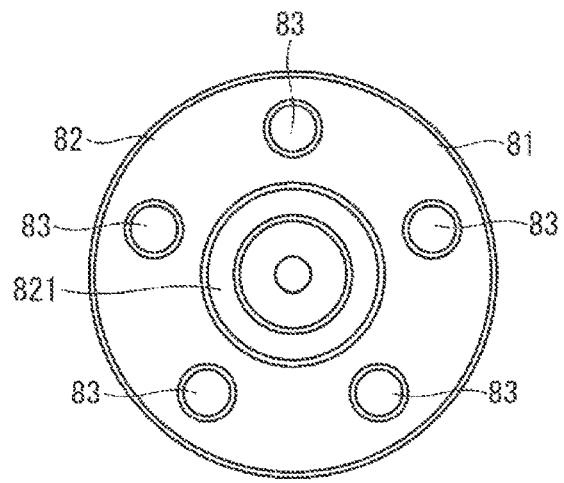
FIG. 32 is a view of FIG. 31 as viewed in a direction of an arrow XXXII.
Figure 33:
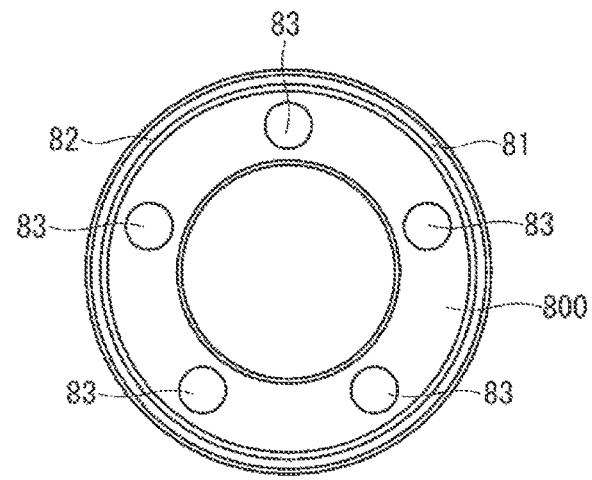
FIG. 33 is a view of FIG. 31 as viewed in a direction of an arrow XXXIII.

As shown in FIGS. 31 to 33, the intermediate member 81 includes the intermediate member body 82 and the first passages 83. The intermediate member body 82 has a substantially disk shape. The intermediate member body 82 is provided in contact with the discharge seat member 71 inside the one end of the discharge joint 70. An outer diameter of the intermediate member body 82 is slightly smaller than an inner diameter of the one end of the discharge joint 70.

An intermediate recess 821 is formed in the intermediate member body 82. The intermediate recess 821 is recessed in a substantially cylindrical shape from the center of the one end surface of the intermediate member body 82 toward the other end surface. The intermediate recess 821 is substantially coaxial with the intermediate member body 82.

The first passages 83 each have a substantially cylindrical shape and pass through the intermediate member body 82 between the one end surface and the other end surface of the intermediate member body 82. The first passages 83 are located on the radially outside of the intermediate recess 821. The five first passages 83 are formed at equal intervals in the circumferential direction of the intermediate member body 82.

According to the present embodiment, an annular recess 800 is formed in the intermediate member 81. The annular recess 800 has a substantially annular shape recessed from the other end surface toward the one end surface of the intermediate member body 82. The annular recess 800 is substantially coaxially with the intermediate member body 82. The annular recess 800 is connected to ends of all the first passages 83.

Figure 34:
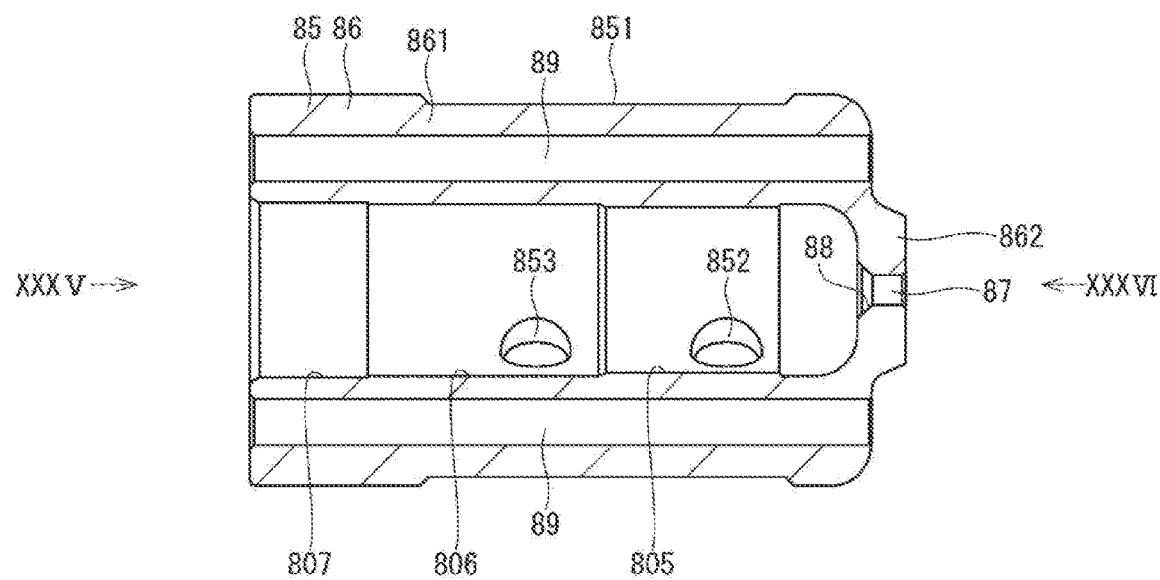
FIG. 34 is a cross-sectional view of a relief seat member of the high-pressure pump according to the first embodiment.
Figure 35:
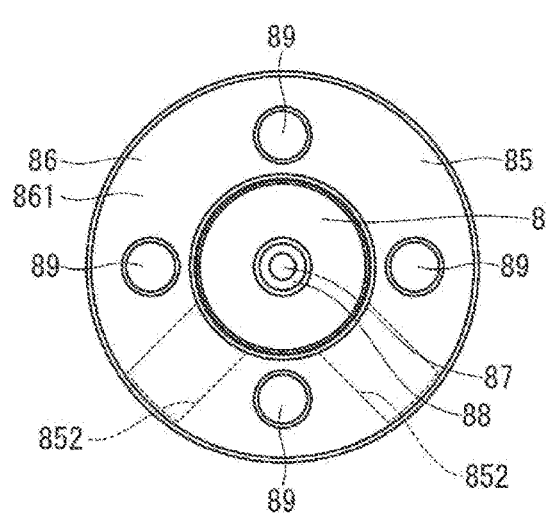
FIG. 35 is a view of FIG. 34 as viewed in a direction of an arrow XXXV.
Figure 36:
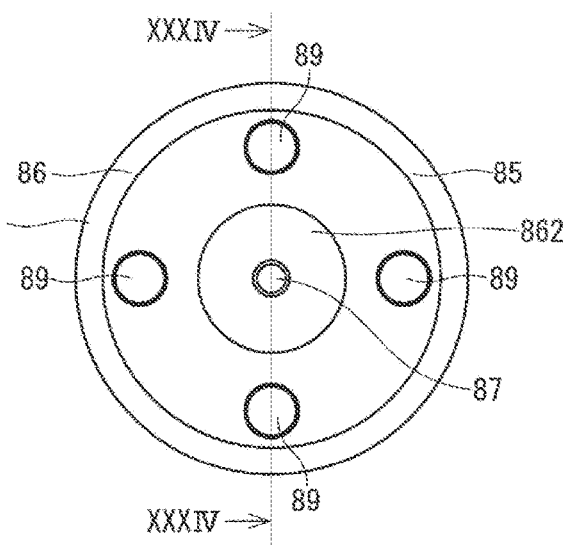
FIG. 36 is a view of FIG. 34 as viewed in a direction of an arrow XXXVI.

As shown in FIGS. 34 to 36, the relief seat member 85 includes the relief member body 86, the relief hole 87, the relief valve seat 88, the second passages 89, the relief outer peripheral recess 851, the relief lateral hole 852, and the lateral hole 853. The relief member body 86 has a relief member cylindrical portion 861 and a relief member bottom portion 862. The relief member cylindrical portion 861 has a substantially cylindrical shape. The relief member bottom portion 862 is formed integrally with the relief member cylindrical portion 861 in such a shape as to close one end of the relief member cylindrical portion 861.

The inner peripheral wall of the relief member cylindrical portion 861 is formed such that an inner diameter of a portion 806 located between the pressurizing chamber 200 and the sliding portion 805 sliding on the relief valve sliding portion 93 is larger than an inner diameter of the sliding portion 805. The inner peripheral wall of the relief member cylindrical portion 861 is formed such that an inner diameter of a portion 807 located between the pressurizing chamber 200 and the sliding portion 806 is larger than an inner diameter of the sliding portion 806 (see FIG. 34).

The relief member body 86 is provided inside the discharge joint 70 and located on a side of the intermediate member 81 opposite to the discharge seat member 71. An outer diameter of the relief member cylindrical portion 861 is substantially equivalent to an inner diameter of a portion located between the discharge seat member 71 and the step surface 701 of the discharge joint 70. The relief member body 86 is provided inside the discharge joint 70 such that the end surface of the relief member cylindrical portion 861 facing away from the relief member bottom portion 862 is in contact with an outer edge of the end surface of the intermediate member body 82, and that an outer edge of the end surface of the relief member cylindrical portion 861 facing the relief member bottom portion 862 is in contact with the step surface 701 of the discharge joint 70.

The relief hole 87 has a substantially cylindrical shape and passes through the relief member bottom portion 862 between one surface and the other surface at the center of the relief member bottom portion 862. The relief valve seat 88 is formed in an annular shape on one of the surfaces of the relief member bottom portion 862 around the relief hole 87. The relief valve seat 88 tapers toward the axis of the relief member cylindrical portion 861 in a direction from one side to the other side in the axial direction of the relief member cylindrical portion 861. The relief hole 87 and the relief valve seat 88 are substantially coaxial with the relief member body 86.

Each of the second passages 89 has a substantially cylindrical shape and passes through the relief member cylindrical portion 861 between one end surface and the other end surface at the center of the relief member cylindrical portion 861. The four second passages 89 are formed at equal intervals in the circumferential direction of the relief member cylindrical portion 861.

The relief outer peripheral recess 851 has a substantially cylindrical shape which is recessed radially inward from the outer peripheral wall of the relief member cylindrical portion 861. The relief lateral hole 852 has a substantially cylindrical shape and passes through the relief member cylindrical portion 861 between the relief outer peripheral recess 851 and an inner peripheral wall of the relief member cylindrical portion 861. The two relief lateral holes 852 are formed at intervals of 90 degrees in a circumferential direction of the relief member cylindrical portion 861 (see FIG. 35). By positioning the two relief lateral holes 852 at unequal intervals in the circumferential direction, a stable flow is achievable with the relief valve 91 offset to one side during operation of the open valve. If the two relief lateral holes 852 are disposed at equal intervals in the circumferential direction, the direction of the offset is not fixed by variations in negative pressure balance. In this case, behaviors of the relief valve 91 may become unstable.

The lateral hole 853 has a substantially cylindrical shape and passes through the relief member cylindrical portion 861 between the relief outer peripheral recess 851 and the inner peripheral wall of the relief member cylindrical portion 861. The lateral hole 853 is located on the side of the relief lateral hole opposite to the relief member bottom portion 862. The one lateral hole 853 is formed in the circumferential direction of the relief member cylindrical portion 861. An inner diameter of the horizontal hole 853 is equal to an inner diameter of the relief lateral hole 852.

The annular recess 800 connects the first passages 83 of the intermediate member 81 and the second passages 89 of the relief seat member 85 in a state in which the relief member body 86 is provided on the side of the intermediate member 81 opposite to the discharge seat member 71 inside the discharge joint 70. According to the present embodiment, the axial length of the relief member cylindrical portion 861 in which the second passages 89 are formed is larger than the axial length of the intermediate member body 82 in which the first passages 83 are formed.

Figure 37:
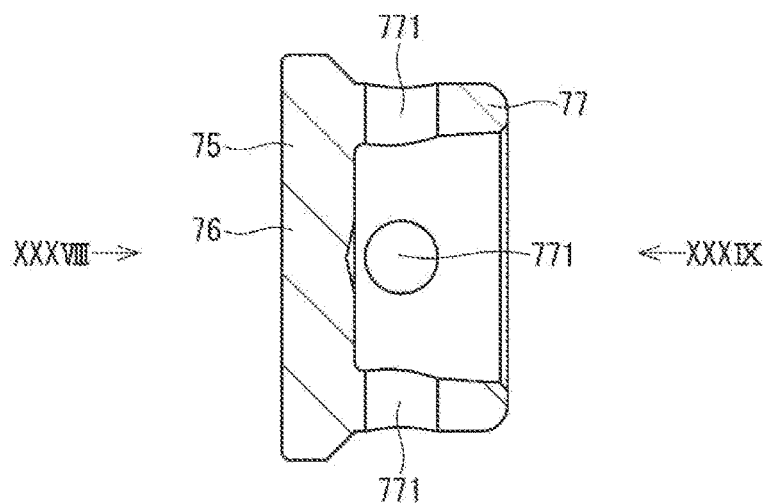
FIG. 37 is a cross-sectional view of a discharge valve of the high-pressure pump according to the first embodiment.
Figure 38:
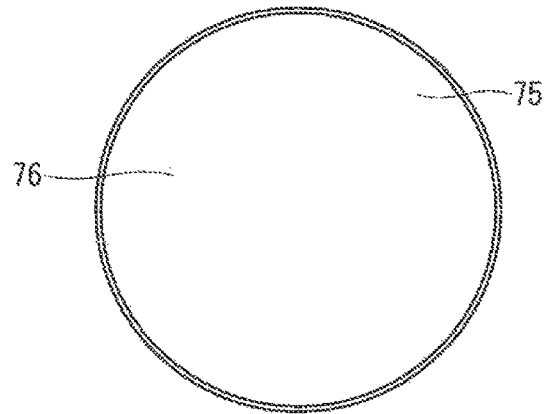
FIG. 38 is a view of FIG. 37 as viewed in a direction of an arrow XXXVIII.
Figure 39:
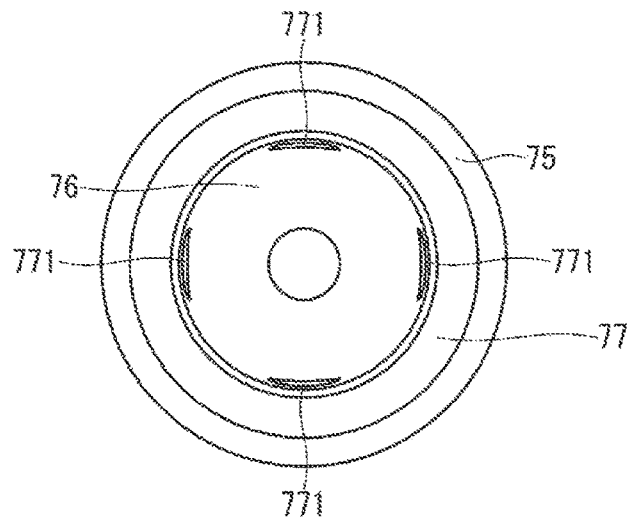
FIG. 39 is a view of FIG. 37 as viewed in a direction of an arrow XXXIX.

As shown in FIGS. 37 to 39, the discharge valve 75 has the discharge valve contact portion 76 and the discharge valve sliding portion 77. The discharge valve contact portion 76 has a substantially disk shape. An outer diameter of the discharge valve contact portion 76 is smaller than an inner diameter of the discharge recess 721 of the discharge seat member 71, and larger than an inner diameter of the intermediate recess 821 of the intermediate member 81. The discharge valve contact portion 76 is provided inside the discharge recess 721 such that the outer edge of one surface of the discharge valve contact portion 76 can contact the discharge valve seat 74 or be separated from the discharge valve seat 74.

The discharge valve sliding portion 77 is formed integrally with the discharge valve contact portion 76 in such a shape as to protrude from the other surface of the discharge valve contact portion 76 in a substantially cylindrical shape. The discharge valve sliding portion 77 is substantially coaxial with the discharge valve contact portion 76. An outer diameter of the discharge valve sliding portion 77 is slightly smaller than an inner diameter of the intermediate recess 821. The discharge valve 75 is provided such that the outer peripheral wall of the discharge valve sliding portion 77 can reciprocate in the axial direction while sliding along the inner peripheral wall of the intermediate recess 821.

Holes 771 are formed in the discharge valve sliding portion 77. The holes 771 each have a substantially cylindrical shape and pass through the discharge valve sliding portion 77 between the inner peripheral wall and the outer peripheral wall of the discharge valve sliding portion 77. The four holes 771 are formed at equal intervals in the circumferential direction of the discharge valve sliding portion 77. The holes 771 is fluidly connected to a space inside the discharge valve sliding portion 77 and a space outside the discharge valve sliding portion 77.

According to the present embodiment, the inner peripheral wall of the discharge valve sliding portion 77 is tapered such that the inner diameter increases in a direction away from the discharge valve contact portion 76 and from the discharge valve contact portion 76 (see FIG. 37). This configuration reduces a contact between the outer peripheral portion of the spring 79 and the inner peripheral wall of the discharge valve sliding portion 77. In addition, this configuration does not have a step on the inner peripheral wall of the discharge valve sliding portion 77, and therefore simplifies deburring. According to the present embodiment, the end surface of the discharge valve contact portion 76 and the holes 771 are separated from each other from a viewpoint of workability.

Figure 40:
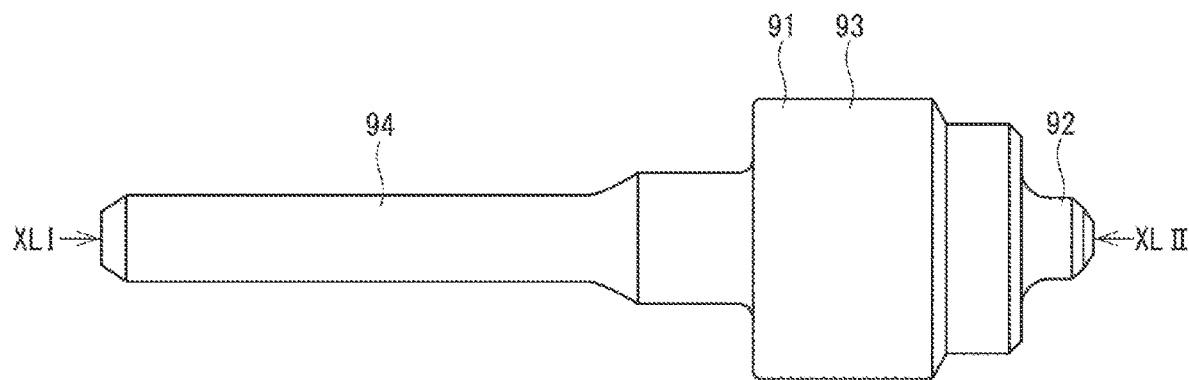
FIG. 40 is a view of a relief valve of the high-pressure pump according to the first embodiment.
Figure 41:
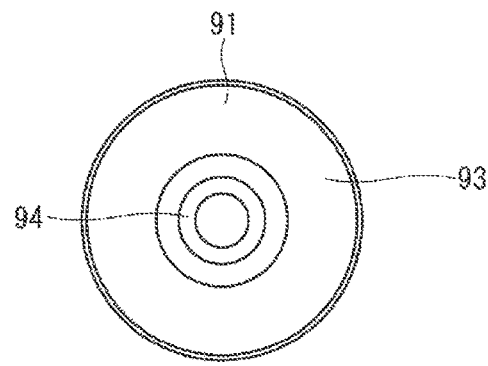
FIG. 41 is a view of FIG. 40 as viewed in a direction of an arrow XLI.
Figure 42:
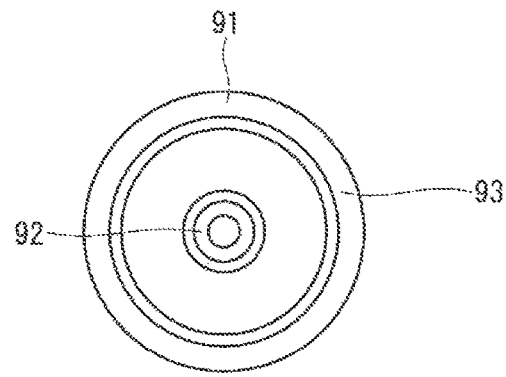
FIG. 42 is a view of FIG. 40 as viewed in a direction of an arrow XLII.

As shown in FIGS. 40 to 42, the relief valve 91 includes the relief valve contact portion 92, the relief valve sliding portion 93, and the relief valve protruding portion 94. The relief valve contact portion 92 has a substantially cylindrical shape. The relief valve contact portion 92 has a tapered shape formed such that an outer peripheral wall of one end of the relief valve contact portion 92 tapers toward the axis to the one side from the other side. The relief valve contact portion 92 is provided inside the relief member cylindrical portion 861 such that the one end of the relief valve contact portion 92 can contact the relief valve seat 88 or be separated from the relief valve seat 88.

The relief valve sliding portion 93 has a substantially cylindrical shape. The relief valve sliding portion 93 is formed integrally with the relief valve contact portion 92 such that one end of the relief valve sliding portion 93 is connected to the other end of the relief valve contact portion 92. The relief valve sliding portion 93 is substantially coaxial with the relief valve contact portion 92. An outer diameter of the relief valve sliding portion 93 is slightly smaller than an inner diameter of the relief member cylindrical portion 861. The outer peripheral wall of the relief valve sliding portion 93 is slidable on the inner peripheral wall of the relief member cylindrical portion 861 in a state where the relief valve sliding portion 93 is provided inside the relief member cylindrical portion 861.

The relief valve sliding portion 93 has a tapered shape such that an outer peripheral wall of the end of the relief valve sliding portion 93 facing the relief valve contact portion 92 tapers toward the axis in a direction toward the relief valve contact portion 92 away from the relief valve contact portion 92. When the relief valve contact portion 92 is in contact with the relief valve seat 88, the relief lateral hole 852 of the relief seat member 85 is closed by the outer peripheral wall of the relief valve sliding portion 93 (see FIG. 6).

The relief valve protruding portion 94 has a substantially cylindrical shape. The relief valve protruding portion 94 is formed integrally with the relief valve sliding portion 93 such that one end of the relief valve protruding portion 94 is connected to the center of the end surface of the relief valve sliding portion 93 opposite to the relief valve contact portion 92. The relief valve protruding portion 94 is substantially coaxial with the relief valve sliding portion 93. An outer diameter of the relief valve protruding portion 94 is smaller than an outer diameter of the relief valve sliding portion 93. When the relief valve contact portion 92 is in contact with the relief valve seat 88, the end surface of the relief valve protruding portion 94 opposite to the relief valve sliding portion 93 is located between the relief member bottom portion 862 and the end surface of the relief member cylindrical portion 861 facing away from the relief member bottom portion 862 (see FIG. 6).

As shown in FIG. 6, the stopping member 95 has a substantially disk shape. An outer diameter of the stopping member 95 is slightly larger than an inner diameter of the portion 807 of the inner peripheral wall of the relief member cylindrical portion 861. The stopping member 95 is press-fitted inside the relief member cylindrical portion 861 such that the outer peripheral wall of the stopping member 95 is fitted to the portion 807 on the inner peripheral wall of the relief member cylindrical portion 861. In other words, the stopping member 95 is substantially coaxial with the relief member cylindrical portion 861. The stopping member 95 is positioned in the vicinity of the end of the relief member cylindrical portion 861 on the side opposite to the relief member bottom portion 862 in the axial direction of the relief member cylindrical portion 861.

An inner diameter of the stopping member 95 is larger than an outer diameter of the relief valve protruding portion 94. When the relief valve contact portion 92 is in contact with the relief valve seat 88, the end surface of the relief valve protruding portion 94 facing away from the relief valve sliding portion 93 is located inside the stopping member 95. The clearance Sq1 having a substantially cylindrical shape is herein formed between the inner peripheral wall of the stopping member 95 and the outer peripheral wall of the relief valve protruding portion 94. Accordingly, the inner peripheral wall of the stopping member 95 and the outer peripheral wall of the relief valve protruding portion 94 do not slide on each other.

Figure 43:
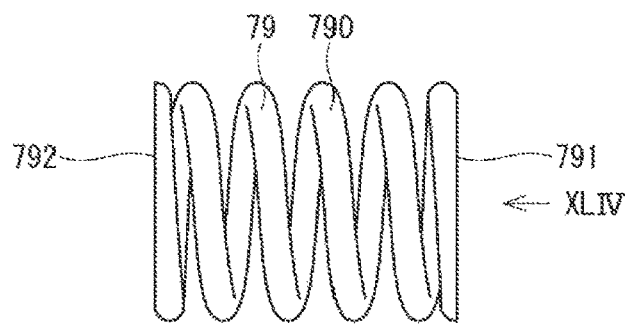
FIG. 43 is a view of a spring that biases the discharge valve of the high-pressure pump according to the first embodiment.
Figure 44:
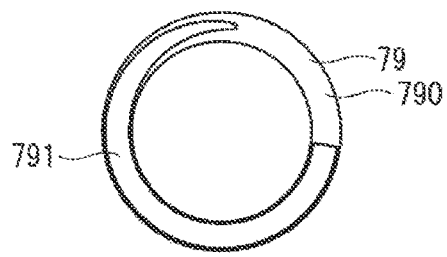
FIG. 44 is a view of FIG. 43 as viewed in a direction of an arrow XLIV.

As shown in FIGS. 43 and 44, the spring 79 is formed into a coil shape by winding a wire member 790 made of metal. The spring 79 includes a spring end surface 791 and a spring end surface 792. The spring end surface 791 having a flat shape is formed at one axial end of the spring 79. The spring end surface 792 having a flat shape is formed at the other axial end of the spring 79.

The spring 79 is provided inside the discharge valve sliding portion 77 such that the spring end surface 791 comes into contact with the bottom surface of the intermediate recess 821 of the intermediate member 81, and that the spring end surface 792 comes into contact with the discharge valve sliding portion 77 side end surface of the discharge valve contact portion 76 of the discharge valve 75. In this state, the spring 79 can bias the discharge valve 75 to the side opposite to the intermediate member 81. A wire diameter of the wire member 790 is smaller than an inner diameter of the lateral hole 853 of the relief seat member 85.

Figure 45:
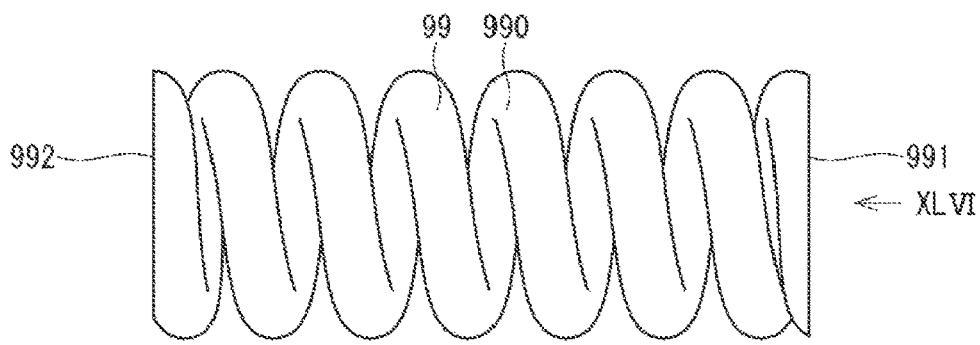
FIG. 45 is a view of a spring that biases a relief valve of the high-pressure pump according to the first embodiment.
Figure 46:
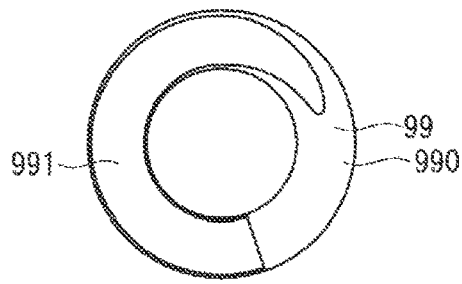
FIG. 46 is a view of FIG. 45 as viewed in a direction of an arrow XLVI.

As shown in FIGS. 45 and 46, the spring 99 is formed into a coil shape by winding a wire member 990 made of metal. A wire diameter of the wire member 990 herein is larger than a wire diameter of the wire member 790. The spring 99 includes a spring end surface 991 and a spring end surface 992. The spring end surface 991 having a flat shape is formed at one axial end of the spring 99. The spring end surface 992 having a flat shape is formed at the other axial end of the spring 99.

The spring 99 is provided inside the relief member cylindrical portion 861 such that the spring end surface 991 comes into contact with the end surface of the relief valve sliding portion 93 facing the relief valve protruding portion 94, and that the spring end surface 992 comes into contact with the end surface of the stopping member 95 facing the relief member bottom portion 862. In this state, the spring 99 can bias the relief valve 91 toward the relief member bottom portion 862. The biasing force of the spring 99 can be controlled by controlling the axial position of the stopping member 95 with respect to the portion 807 of the inner peripheral wall of the relief member cylindrical portion 861.

According to the present embodiment, as described above, the intermediate member 81 includes five, i.e., an odd number of the first passages 83 formed at equal intervals in the circumferential direction. The relief seat member 85 includes four, i.e., an even number of the second passages 89 formed at equal intervals in the circumferential direction. The number of the first passages 83 and the number of the second passages 89 are relatively prime. This configuration can reduce variations in an overlapping area of the first passages 83 and the second passages 89 as viewed in the axial direction of the intermediate member 81 in any relative rotations of the intermediate member 81 and the relief seat member 85 around the axis. This configuration therefore reduces variations in the fuel flow in accordance with a relative positional relationship between the intermediate member 81 and the relief seat member 85 in the rotation direction. Accordingly, reduction of variations in the discharge amount for each product is achievable.

According the present embodiment, the discharge valve 75 includes the discharge valve contact portion 76 capable of contacting the discharge valve seat 74, and the discharge valve sliding portion 77 formed between the intermediate member 81 and the discharge valve contact portion 76 and slidable on the intermediate member 81. An outer diameter of the discharge valve sliding portion 77 is smaller than an outer diameter of the discharge valve contact portion 76.

In the opened state of the discharge valve 75, the fuel in the discharge recess 721 flows toward the discharge hole 73 when the volume of the pressurizing chamber 200 increases by a shift of the plunger 11 away from the pressurizing chamber 200. The fuel flow in this state collides with the outer edge of the discharge valve sliding portion 77 side surface of the discharge valve contact portion 76. Accordingly, the discharge valve 75 can be rapidly closed.

According to the present embodiment, the discharge seat member 71 includes the inner projection 722, the outer projection 723. The inner projection 722 projects annularly from the surface of the discharge member body 72 facing the pressurizing chamber 200 toward the pressurizing chamber 200, and contacts the bottom surface of the discharge hole portion 214 of the upper housing 21 constituting the discharge passage forming portion. The discharge member 71 is located on the radially outside the discharge hole 73. The outer projection 723 projects annularly from the surface of the discharge member body 72 facing the pressurizing chamber 200 toward the pressurizing chamber 200 and contacts the bottom surface of the discharge hole portion 214 of the upper housing 21. The outer projection 723 is located on the radially outside the inner projection 722.

If the inner projection 722 is not formed but only the outer projection 723 is formed, a clearance is formed between the end surface of the discharge member body 72 facing the inner edge of the pressurizing chamber 200 and the bottom surface of the discharge hole portion 214. In this case, the inner edge of the discharge member body 72 is inclined to deform toward the pressurizing chamber 200 at the time of contact between the discharge valve 75 and the discharge valve seat 74. As a result, a slip may be produced between the discharge seat member 71 and the discharge valve 75, and cause abrasion.

According to the present embodiment, however, the inner projection 722 is formed radially inside the outer projection 723. In this case, inclination of the inner edge of the discharge member body 72 with deformation toward the pressurizing chamber 200 can be reduced at the time of contact between the discharge valve 75 and the discharge valve seat 74. Accordingly, abrasion between the discharge seat member 71 and the discharge valve 75 can be reduced.

Deformation of the discharge seat member 71 can be reduced by providing the inner projection 722 at a position axially overlapping with a seal portion produced by the discharge valve 75 (see FIG. 6).

The end of the discharge member body 72 facing the pressurizing chamber 200 is not brought into contact with the bottom surface of the discharge hole portion 214, but the inner projection 722 and the outer projection 723 are in contact with the bottom surface of the discharge hole portion 214. This configuration secures a sufficient surface pressure of the discharge seat member 71 for the bottom surface of the discharge hole portion 214.

According to the present embodiment, the discharge seat member 71, the intermediate member 81, and the relief seat member 85 have the same hardness. The hardness of the intermediate member 81 herein may be lower than the hardness of the discharge seat member 71 and the relief seat member 85. In this case, sealing ability improves.

According to the present embodiment, the relief valve 91 includes the relief valve contact portion 92 capable of contacting the relief valve seat 88, and the relief valve sliding portion 93 formed on the side of the relief valve contact portion 92 facing intermediate member 81 and slidable on the relief member body 86. The center of gravity of the relief valve 91 is set at the relief valve sliding portion 93. In this case, the relief valve 91 is not easily tilted during grinding of the sliding portion of the relief valve sliding portion 93 sliding on the relief member body 86. Accordingly, grinding is easy performed. In addition, a force is applied to a portion containing the center of gravity when the center of gravity is set at the relief valve sliding portion 93 which is a portion sliding on the relief member body 86. Accordingly, movement of the relief valve 91 is stabilized.

According to the present embodiment, the relief member body 86 has a cylindrical shape. The relief seat member 85 includes the lateral hole 853 that passes through the relief member body 86 between the inner peripheral wall and the outer peripheral wall of the relief member body 86. The present embodiment further includes the spring 99 constituting a relief valve biasing member. The spring 99 is formed into a coil shape by winding the wire member 990, is provided inside the relief member body 86, and biases the relief valve 91 toward the relief valve seat 88. A wire diameter of the wire member 990 is smaller than an inner diameter of the lateral hole 853. Accordingly, closure of the lateral hole 853 by the wire member 990 of the spring 99 is avoidable.

According to the present embodiment, the relief member body 86 has a cylindrical shape. The relief valve 91 includes the relief valve contact portion 92 capable of contacting the relief valve seat 88, the relief valve sliding portion 93 formed on the side of the relief valve contact portion 92 facing intermediate member 81 and slidable on the inner peripheral wall of the relief member body 86, and the relief valve protruding portion 94 which protrudes from the relief valve sliding portion 93 toward the intermediate member 81. According to the present embodiment, the spring 99 and the stopping member 95 constituting a relief valve biasing member are further provided. The spring 99 is provided inside the relief member body 86, and biases the relief valve 91 toward the relief valve seat 88. The stopping member 95 has a cylindrical shape, and is provided inside the relief member body 86 such that a part of the relief valve protruding portion 94 is located inside to stop an end of the spring 99. The clearance $Sq1$ having a cylindrical shape is formed between the outer peripheral wall of the relief valve protruding portion 94 and the inner peripheral wall of the stopping member 95. Accordingly, when the relief valve 91 opens and moves toward the pressurizing chamber 200, the fuel between the stopping member 95 and the relief valve sliding portion 93 is allowed to flow toward the pressurizing chamber 200 via the clearance $Sq1$. In this case, a damper action is applied to the fuel in the space between the stopping member 95 and the relief valve sliding portion 93, and reduces resistance to movement of the relief valve 91 in the opening direction.

According to the present embodiment, the intermediate member 81 in the state of contact with the relief valve 91 is capable of regulating movement of the relief valve 91 toward the pressurizing chamber 200. According to the present embodiment, the pressure in the pressurizing chamber 200 side space of the discharge passage 705 with respect to the intermediate member 81 is higher than the pressure in the relief seat member 85 side space of the discharge passage 705 with respect to the intermediate member 81 when fuel is discharged from the pressurizing chamber 200. In this case, a pressure is applied to the intermediate member 81 in the direction from the pressurizing chamber 200 toward the relief seat member 85. As a result, a stress of the contact surface of the intermediate member 81 contacting the relief valve 91 increases. Accordingly, even when the relief valve 91 comes into contact with the intermediate member 81, movement of the intermediate member 81 toward the pressurizing chamber 200 can be reduced.

As described above, (C1) the high-pressure pump 10 of the present embodiment includes the cylinder 23 constituting the pressurizing chamber forming portion, and the upper housing 21, the discharge seat member 71, the intermediate member 81, the relief seat member 85, the discharge valve 75, and the relief valve 91 constituting the discharge passage forming portion.

The cylinder 23 forms the pressurizing chamber 200 in which fuel is pressurized. The upper housing 21 defines the discharge passage 217 through which the fuel discharged from the pressurizing chamber 200 flows. The discharge seat member 71 includes the discharge member body 72 disposed in the discharge passage 217, the discharge hole 73 that passes through the discharge seat member 71 between the surface of the discharge member body 72 facing the pressurizing chamber 200 and the surface of the discharge member body 72 facing away from the pressurizing chamber 200, and the discharge valve seat 74 disposed on the surface of the discharge member body 72 facing away from the pressurizing chamber 200 around the discharge hole 73.

The intermediate member 81 includes the intermediate member body 82 disposed on the side of the discharge seat member 71 opposite to the pressurizing chamber 200, and the first passages 83 that passes through the intermediate member body 82 between the surface of the intermediate member body facing the pressurizing chamber 200 and the surface of the intermediate member body 82 facing away from the pressurizing chamber 200. The relief seat member 85 includes the relief member body 86 disposed on the side of the intermediate member 81 opposite to the pressurizing chamber 200, the relief hole 87 that passes through the relief member body 86 between the surface of the relief member body 86 facing the pressurizing chamber 200 and the surface of the relief member body 86 facing away from the pressurizing chamber 200, the relief valve seat 88 formed on the surface of the relief member body 86 facing the pressurizing chamber 200 around the relief hole 87, and the second passages 89 that passes through the relief member body 86 between the surface of the relief member body 86 facing the pressurizing chamber 200 and the surface of the relief member body 86 facing away from the pressurizing chamber 200.

The discharge valve 75 is disposed between the intermediate member 81 and the discharge seat member 71, and capable of allowing the fuel to flow in the discharge hole 73 by being separated from the discharge valve seat 74 for opening the discharge hole 73 and of restricting the fuel to flow in the discharge hole 73 by contacting the discharge valve seat 74 for closing the discharge hole 73. The relief valve 91 is disposed between on the intermediate member 81 and the relief seat member 85, and capable of allowing the fuel to flow in the relief hole 87 by being separated from the relief valve seat 88 for opening the relief hole 87 and of restricting the fuel to flow in the relief hole 87 by contacting the relief valve seat 88.

At least either the intermediate member 81 or the relief seat member 85 includes the annular recess 800 which has an annular shape in opposing surfaces of the intermediate member body 82 and the relief member body 86, and fluidly connects the first passages 83 and the second passages 89. In this case, the first passages 83 and the second passages 89 are in communication with each other via the annular recess 800 in any relative rotations of the intermediate member 81 and the relief seat member 85 around the axis. Accordingly, a flow path for fuel discharged from the pressurizing chamber 200 toward the engine 1 can be secured regardless of the relative positions of the intermediate member 81 and the relief seat member 85.

According to the present embodiment, the discharge valve 75 is disposed in the vicinity of the pressurizing chamber 200, while the relief valve 91 is disposed on the side of the discharge valve 75 opposite to the pressurizing chamber 200. This configuration can reduce a dead volume which is in communication with the pressurizing chamber 200 and becomes a high-pressure space during pressurization. Accordingly, discharge of high-pressure fuel from the high-pressure pump 10 is achievable.

According to the present embodiment, the discharge valve 75 and the relief valve 91 can be coaxially disposed, and provided integrally in a predetermined range. Accordingly, this configuration can miniaturize the discharge passage portion 700 which is a part including the discharge valve 75 and the relief valve 91, and therefore can reduce the size of the high-pressure pump 10.

(C2) According to the present embodiment, the first passages 83 are formed in the intermediate member body 82 in the circumferential direction. The second passages 89 are formed in the relief member body 86 in the circumferential direction. Accordingly, a sufficient flow rate of fuel discharged from the pressurizing chamber 200 toward the engine 1 can be ensured.

When the first passages 83 and the second passages 89 are formed, an overlapping area of the first passages 83 and the second passages 89 may become extremely small as viewed in the axial direction of the intermediate member 81 depending on the relative positions of the intermediate member 81 and the relief seat member 85. According to the present embodiment, however, the annular recess 800 connecting the first passages 83 and the second passages 89 is formed in the intermediate member 81. Accordingly, a sufficient flow rate of fuel discharged from the pressurizing chamber 200 toward the engine 1 can be secured regardless of the relative positions of the intermediate member 81 and the relief seat member 85.

(C3) According to the present embodiment, the number of first passages 83 is different from the number of second passages 89. Accordingly, a deviation angle between the center of each of the first passages 83 and the center of each of the second passages 89 can be reduced.

(C4) According to the present embodiment, the number of the first passages 83 is larger than the number of the second passages 89. The annular recess 800 is formed in the intermediate member body 82. More specifically, the annular recess 800 is formed in the intermediate member 81 which is the member having the larger number of flow paths in the intermediate member 81 and the relief seat member 85.

In general, a tip of a tooth tool which forms a recess by cutting a part has a rounded corner. Accordingly, when a recess is formed in a part by cutting with a tooth tool, a corner of the recess in the part has a round shape. When the first passages 83 intersect a round corner of the annular recess 800, sharp corners are formed at the intersecting portions. In this case, a stress concentrates on these corners. Accordingly, for securing strength, the flow path area of the first passages 83 needs to be reduced to prevent intersection of the first passages 83 and the round corners of the annular recess 800. According to the present embodiment, the number of the first passages 83 is larger than the number of the second passages 89 to secure a sufficient flow rate of fuel flowing in the first passages 83 even with reduction of the flow path area of the first passages 83.

(C5) According to the present embodiment, the number of the first passages 83 and the number of the second passages 89 are relatively prime. This configuration can reduce variations in an overlapping area of the first passages 83 and the second passages 89 as viewed in the axial direction of the intermediate member 81 in any relative rotations of the intermediate member 81 and the relief seat member 85 around the axis. This configuration therefore reduces variations in the fuel flow in accordance with a relative positional relationship between the intermediate member 81 and the relief seat member 85 in the rotation direction. Accordingly, reduction of variations in the discharge amount for each product is achievable.

(C6) According to the present embodiment, the number of the first passages 83 is larger than the number of the second passages 89. The length of each of the first passages 83 is smaller than the length of each of the second passages 89. The number of the first passages 83 is larger than the number of the second passages 89. Accordingly, a sufficient flow rate can be secured even when the flow path area per the one first passage 83 is reduced. For example, when the flow path area of each of the first passages 83 is reduced, the diameter of the holes forming the first passages 83 decreases. In this case, processing may become difficult. According to the present embodiment, however, the length of each of the first passages 83 is smaller than the length of each of the second passages 89. Accordingly, processing of the first passage 83 can be easily achieved even when the flow path area of each of the first passages 83 is reduced.

(C7) According to the present embodiment, the discharge joint 70 is further disposed. The discharge joint 70 has a cylindrical shape, and houses the discharge seat member 71, the intermediate member 81, the relief seat member 85, the discharge valve 75, and the relief valve 91 inside. In addition, the outer peripheral wall of the discharge joint 70 is coupled to the upper housing 21. In this case, the discharge joint 70, the discharge seat member 71, the intermediate member 81, the relief seat member 85, the discharge valve 75, and the relief valve 91 can be assembled into one body in advance to constitute a subassembly. Accordingly, the entire high-pressure pump 10 can be easily assembled, wherefore manufacture of the high-pressure pump 10 can be facilitated.

Second Embodiment

Figure 47:
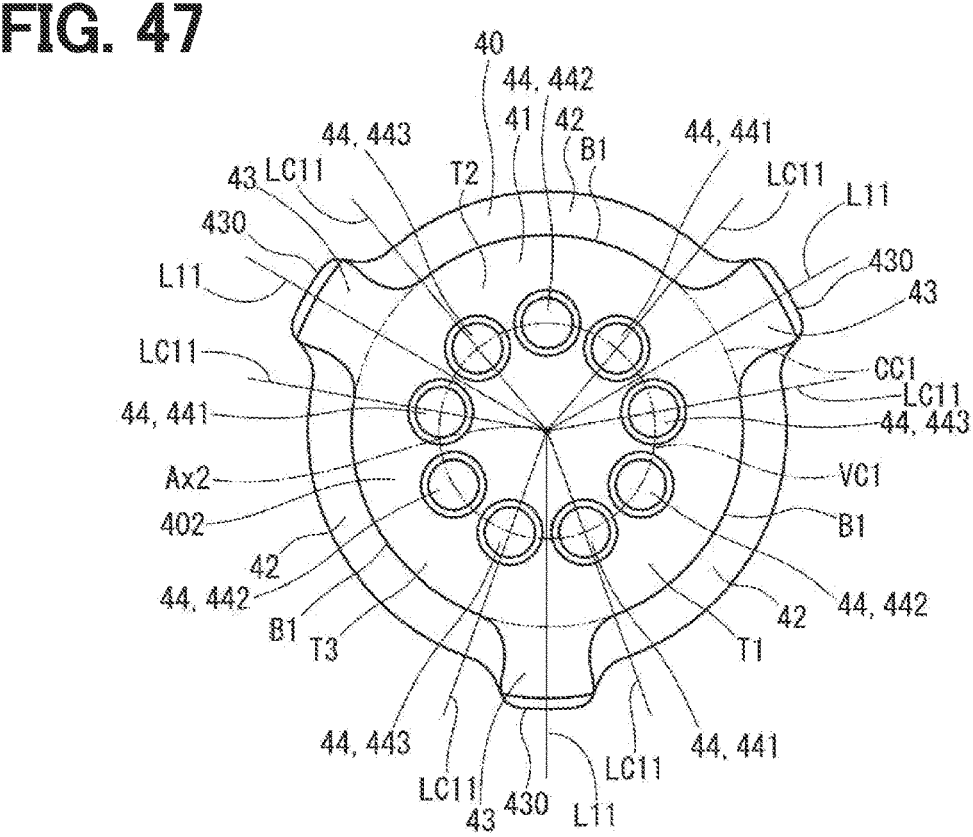
FIG. 47 is a schematic view of a valve member of a high-pressure pump according to a second embodiment as viewed from the pressurizing chamber.
Figure 48:
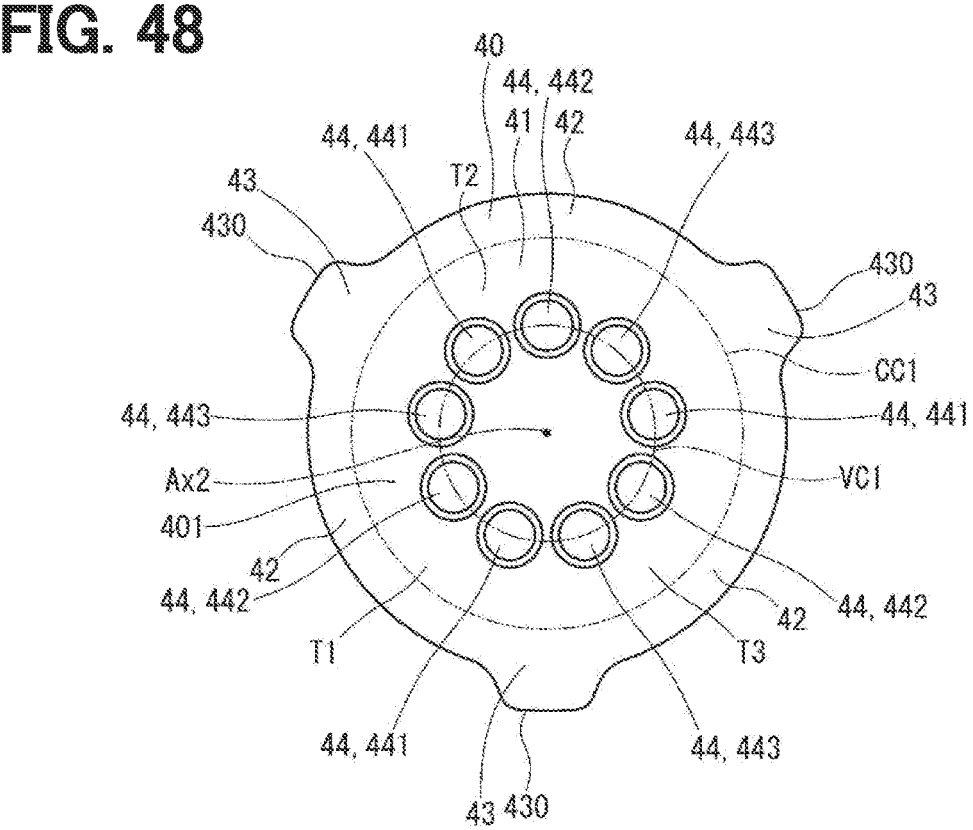
FIG. 48 is a schematic view of the valve member of the high-pressure pump according to the second embodiment as viewed from the seat member.

<A-2> FIGS. 47 and 48 show a part of a high-pressure pump according to a second embodiment. The second embodiment is different from the first embodiment in the configuration of the valve member 40.

According to the present embodiment, the boundary line B1 between the inner edge of the tapered portion 42 radially outside the first region T1 of the valve body 41 and the outer edge of the valve body 41 is formed in a range between the straight line LC11 extending from the center of the valve body 41 and passing through the center of the communication hole 441 of the first region T1, and the straight line LC11 extending from the center of the valve body 41 and passing through the center of the communication hole 443 in the first region T1.

The boundary line B1 between the inner edge of the tapered portion 42 radially outside the second region T2 of the valve body 41 and the outer edge of the valve body 41, and the boundary line B1 between the inner edge of the tapered portion 42 radially outside the third region T3 of the valve body 41 and the outer edge of the valve body 41 are formed similarly to the above boundary line B1.

Accordingly, (A4) in the present embodiment, In other words, the boundary line B1 between the inner edge of the one tapered portion 42 sandwiched between the two guide portions 43 and the outer edge of the valve body 41 is formed in a range between the two straight lines LC11 extending from the center of the valve body 41 and passing through the centers of the end communication holes (441, 443) which are the communication holes 44 at both ends of the communication holes 44 facing the inner edge of the tapered portion 42. In this case, the distance between both ends of each of the boundary lines B1 and the communication holes 44 can be reduced while securing the length of each of the boundary lines B1. Accordingly, portions in the vicinity of both ends of each of the boundary lines B1 do not produced resistance for a fuel flow.

Third Embodiment

Figure 49:
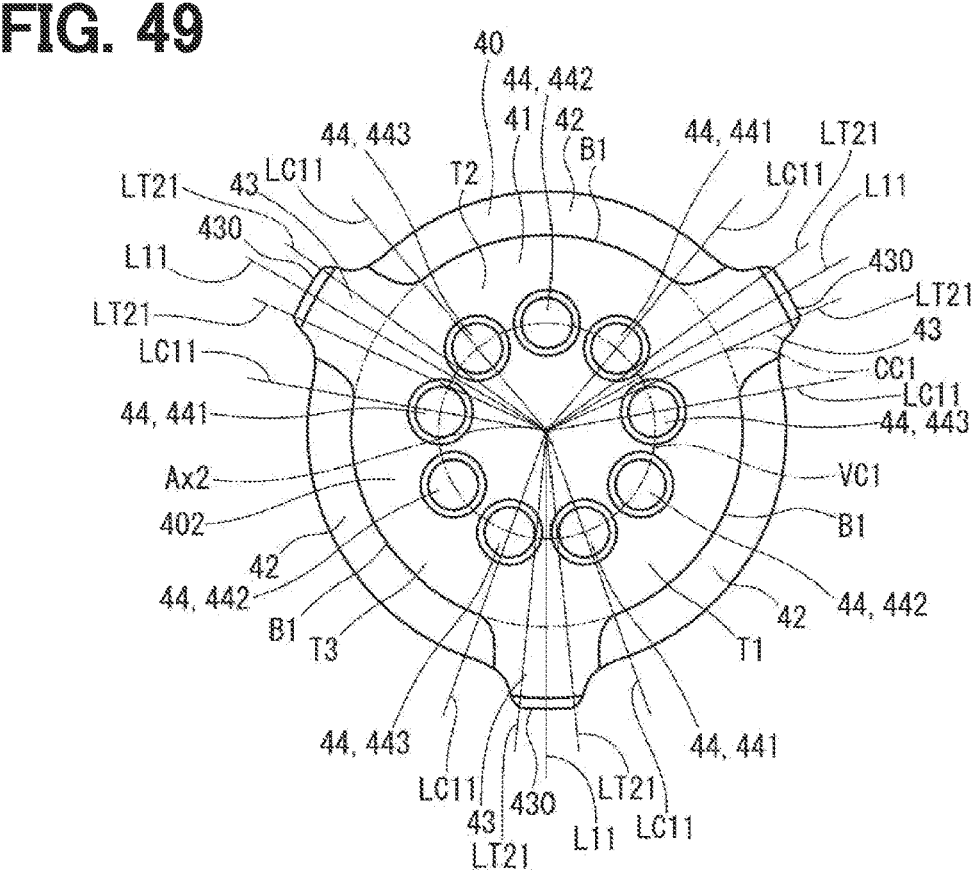
FIG. 49 is a schematic view of a valve member of a high-pressure pump according to a third embodiment as viewed from the pressurizing chamber.
Figure 50:
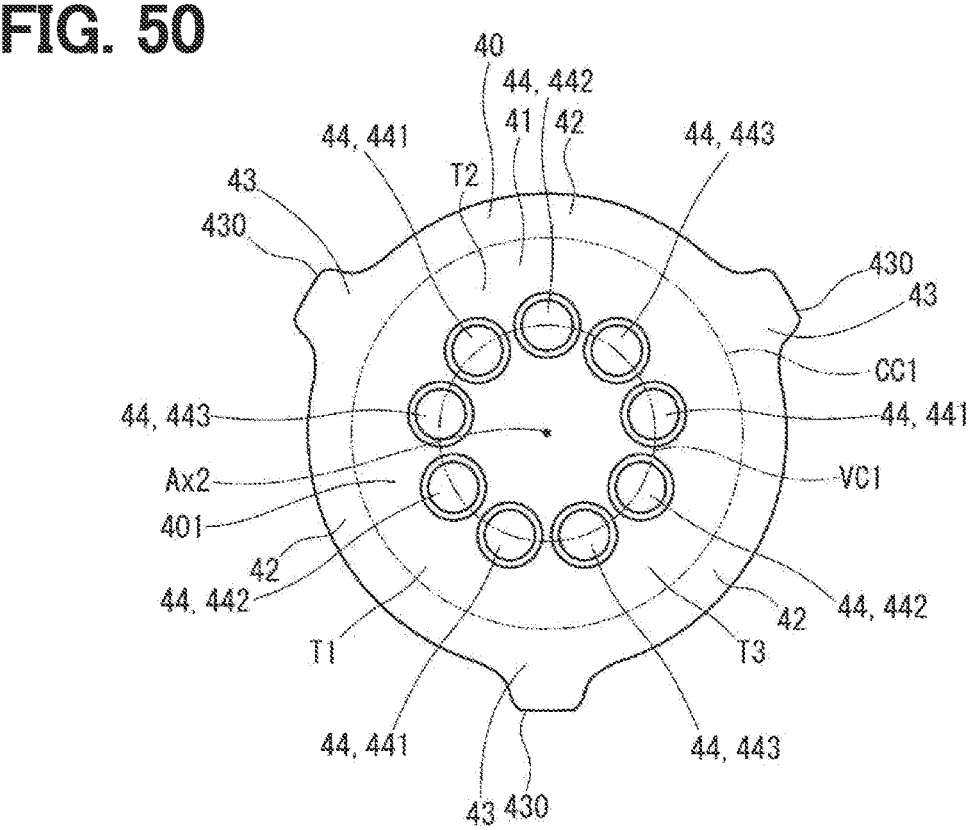
FIG. 50 is a schematic view of the valve member of the high-pressure pump according to the third embodiment as viewed from the seat member.

<A-3> FIGS. 49 and 50 show a part of a high-pressure pump according to a third embodiment. The third embodiment is different from the second embodiment in the configuration of the valve member 40.

According to the present embodiment, the guide portion 43 through which the straight line L11 between the first region T1 and the second region T2 passes includes the sliding portion 430 which is a portion sliding on the inner peripheral wall of the stopper recess 351 of the stopper 35 constituting the suction passage forming portion. The sliding portion 430 is formed between a tangent line LT21 which is a tangent line on the communication hole 441 side in the second region T2 in two tangent lines extending from the center of the valve body 41 and passing through the outer edge of the communication hole 443 in the first region T1, and a tangent LT21 which is a tangent line on the communication hole 443 side in the first region T1 in the two tangent lines extending from the center of the valve body 41 and passing through the outer edge of the communication hole 441 in the second region T2.

The guide portion 43 through which the straight line L11 between the second region T2 and the third region T3 passes, and the guide portion 43 through which the straight line L11 between the third region T3 and the first region T1 passes are formed similarly to the above guide portion 43.

(A5) According to the present embodiment, the guide portion 43 has the sliding portion 430 which is a portion sliding on the stopper recess 351 of the stopper 35. The sliding portion 43 is formed in the range between the two tangent lines LT21 extending from the center of the valve body 41 and passing through the outer edges facing the two communication holes 44 adjacent to each other. In this case, the size of the sliding portion 430 of the guide portion 43 can be determined in accordance with the distance between the adjacent communication holes 44. Accordingly, the sliding portion 430 does not interfere with a fuel flow.

Fourth Embodiment

Figure 51:
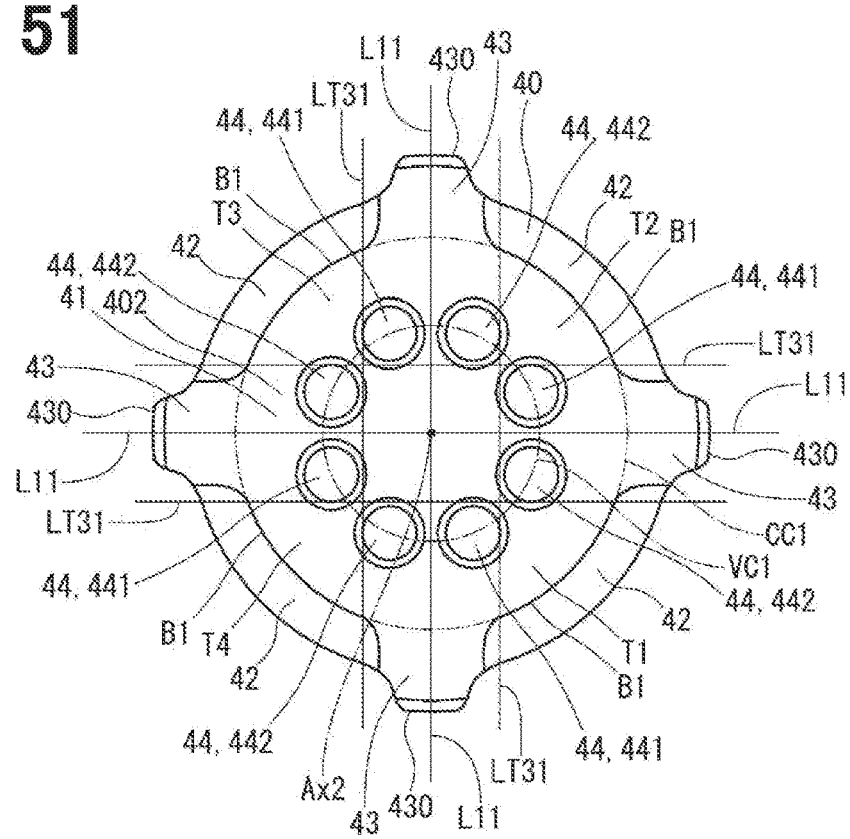
FIG. 51 is a schematic view of a valve member of a high-pressure pump according to a fourth embodiment as viewed from the pressurizing chamber.
Figure 52:
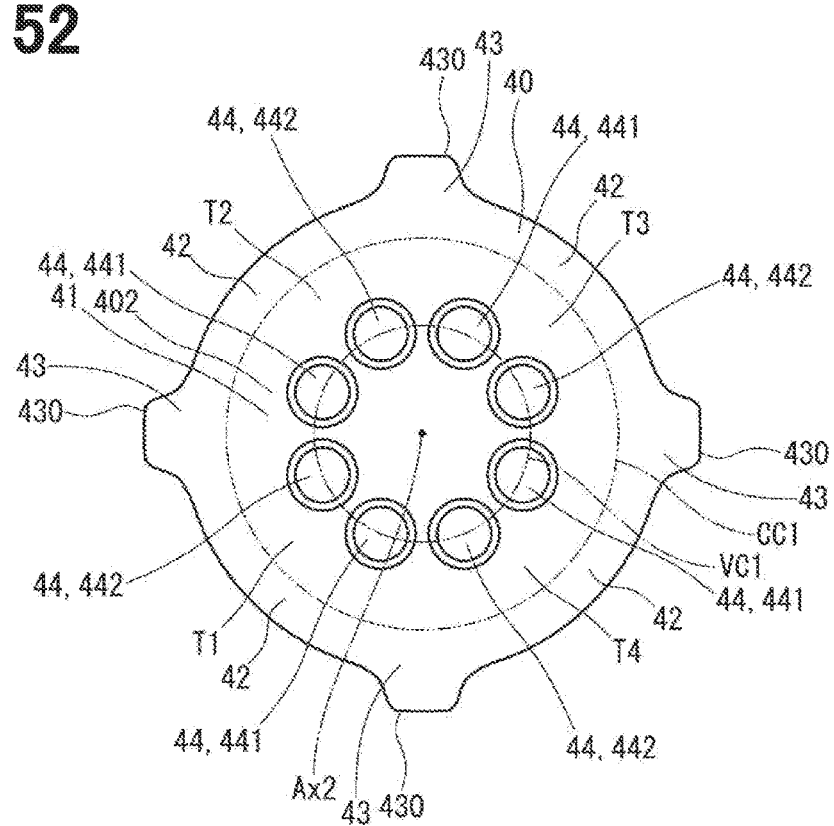
FIG. 52 is a schematic view of the valve member of the high-pressure pump according to the fourth embodiment as viewed from the seat member.

<A-4> FIGS. 51 and 52 show a part of a high-pressure pump according to a fourth embodiment. The fourth embodiment is different from the first embodiment in the configuration of the valve member 40.

According to the present embodiment, the four guide portions 43 are formed at equal intervals in the circumferential direction of the valve body 41 to divide the four tapered portions 42 in the circumferential direction. The eight communication holes 44 are formed at equal intervals in the circumferential direction of the valve body 41. The communication holes 44 are disposed on a virtual circle VC1 centered at the axis Ax2 of the valve body 41 (see FIGS. 51 and 52). As shown in FIG. 51, the boundary line B1 between the inner edges of the four tapered portions 42 and the outer edge of the valve body 41 is formed along the concentric circle CC1 corresponding to the virtual circle VC1.

As shown in FIG. 51, the two communication holes 44 are formed in each of the first region T1, the second region T2, the third region T3, and a fourth region T4 included in the valve body 41 and defined by the four straight lines L11 each included in the valve body 41, extending from the center of the valve body 41, and passing through the center of the guide portion 43.

Assuming that the number h of the communication holes 44 is 8, and that the number g of the guide portions 43 is 4, the number of the communication holes 44 facing an inner edge of one of the multiple tapered portions 42 separated by the guide portions 43 is calculated as $h/g = 8/4 = 2$.

Assuming that the two communication holes 44 formed in each of the first region T1, the second region T2, the third region T3, and the fourth region T4 are the communication hole 441 and the communication hole 442 disposed in this order in the circumferential direction of the virtual circle VC1, the boundary line B1 between the inner edge of the tapered portion 42 on the radially outside of the first region T1 of the valve body 41 and the outer edge of the valve body 41 is located in a range between a tangent line LT31 which is a tangent line on the side opposite to the third region T3 and the fourth region T4 in two tangent lines passing through the outer edge of the communication hole 441 in the first region T1 and the outer edge of the communication hole 442 included in the second region T2 and formed at a position line-symmetric with the communication hole 441 in the first region T1 with respect to the straight line L11 between the first region T1 and the second region T2, and a tangent line LT31 which is a tangent line on the side opposite to the second region T2 and the third region T3 in two tangent lines passing through the outer edge of the communication hole 442 in the first region T1 and the outer edge of the communication hole 441 included in the fourth region T4 and formed at a position line-symmetric with the communication hole 442 in the first region T1 with respect to a straight line L11 formed between the first region T1 and the fourth region T4.

The boundary line B1 between the inner edge of the tapered portion 42 radially outside the second region T2 of the valve body 41 and the outer edge of the valve body 41, the boundary line B1 between the inner edge of the tapered portion 42 radially outside the third region T3 of the valve body 41 and the outer edge of the valve body 41, and the boundary line B1 between the inner edge of the tapered portion 42 radially outside the fourth region T4 of the valve body 41 and the outer edge of the valve body 41 are formed similarly to the above boundary line B1.

(A3) According to the present embodiment, the boundary line B1 between the inner edge of the one tapered portion 42 sandwiched between the two guide portions 43 and the outer edge of the valve body 41 is formed in a range between the two tangent lines LT31 passing through the outer edges of the end communication holes (441, 442) which are the communication holes 44 at both ends in the plurality of communication holes 44 facing the inner edge of one tapered portion 42, and the outer edges of the communication holes 44 (442, 441) formed at positions line-symmetric with the end communication holes (441, 442) with respect to the straight line L11 extending from the center of the valve body 41 and passing through the center of the guide portion 43. In this case, the distance between both ends of each of the boundary lines B1 and the communication holes 44 can be reduced while securing the length of each of the boundary lines B1. Accordingly, portions in the vicinity of both ends of each of the boundary lines B1 do not produced resistance for a fuel flow.

According to the present embodiment, the four guide portions 43 are formed on the valve member 40 in the circumferential direction. This configuration reduces eccentricity more than that of the first embodiment including the three guide portions 43, and offers an advantageous effect of reducing inclination of the valve member 40.

Fifth Embodiment

Figure 53:
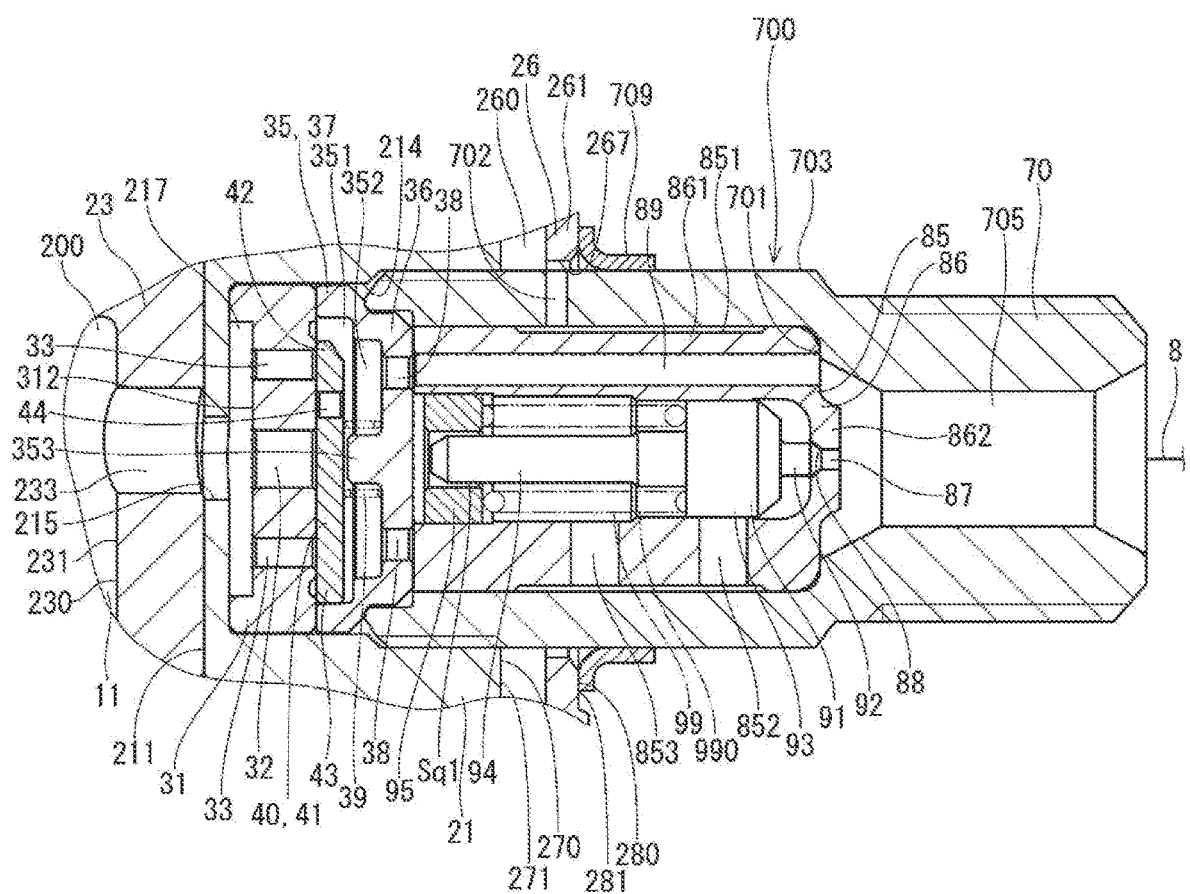
FIG. 53 is a cross-sectional view of a discharge passage portion of a high-pressure pump according to a fifth embodiment.

<A-5> FIG. 53 shows a part of a high-pressure pump according to a fifth embodiment. The fifth embodiment is different from the first embodiment in the configuration of the discharge passage portion 700.

According to the present embodiment, the discharge passage portion 700 includes the seat member 31, the stopper 35, the valve member 40, and the spring 39 instead of the discharge seat member 71, the intermediate member 81, the discharge valve 75, and the spring 79.

According to the present embodiment, the end surface of the discharge joint 70 facing the pressurizing chamber 200 is disposed on the side of the end surface of the discharge joint 70 facing the pressurizing chamber 200 opposite to the pressurizing chamber 200 in the first embodiment. In other words, the axial length of the discharge joint 70 of the present embodiment is smaller than the axial length of the discharge passage portion 700 of the first embodiment.

The seat member 31 is provided in the discharge passage 217 such that one surface of the seat member 31 contacts the bottom surface of the discharge hole portion 214. The seat member 31 herein includes a seat member recess 312. The seat member recess 312 has a substantially cylindrical shape recessed from the surface of the seat member 31 facing the pressurizing chamber 200 away from the pressurizing chamber 200. The seat member recess 312 is substantially coaxial with the seat member 31. The communication path 32 and the communication paths 33 pass through the seat member 31 facing away from the pressurizing chamber 200 between a bottom surface of the seat member recess 312 and the surface of the seat member 31 facing away from the pressurizing chamber 200.

The configuration of the stopper 35 of the discharge passage portion 700 is similar to the configuration of the stopper 35 of the suction valve unit 300. The stopper 35 is provided on the side of the seat member 31 opposite to the pressurizing chamber 200. The surface of the stopper large diameter portion 37 facing away from the stopper small diameter portion 36 herein is in contact with the outer edge of the surface of the seat member 31 facing away from the pressurizing chamber 200. The stopper small diameter portion 36 is located inside the end of the discharge joint 70 facing the pressurizing chamber 200. The step surface between the stopper small diameter portion 36 and the stopper large diameter portion 37 faces the end surface of the discharge joint 70 facing the pressurizing chamber 200. The outer edge of the surface of the stopper small diameter portion 36 facing away from the stopper large diameter portion 37 is in contact with the end surface of the relief member cylindrical portion 861 facing the pressurizing chamber 200.

The step surface 701 of the discharge joint 70 herein biases the relief seat member 85, the stopper 35, and the seat member 31 toward the pressurizing chamber 200. Accordingly, the relief seat member 85, the stopper 35, and the seat member 31 are in contact with each other to regulate axial movement. The surface of the seat member 31 facing the pressurizing chamber 200 are pressed against the step surface between the discharge hole portion 214 and the discharge hole portion 215, i.e., the periphery of the discharge hole portion 215 in the bottom surface of the discharge hole portion 214. In this case, an axial force in the direction from the seat member 31 toward the pressurizing chamber 200 acts on the periphery of the discharge hole portion 215 in the bottom surface of the discharge hole portion 214. Accordingly, sealing under a high pressure is achievable using only a simple structure.

The stopper 35 is provided such that the communication holes 38 and the second passages 89 of the relief seat member 85 are in communication with each other. According to the present embodiment, the pressurizing chamber 200 id capable of being in communication with the high-pressure fuel pipe 8 via the discharge hole 233, the discharge hole portion 215, the seat member recess 312, the communication path 32, the communication paths 33, the stopper recess 351, the stopper recess 352, the communication holes 38, and the second passages 89.

The configurations of the valve member 40 and the spring 39 of the discharge passage portion 700 are similar to the configurations of the valve member 40 and the spring 39 of the suction valve unit 300. The valve member 40 is provided inside the stopper recess 351 similarly to the valve member 40 of the suction valve unit 300. The spring 39 is also provided radially outside the stopper protrusion 353 similarly to the spring 39 of the suction valve unit 300.

When a fuel pressure in the pressurizing chamber 200 increases to a predetermined value or higher, the valve member 40 moves toward the high-pressure fuel pipe 8 while resisting the biasing force of the spring 39. As a result, the valve member 40 is separated from the valve seats 310 and is opened. Accordingly, the fuel between the pressurizing chamber 200 and the seat member 31 is discharged toward the high-pressure fuel pipe 8 via the seat member recess 312, the communication path 32, the communication paths 33, the valve seats 310, the stopper recess 351, the stopper recess 352, the communication holes 38, and the second passages 89.

According to the present embodiment, as described above, the cylinder 23 constituting the pressurizing chamber forming portion, and the upper housing 21, the seat member 31, and the valve member 40 constituting the discharge passage forming portion are provided. The cylinder 23 defines the pressurizing chamber 200 in which fuel is pressurized. The upper housing 21 defines the discharge passage 217 through which the fuel discharged from the pressurizing chamber 200 flows.

The seat member 31 is disposed in the discharge passage 217, and includes the communication path 32 and the communication paths 33 that pass through the seat member 31 between one surface and the other surface of the seat member 31. The valve member 40 disposed on the side of the seat member 31 opposite to the pressurizing chamber 200 opens at the time of separation from the seat member 31 to allow the fuel to flow in the communication path 32 and the communication paths 33, and closes at the time of contact with the seat member 31 to restrict the fuel to flow in the communication path 32 and the communication paths 33.

The valve member 40 includes the valve body 41 having a plate shape and capable of being separated from the seat member 31 or contacting the seat member 31, the communication holes 44 that pass through the valve body 41 between one surface and the other surface of the valve body 41, the tapered portion 42 provided radially outside the valve body 41 and having a tapered surface which formed such that the surface of the tapered portion 42 facing away from the pressurizing chamber 200 tapes toward the axis Ax2 of the valve body 41 in the direction toward the pressurizing chamber 200, and the guide portions 43 protruding radially outward from the valve body 41 to divide the tapering portions 42 in the circumferential direction, and capable of guiding the movement of the valve member 40 by sliding on the stopper recesses 351 of the stopper 35. The communication holes 44 are disposed on the virtual circle VC1 centered at the axis Ax2 of the valve body 41.

The boundary line B1 between the inner edge of each of the tapering portions 42 and the outer edge of the valve body 41 is formed along the concentric circle CC1 corresponding to the virtual circle VC1. This configuration reduces the distance between both ends of each of the boundary lines B1 and the communication holes 44. In this case, portions in the vicinity of both ends of each of the boundary lines B1 do not produce resistance for fuel flowing on the surface of the valve member 40. Accordingly, a sufficient flow rate of fuel discharged from the pressurizing chamber 200 can be secured. Moreover, valve closing responsiveness improves by reduction of the lift amount of the valve member 40, Accordingly, a backward flow rate decreases, wherefore a sufficient discharge amount of the high-pressure pump 10 can be secured.

Presented in the present embodiment is therefore an example which adopts the valve member 40 of a multi-seat type as the discharge valve in the discharge passage 217.

Sixth Embodiment

Figure 54:
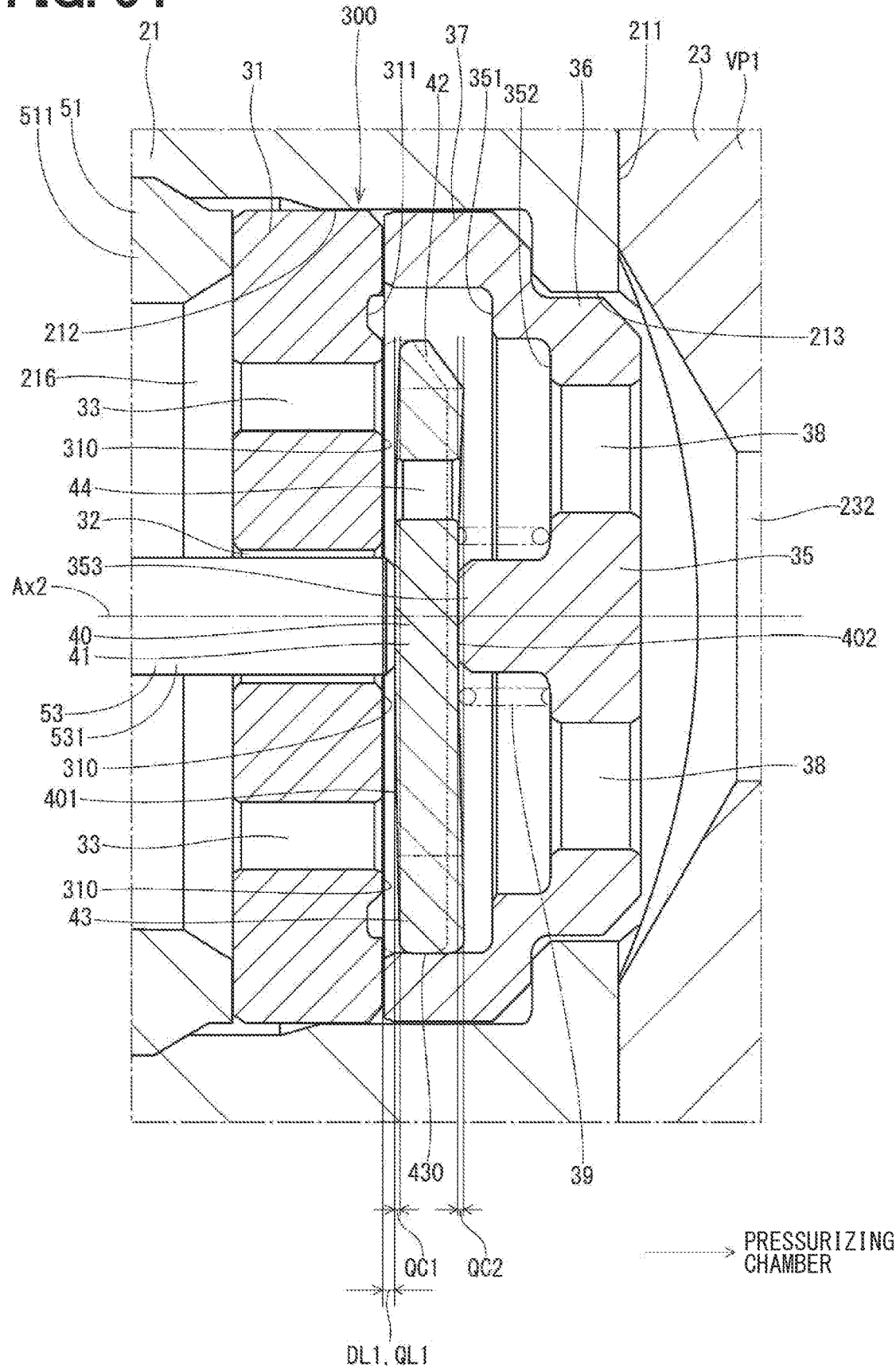
FIG. 54 is an enlarged cross-sectional view of a suction valve unit of a high-pressure pump according to a sixth embodiment.

<A-6> FIG. 54 shows a part of a high-pressure pump according to a sixth embodiment. The sixth embodiment is different from the first embodiment in the configuration of the valve member 40.

According to the present embodiment, the valve member 40 is formed such that the one surface 401 in the axial direction, i.e., the seat member 31 side surface, and the other surface 402, i.e., the pressurizing chamber 200 side surface, are curved in a cross section taken along the virtual plane VP1 including the axis Ax2 of the valve body 41. The one surface 401 and the other surface 402 of the valve member 40 are so formed as to protrude toward the seat member 31. In other words, the valve member 40 is so formed as to curve toward the pressurizing chamber 200 side with nearness to the radially outside from the center.

According to the valve member 40, each of a curve amount QC1 of the one surface 401 in the axial direction and a curve amount QC2 of the other surface 402, is set to a value smaller than a minimum value DL1 of the distance between the valve member 40 and the seat member 31 when the valve member 40 separates from the seat member 31. The minimum value DL1 is equivalent to the distance between the one surface 401 of the valve member 40 and the pressurizing chamber 200 side surface of the seat member 31 on the axis Ax2 of the valve body 41 when the other surface 402 of the valve member 40 is in contact with the stopper protrusion 353 (see FIG. 54). According to the present embodiment, the curve amount QC1 and the curve amount QC2 are equalized.

According to the present embodiment, the needle 53 moves to the side opposite to the pressurizing chamber 200 when the coil 60 of the electromagnetic driving unit 500 is energized in a state of a degrees in the volume of the pressurizing chamber 200 by a shift of the plunger 11 toward the pressurizing chamber 200. In this case, the valve member 40 moves in the closing direction. At this time, a pressure of fuel in the pressurizing chamber 200 is applied to the other surface 402 of the valve member 40. Accordingly, as indicated by a broken line in FIG. 54, the outer edge of the valve member 40 is deformed toward the seat member 31, wherefore the one surface 401 comes into close contact with the pressurizing chamber 200 side surface of the seat member 31, i.e., a plurality of the valve seats 310. As a result, the valve member 40 is closed.

According to the present embodiment, as described above, the one surface 401 of the valve member 40 is curved and protruded toward the seat member 31. In this case, assuming that the minimum value DL1 is a lift amount QL1 of the valve member 40, an apparent lift amount of the valve member 40 is larger than the lift amount QL1 by a curve amount QC1 at the outer edge of the valve member 40. Accordingly, a suck amount of fuel into the pressurizing chamber 200, a return amount of fuel from the pressurizing chamber 200 to the fuel chamber 260, and a self-closing limit of the valve member 40 improve.

As described above, (A6) according to the present embodiment, the valve member 40 is formed such that the one surface 401 which is the seat member 31 side surface is curved in a cross section taken along the virtual plane VP1 including the axis Ax2 of the valve body 41. In this case, the apparent lift amount of the valve member 40 increases in a part of the valve member 40 by the curve amount of the one surface 401. Accordingly, a suck amount of fuel into the pressurizing chamber 200, a return amount of fuel from the pressurizing chamber 200 to the fuel chamber 260, and a self-closing limit of the valve member 40 improve. Accordingly, the lift amount of the valve member 40 for securing the same performance can be reduced, wherefore reduction of power consumption of the electromagnetic driving unit 500 and reduction of NV are achievable.

(A7) According to the present embodiment, the valve member 40 is formed such that the curve amount QC1 of the one surface 401 which is the seat member 31 side surface is set to a value smaller than the minimum value DL1 of the distance between the valve member 40 and the seat member 31 when the valve member 40 separates from the seat member 31.

(A8) According to the present embodiment, the valve member 40 is formed such that the one surface 401 which is the seat member 31 side surface is protruded toward the seat member 31. The present embodiment shows an example of a specific configuration of the valve member 40.

Seventh Embodiment

Figure 55:
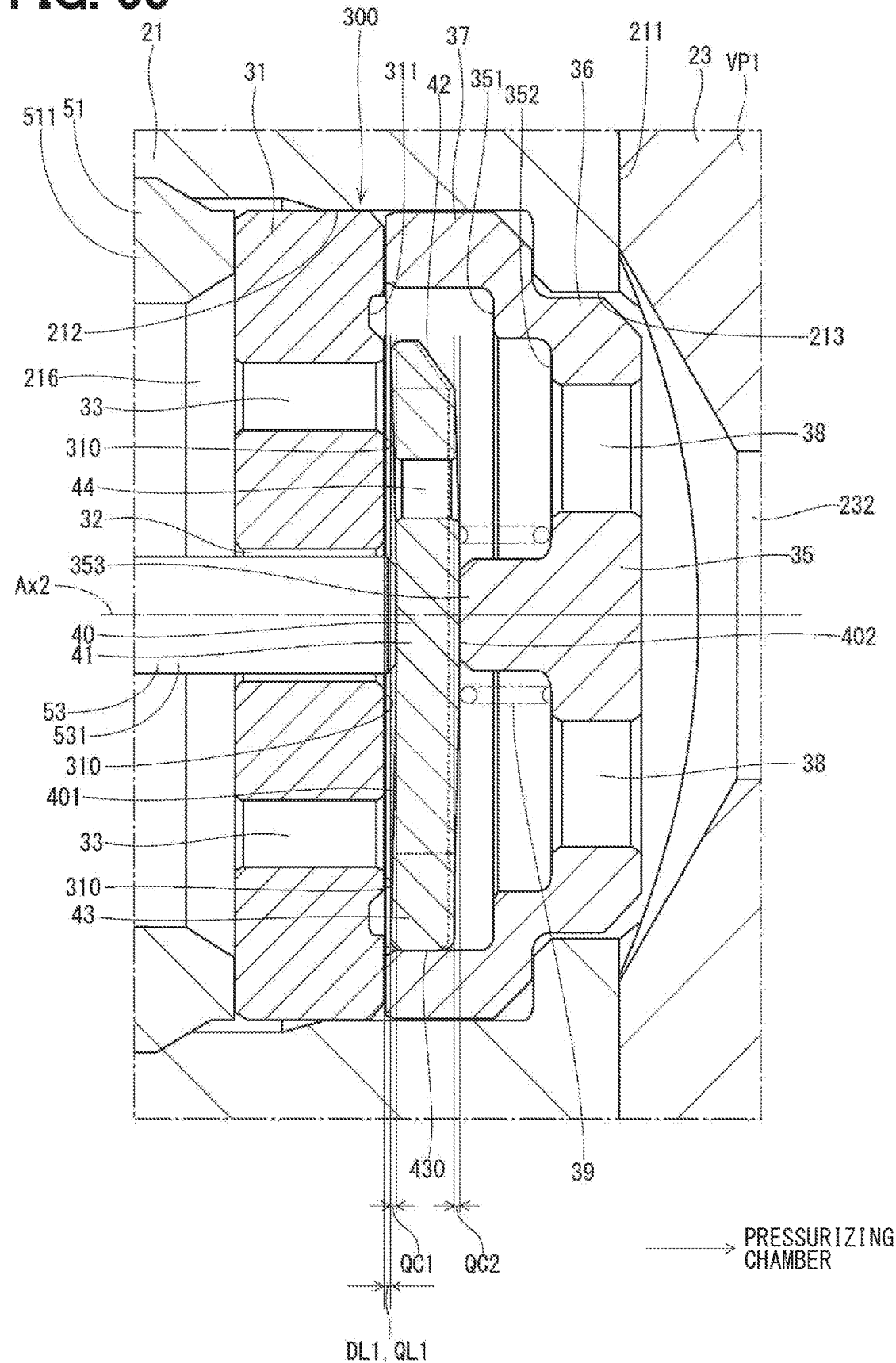
FIG. 55 is an enlarged cross-sectional view of a suction valve unit of a high-pressure pump according to a seventh embodiment.

<A-7> FIG. 55 shows a part of a high-pressure pump according to a seventh embodiment. The seventh embodiment is different from the first embodiment in the configuration of the valve member 40.

According to the present embodiment, the valve member 40 is formed such that the one surface 401 in the axial direction, i.e., the seat member 31 side surface, and the other surface 402, i.e., the pressurizing chamber 200 side surface, are curved in a cross section taken along the virtual plane VP1 including the axis Ax2 of the valve body 41. The one surface 401 and the other surface 402 of the valve member 40 are so formed as to protrude toward the pressurizing chamber 200. In other words, the valve member 40 is so formed as to curve toward the seat member 31 with nearness to the radially outside from the center.

According to the valve member 40, each of a curve amount QC1 of the one surface 401 in the axial direction and a curve amount QC2 of the other surface 402, is set to a value smaller than a minimum value DL1 of the distance between the valve member 40 and the seat member 31 when the valve member 40 separates from the seat member 31. The minimum value DL1 is equivalent to the distance between the outer edge of the one surface 401 of the valve member 40 and the pressurizing chamber 200 side surface of the seat member 31 when the other surface 402 of the valve member 40 is in contact with the stopper protrusion 353 (see FIG. 55). According to the present embodiment, the curve amount QC1 and the curve amount QC2 are equalized.

According to the present embodiment, the needle 53 moves to the side opposite to the pressurizing chamber 200 when the coil 60 of the electromagnetic driving unit 500 is energized in a state of a degrees in the volume of the pressurizing chamber 200 by a shift of the plunger 11 toward the pressurizing chamber 200. In this case, the valve member 40 moves in the closing direction. At this time, a pressure of fuel in the pressurizing chamber 200 is applied to the other surface 402 of the valve member 40. Accordingly, as indicated by a broken line in FIG. 55, a central portion of the valve member 40 is deformed toward the seat member 31, wherefore the one surface 401 comes into close contact with the pressurizing chamber 200 side surface of the seat member 31, i.e., a plurality of the valve seats 310. As a result, the valve member 40 is closed.

According to the present embodiment, as described above, the one surface 401 of the valve member 40 is curved and protruded toward the pressurizing chamber 200. In this case, assuming that the minimum value DL1 is the lift amount QL1 of the valve member 40, an apparent lift amount of the valve member 40 is larger than the lift amount QL1 by the curve amount QC1 at the central portion of the valve member 40. Accordingly, a suck amount of fuel into the pressurizing chamber 200, a return amount of fuel from the pressurizing chamber 200 to the fuel chamber 260, and a self-closing limit of the valve member 40 improve.

Eighth Embodiment

Figure 56:
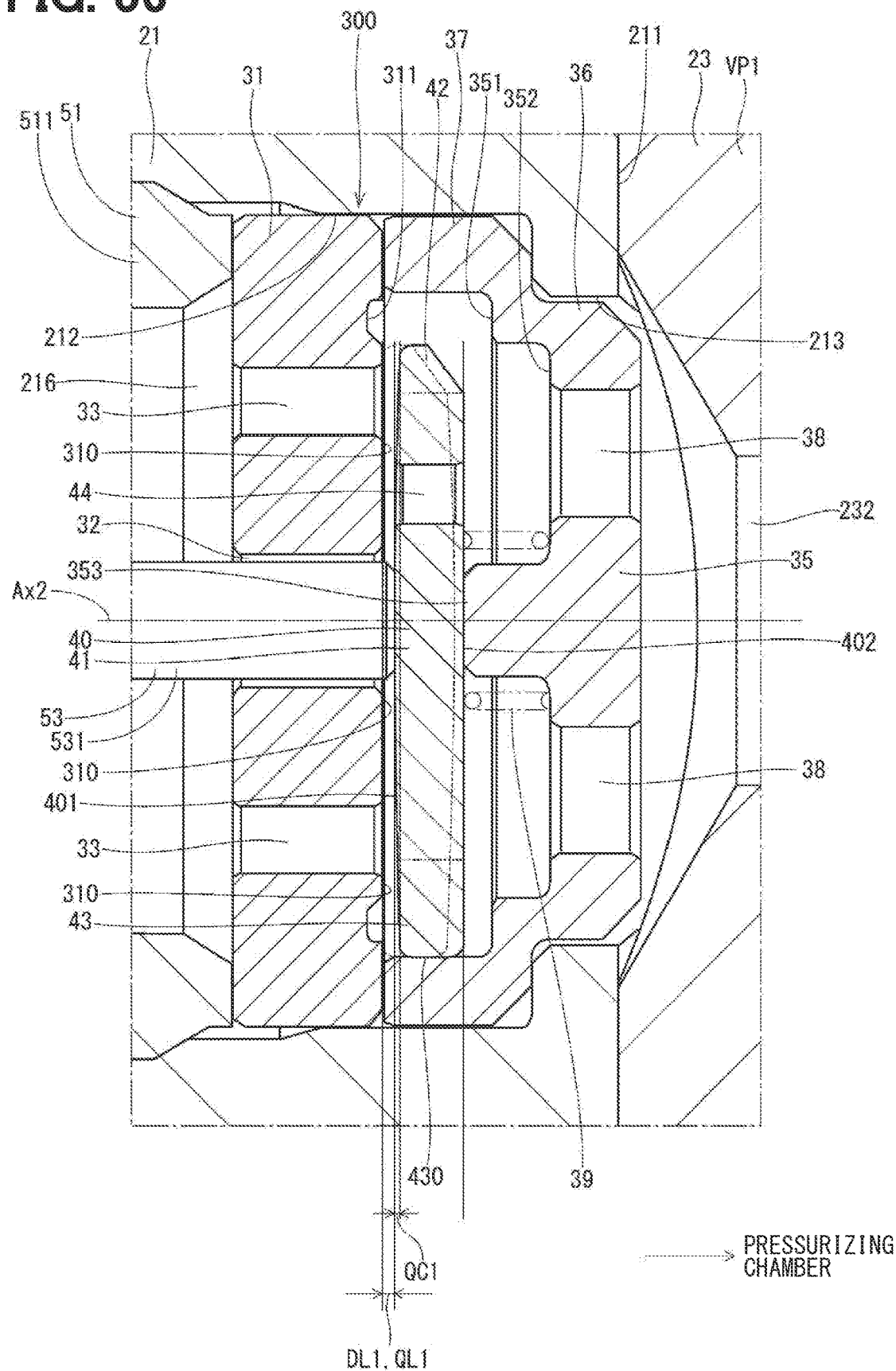
FIG. 56 is an enlarged cross-sectional view of a suction valve unit of a high-pressure pump according to an eighth embodiment.

<A-8> FIG. 56 shows a part of a high-pressure pump according to an eighth embodiment. The eighth embodiment is different from the sixth embodiment in the configuration of the valve member 40.

According to the present embodiment, the other surface 402 which is the pressurizing chamber 200 side surface of the valve member 40 has a flat shape. Accordingly, the curve amount of the other surface 402 is zero.

According to the present embodiment, the needle 53 moves to the side opposite to the pressurizing chamber 200 when the coil 60 of the electromagnetic driving unit 500 is energized in a state of a degrees in the volume of the pressurizing chamber 200 by a shift of the plunger 11 toward the pressurizing chamber 200. In this case, the valve member 40 moves in the closing direction. At this time, a pressure of fuel in the pressurizing chamber 200 is applied to the other surface 402 of the valve member 40. Accordingly, as indicated by a broken line in FIG. 56, the outer edge of the valve member 40 is deformed toward the seat member 31, wherefore the one surface 401 comes into close contact with the pressurizing chamber 200 side surface of the seat member 31, i.e., a plurality of the valve seats 310. As a result, the valve member 40 is closed.

According to the present embodiment, the one surface 401 of the valve member 40 is curved and protruded toward the seat member 31 similarly to the sixth embodiment. Accordingly, advantageous effects similar to those of the sixth embodiment can be produced.

Ninth Embodiment

Figure 57:
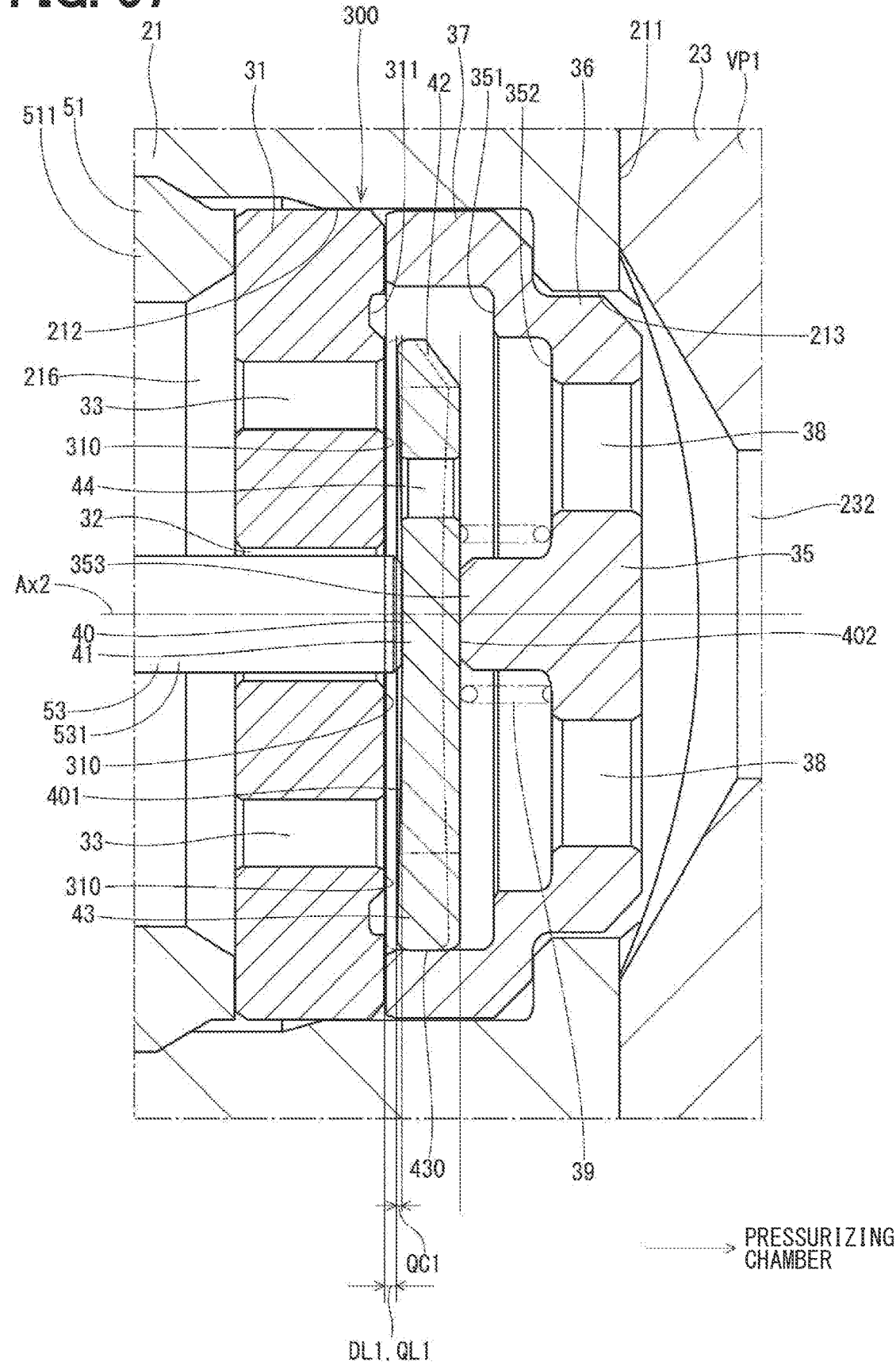
FIG. 57 is an enlarged cross-sectional view of a suction valve unit of a high-pressure pump according to a ninth embodiment.

<A-9> FIG. 57 shows a part of a high-pressure pump according to a ninth embodiment. The ninth embodiment is different from the seventh embodiment in the configuration of the valve member 40.

According to the present embodiment, the other surface 402 which is the pressurizing chamber 200 side surface of the valve member 40 has a flat shape. Accordingly, the curve amount of the other surface 402 is zero.

According to the present embodiment, the needle 53 moves to the side opposite to the pressurizing chamber 200 when the coil 60 of the electromagnetic driving unit 500 is energized in a state of a degrees in the volume of the pressurizing chamber 200 by a shift of the plunger 11 toward the pressurizing chamber 200. In this case, the valve member 40 moves in the closing direction. At this time, a pressure of fuel in the pressurizing chamber 200 is applied to the other surface 402 of the valve member 40. Accordingly, as indicated by a broken line in FIG. 57, a central portion of the valve member 40 is deformed toward the seat member 31, wherefore the one surface 401 comes into close contact with the pressurizing chamber 200 side surface of the seat member 31, i.e., a plurality of the valve seats 310. As a result, the valve member 40 is closed.

According to the present embodiment, the one surface 401 of the valve member 40 is curved and protruded toward the pressurizing chamber 200 similarly to the seventh embodiment. Accordingly, advantageous effects similar to those of the seventh embodiment can be produced.

Tenth Embodiment

Figure 58:
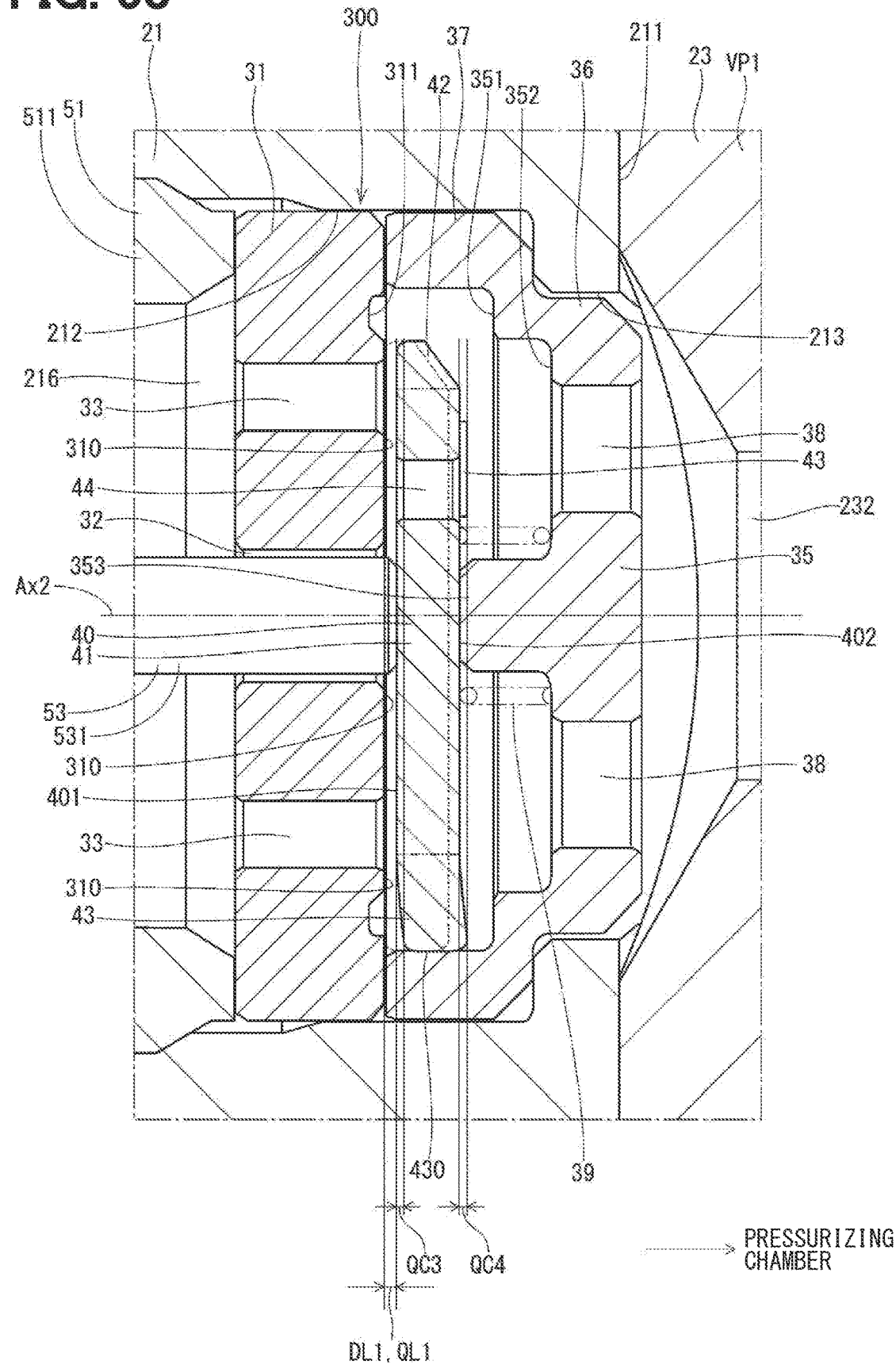
FIG. 58 is an enlarged cross-sectional view of a suction valve unit of a high-pressure pump according to a tenth embodiment.

<A-10> FIG. 58 shows a part of a high-pressure pump according to a tenth embodiment. The tenth embodiment is different from the first embodiment in the configuration of the valve member 40.

According to the present embodiment, each of the guide portions 43 of the valve member 40 is formed such that the seat member 31 side surface and the pressurizing chamber 200 side surface are curved from the valve body 41 toward the pressurizing chamber 200 in a cross section taken along the virtual plane VP1 including the axis Ax2 of the valve body 41. In other words, each of the guide portions 43 is so formed as to curve toward the pressurizing chamber 200 side with nearness to the radially outside from the valve body 41.

Each of a curve amount QC3 of the seat member 31 side surface and a curve amount QC4 of the pressurizing chamber 200 side surface of each of the guide portions 43 is set to a value smaller than the minimum value DL1 of the distance between the valve member 40 and the seat member 31 when the valve member 40 separates from the seat member 31. The minimum value DL1 herein is equivalent to the distance between the one surface 401 of the valve member 40 and the pressurizing chamber 200 side surface of the seat member 31 on the axis Ax2 of the valve body 41 when the other surface 402 of the valve member 40 is in contact with the stopper protrusion 353 (see FIG. 58). According to the present embodiment, the curve amount QC3 and the curve amount QC4 are equalized.

According to the present embodiment, the needle 53 moves to the side opposite to the pressurizing chamber 200 when the coil 60 of the electromagnetic driving unit 500 is energized in a state of a degrees in the volume of the pressurizing chamber 200 by a shift of the plunger 11 toward the pressurizing chamber 200. In this case, the valve member 40 moves in the closing direction. At this time, a pressure of fuel in the pressurizing chamber 200 is applied to the pressurizing chamber 200 side surface of the guide portions 43. Accordingly, as indicated by a broken line in FIG. 58, each of the guide portions 43 of the valve member 40 is deformed toward the seat member 31, wherefore the seat member 31 side surface comes into close contact with the pressurizing chamber 200 side surface of the seat member 31, i.e., the valve seats 310. As a result, the valve member 40 is closed.

According to the present embodiment, as described above, the seat member 31 side surface of the guide portion 43 of the valve member 40 is curved from the valve body 41 toward the pressurizing chamber 200. In this case, assuming that the minimum value DL1 is the lift amount QL1 of the valve member 40, an apparent lift amount of the valve member 40 is larger than the lift amount QL1 by the curve amount QC3 at the guide portion 43 of the valve member 40. Accordingly, a suck amount of fuel into the pressurizing chamber 200, a return amount of fuel from the pressurizing chamber 200 to the fuel chamber 260, and a self-closing limit of the valve member 40 improve.

Eleventh Embodiment

Figure 59:
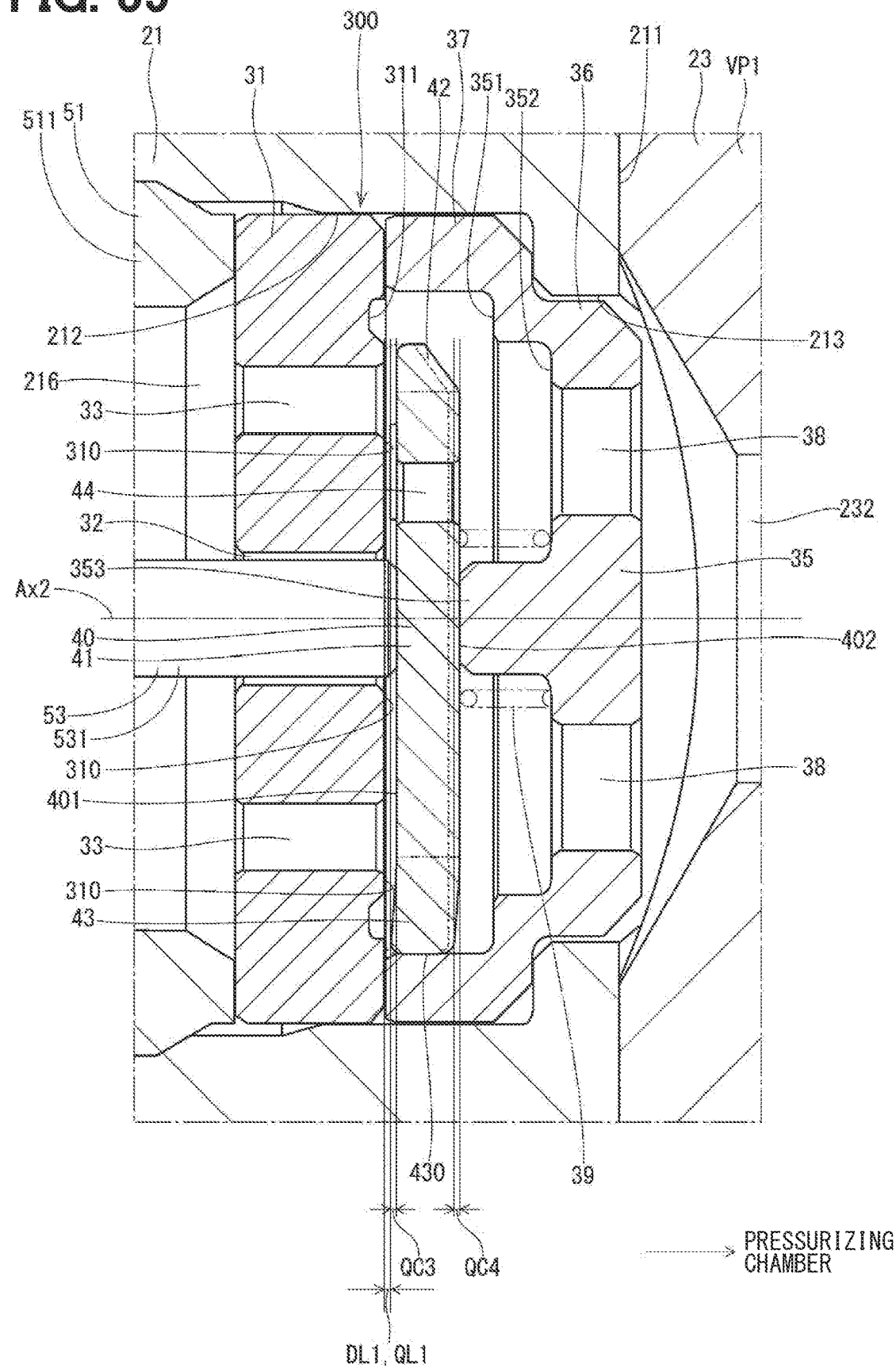
FIG. 59 is an enlarged cross-sectional view of a suction valve unit of a high-pressure pump according to an eleventh embodiment.

<A-11> FIG. 59 shows a part of a high-pressure pump according to an eleventh embodiment. The eleventh embodiment is different from the tenth embodiment in the configuration of the valve member 40.

According to the present embodiment, each of the guide portions 43 of the valve member 40 is formed such that the seat member 31 side surface and the pressurizing chamber 200 side surface are curved from the valve body 41 toward the seat member 31 in a cross section taken along the virtual plane VP1 including the axis Ax2 of the valve body 41. In other words, each of the guide portions 43 is so formed as to curve toward the seat member 31 with nearness to the radially outside from the valve body 41.

Each of a curve amount QC3 of the seat member 31 side surface and a curve amount QC4 of the pressurizing chamber 200 side surface of each of the guide portions 43 is set to a value smaller than the minimum value DL1 of the distance between the valve member 40 and the seat member 31 when the valve member 40 separates from the seat member 31. The minimum value DL1 herein is equivalent to the distance between the end of the seat member 31 side surface of the guide portion 43 on the side opposite to the valve body 41 and the pressurizing chamber 200 side surface of the seat member 31 when the other surface 402 of the valve member 40 is in contact with the stopper protrusion 353 (see FIG. 59). According to the present embodiment, the curve amount QC3 and the curve amount QC4 are equalized.

According to the present embodiment, the needle 53 moves to the side opposite to the pressurizing chamber 200 when the coil 60 of the electromagnetic driving unit 500 is energized in a state of a degrees in the volume of the pressurizing chamber 200 by a shift of the plunger 11 toward the pressurizing chamber 200. In this case, the valve member 40 moves in the closing direction. At this time, a pressure of fuel in the pressurizing chamber 200 is applied to the pressurizing chamber 200 side surface of the guide portions 43. Accordingly, as indicated by a broken line in FIG. 59, each of the guide portions 43 of the valve member 40 is deformed toward the pressurizing chamber 200, wherefore the seat member 31 side surface of the valve body 41 comes into close contact with the pressurizing chamber 200 side surface of the seat member 31, i.e., a plurality of the valve seats 310. As a result, the valve member 40 is closed.

According to the present embodiment, as described above, the seat member 31 side surface of the guide portion 43 of the valve member 40 is curved from the valve body 41 toward the seat member 31. In this case, assuming that the minimum value DL1 is the lift amount QL1 of the valve member 40, an apparent lift amount of the valve member 40 is larger than the lift amount QL1 by the curve amount QC3 at the valve body 41 of the valve member 40. Accordingly, a suck amount of fuel into the pressurizing chamber 200, a return amount of fuel from the pressurizing chamber 200 to the fuel chamber 260, and a self-closing limit of the valve member 40 improve.

Twelfth Embodiment

Figure 60:
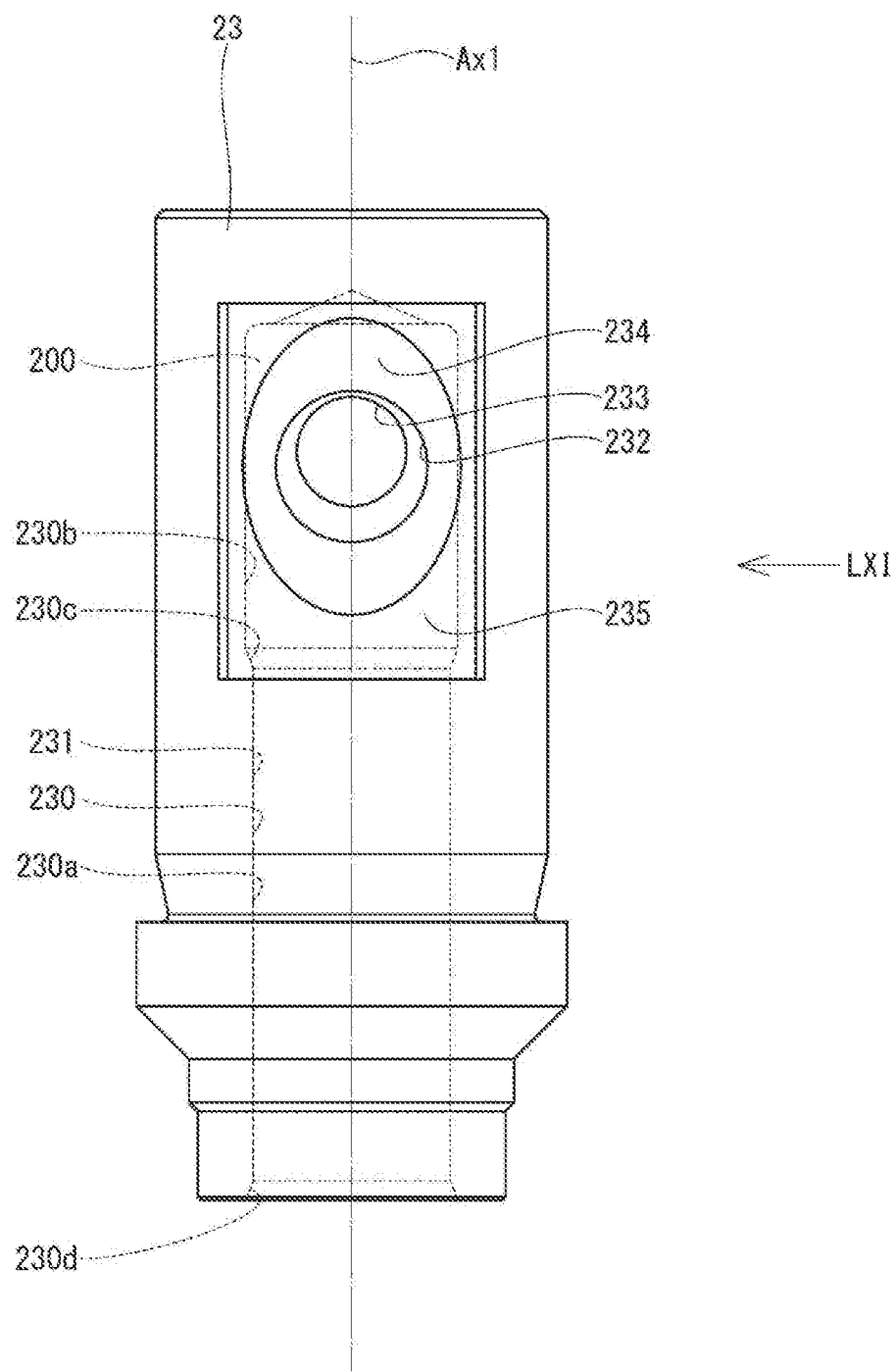
FIG. 60 is a front view of a cylinder of a high-pressure pump according to a twelfth embodiment.
Figure 61:
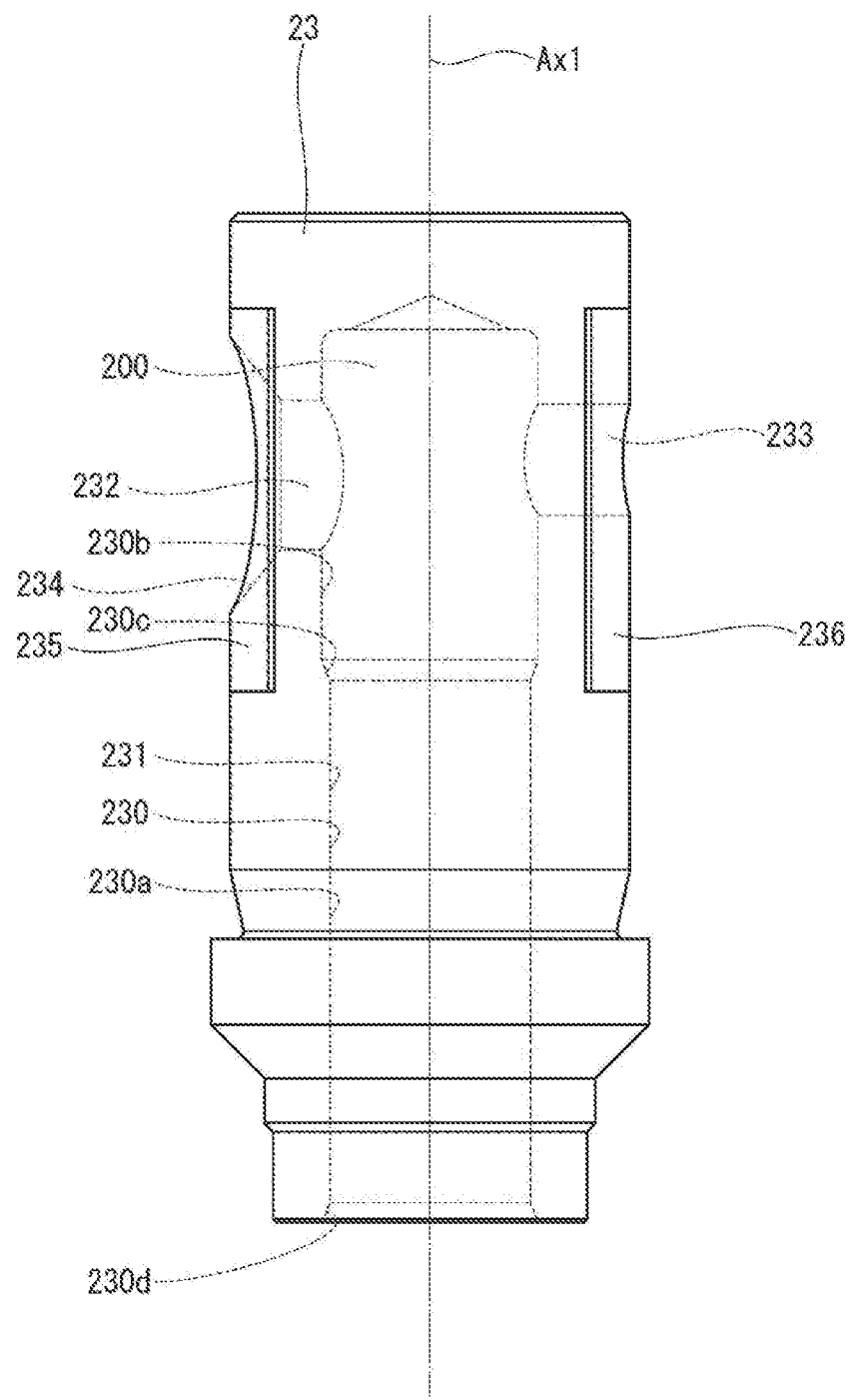
FIG. 61 is a view of FIG. 60 as viewed in a direction of an arrow LXI.

<A-12> FIGS. 60 and 61 show a part of a high-pressure pump according to a twelfth embodiment. The twelfth embodiment is different from the first embodiment in the configuration of the cylinder 23.

According to the present embodiment, the outer peripheral recess 235 is formed in a range from a position slightly on the bottom portion side of the cylinder 23 with respect to the upper end of the tapered surface 234 to a position away from the lower end of the tapered surface 234 toward the side opposite to the bottom portion of the cylinder 23 by a predetermined distance in the axial direction of the cylinder 23 as viewed in the axial direction of the suction hole 232. Accordingly, the outer peripheral recess 235 of the present embodiment is so formed as to include all of the tapered surface 234 inside as viewed in the axial direction of the suction hole 232, and is larger than the outer peripheral recess 235 of the first embodiment in the axial direction of the cylinder 23. Similarly to the first embodiment, at least a part of the outer peripheral recess 235 is formed in a range overlapping with the sliding surface 230a in a lower portion of the cylinder 23 in the axial direction as viewed in the axial direction of the suction hole 232 (see FIG. 60).

The outer peripheral recess 236 is formed in a range from a position slightly on the bottom portion side of the cylinder 23 with respect to the upper end of the discharge hole 233 to a position away from the lower end of the discharge hole 233 toward the side opposite to the bottom portion of the cylinder 23 by a predetermined distance in the axial direction of the cylinder 23 as viewed in the axial direction of the discharge hole 233. Accordingly, the outer peripheral recess 236 of the present embodiment is so formed as to include all of the discharge hole 233 inside as viewed in the axial direction of the discharge hole 233, and is larger than the outer peripheral recess 236 of the first embodiment in the axial direction of the cylinder 23. Similarly to the first embodiment, at least a part of the outer peripheral recess 236 is formed in a range overlapping with the sliding surface 230a in a lower portion of the cylinder 23 in the axial direction as viewed in the axial direction of the discharge hole 233 (see FIG. 61).

Similarly to the first embodiment, the outer peripheral recesses 235 and 236 are formed in a range leaving a portion fitted to the upper housing 21, i.e., a shrink fitting portion, in an axially upper portion of the cylinder 23 as viewed in the axial direction of the suction hole 232 or the discharge hole 233 (see FIGS. 60 and 61). However, the size of the fitting portion with the upper housing 21 is smaller than that of the first embodiment.

According to the present embodiment, the outer peripheral recess 235 and the outer peripheral recess 236 are formed in the outer peripheral wall of the cylinder 23 similarly to the first embodiment. In this case, even when the inner peripheral wall of the hole portion 211 of the upper housing 21 is deformed radially inward during screwing the cylindrical member 51 of the electromagnetic driving unit 500 into the suction hole portion 212 of the upper housing 21, and during screwing the discharge joint 70 of the discharge passage portion 700 into the discharge hole portion 214 of the upper housing 21, a surface pressure produced by this deformation and applied to the outer peripheral wall of the cylinder 23 can be reduced. Accordingly, a constant clearance between the columnar inner peripheral wall 230 and the outer peripheral wall of the plunger 11 can be maintained, wherefore uneven wear and seizure between the columnar inner peripheral wall 230 and the outer peripheral wall of the plunger 11 can be reduced.

The outer peripheral recess 235 and the outer peripheral recess 236 of the present embodiment are larger than the outer peripheral recess 235 and the outer peripheral recess 236 of the first embodiment. Accordingly, the effect of "reducing uneven wear and seizure of the columnar inner peripheral wall 230 and the outer peripheral wall of the plunger 11" produced by the present embodiment increases.

According to the present embodiment, the outer peripheral recess 235 and the outer peripheral recess 236 are so formed as to include upper and lower portions of the portions corresponding to the valve seats 310 and the discharge valve seat 74. Accordingly, deformation of the valve seats 310 and the discharge valve seat 74 is more equalized than in a case where the outer peripheral recess 235 and the outer peripheral recess 236 are so formed as to include only either upper or lower portions of the portions corresponding to the valve seats 310 and the discharge valve seat 74. This configuration can reduce a difference between the upper and lower deformation of the valve seats 310 and the discharge valve seat 74, and reduce uneven wear of the valve member 40 and the discharge valve 75.

Thirteenth Embodiment

Figure 62:
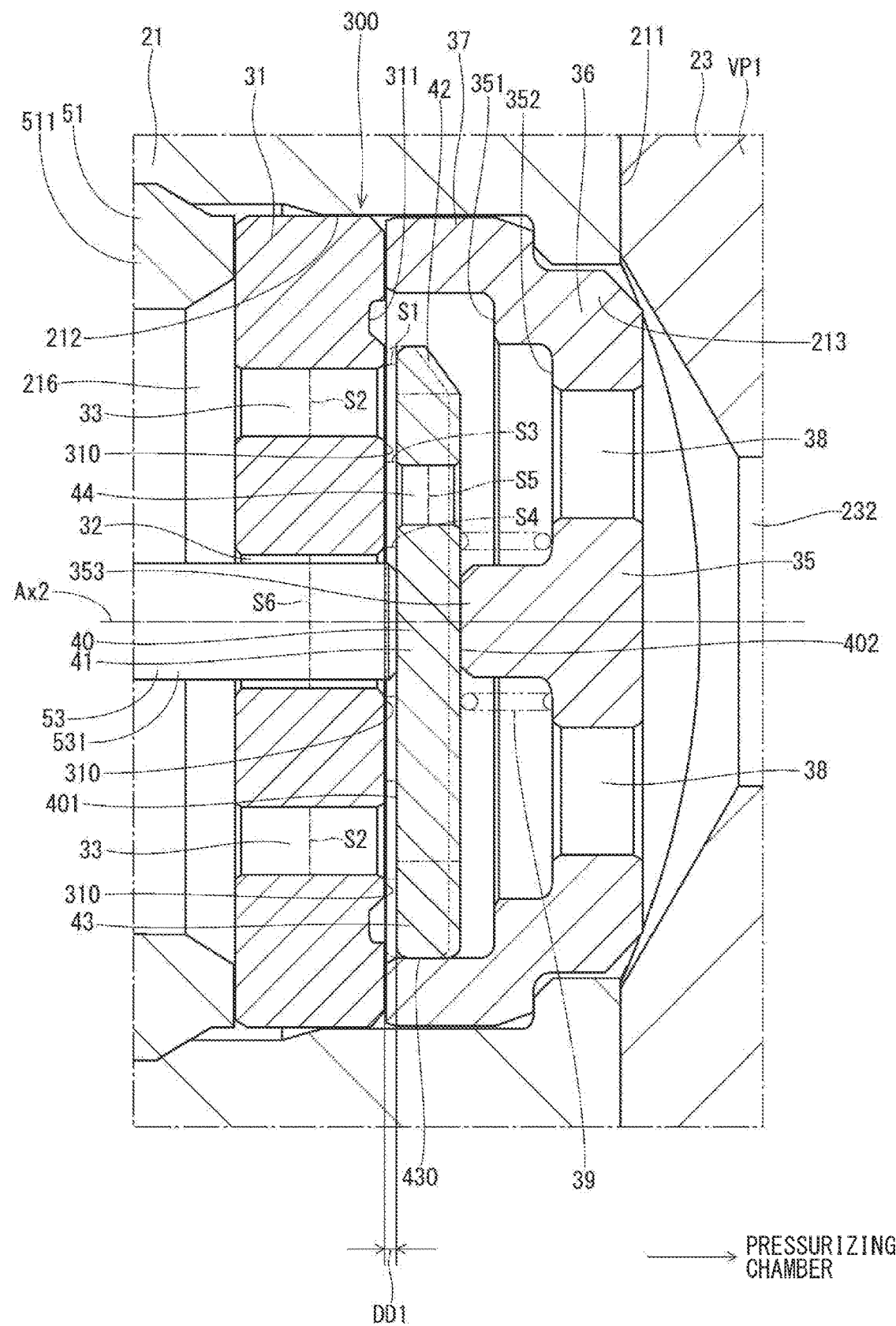
FIG. 62 is an enlarged cross-sectional view of a suction valve unit of a high-pressure pump according to a thirteenth embodiment.

<A-01> FIG. 62 shows a part of a high-pressure pump according to a thirteenth embodiment. The thirteenth embodiment is different from the first embodiment in the configuration of the stopper 35.

According to the present embodiment, an inner diameter of the stopper recess 351 is smaller than an outer diameter of the stopper large diameter portion 37 and an outer diameter of the stopper small diameter portion 36. Accordingly, a sufficient wall thickness of the stopper 35 on the pressurizing chamber 200 side can be secured for the bottom surface of the stopper recess 351.

Fourteenth Embodiment

Figure 63:
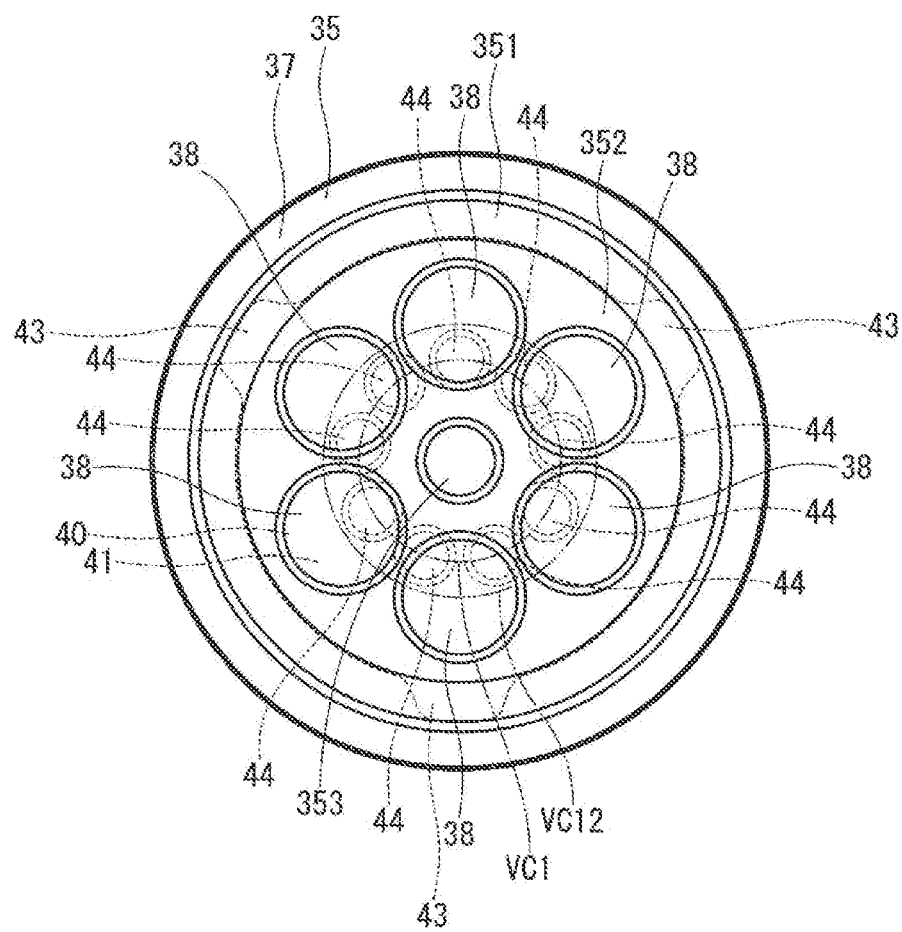
FIG. 63 is a schematic view of a stopper of a high-pressure pump according to a fourteenth embodiment.

<A-02> FIG. 63 shows a part of a high-pressure pump according to a fourteenth embodiment. The fourteenth embodiment is different from the first embodiment in the configuration of the stopper 35.

According to the present embodiment, the six communication holes 38 are formed in the stopper 35 at equal intervals in the circumferential direction. This configuration reduces fuel flow variations produced by a relative angle difference between the stopper 35, the valve member 40, and the seat member 31 during assembly or operation. Accordingly, a fuel flow into the communication holes 44 of the valve member 40 is stabilized, wherefore behaviors of the valve member 40 are stabilized.

Fifteenth Embodiment

Figure 64:
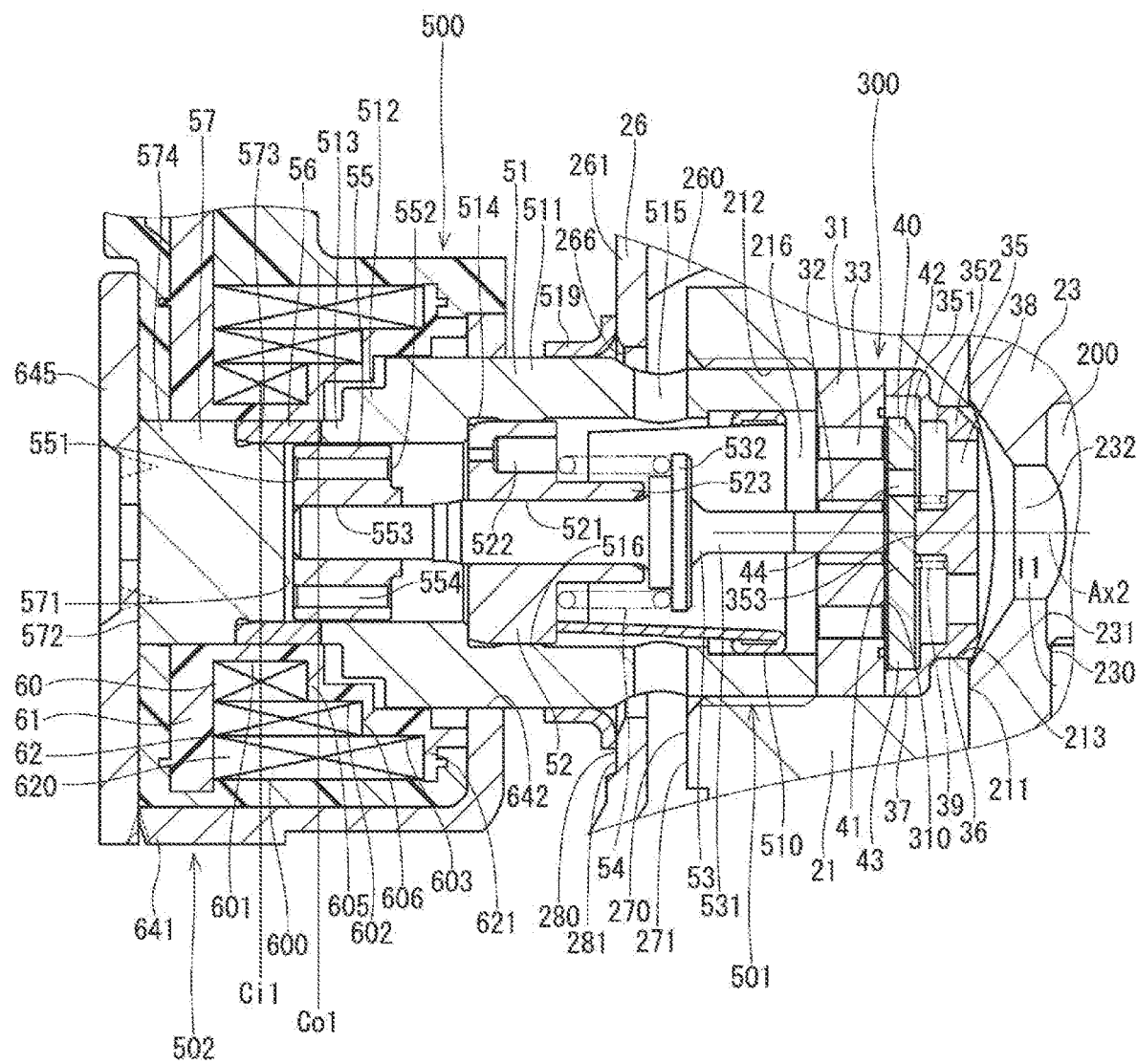
FIG. 64 is a cross-sectional view of a suction valve unit and an electromagnetic driving unit of a high-pressure pump according to a fifteenth embodiment.

<B-2> FIG. 64 shows a part of a high-pressure pump according to a fifteenth embodiment. The fifteenth embodiment is different from the first embodiment in the configuration of the coil 60.

According to the present embodiment, the coil 60 includes an outer cylindrical surface 600 that is one virtual surface in contact with an outer peripheral surface of the winding portion 62, and an inner cylindrical surface 601, an inner cylindrical surface 602, and inner cylindrical surface 603 which are virtual surfaces in contact with an inner peripheral surface of the winding portion 62. The inner cylindrical surfaces 601 to 603 have different diameters.

The outer cylindrical surface 600 has a substantially cylindrical shape. The inner cylindrical surface 601 has a substantially cylindrical shape, and is located inside a portion of the outer cylindrical surface 600 facing away from the pressurizing chamber 200. The inner cylindrical surface 602 has a substantially cylindrical shape, and is positioned between the pressurizing chamber 200 and the inner cylindrical surface 601 inside the outer cylindrical surface 600. The inner cylindrical surface 603 has a substantially cylindrical shape, and is positioned between the pressurizing chamber 200 and the inner cylindrical surface 602 inside a portion of the outer cylindrical surface 600 facing the pressurizing chamber 200.

A diameter of the inner cylindrical surface 602 is larger than a diameter of the inner cylindrical surface 601. A diameter of the inner cylindrical surface 603 is larger than a diameter of the inner cylindrical surface 602. The inner cylindrical surface 601, the inner cylindrical surface 602, and the inner cylindrical surface 603 are located on the outer peripheral wall of the spool 61. In other words, the inner cylindrical surfaces are arranged in order of increasing diameter in the direction toward the pressurizing chamber 200. The spool 61 has outer different diameters between a portion of the spool 61 facing the pressurizing chamber 200 and a portion of the spool 61 facing away from the pressurizing chamber 200 in the axial direction.

The coil 60 includes a connecting surface 605 which is a virtual surface connecting the inner cylindrical surface 601 and the inner cylindrical surface 602, and a connecting surface 606 which is a virtual surface connecting the inner cylindrical surface 602 and the inner cylindrical surface 603. The connecting surface 605 and the connecting surface 606 are located on the outer peripheral wall of the spool 61, and are formed such that at least a part of each of the connecting surfaces 605 and 606 is perpendicular to the axis of the spool 61. The wire 620 is wound around the outer peripheral wall of the spool 61, i.e., the wire 620 is wound starting from the inner cylindrical surface 601 radially outward the inner cylindrical surface 601, the inner cylindrical surface 603, the connecting surface 605, and the connecting surface 606 to constitute the winding portion 62 having a cylindrical shape.

According to the present embodiment, during non-energization of the coil 60, the end surface 551 of the movable core 55 facing away from the pressurizing chamber 200 side, i.e., the end surface 551 facing the fixed core 57 is located between the center Ci1 of the inner cylindrical surface 601 in the axial direction, which is an inner cylindrical surface having the smallest diameter, and the center Co1 of the outer cylindrical surface 600 in the axial direction. In addition, the end surface 552 of the movable core 55 facing the pressurizing chamber 200 located between the fixed core 57 and the end surface 621 of the winding portion 62 facing the pressurizing chamber 200.

According to the present embodiment, the end of the first cylindrical portion 511 facing the second columnar portion 512 of the cylindrical member 51 is located inside the inner cylindrical surface 603. The second columnar portion 512 is located inside the connecting surface 606. The third cylindrical portion 513 is located inside the inner cylindrical surface 602.

Advantageous effects similar to those of the first embodiment can be offered by the fifteenth embodiment. In the fifteenth embodiment, the number of times in winding the wire 620 is allowed to increase without increasing the diameter of the outer cylindrical surface 600 from the corresponding diameter of the first embodiment.

Sixteenth Embodiment

Figure 65:
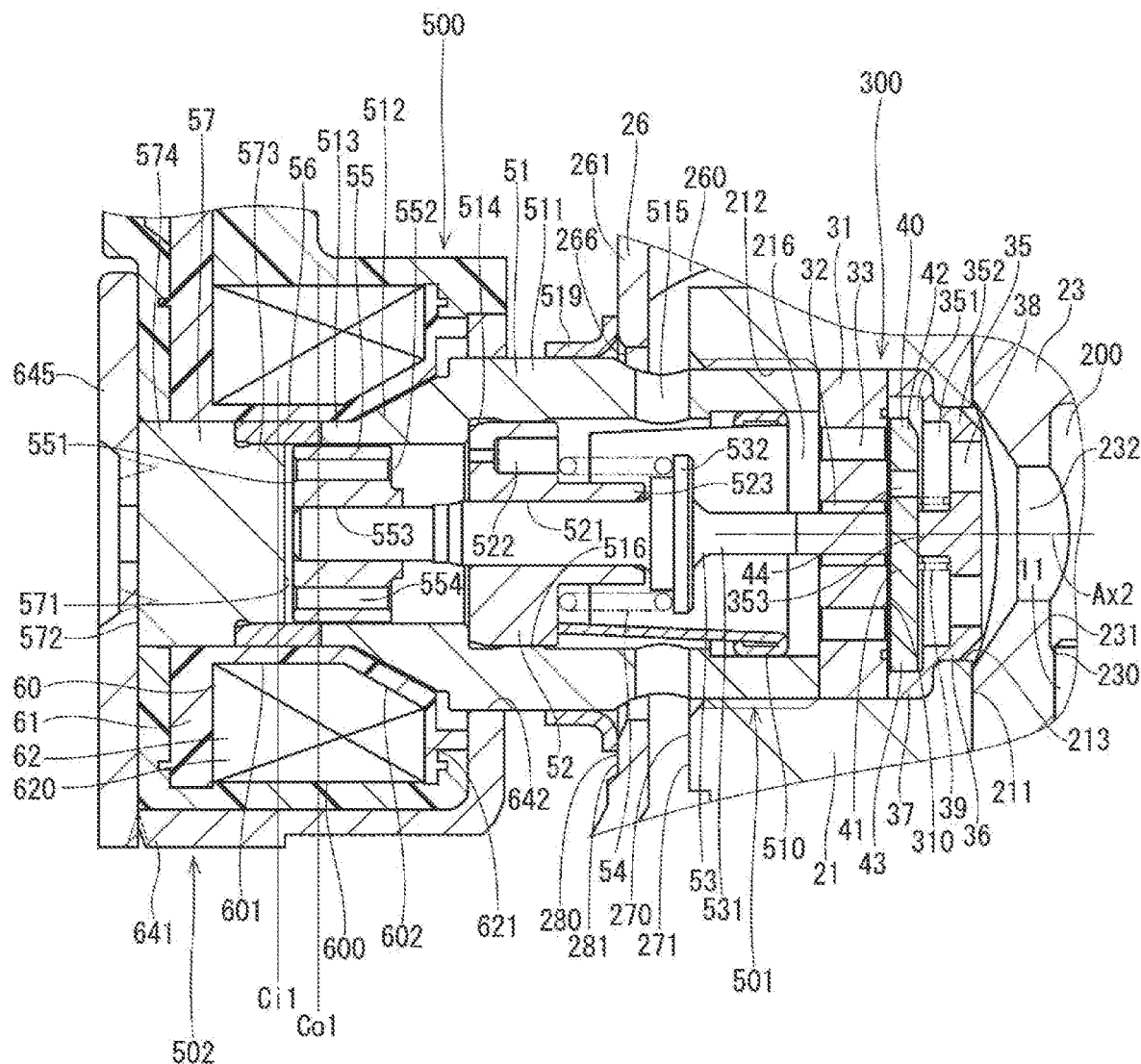
FIG. 65 is a cross-sectional view of a suction valve unit and an electromagnetic driving unit of a high-pressure pump according to a sixteenth embodiment.

<B-3> FIG. 65 shows a part of a high-pressure pump according to a sixteenth embodiment. The sixteenth embodiment is different from the tenth embodiment in the configuration of the coil 60.

According to the present embodiment, the coil 60 does not have the connecting surface 605 shown in the first embodiment. The end of the inner cylindrical surface 601 facing the pressurizing chamber 200 s and the end of the inner cylindrical surface 602 facing away from the pressurizing chamber 200 are connected to each other.

The inner cylindrical surface 602 has a tapered shape formed such that the whole part of the inner cylindrical surface 602 tapers toward the axis of the spool 61 in the direction away from the pressurizing chamber 200. Accordingly, the diameter of the inner cylindrical surface 602 increases in the direction toward the pressurizing chamber 200.

The inner cylindrical surface 601 and the inner cylindrical surface 602 are located on the outer peripheral wall of the spool 61.

The wire 620 are wound around the outer peripheral wall of the spool 61, i.e., the wire 620 are wound starting from the inner cylindrical surface 601 radially outward the inner cylindrical surface 602 to constitute the winding portion 62 having a cylindrical shape.

According to the present embodiment, during non-energization of the coil 60, the end surface 551 of the movable core 55 facing away from the pressurizing chamber 200, i.e., the end surface 551 of the movable core 55 facing the fixed core 57 is located between the center Ci1 of the inner cylindrical surface 601 in the axial direction, which is an inner cylindrical surface having the smallest diameter, and the center Co1 of the outer cylindrical surface 600 in the axial direction. In addition, the end surface 552 of the movable core 55 facing the pressurizing chamber 200 is located between the fixed core 57 and the end surface 621 of the winding portion 62 facing the pressurizing chamber 200.

According to the present embodiment, the portion of the second columnar portion 512 facing the third cylindrical portion 513 is located inside the inner cylindrical surface 602. The third cylindrical portion 513 is located inside the connecting portion between the inner cylindrical surface 601 and the inner cylindrical surface 602. The outer peripheral wall of the portion of the second columnar portion 512 facing the third cylindrical portion 513 has a tapering shape that tapers toward the axis of the second columnar portion 512 in the direction away from the pressurizing chamber 200.

Advantageous effects similar to those of the first embodiment can be offered by the sixteenth embodiment. In the sixteenth embodiment, the number of times in winding the wire 620 is allowed to increase without increasing the diameter of the outer cylindrical surface 600 from the corresponding diameter of the first and fifteenth embodiments.

Seventeenth Embodiment

Figure 66:
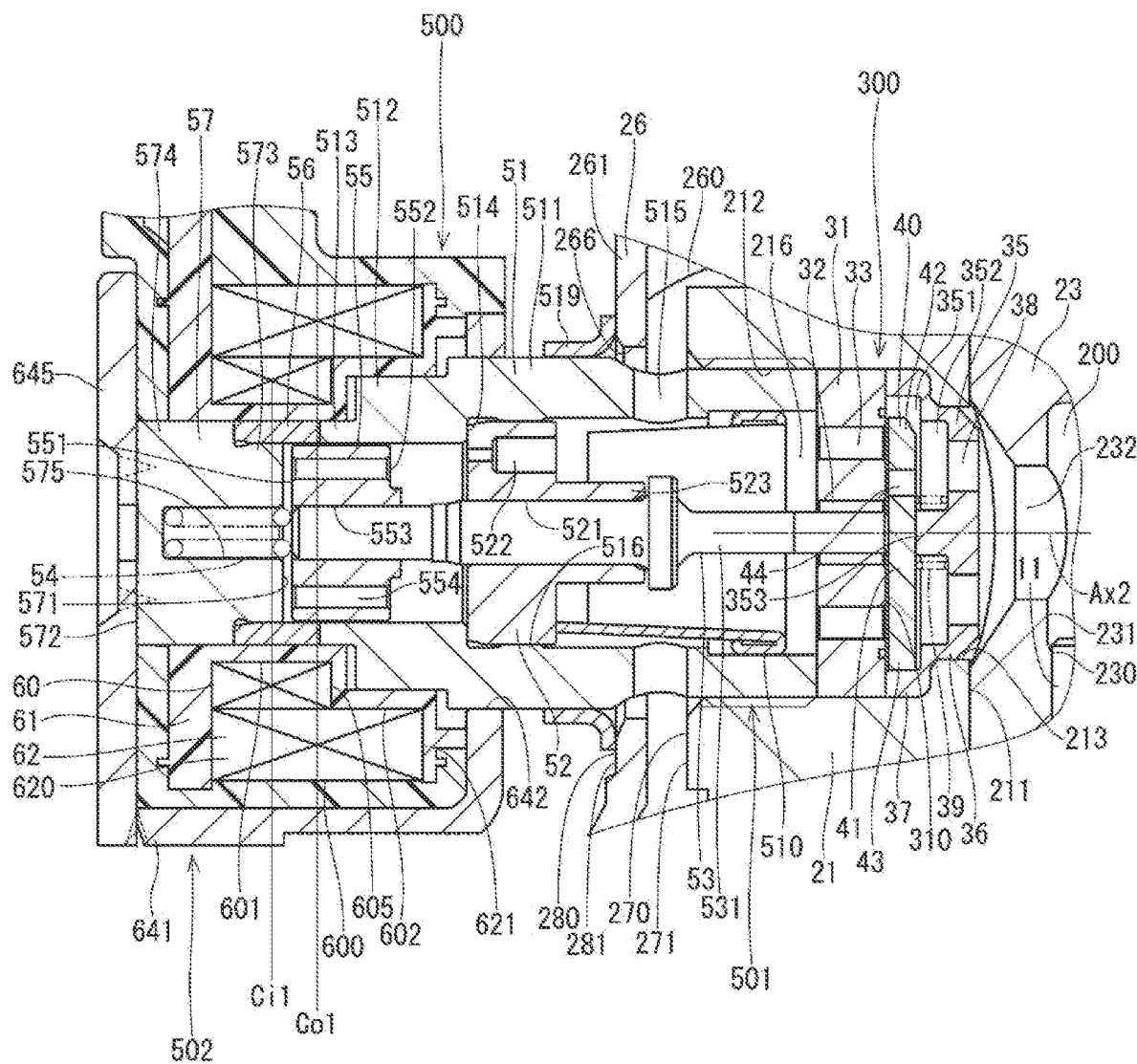
FIG. 66 is a cross-sectional view of a suction valve unit and an electromagnetic driving unit of a high-pressure pump according to a seventeenth embodiment.

<B-4> FIG. 66 shows a part of a high-pressure pump according to a seventeenth embodiment. The seventeenth embodiment is different from the first embodiment in the configuration and the like of the fixed core 57.

According to the present embodiment, the fixed core 57 has a fixed core hole portion 575. The fixed core hole portion 575 has a substantially cylindrical shape which extends from the center of the end surface 571 of the fixed core 57 on the pressurizing chamber 200 side to the side opposite to the pressurizing chamber 200. The fixed core hole portion 575 is substantially coaxial with the fixed core small diameter portion 573 and the fixed core large diameter portion 574.

The needle 53 does not have the stopping portion 532 shown in the first embodiment. The spring 54 is provided in the fixed core hole portion 575. One end of the spring 54 is in contact with the bottom surface of the fixed core hole portion 575, while the other end is in contact with the end surface of the needle body 531 on the side opposite to the pressurizing chamber 200. In other words, the bottom surface of the fixed core hole portion 575 stops the one end of the spring 54. The spring 54 urges the needle 53 toward the pressurizing chamber 200. According to the present embodiment, the stopping portion 532 of the needle 53 for stopping the end of the spring 54 is unnecessary. In this case, the weight of the needle 53 can be reduced. Accordingly, NV can be reduced.

Eighteenth Embodiment

Figure 67:
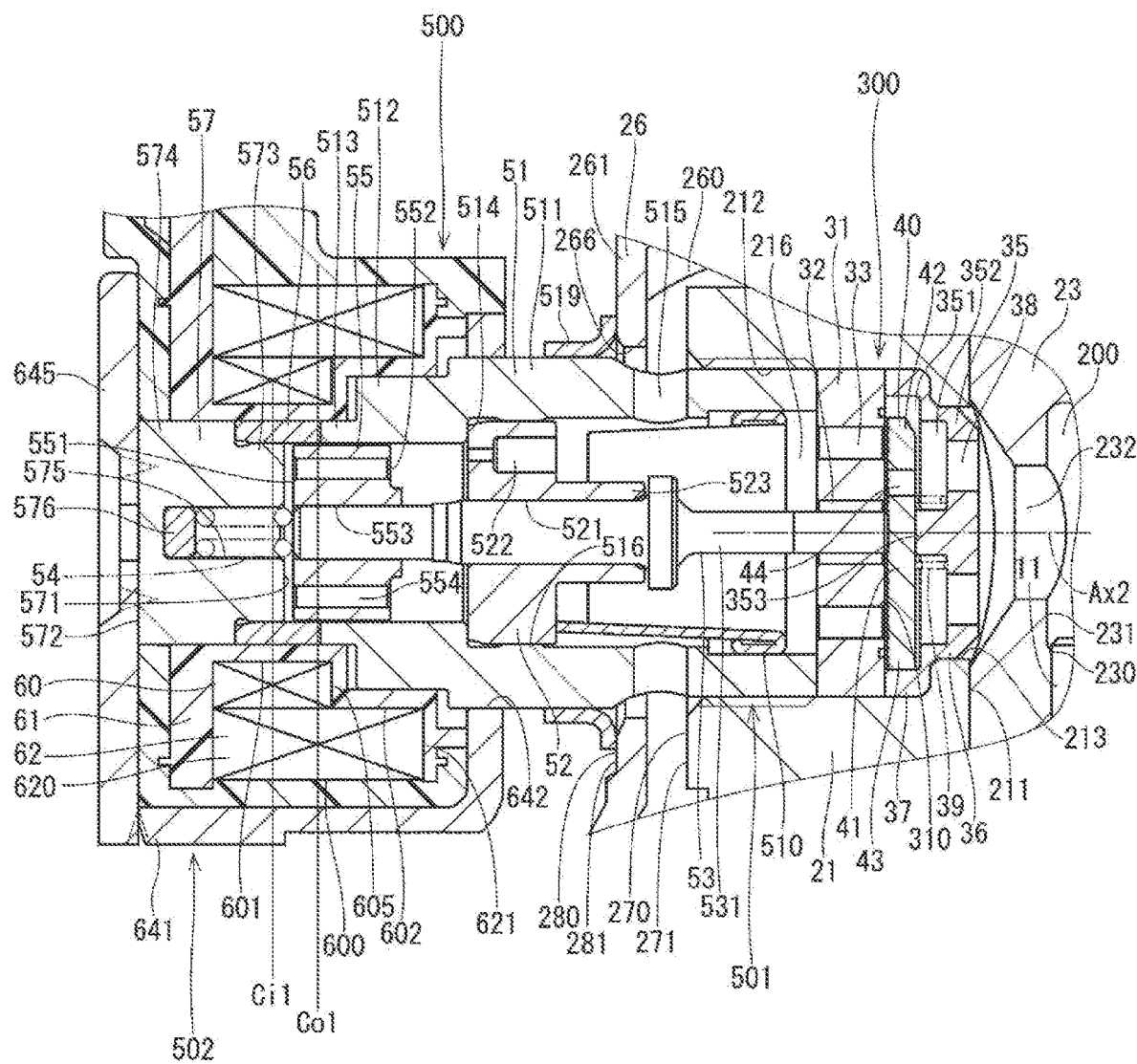
FIG. 67 is a cross-sectional view of a suction valve unit and an electromagnetic driving unit of a high-pressure pump according to an eighteenth embodiment.

<B-5> FIG. 67 shows a part of a high-pressure pump according to an eighteenth embodiment. The eighteenth embodiment is different from the seventeenth embodiment in the configuration in the vicinity of the spring 54.

According to the present embodiment, a stopping member 576 is further provided. The stopping member 576 has a substantially cylindrical shape, and is made of a material having hardness higher than that of the fixed core 57. The hardness of the stopping member 576 is set in a range from HRc 56 to HRc 64, for example.

An outer diameter of the stopping member 576 is slightly smaller than an inner diameter of the fixed core hole portion 575. The stopping member 576 is provided substantially coaxially with the fixed core hole portion 575 such that one end surface of the stopping member 576 is in contact with the bottom surface of the fixed core hole portion 575. One end of the spring 54 is in contact with the other end surface of the stopping member 576. Accordingly, the stopping member 576 stops the one end of the spring 54.

A pressure on the pressurizing chamber 200 side of the fixed core hole portion 575 varies in accordance with reciprocating movement of the movable core 55 and the needle 53 or the like. These pressure variations are transmitted with a delay to the end of the fixed core hole portion 575 on the side opposite to the pressurizing chamber 200. Accordingly, cavitation is likely to occur at the end of the fixed core hole portion 575 on the side opposite to the pressurizing chamber 200.

According to the present embodiment, the stopping member 576 is provided on the bottom surface of the fixed core hole portion 575. This configuration reduces erosion of the bottom surface of the fixed core hole portion 575 and surroundings of the bottom surface as a result of cavitation erosion by using the stopping member 576 even when cavitation occurs at the end of the fixed core hole portion 575 on the side opposite to the pressurizing chamber 200.

Nineteenth Embodiment

Figure 68:
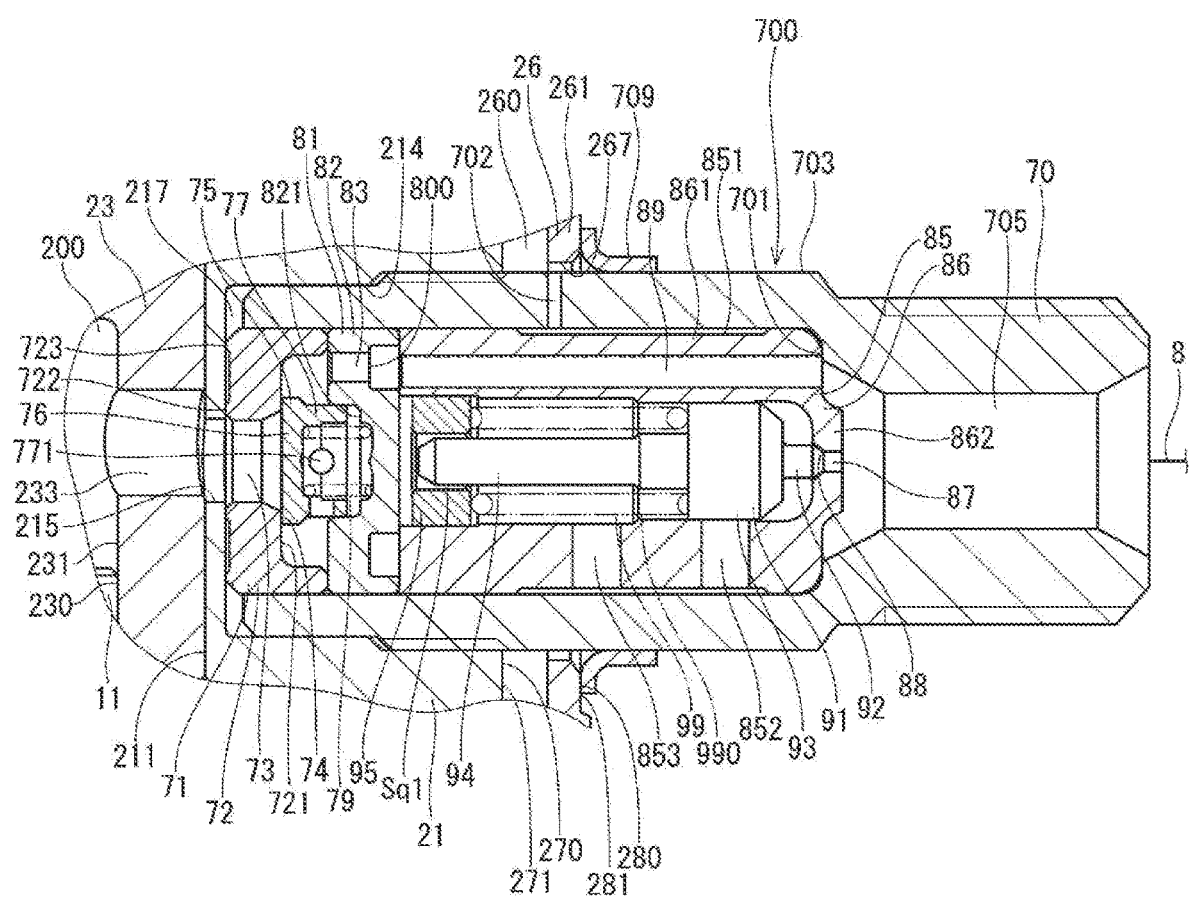
FIG. 68 is a cross-sectional view of a discharge passage portion of a high-pressure pump according to a nineteenth embodiment.

<C-01> FIG. 68 shows a part of a high-pressure pump according to a nineteenth embodiment. The nineteenth embodiment is different from the first embodiment in the configuration of the discharge joint 70.

According to the present embodiment, the flow path area of the lateral hole portion 702 is smaller than the flow path area of the relief hole 87 in a full-open state of the relief valve 91. More specifically, according to the present embodiment, the flow path area of the lateral hole portion 702 on the downstream side with respect to the relief lateral hole 852 functioning as a variable orifice is smaller than the flow path area of the relief hole 87 on the upstream side with respect to the relief lateral hole 852. This configuration can reduce an excessive fuel flow in the direction from the high-pressure fuel pipe 8 toward the fuel chamber 260 when the pressure of the fuel on the high-pressure fuel pipe 8 side becomes an abnormal value. Accordingly, this configuration reduces a pressure spike produced on the fuel chamber 260 side as a low-pressure side. Moreover, this configuration reduces instability of behaviors of the relief valve 91.

For reducing the flow path area on the downstream side of the relief lateral hole 852 functioning as a variable orifice, various methods such as a method of decreasing the depth of the relief outer peripheral recess 851, and a method of providing an orifice member in the relief lateral hole 852 may be adopted as well as reduction of the inner diameter of the lateral hole portion 702 described above.

Twentieth Embodiment

Figure 69:
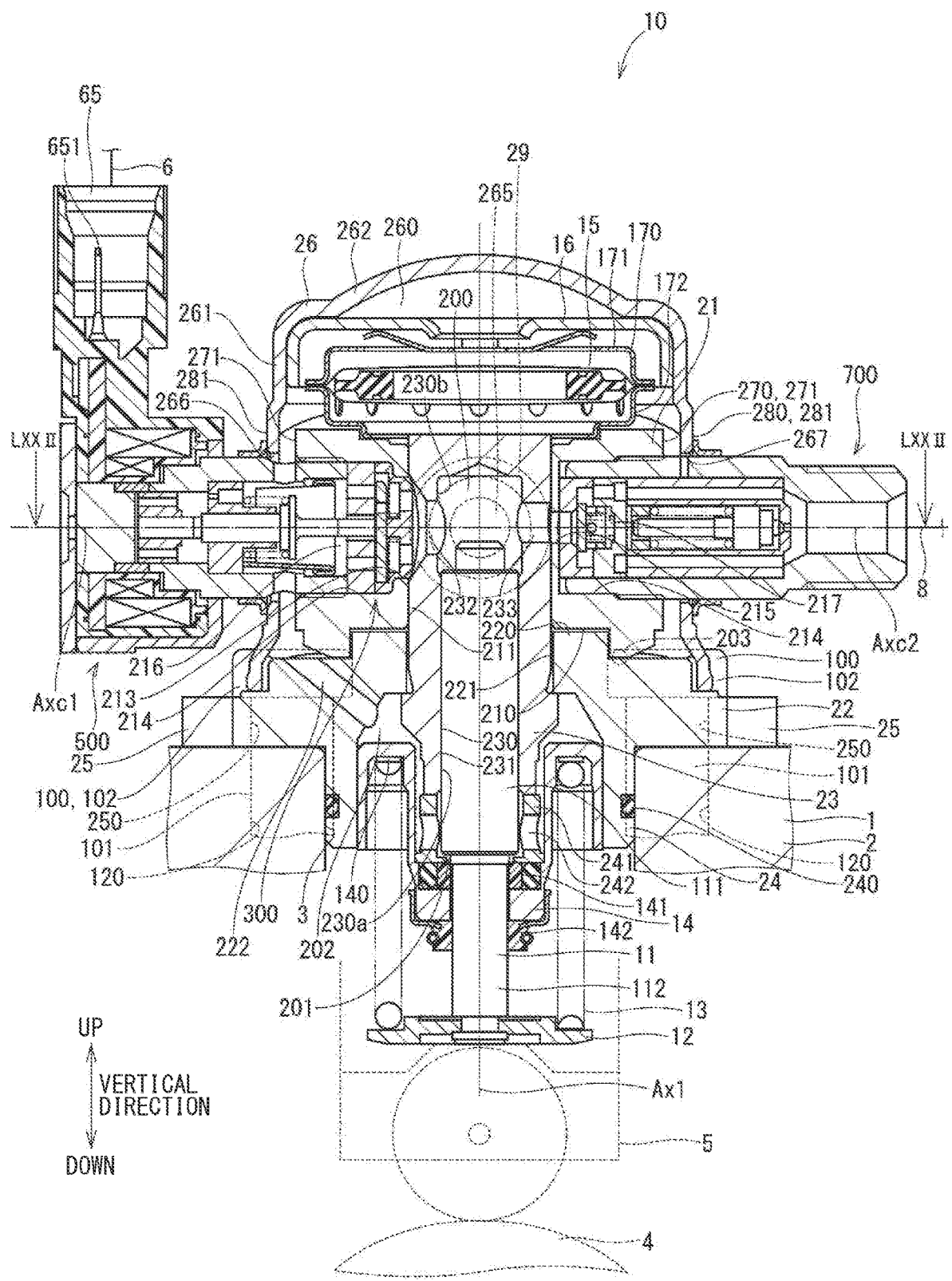
FIG. 69 is a cross-sectional view of a high-pressure pump according to a twentieth embodiment.

<D-1> FIG. 69 shows a high-pressure pump according to a twentieth embodiment. The twentieth embodiment is different from the first embodiment in the arrangement of the supply passage portion 29, the electromagnetic driving unit 500, and the discharge passage portion 700, and other points.

Figure 72:
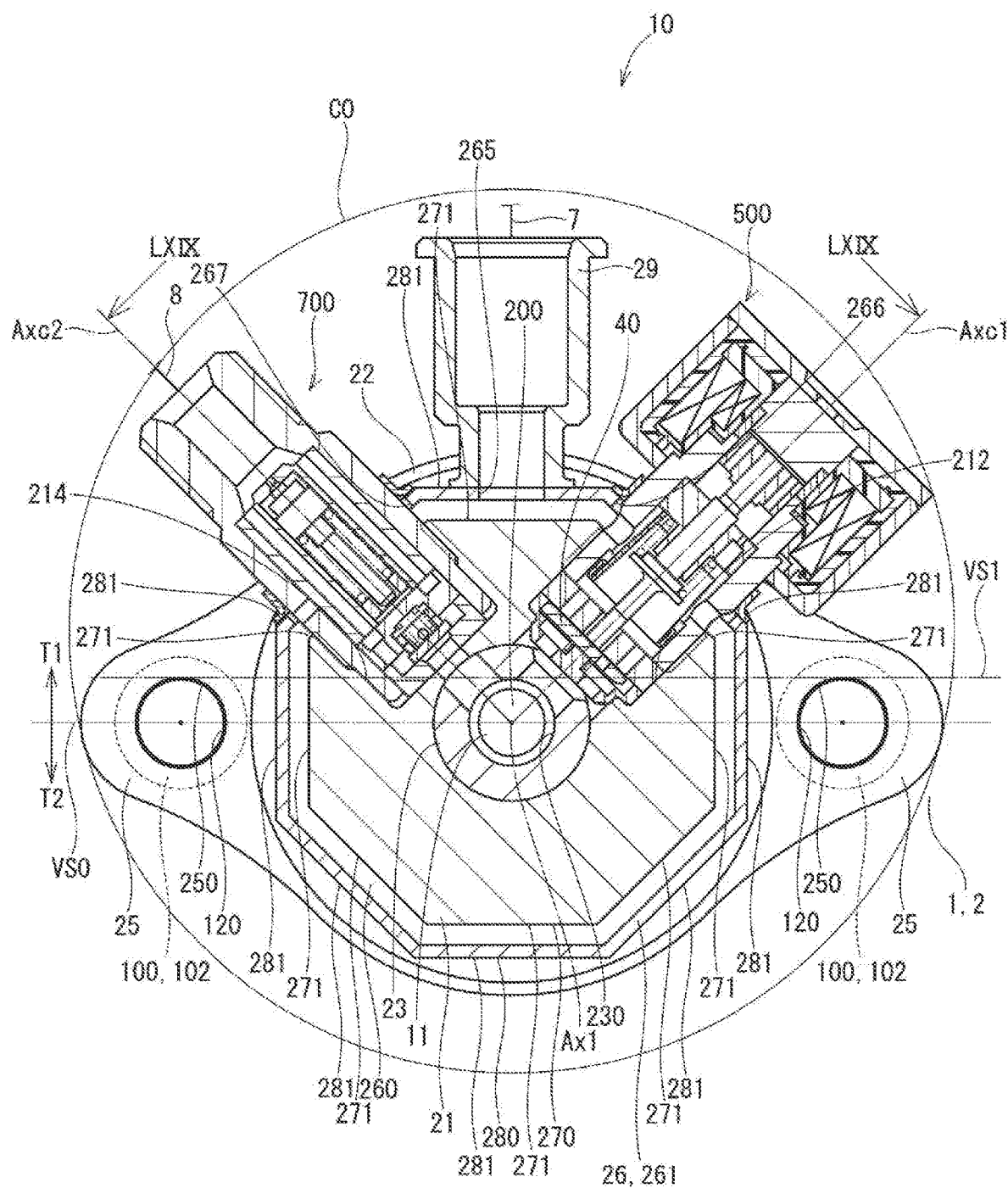
FIG. 72 is a cross-sectional view taken along a line LXXII-LXXII in FIG. 69.

According to the present embodiment, the axes of the suction hole portion 212 and the suction hole portion 213 are orthogonal to the axes of the discharge hole portion 214 and the discharge hole portion 215 (see FIG. 72). The axis of the suction hole 232 and the axis of the discharge hole 233 are orthogonal to the axis Ax1 of the cylindrical inner peripheral wall 230 of the cylinder hole portion 231. The axis of the suction hole 232 and the axis of the discharge hole 233 are orthogonal to each other.

Each of the cover hole portion 265, the cover hole portion 266, and the cover hole portion 267 has a substantially cylindrical shape which connects the inner peripheral wall of the cover columnar portion 261 and the outer peripheral wall, i.e., the flat portion 281 of the cover outer peripheral wall 280.

The cover hole portion 265 is formed in the flat portion 281 between the flat portion 281 including the cover hole portion 266 and the flat portion 281 including the cover hole portion 267. In other words, the cover hole portion 266, the cover hole portion 265, and the cover hole portion 267 are disposed in the cover 26 in this order in the cover outer peripheral wall 280 in the circumferential direction (see FIG. 72).

According to the present embodiment, one end of the supply passage portion 29 is connected to the outer wall around the cover hole portion 265 of the cover columnar portion 261, i.e., the flat portion 281 of the cover outer peripheral wall 280. The supply passage portion 29 is disposed such that a space inside the supply passage portion 29 is in communication with the fuel chamber 260 via the cover hole portion 265. The supply passage portion 29 and the flat portion 281 of the cover outer peripheral wall 280 herein are welded to each other in the entire area of the supply passage portion 29 in the circumferential direction of the supply passage portion 29. The supply fuel pipe 7 is connected to the other end of the supply passage portion 29. Accordingly, fuel discharged from the fuel pump flows into the fuel chamber 260 via the supply fuel pipe 7 and the supply passage portion 29.

Next, the cylinder 23 of the present embodiment will be more specifically described.

Figure 70:
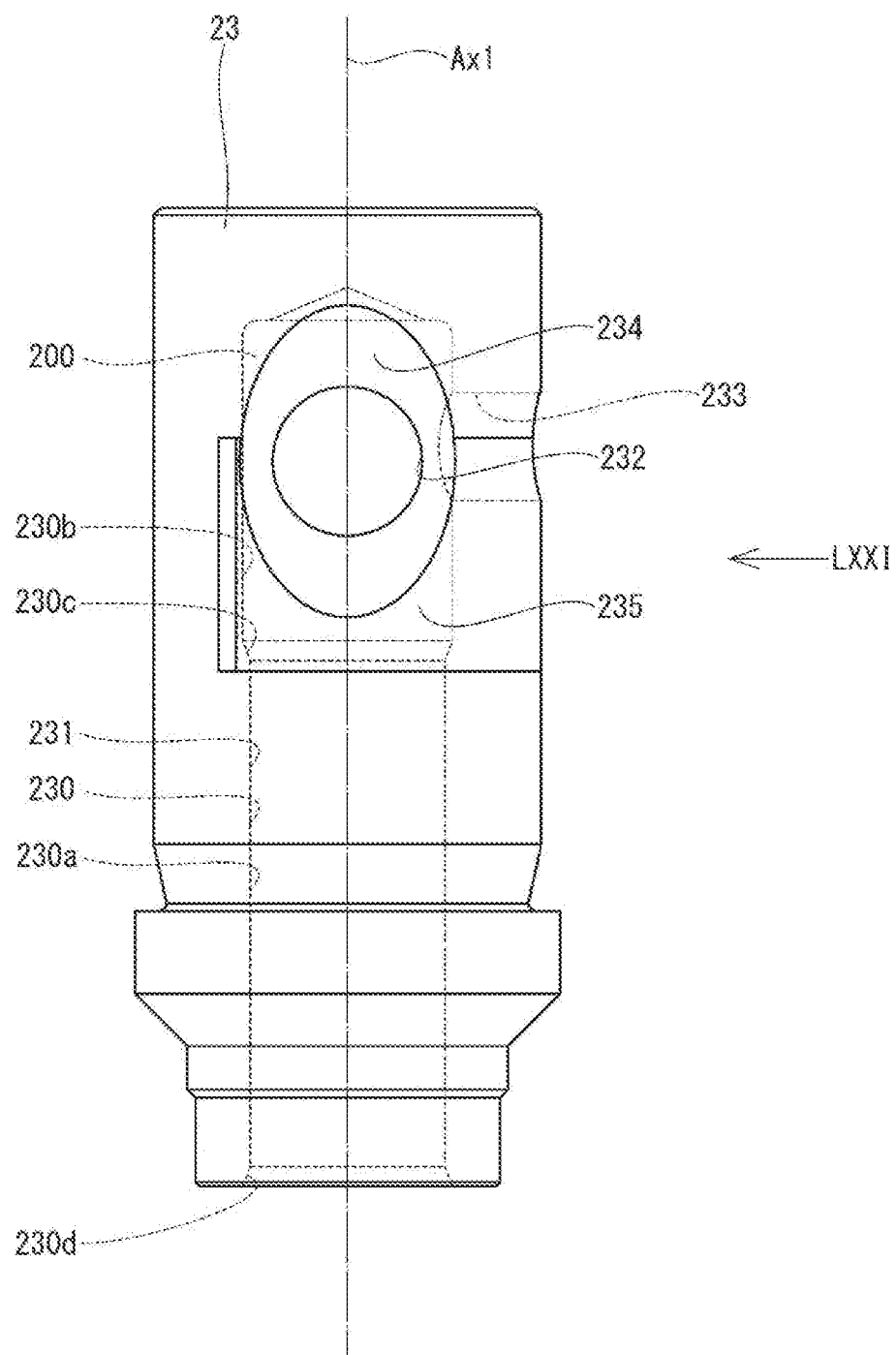
FIG. 70 is a front view of a cylinder of the high-pressure pump according to the twentieth embodiment.
Figure 71:
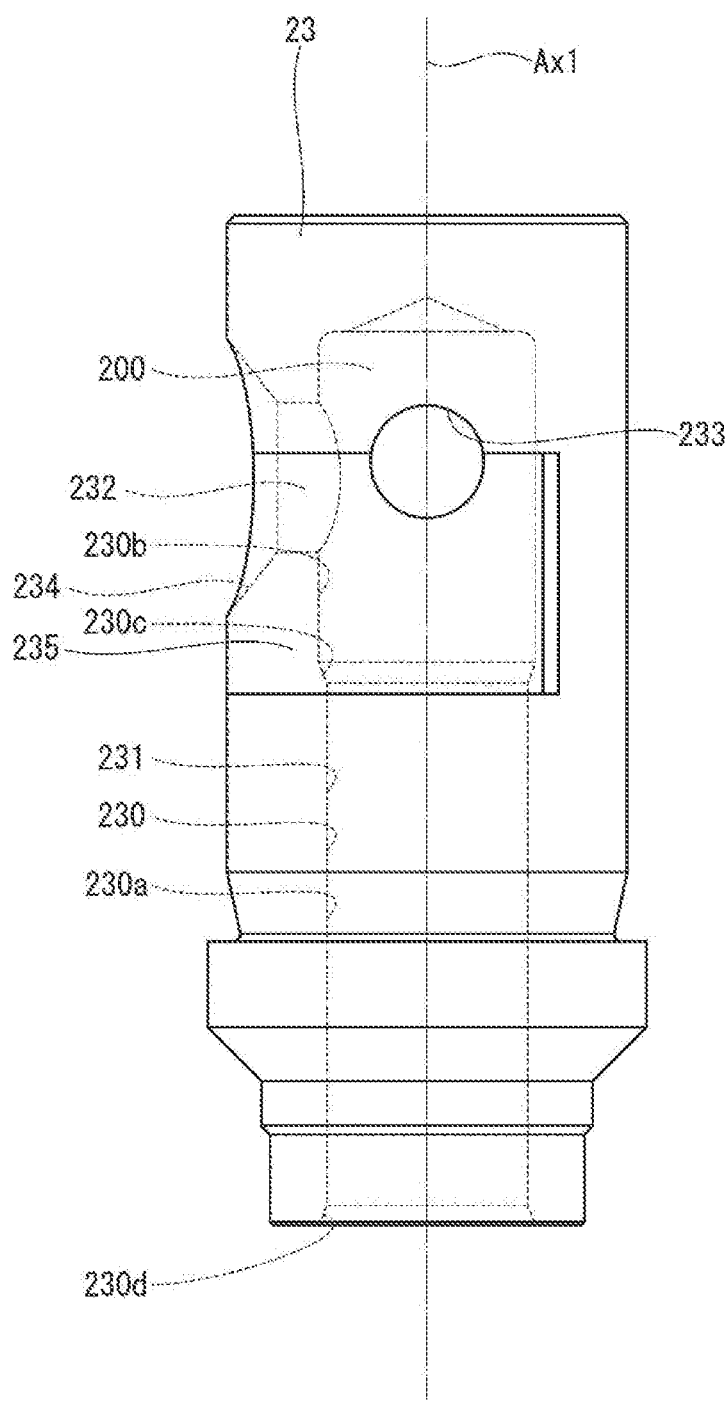
FIG. 71 is a view of FIG. 70 as viewed in a direction of an arrow LXXI.

As shown in FIGS. 70 and 71, the cylinder 23 has the tapered surface 234 and the outer peripheral recess 235.

The tapered surface 234 is formed at the end of the suction hole 232 facing away from the pressurizing chamber 200. The tapered surface 234 tapers away from the axis of the suction hole 232 in the direction away from the pressurizing chamber 200 side.

The outer peripheral recess 235 is recessed radially inward at a predetermined depth from the outer peripheral wall of the cylinder 23. The outer peripheral recess 235 is formed in a range including all of the suction hole 232, i.e., the tapered surface 234 and the discharge hole 233 in the circumferential direction of the cylinder 23 (see FIGS. 70 and 71). The outer peripheral recess 235 is formed in a range from a position slightly on the bottom portion side of the cylinder 23 with respect to the axis of the suction hole 232 to a position away from the lower end of the tapered surface 234 toward the side opposite to the bottom portion of the cylinder 23 by a predetermined distance in the axial direction of the cylinder 23 as viewed in the axial direction of the suction hole 232 (FIG. 70). The outer peripheral recess 235 is formed in a range from a position slightly on the bottom portion side of the cylinder 23 with respect to the axis of the discharge hole 233 to a position away from the lower end of the discharge hole 233 toward the side opposite to the bottom portion of the cylinder 23 by a predetermined distance in the axial direction of the cylinder 23 as viewed in the axial direction of the discharge hole 233 (see FIG. 71). At least a part of the outer peripheral recess 235 is formed in a range overlapping with the sliding surface 230a in a lower portion of the cylinder 23 in the axial direction as viewed in the axial direction of the suction hole 232 or the discharge hole 233 (see FIGS. 70 and 71).

The outer peripheral recess 235 is formed in a range leaving a portion fitted to the upper housing 21, i.e., a shrink fitting portion, in an axially upper portion of the cylinder 23 as viewed in the axial direction of the suction hole 232 or the discharge hole 233 (see FIGS. 70 and 71).

As described above, when the cylindrical member 51 of the electromagnetic driving unit 500 is screwed into the suction hole portion 212 of the upper housing 21, an axial force in a direction from the step surface between the stopper small diameter portion 36 and the stopper large diameter portion 37 toward the pressurizing chamber 200 acts on the stepped surface between the suction hole portion 213 and the suction hole portion 212. Accordingly, the inner peripheral wall of the hole portion 211 of the upper housing 21 may be slightly deformed radially inward around the suction hole portion 213. According to the present embodiment, however, the outer peripheral recess 235 is formed at a position corresponding to the suction hole portion 213 of the outer peripheral wall of the cylinder 23. Accordingly, a surface pressure generated by the deformation and acting on the outer peripheral wall of the cylinder 23 can be reduced even when the inner peripheral wall of the hole portion 211 of the upper housing 21 is deformed radially inward. In this manner, radially inward deformation of the cylindrical inner peripheral wall 230 of the cylinder hole portion 231 can be reduced. Accordingly, a constant clearance between the cylindrical inner peripheral wall 230 and the outer peripheral wall of the plunger 11 can be maintained, wherefore uneven wear and seizure between the cylindrical inner peripheral wall 230 and the outer peripheral wall of the plunger 11 can be reduced.

When the discharge joint 70 of the discharge passage portion 700 is screwed into the discharge hole portion 214 of the upper housing 21, an axial force generated from the inner projection 722 and the outer projection 723 toward the pressurizing chamber 200 acts on the periphery of the discharge hole portion 215 in the bottom surface of the discharge hole portion 214. Accordingly, the inner peripheral wall of the hole portion 211 of the upper housing 21 may be slightly deformed radially inward around the discharge hole portion 215. According to the present embodiment, however, the outer peripheral recess 235 is formed at a position corresponding to the discharge hole portion 215 of the outer peripheral wall of the cylinder 23. Accordingly, a surface pressure generated by the deformation and acting on the outer peripheral wall of the cylinder 23 can be reduced even when the inner peripheral wall of the hole portion 211 of the upper housing 21 is deformed radially inward. In this manner, radially inward deformation of the cylindrical inner peripheral wall 230 of the cylinder hole portion 231 can be reduced. Accordingly, a constant clearance between the cylindrical inner peripheral wall 230 and the outer peripheral wall of the plunger 11 can be maintained, wherefore uneven wear and seizure between the cylindrical inner peripheral wall 230 and the outer peripheral wall of the plunger 11 can be reduced.

Furthermore, the inner peripheral wall of the hole portion 211 of the upper housing 21 is deformed radially inward as an effect of the axial force described above. Accordingly, an increase in the pressure of the pressurizing chamber 200 can be easily handled by a rise of a surface pressure generated at the boundary of the outer peripheral recess 235 of the cylinder 23.

Next described will be an arrangement of the electromagnetic driving unit 500 and the discharge passage portion 700, and other points.

As shown in FIG. 72, two bolt holes 250 are arranged radially outside the housing outer peripheral wall 270 at equal intervals in the circumferential direction as viewed in the direction of the axis Ax1 of the cylindrical inner peripheral wall 230. Accordingly, an angle defined between straight lines the axis Ax1 of the cylindrical inner peripheral wall 230 and the respective axes of the two bolt holes 250 is 180 degrees. The bolt holes 250 are formed such that respective axes of the bolt holes 250 are substantially parallel to the axis Ax1 of the cylindrical inner peripheral wall 230 of the cylinder 23.

The electromagnetic driving unit 500 protrudes radially outward from the housing outer peripheral wall 270. The discharge passage portion 700 protrudes radially outward from the housing outer peripheral wall 270. The supply passage portion 29 protrudes from the cover 26 toward the radially outside of the housing outer peripheral wall 270.

When the high-pressure pump 10 is divided into the first region T1 and the second region T2 by a virtual surface VS0 on which the axes of two adjacent bolt holes 250 and the axis Ax1 of the cylindrical inner peripheral wall 230, the electromagnetic driving unit 500, the supply passage portion 29, and the discharge passage portion 700 are all located in the first region T1. The virtual surface VS0 has a planar shape.

According to the present embodiment, the axis of the supply passage portion 29 is orthogonal to the virtual surface VS0. The angle formed by the center axis Axc1 of the electromagnetic driving unit 500 and the center axis Axc2 of the discharge passage portion 700 is approximately 90 degrees. The angle formed by the virtual surface VS0 and the center axis Axc1 of the electromagnetic driving unit 500 and the center axis Axc2 of the discharge passage portion 700 is approximately 45 degrees.

The supply passage portion 29 is located in a range within 180 degrees from the electromagnetic driving unit 500 toward the discharge passage portion 700, or within 180 degrees from the discharge passage portion 700 toward the electromagnetic driving unit 500 in the circumferential direction of the housing outer peripheral wall 270.

The flat portions 271 of the housing outer peripheral wall 270 are formed three in the first region T1. More specifically, the three flat portions 271 are formed in the first region T1. Each of the electromagnetic driving unit 500, the discharge passage portion 700, and the supply passage portion 29 is disposed in the corresponding one of the flat portions 271. The flat portions 271 are also formed three in the second region T2.

According to the present embodiment, it is also considered that the three flat portions 271 that do not intersect a plane VS1 that is parallel to the virtual surface VS0 and that tangent to the two bolt holes 250 are located in the first region T1. Each of the electromagnetic driving unit 500, the discharge passage portion 700, and the supply passage portion 29 is disposed at the corresponding one of the flat portions 271 (see FIG. 72).

According to the present embodiment, it is also considered that the three flat portions 271 are formed between the two flat portions 271 each of which faces a corresponding one of the two bolt holes 250. Each of the electromagnetic driving unit 500, the discharge passage portion 700, and the supply passage portion 29 is disposed at the corresponding one of the flat portions 271 (see FIG. 72).

According to the present embodiment, as described above, the electromagnetic driving unit 500, the discharge passage portion 700, and the supply passage portion 29 are collectively disposed in the first region T1 which is a specific location in the circumferential direction of the upper housing 21. In this case, the bolt holes 250, the electromagnetic driving unit 500, and the discharge passage portion 700 do not overlap with each other as viewed in the direction of the axis Ax1 of the cylindrical inner peripheral wall 230.

Figure 73:
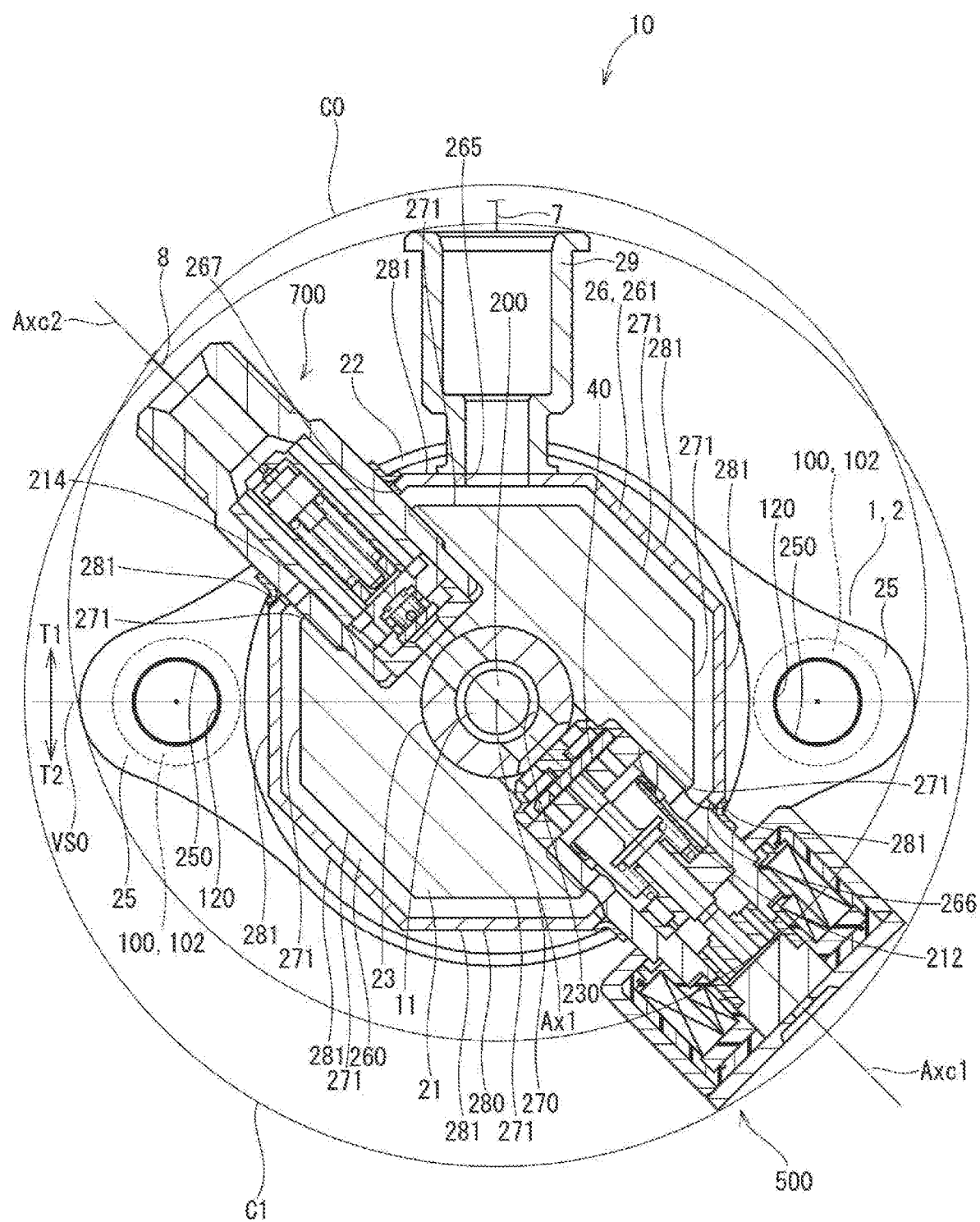
FIG. 73 is a cross-sectional view of a high-pressure pump according to a comparative example.

FIG. 73 shows the high-pressure pump 10 according to a comparative example. The high-pressure pump 10 according to the comparative example is different from the twentieth embodiment in the arrangement of the electromagnetic driving unit 500. According to the high-pressure pump 10 of the comparative example, the electromagnetic driving unit 500 is provided on the upper housing 21 at a position coaxial with the discharge passage portion 700. In this case, the center axis Axc1 of the electromagnetic driving unit 500 and the center axis Axc2 of the discharge passage portion 700 are aligned with each other. Accordingly, the discharge passage portion 700 is located in the first region T1, while the electromagnetic driving unit 500 is located in the second region T2.

According to the high-pressure pump 10 of the comparative example, the electromagnetic driving unit 500, the discharge passage portion 700, and the supply passage portion 29 are not collectively disposed at a specific location in the circumferential direction of the upper housing 21. Accordingly, a circle C1 which includes the entire high-pressure pump 10 of the comparative example is larger than a circle C0 which includes the entire high-pressure pump 10 of the twentieth embodiment as viewed in the direction of the axis Ax1 of the cylindrical inner peripheral wall 230 (see FIGS. 72, 73). Assuming that the diameter of the circle C0 is 1, the diameter of the circle C1 is approximately 1.1. It is therefore understood that the high-pressure pump 10 of the twentieth embodiment is smaller in size than the high-pressure pump 10 of the comparative example.

Attachment of the high-pressure pump 10 to the engine 1 will be next described.

According to the present embodiment, the high-pressure pump 10 is attached to the engine 1 such that the holder supporter 24 is inserted into the attachment hole portion 3 of the engine head 2 (see FIG. 69). The high-pressure pump 10 is fixed to the engine 1 by fixation of the fixed portion 25 to the engine head 2 using the bolts 100. The high-pressure pump 10 herein is attached to the engine 1 in such a posture that the axis Ax1 of the cylindrical inner peripheral wall 230 of the cylinder 23 extends in the vertical direction.

For example, the high-pressure pump 10 is attached to the engine 1 by following steps. Initially, the lifter 5 is attached to the end of the small diameter portion 112 of the plunger 11 on the side opposite to the large diameter portion 111. Subsequently, the holder supporter 24 of the high-pressure pump 10 is inserted into the attachment hole portion 3 of the engine head 2 together with the lifter 5. The position of each of the bolt holes 250 of the fixed portion 25 herein is set to a position corresponding to the position of the corresponding fixing hole portion 120 of the engine head 2.

Subsequently, the bolts 100 are inserted into the bolt holes 250 to screw the bolts 100 into the fixing hole portions 120. At this time, the bolts 100 are screwed into the fixing hole portions 120 using a not-shown tool corresponding to the head portions 102 of the bolts 100. In this manner, the fixed portion 25 is fixed to the engine head 2. Attachment of the high-pressure pump 10 to the engine 1 is completed by the foregoing steps.

According to the present embodiment, the electromagnetic driving unit 500, the discharge passage portion 700, and the supply passage portion 29 are collectively disposed in the first region T1, which is a specific location in the circumferential direction of the upper housing 21. Accordingly, at the time of fixation of the fixed portion 25 to the engine head 2 of the engine 1 using the bolts 100 to attach the high-pressure pump 10 to the engine 1, the bolts 100 and a tool for screwing the bolts 100 into the fixing hole portions 120 do not interfere with the electromagnetic driving unit 500, the discharge passage portion 700, and the supply passage portion 29.

As described above, (D1) according to the present embodiment, the high-pressure pump 10 attached to the engine 1 and pressurizing and supplying fuel to the engine 1 includes the cylinder 23 and the plunger 11 constituting the pressurizing chamber forming portion, and the upper housing 21, the valve member 40, the electromagnetic driving unit 500, the discharge passage portion 700, and the fixed portion 25 constituting the housing. The cylinder 23 includes the cylindrical inner peripheral wall 230 which forms the pressurizing chamber 200 in which fuel is pressurized.

The plunger 11 is disposed in the cylindrical inner peripheral wall 230 and has an end located in the pressurizing chamber 200. The plunger 11 is capable of pressurizing the fuel in the pressurizing chamber 200 by moving along the axial direction of the plunger 11. The upper housing 21 has the housing outer peripheral wall 270 having a cylindrical shape and a portion located radially outside the pressurizing chamber 200. The valve member 40 is capable of allowing the fuel to flow into the pressurizing chamber 200 by opening the valve member 40 and of restricting the fuel to flow into the pressurizing chamber 200 by closing the valve member 40.

The electromagnetic driving unit 500 protrudes radially outward from the housing outer peripheral wall 270, and capable of controlling the valve member 40 to selectively open and close. The discharge passage portion 700 protrudes radially outward from the housing outer peripheral wall 270, and defines a portion in which fuel pressurized in the pressurizing chamber 200 and discharged to the engine 1 flows. The fixed portion 25 is connected to the upper housing 21 and has the bolt holes 250. The fixed portion 25 is fixed to the engine 1 by the bolts 100 provided in correspondence with the bolt holes 250.

Two bolt holes 250 are formed in the circumferential direction radially outside the housing outer peripheral wall 270 as viewed in the direction of the axis Ax1 of the cylindrical inner peripheral wall 230. When the high-pressure pump 10 is divided into the first region T1 and the second region T2 along the virtual surface VS0 on which the axes of two adjacent bolt holes 250 and the axis Ax1 of the cylindrical inner peripheral wall 230, the electromagnetic driving unit 500, and discharge passage portion 700 are all located in the first region T1. Accordingly, the electromagnetic driving unit 500 and the discharge passage portion 700 can be collectively disposed at a specific location in the circumferential direction of the housing outer peripheral wall 270. This configuration increases the degree of freedom of the attachment position of the high-pressure pump 10 to the engine 1.

The harness 6 as a wiring is connected to the electromagnetic driving unit 500 of the high-pressure pump 10, while the high-pressure fuel pipe 8 as a steel pipe is connected to the discharge passage portion 700. According to the present embodiment, the electromagnetic driving unit 500 and the discharge passage portion 700 are collectively disposed at a specific location in the circumferential direction of the housing outer peripheral wall 270. Accordingly, the high-pressure pump 10 can be easily attached to the engine 1 without contacting rotating objects such as a pulley of the engine 1 and the harness 6 and the high-pressure fuel pipe 8. Mountability of the high-pressure pump 10 therefore improves.

(D2) According to the present embodiment, the two bolt holes 250 are formed at equal intervals in the circumferential direction of the housing outer peripheral wall 270. The angle formed by two straight lines between the axis Ax1 of the cylindrical inner peripheral wall 230 and the respective axes of the two bolt holes 250 is 180 degrees. This configuration allows division of the high-pressure pump 10 into equal parts of the first region T1 and the second region T2, and arranges the electromagnetic driving unit 500 and the discharge passage portion 700 in the first region T1. In other words, the electromagnetic driving unit 500 and the discharge passage portion 700 can be collectively disposed in one of the equally divided regions of the high-pressure pump 10. Mountability of the high-pressure pump 10 therefore improves.

(D3) According to the present embodiment, the housing outer peripheral wall 270 has the multiple flat portions 271. The first region T1 includes three flat portions 271 of the multiple flat portions 271. Accordingly, the suction hole portion 212 and the discharge hole portion 214, which are holes receiving the electromagnetic driving unit 500 and the discharge passage portion 700, can be easily formed in the corresponding flat portions 271 each having a flat shape.

(D4) According to the present embodiment, the center axis Axc1 of the electromagnetic driving unit 500 and the center axis Axc2 of the discharge passage portion 700 are located on the common plane. This configuration reduces an increase in the size of the high-pressure pump 10 in the direction of the axis Ax1 of the cylindrical inner peripheral wall 230 of the cylinder 23.

(D5) According to the present embodiment, the supply passage portion 29 is further provided. The supply passage portion 29 protrudes radially outward the housing outer peripheral wall 270. The fuel sucked into the pressurizing chamber 200 flows through the supply passage portion 29. The supply passage portion 29 is located in a range within 180 degrees from the electromagnetic driving unit 500 toward the discharge passage portion 700, or within 180 degrees from the discharge passage portion 700 toward the electromagnetic driving unit 500 in the circumferential direction of the housing outer peripheral wall 270. Accordingly, in the case of the high-pressure pump 10 including the supply passage portion 29 as well as the electromagnetic driving unit 500 and the discharge passage portion 700, the electromagnetic driving unit 500, the discharge passage portion 700, and the supply passage portion 29 can be collectively disposed at a specific location in the circumferential direction of the housing outer peripheral wall 270, i.e., on one side of the high-pressure pump 10.

(D6) According to the present embodiment, the flat portions 271 which does not intersect the surface VS1 that is parallel to the virtual surface VS0 and that tangent to the two bolt holes 250 are formed three in the first region T1. Accordingly, the electromagnetic driving unit 500, the discharge passage portion 700, and the supply passage portion 29 can be collectively disposed with ease in the first region T1 as a specific location in the circumferential direction of the housing outer peripheral wall 270, i.e., on one side of the high-pressure pump 10.

(D7) According to the present embodiment, the flat portions 271 are formed three between the two flat portions 271 each facing corresponding one of the two bolt holes 250. Accordingly, the electromagnetic driving unit 500, the discharge passage portion 700, and the supply passage portion 29 can be collectively disposed with ease at a specific location in the circumferential direction of the housing outer peripheral wall 270, i.e., on one side of the high-pressure pump 10.

Twenty-First Embodiment

Figure 74:
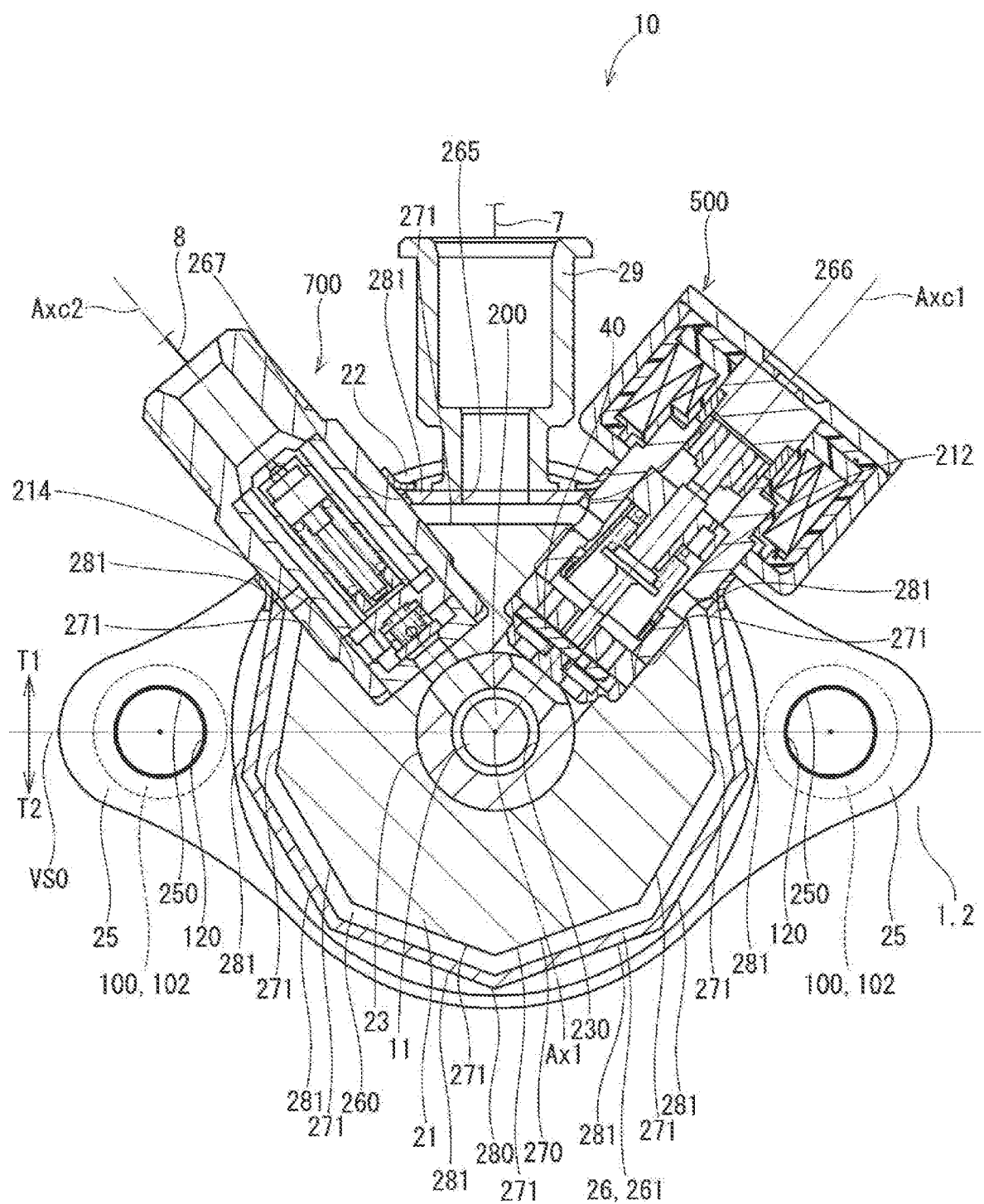
FIG. 74 is a cross-sectional view of a high-pressure pump according to a twenty-first embodiment.

<D-2> FIG. 74 shows a high-pressure pump according to a twenty-first embodiment. The twenty-first embodiment is different from the twentieth embodiment in the configurations of the upper housing 21 and the cover 26, and other points.

According to the present embodiment, the upper housing 21 is formed such that the housing outer peripheral wall 270 has a nine-sided columnar shape. The cover 26 is formed such that the cover outer peripheral wall 280 has a nine-sided columnar shape in correspondence with the housing outer peripheral wall 270.

The angle formed by the center axis Axc1 of the electromagnetic driving unit 500 and the center axis Axc2 of the discharge passage portion 700 is set to be smaller than 90 degrees. Accordingly, the electromagnetic driving unit 500 and the discharge passage portion 700 can be collectively disposed in a narrower range of a specific location in the circumferential direction of the housing outer peripheral wall 270.

The flat portions 271 of the housing outer peripheral wall 270 are formed three in the first region T1. More specifically, the three flat portions 271 are formed in the first region T1. Each of the electromagnetic driving unit 500, the discharge passage portion 700, and the supply passage portion 29 is disposed in the corresponding one of the flat portions 271. The four flat portions 271 are formed in the second region T2. Advantageous effects similar to those of the twentieth embodiment can be offered by the twenty-first embodiment.

Twenty-Second Embodiment

Figure 75:
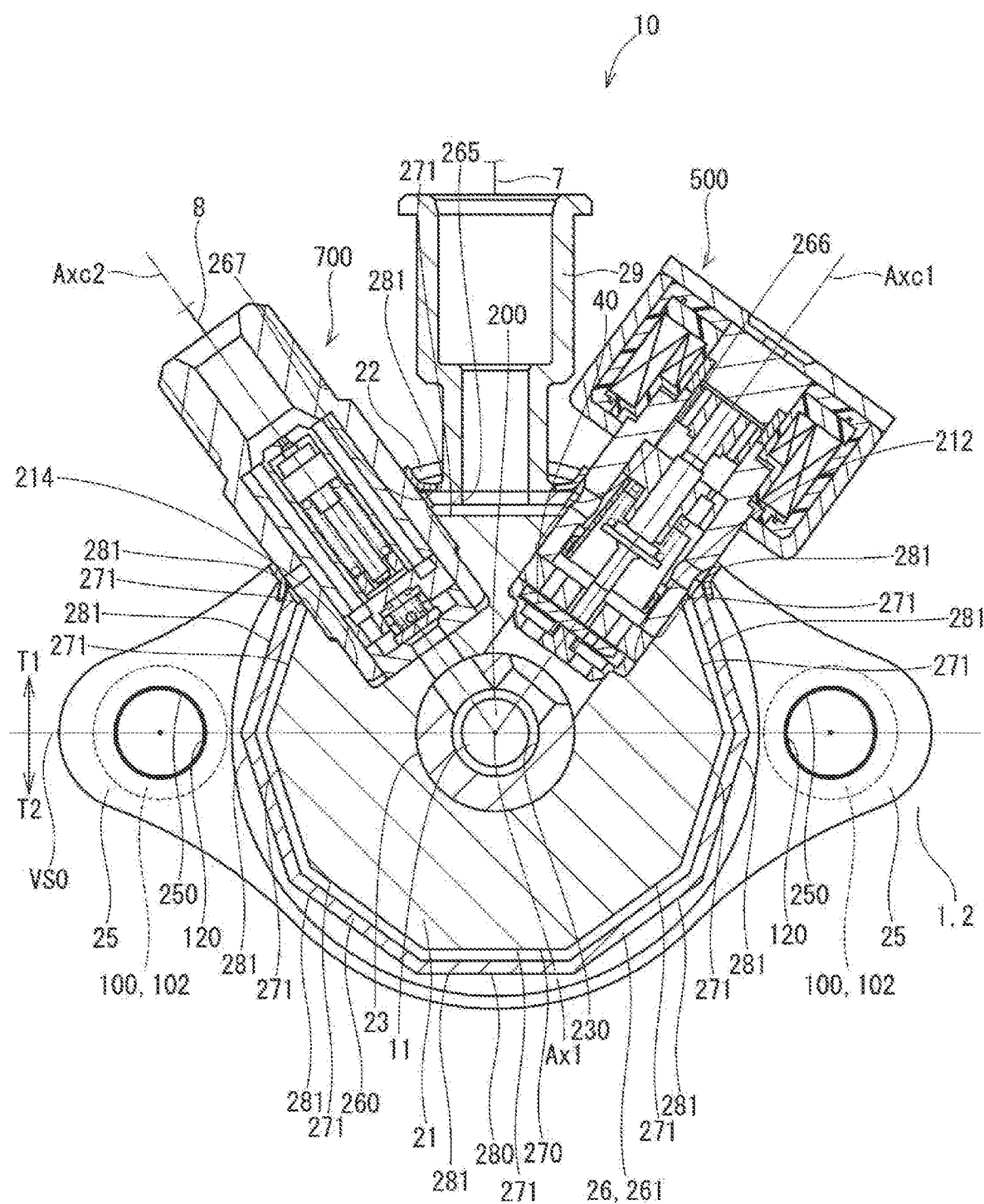
FIG. 75 is a cross-sectional view of a high-pressure pump according to a twenty-second embodiment.

<D-3> FIG. 75 shows a high-pressure pump according to a twenty-second embodiment. The twenty-second embodiment is different from the twentieth embodiment in the configurations of the upper housing 21 and the cover 26, and other points.

According to the present embodiment, the upper housing 21 is formed such that the housing outer peripheral wall 270 has a ten-sided columnar shape. The cover 26 is formed such that the cover outer peripheral wall 280 has a ten-sided cylindrical shape in correspondence with the housing outer peripheral wall 270.

The angle formed by the center axis Axc1 of the electromagnetic driving unit 500 and the center axis Axc2 of the discharge passage portion 700 is set to be smaller than 90 degrees. Accordingly, the electromagnetic driving unit 500 and the discharge passage portion 700 can be collectively disposed in a narrower range of a specific location in the circumferential direction of the housing outer peripheral wall 270.

The five flat portions 271 of the housing outer peripheral wall 270 are formed in the first region T1. More specifically, the five flat portions 271 are formed in the first region T1. Each of the electromagnetic driving unit 500, the discharge passage portion 700, and the supply passage portion 29 is disposed at corresponding one of the three flat portions 271 of the five flat portions 271. The five flat portions 271 are formed in the second region T2. Advantageous effects similar to those of the twentieth embodiment can be offered by the twenty-second embodiment.

Twenty-Third Embodiment

Figure 76:
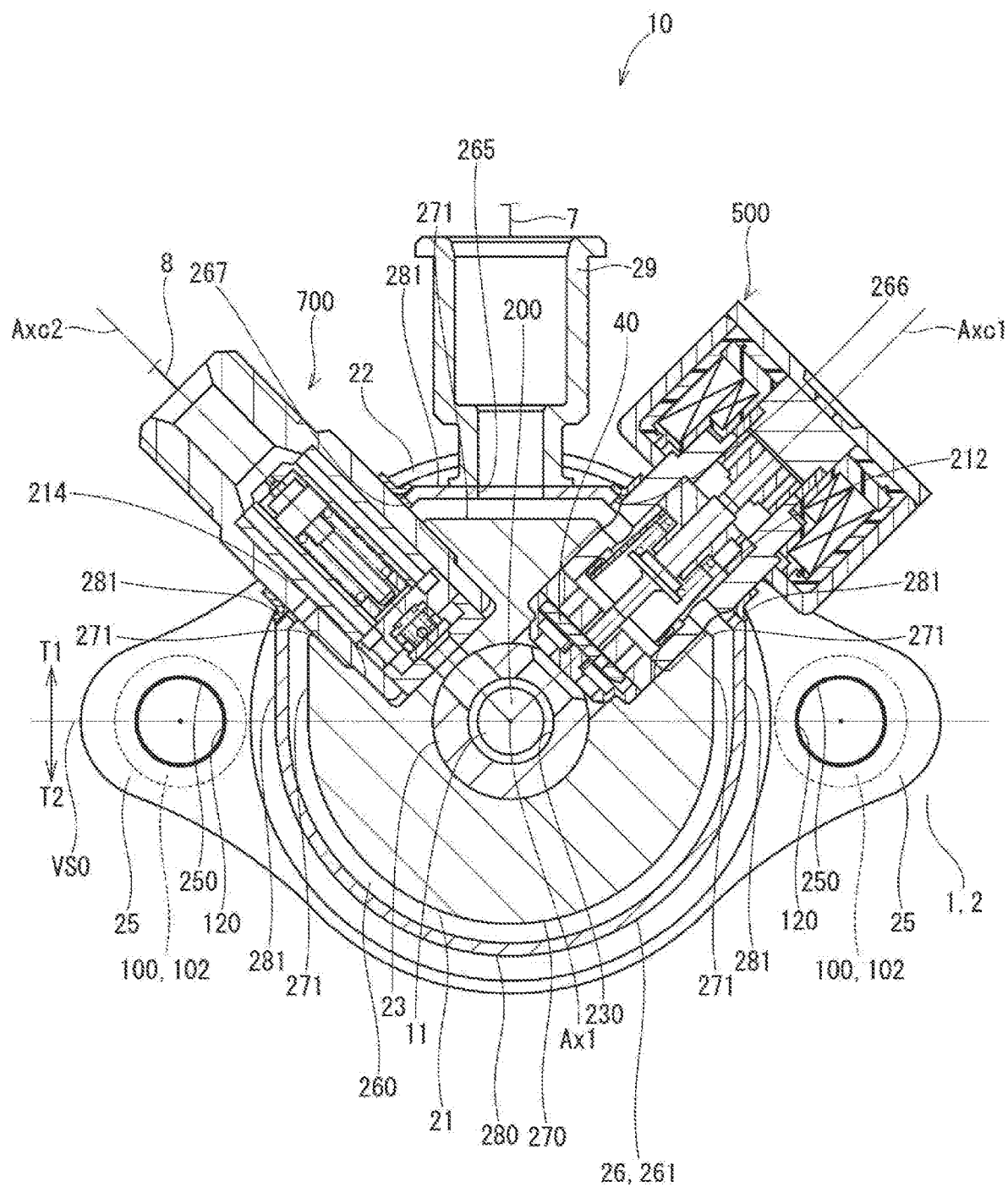
FIG. 76 is a cross-sectional view of a high-pressure pump according to a twenty third embodiment.

<D-4> FIG. 76 shows a high-pressure pump according to a twenty-third embodiment. The twenty-third embodiment is different from the twentieth embodiment in the configurations of the upper housing 21 and the cover 26, and other points.

According to the present embodiment, the upper housing 21 is formed such that the housing outer peripheral wall 270 has a substantially cylindrical shape in the second region T2. The shape of the upper housing 21 in the first region T1 is similar to the corresponding shape of the twentieth embodiment.

The cover 26 is formed such that the cover outer peripheral wall 280 has a substantially cylindrical shape in the second region T2 in correspondence with the housing outer peripheral wall 270. The shape of the cover 26 in the first region T1 is similar to the corresponding shape in the twentieth embodiment.

The configuration of the twenty-third embodiment is similar to the configuration of the twentieth embodiment except for the points described above. Advantageous effects similar to those of the twentieth embodiment can be offered by the twenty-third embodiment.

Twenty-Fourth Embodiment

Figure 77:
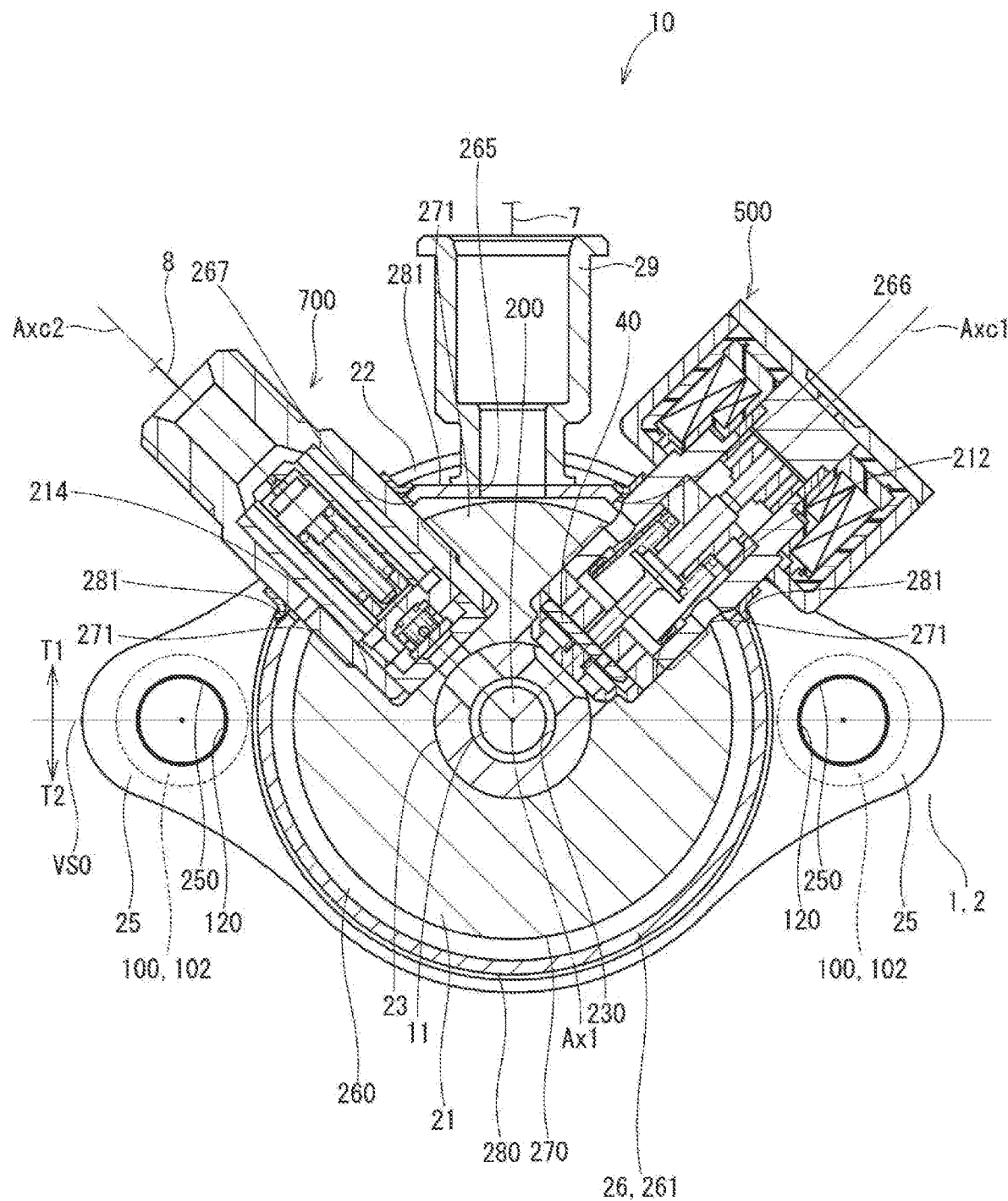
FIG. 77 is a cross-sectional view of a high-pressure pump according to a twenty-fourth embodiment.

<D-5> FIG. 77 shows a high-pressure pump according to a twenty-fourth embodiment. The twenty-fourth embodiment is different from the twentieth embodiment in the configurations of the upper housing 21 and the cover 26, and other points.

According to the present embodiment, the upper housing 21 is formed such that the housing outer peripheral wall 270 has a substantially cylindrical shape.

The cover 26 is provided such that the cover outer peripheral wall 280 has a substantially cylindrical shape except for portions where the cover hole portion 265, the cover hole portion 266, and the cover hole portion 267 are formed. The portions of the cover outer peripheral wall 280 where the cover hole portion 265, the cover hole portion 266, and the cover hole portion 267 are formed have a flat shape.

The configuration of the twenty-fourth embodiment is similar to the configuration of the twentieth embodiment except for the points described above. Advantageous effects similar to those of the twentieth embodiment can be offered by the twenty-fourth embodiment.

Twenty-Fifth Embodiment

Figure 78:
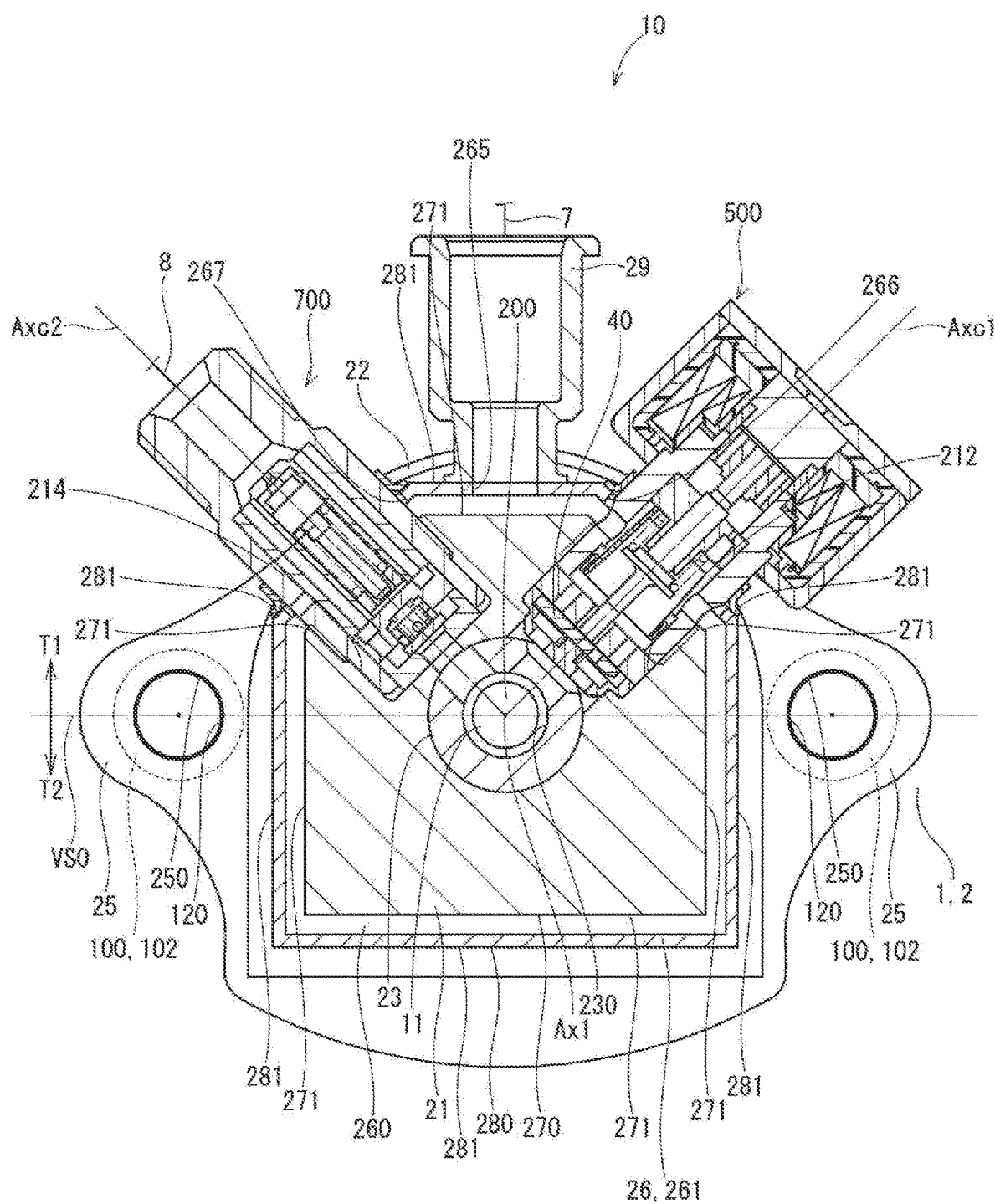
FIG. 78 is a cross-sectional view of a high-pressure pump according to a twenty-fifth embodiment.

<D-6> FIG. 78 shows a high-pressure pump according to a twenty-fifth embodiment. The twenty-fifth embodiment is different from the twentieth embodiment in the configurations of the upper housing 21 and the cover 26, and other points.

According to the present embodiment, the upper housing 21 is formed such that the housing outer peripheral wall 270 constitutes a part of a rectangular column in the second region T2. The shape of the upper housing 21 in the first region T1 is similar to the corresponding shape of the twentieth embodiment.

The cover 26 is formed such that the cover outer peripheral wall 280 constitutes a part of a rectangular column in the second region T2 in correspondence with the housing outer peripheral wall 270. The shape of the cover 26 in the first region T1 is similar to the corresponding shape in the twentieth embodiment.

The configuration of the twenty-fifth embodiment is similar to the configuration of the twentieth embodiment except for the points described above. Advantageous effects similar to those of the twentieth embodiment can be offered by the twenty-fifth embodiment.

Twenty-Sixth Embodiment

Figure 79:
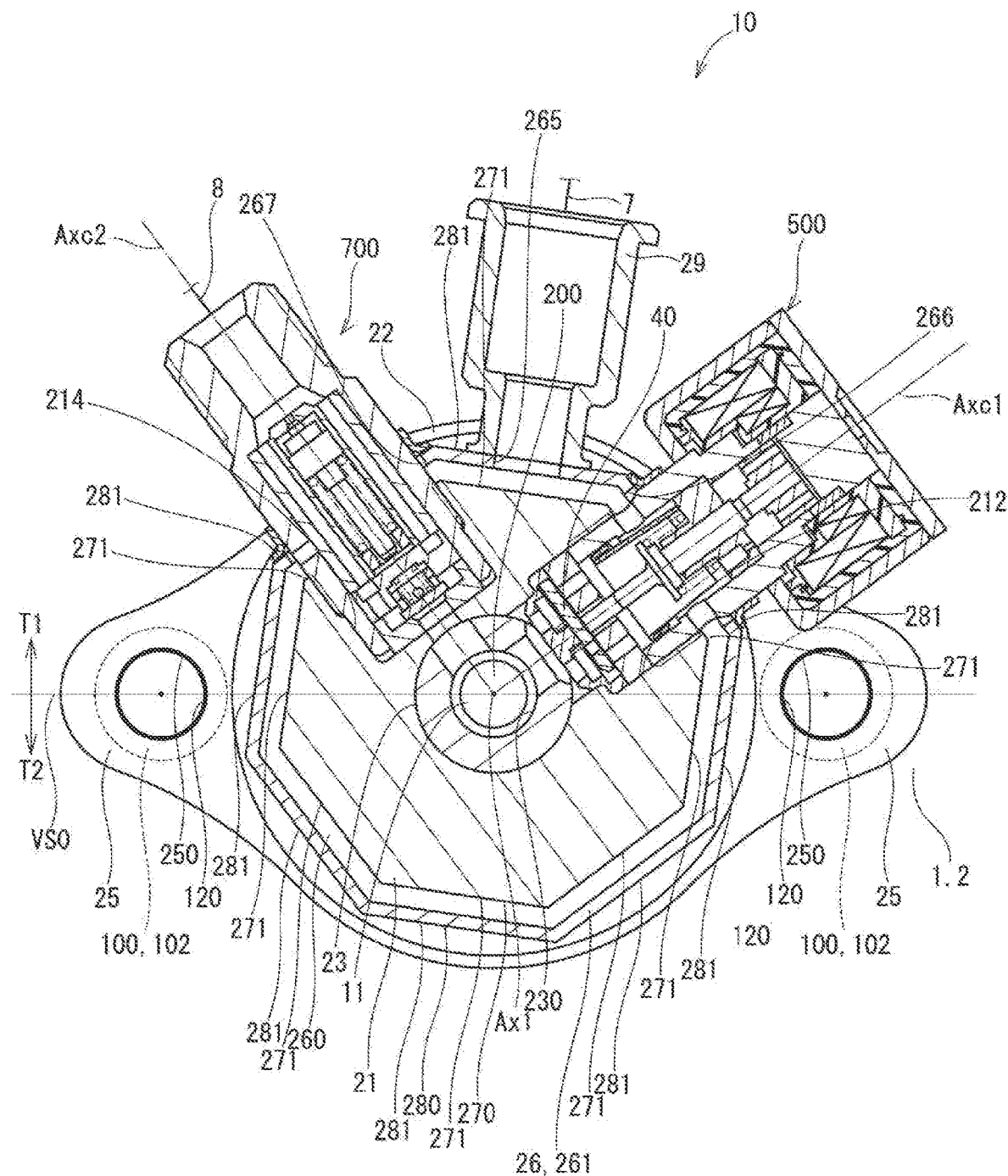
FIG. 79 is a cross-sectional view of a high-pressure pump according to a twenty-sixth embodiment.

<D-7> FIG. 79 shows a high-pressure pump according to a twenty-sixth embodiment. The twenty-sixth embodiment is different from the twentieth embodiment in the positional relationship between the electromagnetic driving unit 500, the discharge passage portion 700, and the bolt hole s250, and other points.

According to the present embodiment, when compared with the twentieth embodiment, the upper housing 21 and the cover 26 including the electromagnetic driving unit 500, the discharge passage portion 700, and the supply passage portion 29 are formed at positions rotated with respect to the fixed portion 25 around the axis Ax1 of the cylindrical inner peripheral wall 230 of the cylinder 23 by a predetermined angle.

The distance between the electromagnetic driving unit 500 and the axes of the bolt holes 250 is smaller than the distance between the discharge passage portion 700 and the axis of each of the bolt holes 250. However, the bolt holes 250 and the bolt 100 do not overlap with the electromagnetic driving unit 500 as viewed in the direction of the axis Ax1 of the cylindrical inner peripheral wall 230. Accordingly, during attachment of the high-pressure pump 10 to the engine 1, the bolts 100 and the tool for screwing the bolts 100 to the fixing hole portions 120 do not interfere with the electromagnetic driving unit 500.

The configuration of the twenty-sixth embodiment is similar to the configuration of the twentieth embodiment except for the points described above. Advantageous effects similar to those of the twentieth embodiment can be offered by the twenty-sixth embodiment.

Twenty-Seventh Embodiment

Figure 80:
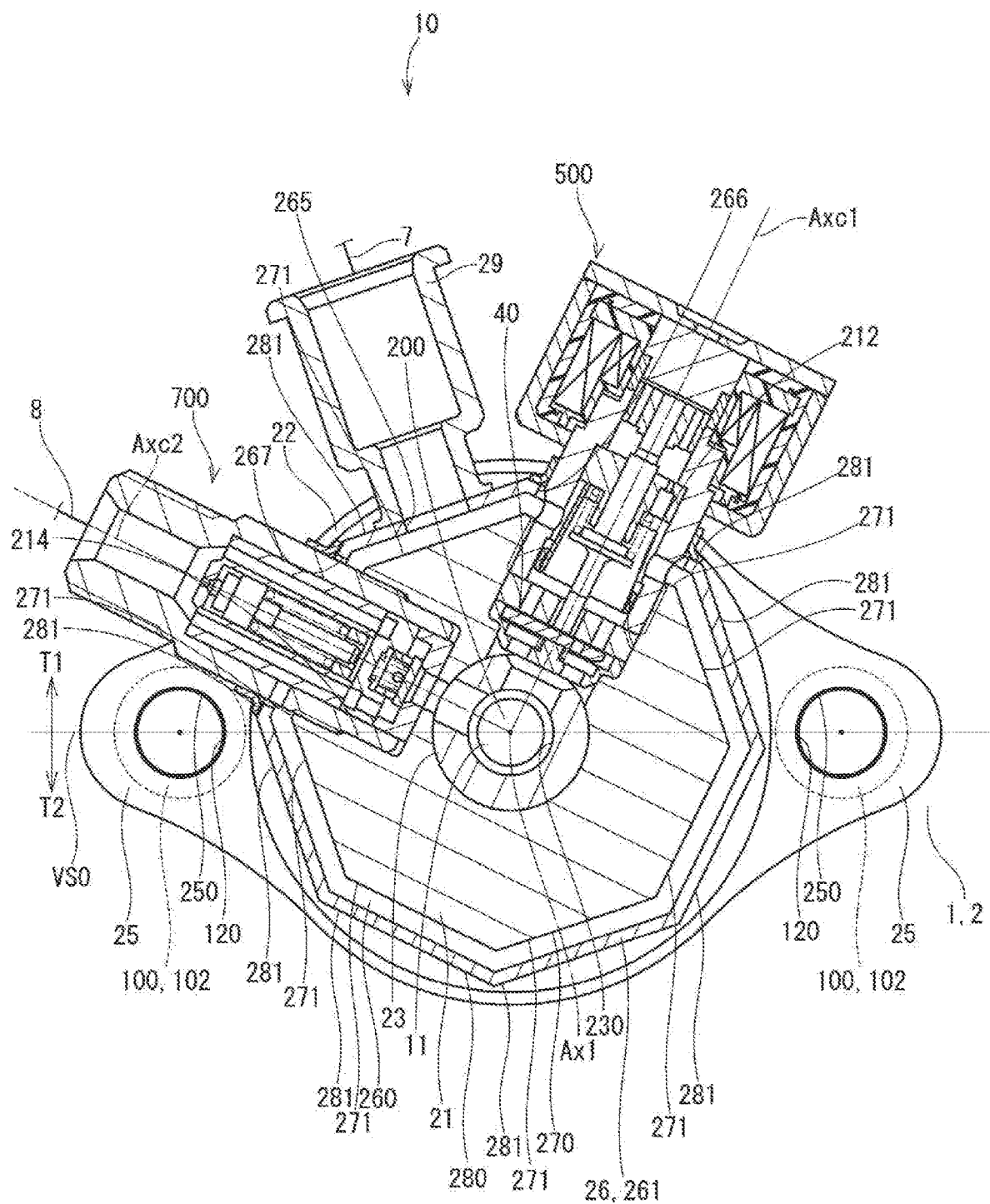
FIG. 80 is a cross-sectional view of a high-pressure pump according to a twenty-seventh embodiment.

<D-8> FIG. 80 shows a high-pressure pump according to a twenty-seventh embodiment. The twenty-seventh embodiment is different from the twentieth embodiment in the positional relationship between the electromagnetic driving unit 500 and the discharge passage portion 700, and the bolt holes 250, and other points.

According to the present embodiment, when compared with the twentieth embodiment, the upper housing 21 and the cover 26 including the electromagnetic driving unit 500, the discharge passage portion 700, and the supply passage portion 29 are formed at positions rotated with respect to the fixed portion 25 around the axis Ax1 of the cylindrical inner peripheral wall 230 of the cylinder 23 by a predetermined angle.

The distance between the discharge passage portion 700 and the axis of each of the bolt holes 250 herein is smaller than the distance between the electromagnetic driving unit 500 and the axis of each of the bolt holes 250. However, the bolt holes 250 and the bolts 100 do not overlap with the discharge passage portion 700 as viewed in the direction of the axis Ax1 of the cylindrical inner peripheral wall 230. Accordingly, during attachment of the high-pressure pump 10 to the engine 1, the bolts 100 and the tool for screwing the bolts 100 to the fixing hole portions 120 do not interfere with the discharge passage portion 700.

The configuration of the twenty-seventh embodiment is similar to the configuration of the twentieth embodiment except for points described above. Advantageous effects similar to those of the twentieth embodiment can be offered by the twenty-seventh embodiment.

Twenty-Eighth Embodiment

Figure 81:
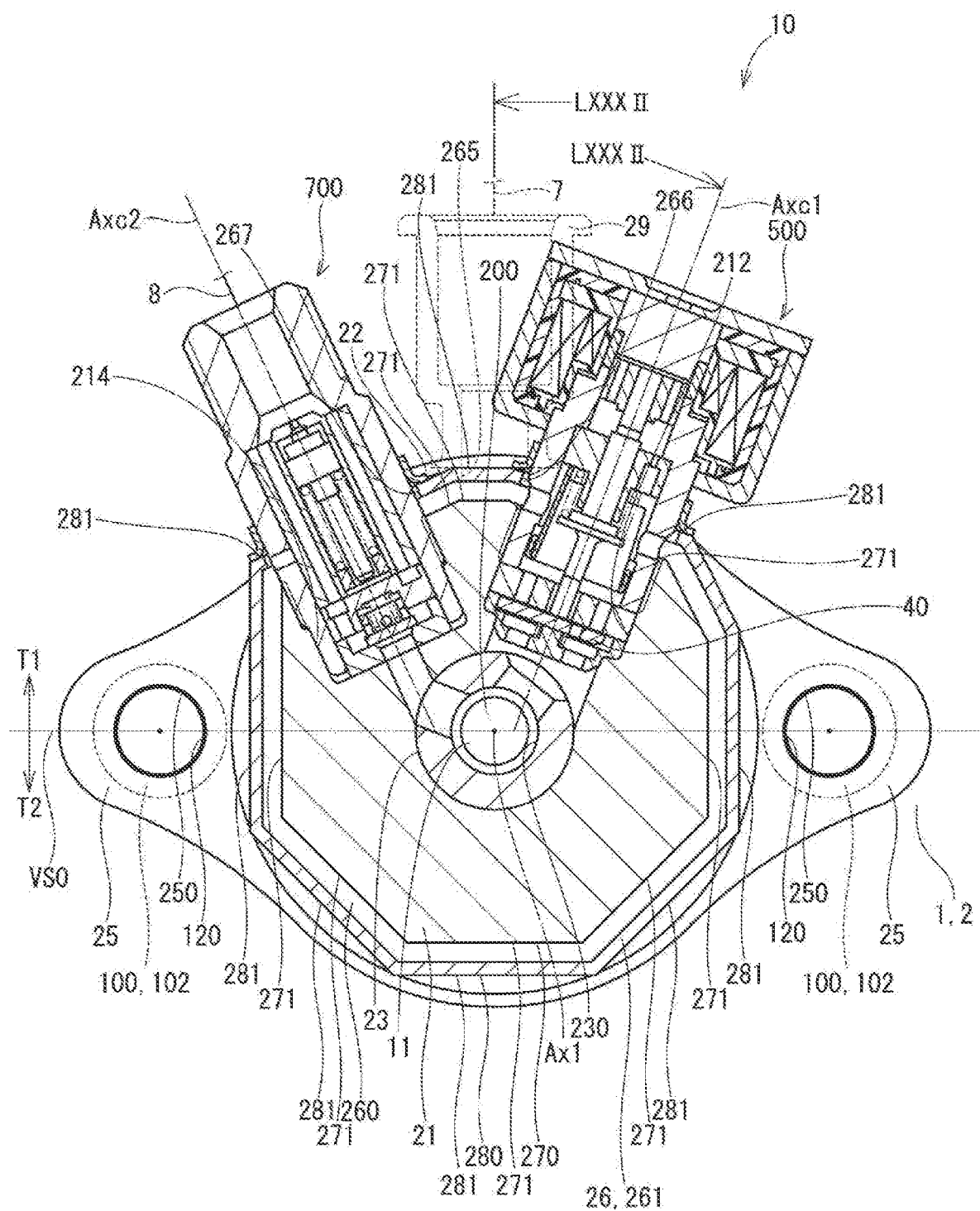
FIG. 81 is a cross-sectional view of a high-pressure pump according to a twenty-eighth embodiment.
Figure 82:
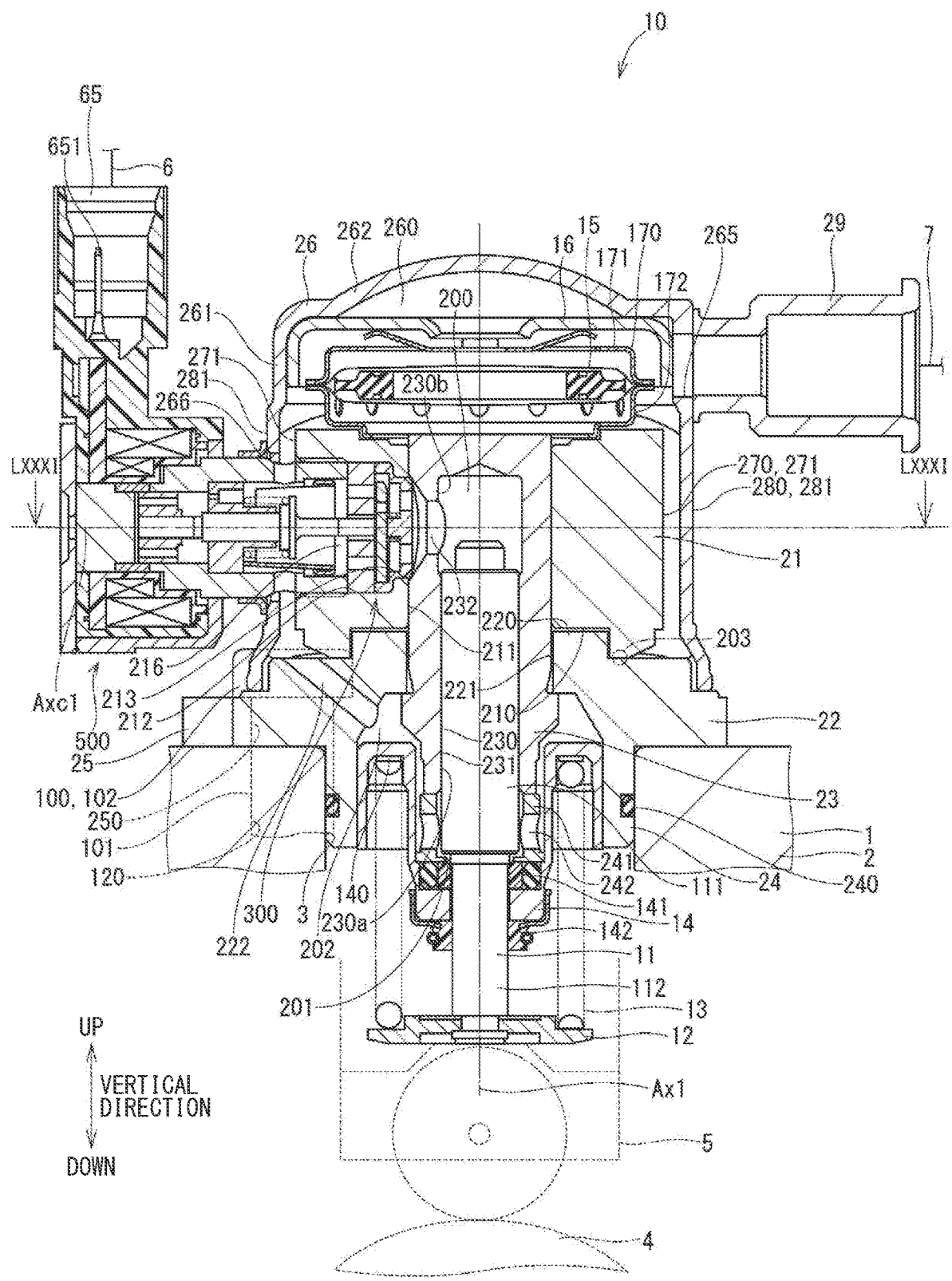
FIG. 82 is a cross-sectional view taken along a line LXXXII-LXXXII in FIG. 81.

<D-9> FIGS. 81 and 82 show a high-pressure pump according to a twenty-eighth embodiment. The twenty-eighth embodiment is different from the twentieth embodiment in the positional relationship between the electromagnetic driving unit 500, the discharge passage portion 700, and the supply passage portion 29, and other points.

According to the present embodiment, the angle formed by the center axis Axc1 of the electromagnetic driving unit 500 and the center axis Axc2 of the discharge passage portion 700 is set to be smaller than 90 degrees, such as approximately 45 degrees. Accordingly, the electromagnetic driving unit 500 and the discharge passage portion 700 can be collectively disposed in a narrower range of a specific location in the circumferential direction of the housing outer peripheral wall 270.

The supply passage portion 29 is provided at the end of the cover peripheral wall 280 facing the cover bottom portion 262. The cover hole portion 265 herein is formed at the end of the cover cylindrical portion 261 facing the cover bottom portion 262 (see FIG. 82).

The position of the supply passage portion 29 in the circumferential direction of the cover outer peripheral wall 280 lies between the center axis Axc1 of the electromagnetic driving unit 500 and the center axis Axc2 of the discharge passage portion 700. The supply passage portion 29 and the electromagnetic driving unit 500 do not come into contact with each other.

The configuration of the twenty-eighth embodiment is similar to the configuration of the twentieth embodiment except for the points described above. Advantageous effects similar to those of the twentieth embodiment can be offered by the twenty-eighth embodiment.

Twenty-Ninth Embodiment

Figure 83:
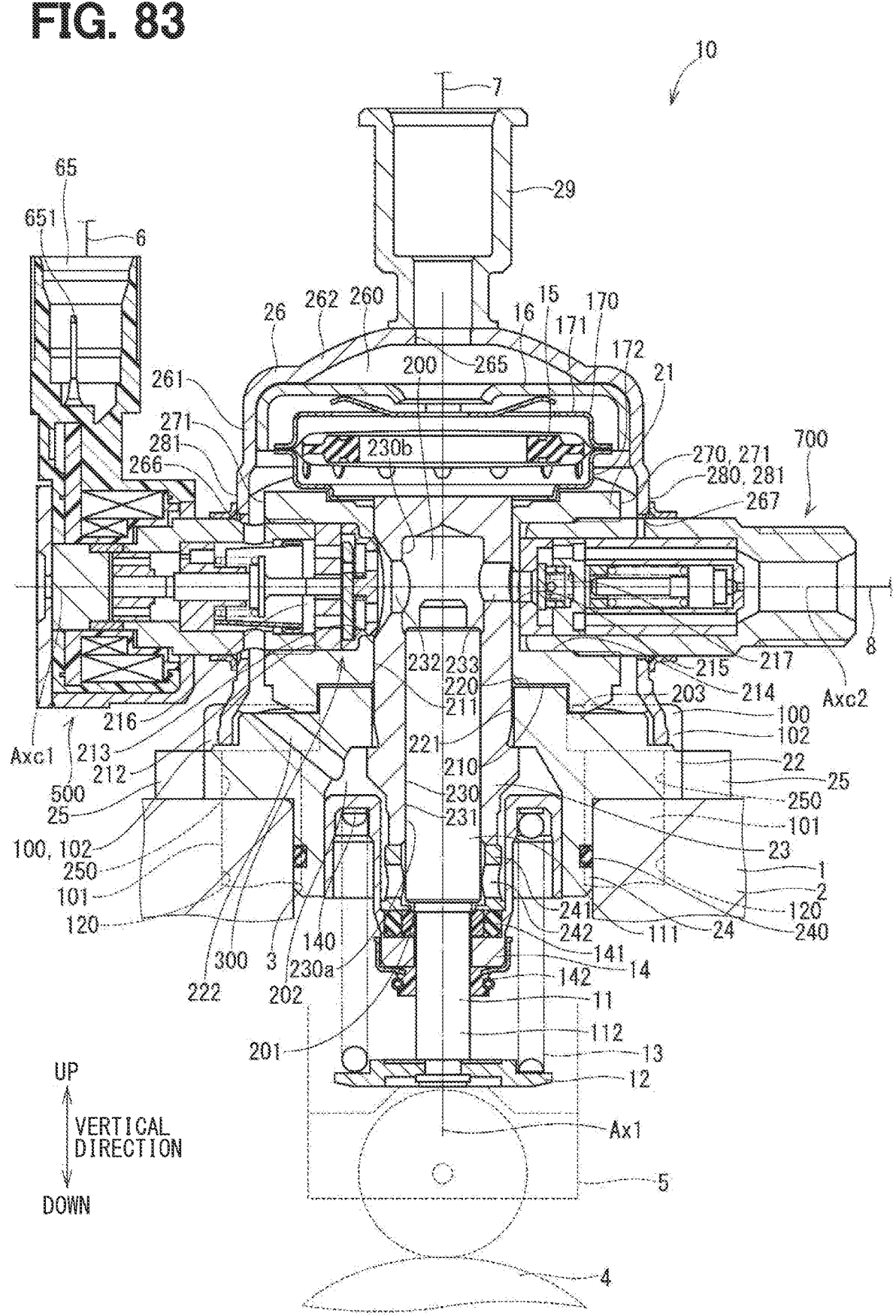
FIG. 83 is a cross-sectional view of a high-pressure pump according to a twenty-ninth embodiment.

<D-10> FIG. 83 shows a high-pressure pump according to a twenty-ninth embodiment. The twenty-ninth embodiment is different from the twentieth embodiment in the arrangement of the supply passage portion 29 and others.

According to the present embodiment, the cover hole portion 265 has a substantially cylindrical shape which passes through the center of the cover bottom portion 262 in the plate thickness direction. The supply passage portion 29 is provided such that one end of the supply passage portion 29 is connected to the outer wall of the cover bottom portion 262 around the cover hole portion 265. More specifically, the supply passage portion 29 protrudes upward in the vertical direction in the direction of the axis Ax1 of the cylindrical inner peripheral wall 230 from the upper housing 21.

The configuration of the twenty-ninth embodiment is similar to the configuration of the twentieth embodiment except for the points described above. Advantageous effects similar to those of the twentieth embodiment can be offered by the twenty-ninth embodiment.

Thirtieth Embodiment

Figure 84:
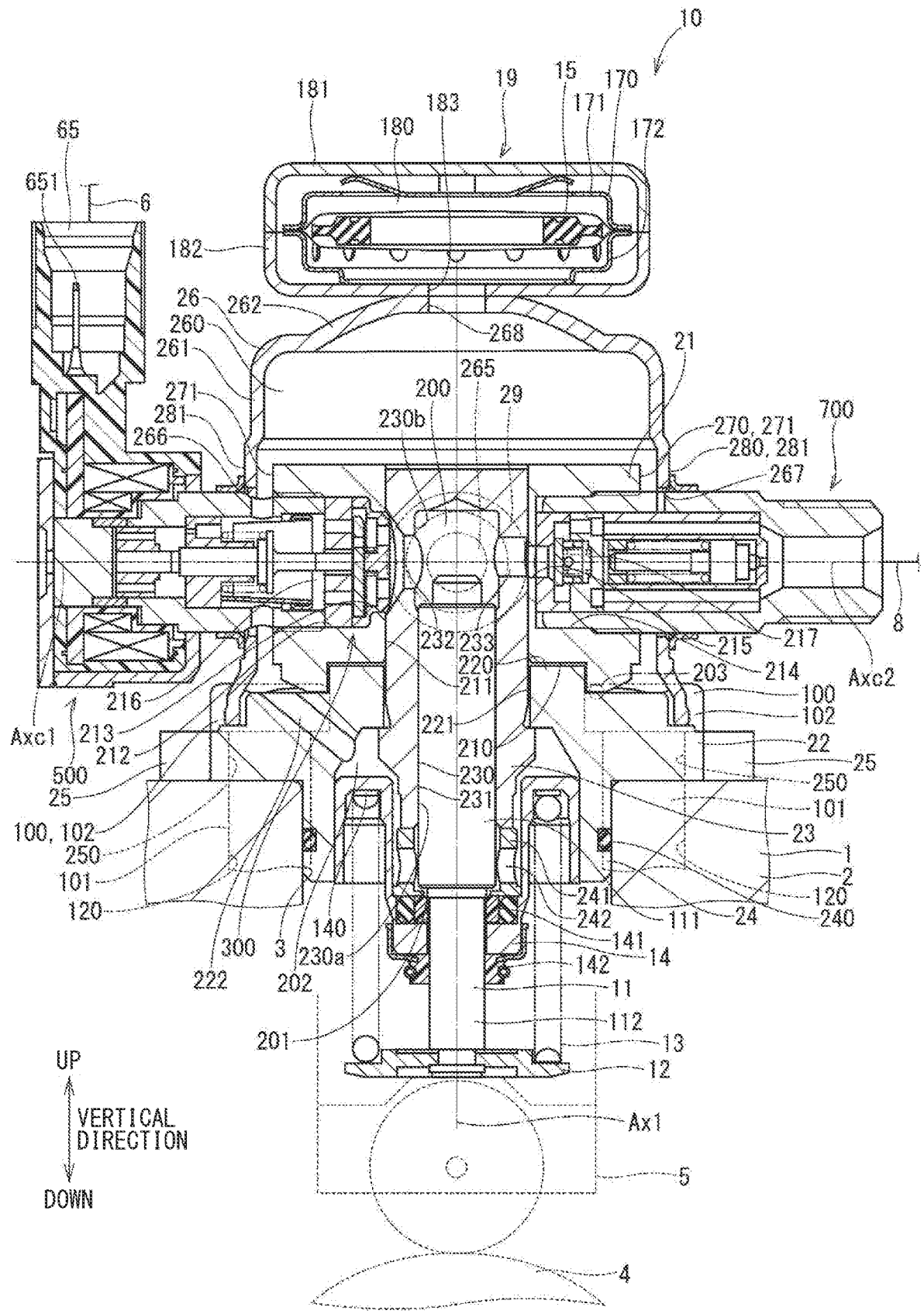
FIG. 84 is a cross-sectional view of a high-pressure pump according to a thirtieth embodiment.

<D-11> FIG. 84 shows a high-pressure pump according to a thirtieth embodiment. The thirtieth embodiment is different from the twentieth embodiment in the configuration in the vicinity of the cover bottom portion 262.

According to the present embodiment, an upper case 181 and a lower case 182 are further provided. Each of the upper case 181 and the lower case 182 has a bottomed cylindrical shape, and is made of metal, for example. An inner diameter and an outer diameter of the upper case 181 are equal to an inner diameter and an outer diameter of the lower case 182. The upper case 181 and the lower case 182 are formed integrally with each other such that opening ends of the upper case 181 and the lower case 182 are joined to each other.

The upper case 181 and the lower case 182 define an in-case fuel chamber 180 inside. According to the present embodiment, the pulsation damper 15, the upper support 171, and the lower support 172 are provided in the in-case fuel chamber 180. Accordingly, the pulsation damper 15, the upper support 171, and the lower support 172 are not provided in the fuel chamber 260 inside the cover 26. The upper case 181, the lower case 182, the pulsation damper 15, the upper support 171, and the lower support 172 constitute a pulsation damper unit 19.

The lower case 182 includes a case hole portion 183 that passes through the center of the bottom portion of the lower case 182. The cover 26 includes a cover hole portion 268 that passes through the center of the cover bottom portion 262. The pulsation damper unit 19 is provided on the side of the cover bottom portion 262 opposite to the cover columnar portion 261 such that the case hole portion 183 and the cover hole portion 268 are in communication with each other. The lower case 182 and the cover bottom portion 262 herein are joined to each other by welding, for example.

The in-case fuel chamber 180 is in communication with the fuel chamber 260 via the case hole portion 183 and the cover hole portion 268. Accordingly, even when pressure pulsation occurs in the fuel in the fuel chamber 260, the pulsation damper 15 in the in-case fuel chamber 180 can reduce the pressure pulsation.

According to the present embodiment, as described above, the pulsation damper unit 19 capable of reducing pulsation of the pressure of the fuel in the fuel chamber 260, i.e., the fuel sucked into the pressurizing chamber 200 is further provided. The pulsation damper unit 19 protrudes upward in the vertical direction in the direction of the axis Ax1 of the cylindrical inner peripheral wall 230 from the upper housing 21.

The configuration of the thirtieth embodiment is similar to the configuration of the twentieth embodiment except for the points described above. Advantageous effects similar to those of the twentieth embodiment can be offered by the thirtieth embodiment.

Thirty-First Embodiment

Figure 85:
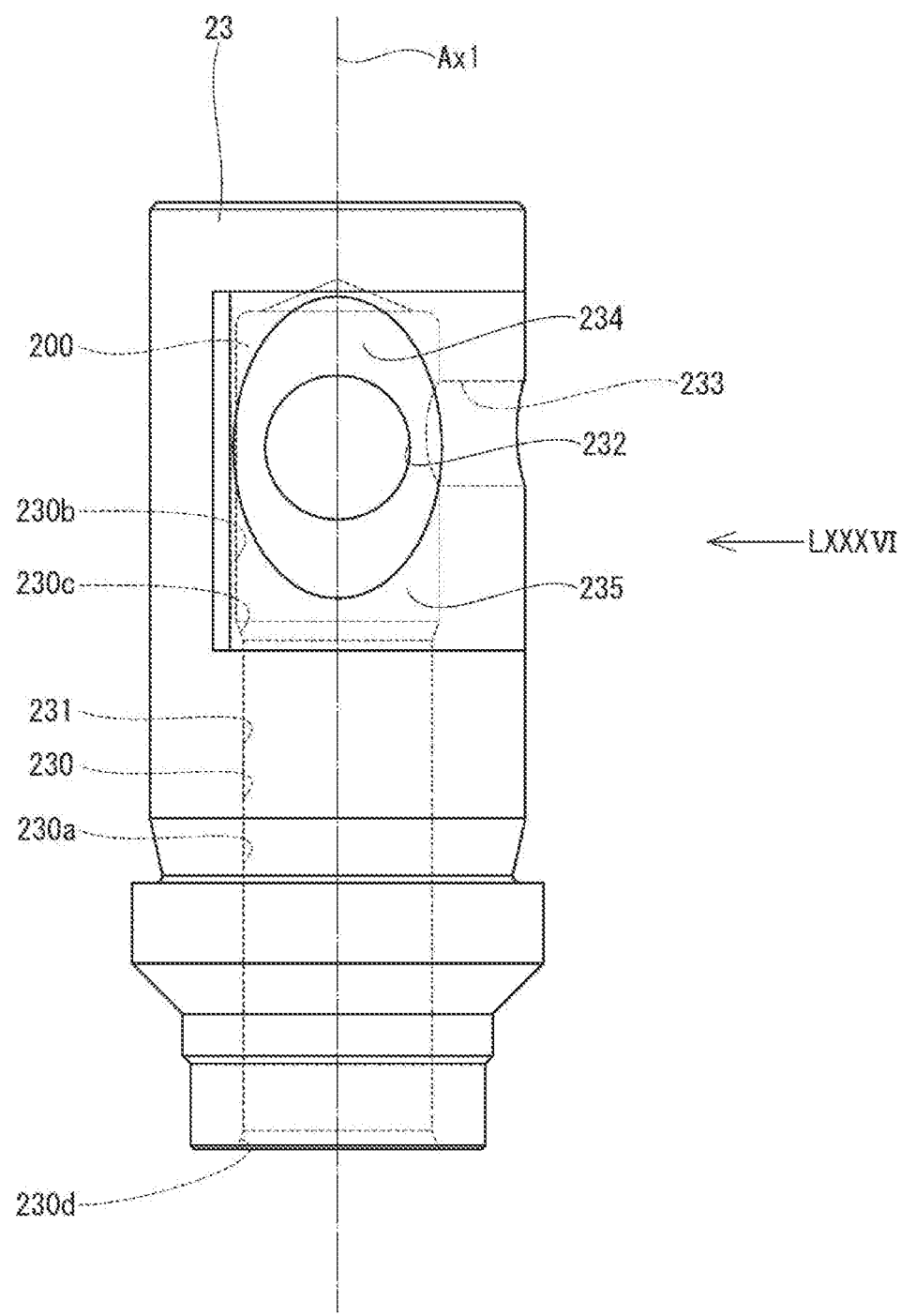
FIG. 85 is a front view of a cylinder of a high-pressure pump according to a thirty-first embodiment.
Figure 86:
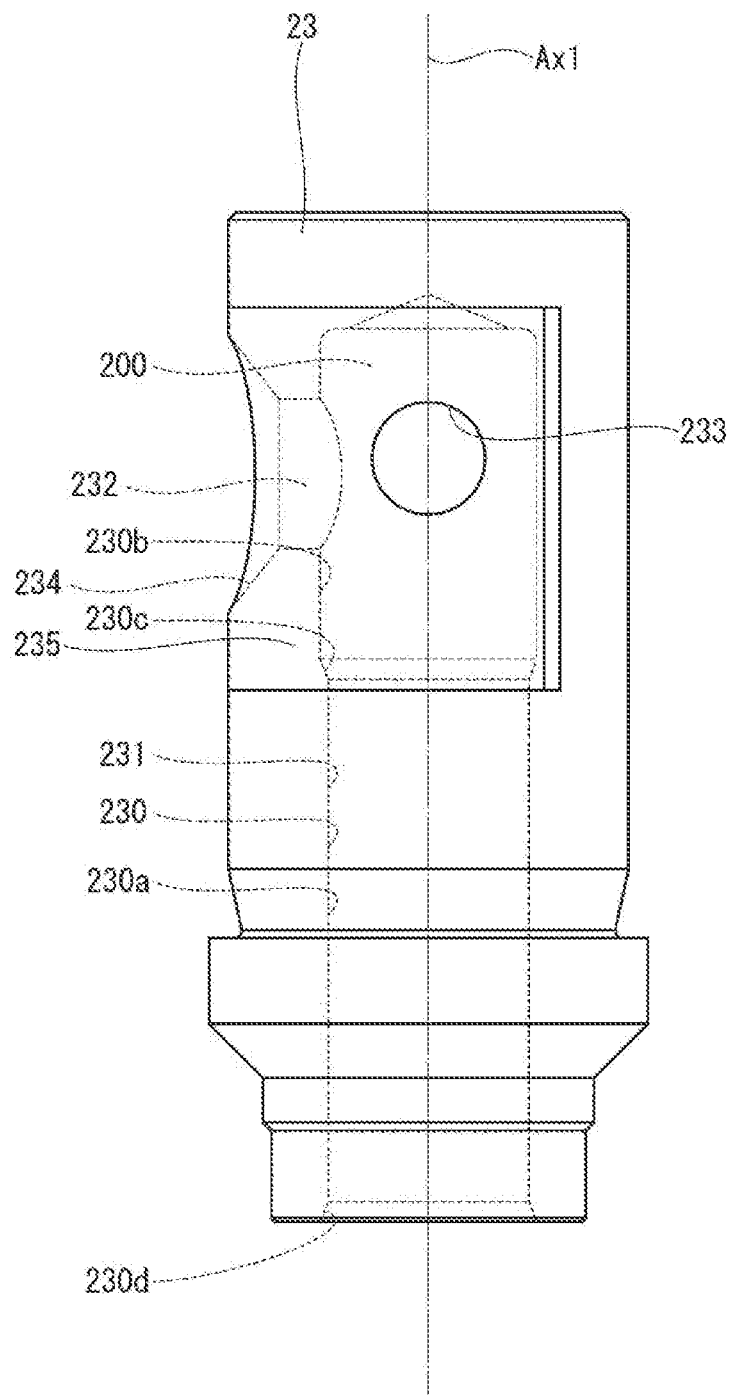
FIG. 86 is a view of FIG. 85 as viewed in a direction of an arrow LXXXVI.

<D-12> FIGS. 85 and 86 show a part of a high-pressure pump according to a thirty-first embodiment. The thirty-first embodiment is different from the twentieth embodiment in the configuration of the cylinder 23.

According to the present embodiment, the outer peripheral recess 235 is formed in a range from a position slightly on the bottom portion side of the cylinder 23 with respect to the upper end of the tapered surface 234 to a position away from the lower end of the tapered surface 234 toward the side opposite to the bottom portion of the cylinder 23 by a predetermined distance in the axial direction of the cylinder 23 as viewed in the axial direction of the suction hole 232 (see FIG. 85). The outer peripheral recess 235 is formed in a range from a position slightly on the bottom portion side of the cylinder 23 with respect to the upper end of the discharge hole 233 to a position away from the lower end of the discharge hole 233 toward the side opposite to the bottom portion of the cylinder 23 by a predetermined distance in the axial direction of the cylinder 23 as viewed in the axial direction of the discharge hole 233 (see FIG. 86).

Accordingly, the outer peripheral recess 235 of the present embodiment is so formed as to include all of the tapered surface 234 inside as viewed in the axial direction of the suction hole 232, is so formed as to include all of the discharge hole 233 inside as viewed in the axial direction of the discharge hole 233, and is larger than the outer peripheral recess 235 of the twentieth embodiment in the axial direction of the cylinder 23. At least a part of the outer peripheral recess 235 is formed in a range overlapping with the sliding surface 230a in a lower portion of the cylinder 23 in the axial direction as viewed in the axial direction of the suction hole 232 or the discharge hole 233 (see FIGS. 85 and 86).

Similarly to the twentieth embodiment, the outer peripheral recess 235 is formed in a range leaving a portion fitted to the upper housing 21, i.e., a shrink fitting portion, in an axially upper portion of the cylinder 23 as viewed in the axial direction of the suction hole 232 or the discharge hole 233 (see FIGS. 85 and 86). However, the size of the fitting portion with the upper housing 21 is smaller than that of the twentieth embodiment.

According to the present embodiment, similarly to the twentieth embodiment, the outer peripheral recess 235 is formed in the outer peripheral wall of the cylinder 23 similarly to the first embodiment. In this case, even when the inner peripheral wall of the hole portion 211 of the upper housing 21 is deformed radially inward during screwing the cylindrical member 51 of the electromagnetic driving unit 500 into the suction hole portion 212 of the upper housing 21, and during screwing the discharge joint 70 of the discharge passage portion 700 into the discharge hole portion 214 of the upper housing 21, a surface pressure produced by the deformation and applied to the outer peripheral wall of the cylinder 23 can be reduced. Accordingly, a constant clearance between the cylindrical inner peripheral wall 230 and the outer peripheral wall of the plunger 11 can be maintained, wherefore uneven wear and seizure between the cylindrical inner peripheral wall 230 and the outer peripheral wall of the plunger 11 can be reduced.

The outer peripheral recess 235 of the present embodiment is larger than the outer peripheral recess 235 of the twentieth embodiment. Accordingly, the effect of "reducing uneven wear and seizure between the cylindrical inner peripheral wall 230 and the outer peripheral wall of the plunger 11" produced by the present embodiment increases.

Thirty-Second Embodiment

Figure 87:
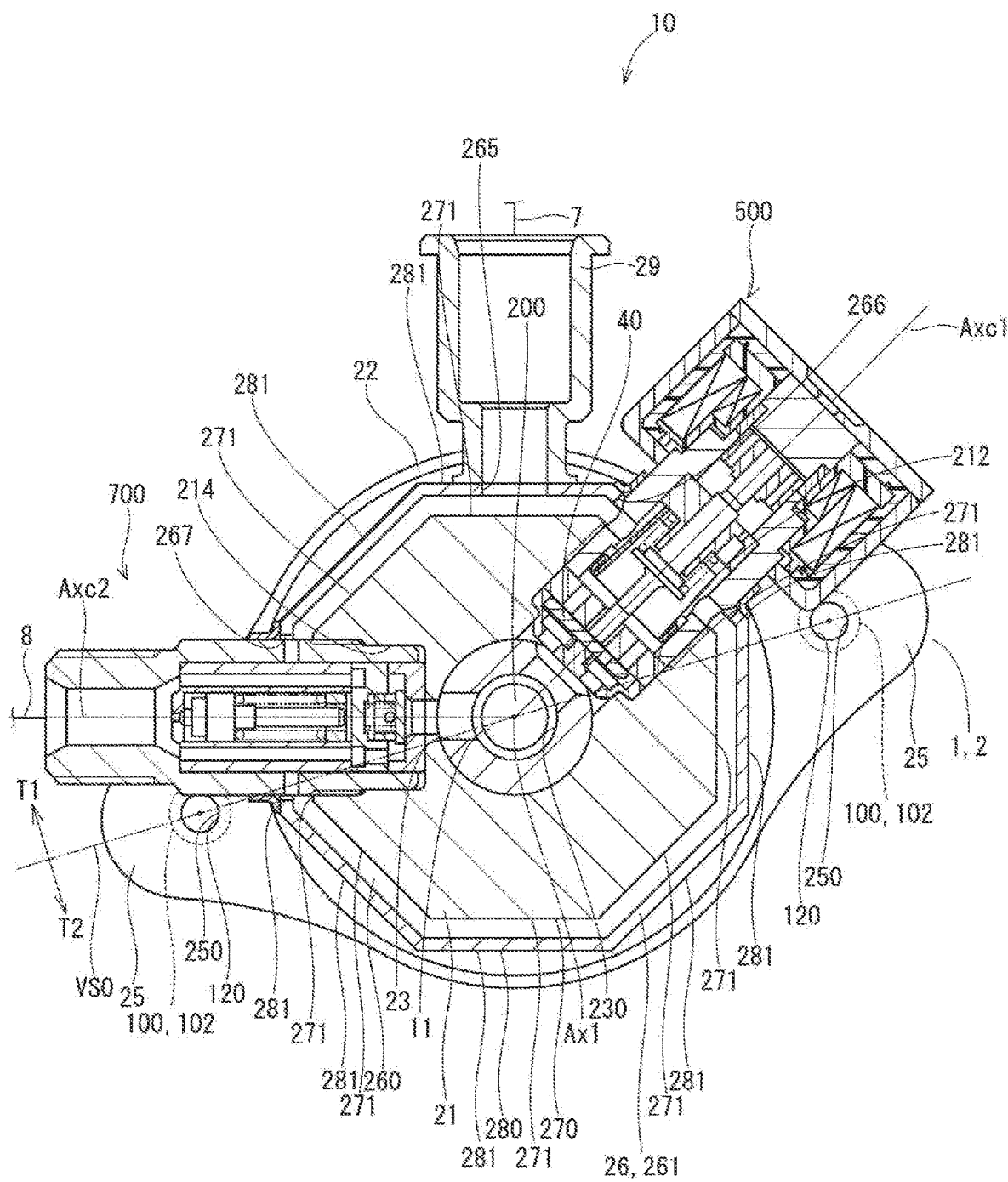
FIG. 87 is a cross-sectional view of a high-pressure pump according to a thirty-second embodiment.

<D-01> FIG. 87 shows a part of a high-pressure pump according to a thirty-second embodiment. The thirty-second embodiment is different from the twentieth embodiment in the arrangement of the discharge passage portion 700 and others.

According to the present embodiment, when compared with the twentieth embodiment, the discharge hole 233, the discharge hole portions 214 and 215, and the cover hole portion 267 are formed at positions rotated around the axis Ax1 by 45 degrees toward the side opposite to the suction hole 232, the suction hole portions 212 213, and the cover hole portion 266 in the circumferential direction of the housing outer peripheral wall 270. Accordingly, each of the angles formed by the axes of the suction hole portion 212 and the suction hole portion 213 and the axes of the discharge hole portion 214 and the discharge hole portion 215 is 135 degrees.

The angle formed by the center axis Axc1 of the electromagnetic driving unit 500 provided in the suction hole portion 212 and the center axis Axc2 of the discharge passage portion 700 provided in the discharge hole portion 214 is approximately 135 degrees.

When compared with the twentieth embodiment, the fixed portion 25 is formed at a position rotated by a predetermined angle around the axis Ax1 toward the electromagnetic driving unit 500 in the circumferential direction of the housing outer peripheral wall 270. An inner diameter of each of the bolt holes 250 formed in the fixed portion 25 is smaller than the corresponding diameter of the twentieth embodiment. An outer diameter of each of the shaft portions 101 of the bolts 100 inserted through the bolt holes 250 is smaller than the corresponding diameter of the twentieth embodiment.

According to the present embodiment, the electromagnetic driving unit 500 and a part of the discharge passage portion 700 are located in the second region T2, but the supply passage portion 29, and a majority of the electromagnetic driving unit 500 and the discharge passage portion 700 are located in the first region T1. In particular, substantially all of the supply passage portion 29, the electromagnetic driving unit 500, and the discharge passage portion 700 are located in the first region T1 on the radially outside of the cover outer peripheral wall 280.

According to the present embodiment, the bolt holes 250, the electromagnetic driving unit 500, and the discharge passage portion 700 do not overlap with each other as viewed in the direction of the axis Ax1 of the cylindrical inner peripheral wall 230.

The configuration of the thirty-second embodiment is similar to the configuration of the twentieth embodiment except for the points described above. Advantageous effects similar to those of the twentieth embodiment can be offered by the thirty-second embodiment.

Thirty-Third Embodiment

Figure 88:
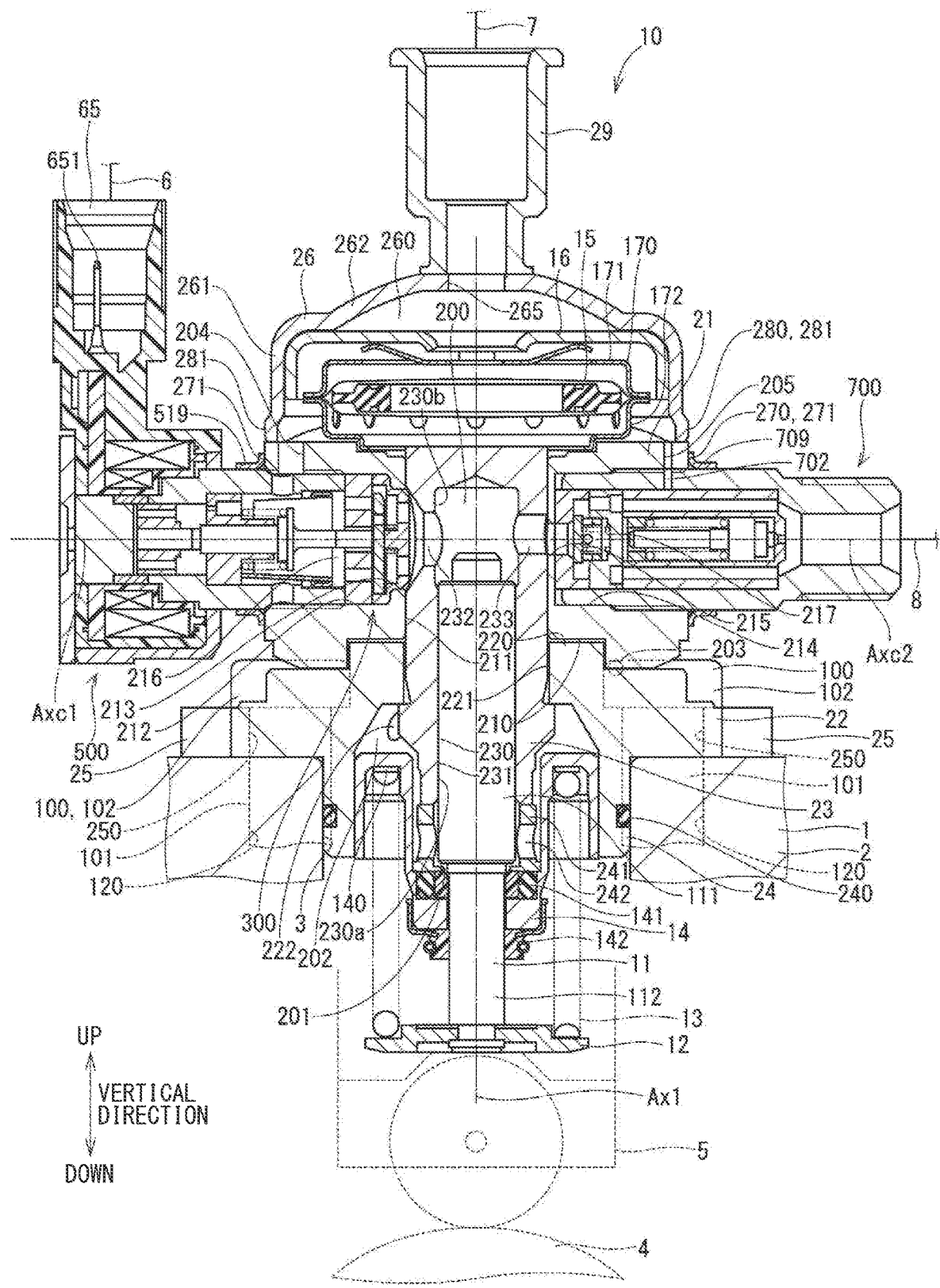
FIG. 88 is a cross-sectional view of a high-pressure pump according to a thirty-third embodiment.

<D-02> FIG. 88 shows a part of a high-pressure pump according to a thirty-third embodiment. The thirty-third embodiment is different from the twenty-ninth embodiment in the configurations of the upper housing 21 and the cover 26, and other points.

According to the present embodiment, when compared with the twenty-ninth embodiment, the upper housing 21 is formed such that the housing outer peripheral wall 270 expands radially outside. The axial length of the cover columnar portion 261 is smaller than that length of the twentieth embodiment. The end of the cover columnar portion 261 facing away from the cover bottom portion 262 is in contact with the end surface of the upper housing 21 facing away from the lower housing 22. The end of the cover columnar portion 261 and the upper housing 21 herein are joined with each other in the entire region in the circumferential direction by welding, for example.

According to the present embodiment, as described above, the cover columnar portion 261 is not located radially outside the upper housing 21. The fuel chamber 260 is formed between the cover columnar portion 261 and the end surface of the upper housing 21 facing away from the lower housing 22.

The welding ring 519 is formed such that the end of the welding ring 519 facing the pressurizing chamber 200 extends radially outward, and comes into contact with a periphery of the suction hole portion 212 of the flat portion 271 of the housing outer peripheral wall 270. The end of the welding ring 519 facing the pressurizing chamber 200 is welded to the flat portion 271 of the housing outer peripheral wall 270 in the entire range in the circumferential direction. The portion of the welding ring 519 facing away from the pressurizing chamber 200 is welded to the outer peripheral wall of the first cylindrical portion 511 in the entire range in the circumferential direction. This configuration reduces leakage of the fuel inside the suction hole portion 212 to the outside of the upper housing 21 via a clearance between the inner peripheral wall of the suction hole portion 212 and the outer peripheral wall of the first cylindrical portion 511.

The welding ring 709 is formed such that the end of the welding ring 519 facing the pressurizing chamber 200 extends radially outward, and comes into contact with a periphery of the discharge hole portion 214 of the flat portion 271 of the housing outer peripheral wall 270. The end of the welding ring 709 facing the pressurizing chamber 200 is welded to the flat portion 271 of the housing outer peripheral wall 270 in the entire range in the circumferential direction. The portion of the welding ring 519 facing away from the pressurizing chamber 200 is welded to the outer peripheral wall of the discharge joint 70 in the entire range in the circumferential direction. This configuration reduces leakage of the fuel inside the discharge hole portion 214 to the outside of the upper housing 21 via a clearance between the inner peripheral wall of the discharge hole portion 214 and the outer peripheral wall of the discharge joint 70.

According to the present embodiment, passages 204 and 205 are formed in the upper housing 21. The passage 204 is formed in the upper housing 21 such that the fuel chamber 260 and the pressurizing chamber 200 are in communication with each other. The passage 205 is formed in the upper housing 21 such that the fuel chamber 260 and the lateral hole portion 702 are in communication with each other. The hole portion 222 is formed in the upper housing 21 and the lower housing 22 such that the fuel chamber 260 and the annular space 202 are in communication with each other.

The configuration of the thirty-third embodiment is similar to the configuration of the twenty-ninth embodiment except for the points described above. Advantageous effects similar to those of the twenty-ninth embodiment can be offered by the thirty-third embodiment.

Thirty-Fourth Embodiment

Figure 89:
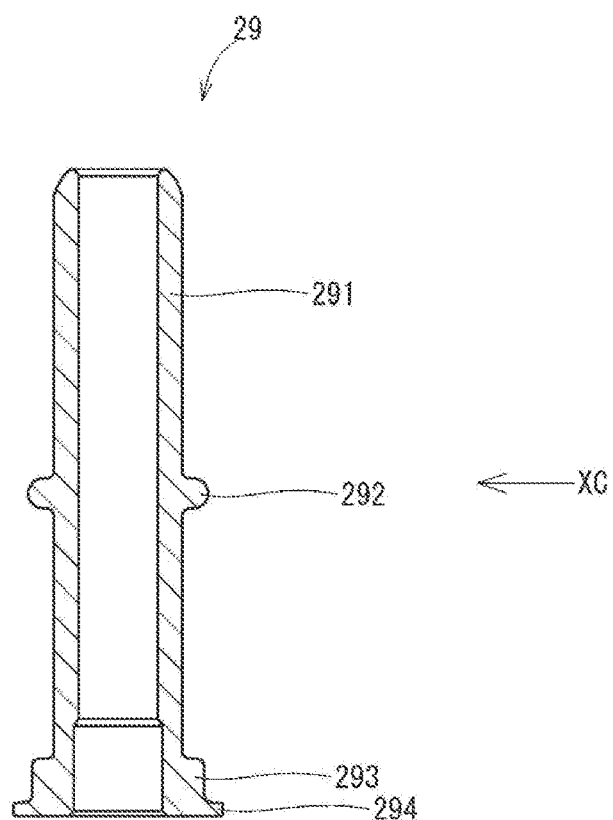
FIG. 89 is a cross-sectional view of a supply passage portion of a high-pressure pump according to a thirty-fourth embodiment.
Figure 90:
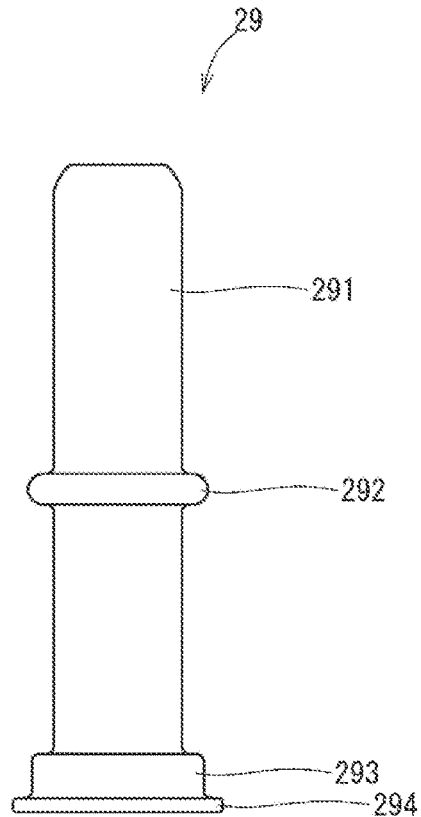
FIG. 90 is a view of FIG. 89 as viewed in a direction of an arrow XC.

<D-03> A part of a high-pressure pump according to a thirty-fourth embodiment is shown in FIGS. 89 and 90. The thirty-fourth embodiment is different from the twentieth embodiment in the configuration of the supply passage portion 29.

According to the present embodiment, the supply passage portion 29 includes a supply cylindrical portion 291, a protruding portion 292, an enlarged portion 293, and a flange portion 294. The supply cylindrical portion 291 has a substantially cylindrical shape. An inner diameter of one end of the supply cylindrical portion 291 is larger than an inner diameter of the other end.

The protruding portion 292 is formed integrally with the supply cylindrical portion 291 in such a shape as to protrude radially outward from the outer peripheral wall of the supply cylindrical portion 291. The protruding portion 292 has an annular shape.

The enlarged portion 293 is formed integrally with the supply cylindrical portion 291 in such a shape as to protrude radially outward from the outer peripheral wall at one end of the supply cylindrical portion 291. The enlarged portion 293 has a substantially cylindrical shape. The flange portion 294 is formed integrally with the enlarged portion 293 in such a shape as to protrude radially outward from the outer peripheral wall at one end of the enlarged portion 293. The flange portion 294 has an annular shape.

According to the present embodiment, one end of the supply passage portion 29 is connected to the outer wall around the cover hole portion 265 of the cover columnar portion 261, i.e., the flat portion 281 of the cover outer peripheral wall 280, such that the space inside the supply passage portion 29 is in communication with the fuel chamber 260 via the cover hole portion 265. The flange portion 294 and the flat portion 281 of the cover outer peripheral wall 280 herein are welded to each other in the entire area of the supply passage portion 29 in the circumferential direction.

The supply fuel pipe 7 is connected to the supply cylindrical portion 291 facing away from the flange portion 294. The protruding portion 292 is capable of stopping an end of the supply fuel pipe 7.

OTHER EMBODIMENTS

<A> According to the above-described embodiments presented by way of example, assuming that the number of the communication holes 44 is h, and that the number of the guide portions 43 is g, the number of the communication holes 44 facing the inner edge of one of the multiple tapering portions 42 separated by the guide portions 43 is a value of h/g. However, the number of the communication holes 44 is not required to be h/g in a different embodiment. In addition, the number of communication holes 44 facing the inner edge of one of the tapering portions 42 separated by the guide portions 43 may be one.

In a different embodiment, the valve member 40 is formed such that the curve amount QC1 of the one surface 401 which is the seat member 31 side surface may be set to a value equal to the minimum value DL1 of the distance between the valve member 40 and the seat member 31 when the valve member 40 separates from the seat member 31.

In a different embodiment, sealability may be increased by changing the shape of the valve member 40 or the seat member 31 into a middle protruding shape, or a plate thickness in a central region of the valve member 40 to a thickness larger than that at the outer edge, for example, to change rigidity of the components and deform the valve member 40 in accordance with the seat member 31.

<B> According to the above-described sixteenth embodiment presented by way of example, the inner cylindrical surface 602 tapers toward the axis of the spool 61 in the direction away from the pressurizing chamber 200 f. In a different embodiment, the minor angle formed by the inner cylindrical surface 601 and the inner cylindrical surface 602 which are the inner cylindrical surfaces having the smallest diameter in the cross section of the virtual plane on which the axis of the spool 61 extends may be 120 degrees. This configuration reduces positional deviation of the wire 620 particularly at the connecting portion between the inner cylindrical surface 601 and the inner cylindrical surface 602.

According to the above-described eighteenth embodiment presented by way of example, the stopping member 576 having higher hardness than the hardness of the fixed core 57 is provided in the fixed core hole portion 575 to stop the spring 54. In a different embodiment, however, a Cr plating layer or a DLC layer may be provided on a surface of the stopping member 576 while setting the hardness of the stopping member 576 to a value equal to or lower than hardness of the fixed core 57, for example. Needless to say, a Cr plating layer, a DLC layer, or the like may be provided on the surface of the stopping member 576 having higher hardness than the hardness of the fixed core 57.

In a different embodiment, the end surface 552 of the movable core 55 facing the pressurizing chamber 200 may be located on the side of the end surface 621 of the winding portion 62 facing the pressurizing chamber 200 opposite to the fixed core 57.

In a different embodiment, the entire part of each of the connecting surfaces 605 and 606 may be perpendicular to the axis of the spool 61. In addition, each of the connecting surfaces 605 and 606 may entirely taper toward the axis of the spool 61 in the direction away from the pressurizing chamber 200. Furthermore, each of the connecting surfaces 605 and 606 may be constituted by a combination of steps having the same height as the height of the wire 620, rather than a tapering surface.

In a different embodiment, the angle formed by the inner cylindrical surface 601 and the connecting surface 605 may be set to be other than 120 degrees in a cross section taken along the virtual plane VP1 on which the axis of the spool 61 extends.

In a different embodiment, the wire 620 is wound starting from the inner cylindrical surface having the smallest diameter radially outward and the different number of times in the axial direction for the first layer and the second layer In addition, the number of times of axial winding for each layer of the wire 620 is not required to be equalized in all layers between the inner cylindrical surface having the smallest diameter and the inner cylindrical surface having the largest diameter.

According to the above-described embodiments presented by way of example, the winding portion 62 is formed by winding the wire 620 around the spool 61 as the winding forming portion. In a different embodiment, however, a part of resin components constituting the connector 65 may function as the winding forming portion, and the winding portion 62 may be formed by winding the wire 620 around the winding forming portion.

<C> According to the above-described embodiment, the annular recess 800 connecting the first passage 83 and the second passage 89 is recessed from the surface of the intermediate member 81 facing the relief member body 86. In a different embodiment, however, the annular recess 800 may be recessed from the surface of the relief seat member 85 facing the intermediate member 81, or recessed from both of the surfaces of the intermediate member 81 and the relief seat member 85 facing each other, rather than recesses from the surface of the intermediate member 81 facing the relief seat member 85.

In a different embodiment, the number of the second passages 89 may be larger than the number of the first passages 83, and the annular recess 800 may be formed in the relief member body 86. In this case, the number of the first passages 83 may be 4, and the number of the second passages 89 may be 5, for example.

In a different embodiment, the number of the second passages 89 may be larger than the number of the first passages 83, and the length of each of the second passages 89 may be smaller than the length of each of the first passages 83. In other words, the length of the relief member body 86 in the axial direction may be smaller than the length of the intermediate member body 82 in the axial direction.

In a different embodiment, the intermediate member body 82 has the one first passage 83. The relief member body 86 has the one second passage 89. Multiple and the same number of the first passages 83 and the second passages 89 may be formed. In a different embodiment, the number of the first passages 83 and the number of the second passages 89 are not required to be relatively prime, but may exhibit any relationship between each other.

In a different embodiment, the discharge joint 70 may be eliminated. In this case, for example, the discharge seat member 71 and the intermediate member 81 may be provided in the discharge hole portion 214, and the relief seat member 85 may be screwed into the discharge hole portion 214 to constitute the discharge passage portion 700.

In a different embodiment, the stopping member 95 may be eliminated. In this case, it is considered that the end of the spring 99 is stopped by the intermediate member 81.

<D> According to the above-described embodiments presented by way of example, two bolt holes 250 are formed radially outside the housing outer peripheral wall 270 at equal intervals in the circumferential direction as viewed in the direction of the axial Ax1 of the cylindrical inner peripheral wall 230. In a different embodiment, however, the bolt holes 250 are not required to be formed at regular intervals in the circumferential direction of the housing outer peripheral wall 270.

In a different embodiment, three or more bolt holes 250 may be formed radially outside the housing outer peripheral wall 270 in the circumferential direction as viewed in the axial Ax1 direction of the cylindrical inner peripheral wall 230. In this case, it is preferable that the bolt holes 250 are formed at equal intervals in the circumferential direction of the housing outer peripheral wall 270.

In a different embodiment, the housing outer peripheral wall 270 is not required to have the flat portion 271 having a flat shape. In a different embodiment, the center axis Axc1 of the electromagnetic driving unit 500 and the center axis Axc2 of the discharge passage portion 700 are not required to be located on the same plane.

In a different embodiment, at least one of a pressure sensor capable of detecting a pressure of fuel sucked into the pressurizing chamber 200, a temperature sensor capable of detecting a temperature of fuel sucked into the pressurizing chamber 200, a vibration sensor capable of detecting vibration of the upper housing 21 or the cover 26, and a branch passage portion fluidly connecting the space inside the cover 26 and the space outside the cover 26 may be further provided. In this case, a low-pressure fuel pipe in communication with an injector for injecting and supplying low-pressure fuel to the internal combustion engine is connected to the branch passage portion.

Each of the pressure sensor, the temperature sensor, the vibration sensor, and the branch passage portion may protrude radially outward from the housing outer peripheral wall 270, for example, and may be located in a range of 180 degrees from the electromagnetic driving unit 500 toward the discharge passage portion 700, or in a range of 180 degrees from the discharge passage portion 700 toward the electromagnetic driving unit 500 in the circumferential direction of the housing outer peripheral wall 270.

Each of the pressure sensor, the temperature sensor, the vibration sensor, and the branch passage portion may be provided on the cover bottom portion 262 in such a manner as to protrude from the upper housing 21 toward the upper side in the vertical direction in the axis Ax1 direction of the cylindrical inner peripheral wall 230, for example.

According to the above-described eleventh embodiment presented by way of example, the pulsation damper unit 19 is provided in the cover bottom portion 262 in such a manner as to protrude from the upper housing 21 toward the upper side in the vertical direction in the direction of the axis Ax1 of the cylindrical inner peripheral wall 230. In a different embodiment, however, the pulsation damper unit 19 may protrude radially outward from the housing outer peripheral wall 270, for example, and may be located in a range of 180 degrees from the electromagnetic driving unit 500 toward the discharge passage portion 700, or in a range of 180 degrees from the discharge passage portion 700 toward the electromagnetic driving unit 500 in the circumferential direction of the housing outer peripheral wall 270.

In a different embodiment, the cover 26 may be eliminated. In this case, for example, the supply passage portion 29 may be provided in the upper housing 21 such that the inside of the supply passage portion 29 and the suction passage 216 are in communication with each other.

According to the above-mentioned embodiments presented by way of example, the cover columnar portion 261 has a regular octagonal columnar shape. In a different embodiment, however, the cover columnar portion 261 may have a deformed octagonal columnar shape which has sides having different lengths. This configuration can reduce resonance by changing characteristic values, thereby reducing NV.

In a different embodiment, at least two of the cylinder 23, the upper housing 21, and the lower housing 22 may be formed integrally with each other. In a different embodiment, at least two of the upper housing 21, the seat member 31, and the stopper 35 may be formed integrally with each other.

In a different embodiment, the high-pressure pump may be applied to an internal combustion engine other than a gasoline engine, such as a diesel engine. Alternatively, the high-pressure pump may be used as a fuel pump which discharges fuel toward an apparatus other than an engine of a vehicle, for example.

As described above, the present disclosure is not limited to the above embodiments, but may be practiced in various other modes without departing from the subject matters of the present disclosure.

A first technical idea of the above-described disclosure will be hereinafter described.

<A> A high-pressure pump which pressurizes fuel and supplies the fuel to an internal combustion engine is conventionally known. The high-pressure pump generally includes a valve member on the low pressure side of a pressurizing chamber. The valve member opens and allows a flow of fuel sucked into the pressurizing chamber when separated from a valve seat. The valve member closes and regulates a flow of fuel from the pressurizing chamber to the low pressure side when coming into contact with the valve seat. For example, a high-pressure pump opens a valve member and sucks fuel into a pressurizing chamber when a plunger lowers to increase the volume of the pressurizing chamber. When the plunger is raised to decrease the volume of the pressurizing chamber in the opened state of the valve member, the fuel is returned from the pressurizing chamber to the low pressure side to control the amount of the fuel pressurized in the pressurizing chamber. When the plunger is raised to decrease the volume of the pressurizing chamber in the closed state of the valve member, the fuel in the pressurizing chamber is pressurized.

The above-mentioned high-pressure pump includes the valve member which has multiple communication holes on a virtual circle centered at the axis. The valve member includes guide portions each capable of guiding the valve member to move in the axial direction by sliding on a member forming a suction passage. This valve member has the three guide portions provided in the circumferential direction. The valve member further includes three inclined surfaces inclined to the axis of the valve member in the circumferential direction at an outer edge of the surface of the valve member facing the pressurizing chamber. These inclined surfaces are formed between the respective guide portions.

According to the high-pressure pump described above, each of the inclined surfaces has a linear edge on the valve member axial side. In this case, the distance between both ends of this edge and the communication hole is long, wherefore both of the ends of the edge may produce resistance for fuel flowing on a surface of the valve member. Accordingly, a sufficient flow rate of fuel sucked into the pressurizing chamber, or a sufficient amount of fuel returned from the pressurizing chamber to the low pressure side may be difficult to obtain.

An object of the present disclosure is to provide a high-pressure pump capable of securing a sufficient flow rate of fuel sucked into a pressurizing chamber.

A second technical idea of the above-described disclosure will be hereinafter described.

<B> A high-pressure pump which pressurizes fuel and supplies the fuel to an internal combustion engine is conventionally known. The high-pressure pump generally includes a valve member on the low pressure side of a pressurizing chamber. The valve member opens and allows a flow of fuel sucked into the pressurizing chamber when separated from a valve seat. The valve member closes and regulates a flow of fuel from the pressurizing chamber to the low pressure side when coming into contact with the valve seat. For example, a high-pressure pump includes an electromagnetic driving unit disposed on the side of the valve member opposite to a pressurizing chamber. The high-pressure pump controls the valve member to open and close for controlling an amount of fuel pressurized in the pressurizing chamber and an amount of fuel discharged from the high-pressure pump.

Generally, magnetic flux density is maximized at the axial center of a coil of an electromagnetic driving unit. All magnetic flux directions become parallel to the coil axis, and extend from a pressurizing chamber toward a fixed core. Accordingly, an attractive force acting on a movable core during energization of the coil increases as an end surface of the movable core facing a fixed core side is disposed at a position closer to the axial center of the coil.

According to the high-pressure pump described above, however, the end surface of the movable core facing the fixed core is located between the pressurizing chamber and the axial center of the coil, and the end surface of the movable core facing the pressurizing chamber is located between the pressurizing chamber and the end surface of the coil facing the pressurizing chamber. In this case, the attractive force acting on the movable core may decrease during energization of the coil. As a result, responsiveness of the movable core may drop. When a current flowing through the coil is raised herein to secure the responsiveness of the movable core, power consumption of the electromagnetic driving unit may increase.

An object of the present disclosure is to provide a high-pressure pump capable of increasing responsiveness of an electromagnetic driving unit.

A third technical idea of the above-described disclosure will be hereinafter described.

<C> A high-pressure pump conventionally known as a pump for pressurizing fuel and supplying the fuel to an internal combustion engine includes a relief valve for releasing the fuel to a pressurizing chamber or a low pressure chamber when the pressure of the fuel discharged from the pressurizing chamber becomes a predetermined value or higher. For example, a relief valve of a high-pressure pump is configured to release fuel to a low-pressure chamber.

Recently, higher pressure fuel supply to an internal combustion engine has been demanded with a demand of a higher fuel pressure for an engine system. For increasing the pressure of the fuel discharged and supplied from the high-pressure pump to the internal combustion engine, it is effective to reduce a dead volume in communication with the pressurizing chamber and forming a high-pressure space during pressurization. A discharge valve of the high-pressure pump is disposed in the vicinity of the pressurizing chamber, while the relief valve is disposed on the side of the discharge valve opposite to the pressurizing chamber. This configuration can reduce the dead volume.

According to the high-pressure pump described above, however, the relief valve is disposed at a position shifted in the radial direction from the axis of the discharge valve, and a pressure pulsation reducing machine is provided between the discharge valve and the relief valve. Furthermore, a flow path through which the discharged fuel having passed through the discharge valve flows is formed radially outside the relief valve and the pressure pulsation reducing machine. Accordingly, the size of a portion including the discharge valve and the relief valve may increase.

An object of the present disclosure is to provide a downsized high-pressure pump.

A fourth technical idea of the above-described disclosure will be hereinafter described.

<D> A high-pressure pump which pressurizes fuel and supplies the fuel to an internal combustion engine is conventionally known. The high-pressure pump generally includes a valve member on the low pressure side of a pressurizing chamber. The valve member opens and allows a flow of fuel sucked into the pressurizing chamber when separated from a valve seat. The valve member closes and regulates a flow of fuel from the pressurizing chamber to the low pressure side when coming into contact with the valve seat. For example, a high-pressure pump includes an electromagnetic driving unit disposed on the side of the valve member opposite to a pressurizing chamber. The high-pressure pump controls the valve member to open and close for controlling an amount of fuel pressurized in the pressurizing chamber and an amount of fuel discharged from the high-pressure pump.

According to the high-pressure pump described above, the electromagnetic driving unit protrudes radially outward from an outer peripheral wall of a housing forming the pressurizing chamber. A discharge passage portion through which fuel discharged from the pressurizing chamber flows protrudes radially outward from the outer peripheral wall of the housing.

The high-pressure pump is attached to the internal combustion engine, wherefore a rotating object such as a pulley may be located near the high-pressure pump depending on the position where the high-pressure pump is attached. A wiring is connected to the electromagnetic driving unit of the high-pressure pump, and a steel pipe is connected to a discharge passage portion. Accordingly, the rotating object may come into contact with the wiring or the steel pipe depending on the position where the high-pressure pump is attached. In this case, the wiring or the steel pipe may be damaged.

The high-pressure pump includes a fixed portion which has multiple bolt holes and is fixed to an internal combustion engine. The three bolt holes are formed radially outside an outer peripheral wall of the housing at equal intervals in the circumferential direction as viewed in an axial direction of a cylindrical inner peripheral wall forming the pressurizing chamber. In this case, the electromagnetic driving unit, the discharge passage portion, and a supply passage portion through which fuel supplied to the pressurizing chamber flows are disposed between the three bolt holes. When the high-pressure pump is attached to the internal combustion engine by fixing the fixed portion to the internal combustion engine, bolts are inserted into the bolt holes. At this time, interference between the bolts and a tool for fastening the bolts and the electromagnetic driving unit, the discharge passage portion, or the supply passage portion needs to be avoided. Accordingly, the electromagnetic driving unit, the discharge passage portion, and the supply passage portion are not allowed to be disposed on the axes of the bolt holes. In this case, the electromagnetic driving unit, the discharge passage portion, and the supply passage portion are not allowed to be collectively disposed at a specific location in the circumferential direction of the housing. This configuration may decrease the degree of freedom of the attachment position of the high-pressure pump to the internal combustion engine.

An object of the present disclosure is to provide a high-pressure pump capable of increasing the degree of freedom of an attachment position to an internal combustion engine.

The present disclosure has been described based on the embodiments. However, the present disclosure is not limited to these embodiments and structures. The present disclosure also includes various modifications and variations within an equivalent range. In addition, various combinations and modes, and other combinations and modes including only a single element, or more or less elements, are all included in the scope and the range of spirit of the present disclosure.

What is claimed is:

1. A high-pressure pump comprising:
a pressurizing chamber forming portion that defines a pressurizing chamber in which fuel is pressurized;
a suction passage forming portion that defines a suction passage through which the fuel sucked into the pressurizing chamber flows;
a seat member disposed in the suction passage and having a communication path that passes through the seat member between one surface and the other surface of the seat member;
a valve member disposed between the pressurizing chamber and the seat member, the valve member being capable of allowing the fuel to flow through the communication path by separating from the seat member to open the communication path and of restricting the fuel to flow through the communication path by contacting the seat member to close the communication path;
a cylindrical member disposed on a side of the seat member opposite to the pressurizing chamber;
a needle movable inside the cylindrical member along an axial direction of the needle, the needle having one end that is configured to move in concert with the valve member;
a movable core disposed at the other end of the needle;
a fixed core disposed to face the movable core in the axial direction of the needle; and
a coil including a winding portion formed into a cylindrical shape by winding a wire around a winding forming portion, the coil generating an attractive force between the fixed core and the movable core to move the movable core and the needle in a direction from the movable core toward the fixed core when the winding portion is energized, wherein
the coil includes an outer cylindrical surface that is in contact with an outer circumferential surface of the winding portion and a plurality of inner cylindrical surfaces that have different diameters and are in contact with an inner circumferential surface of the winding portion,
the plurality of inner cylindrical surfaces are arranged in order of increasing diameter in a direction toward the pressurizing chamber,
the movable core has an end surface that faces the fixed core,
the end surface of the movable core is located between a center, in an axial direction, of a smallest diameter one of the plurality of inner cylindrical surfaces and a center, in an axial direction, of the outer cylindrical surface; and
the end surface of the movable core is located closer to, in the axial direction, the center of the smallest diameter one of the plurality of inner cylindrical surfaces than the end surface of the movable core is to an end surface of the smallest diameter one of the plurality of inner cylindrical surfaces that faces the pressurizing chamber.

2. The high-pressure pump according to claim 1, wherein the movable core has an end surface that faces the pressurizing chamber and that is located between the fixed core and an end surface of the winding portion that faces the pressurizing chamber.

3. The high-pressure pump according to claim 1, wherein the coil includes a connecting surface between adjacent ones of the plurality of the inner cylindrical surfaces, the plurality of inner cylindrical surfaces and the connecting surface are located at an outer circumferential wall of the winding forming portion, and
at least a part of the connecting surface is perpendicular to an axis of the winding forming portion.

4. The high-pressure pump according to claim 1, wherein the coil includes a connecting surface between adjacent ones of the plurality of the inner cylindrical surfaces, the plurality of inner cylindrical surfaces and the connecting surface are located at an outer circumferential wall of the winding forming portion, and
at least a part of the connecting surface tapers toward an axis of the winding forming portion in a direction away from the pressurizing chamber.

5. The high-pressure pump according to claim 4, wherein the connecting surface includes a connecting portion between the smallest diameter one and an adjacent one of the plurality of inner cylindrical surfaces to the smallest diameter one, the connecting portion tapering toward the axis of the winding forming portion in the direction away from the pressurizing chamber, and
the smallest diameter one and the connecting surface form an angle in a cross section taken along a virtual plane on which the axis of the winding forming portion extends, wherein
the angle is 120 degrees.

6. The high-pressure pump according to claim 1, wherein the plurality of inner cylindrical surfaces are located at an outer circumferential wall of the winding forming portion, and
at least a part of the plurality of inner cylindrical surfaces tapers toward an axis of the winding forming portion in a direction away from the pressurizing chamber.

7. The high-pressure pump according to claim 1, wherein the wire is wound starting from the smallest diameter one of the plurality of inner cylindrical surfaces to form N layers stacked with each other in a radial direction across the plurality of inner cylindrical surfaces, and
N is an even number.

8. The high-pressure pump according to claim 1, wherein the wire is wound starting from the smallest diameter one of the plurality of inner cylindrical surfaces to form N layers stacked with each other in a radial direction across the plurality of inner cylindrical surfaces, and
the wire is wound in the axial direction a same number of times for a first layer and a second layer, wherein
the first layer is located radially inward of the second layer.

9. The high-pressure pump according to claim 1, wherein the wire is wound starting from the smallest diameter one of the plurality of inner cylindrical surfaces to form N layers stacked with each other in a radial direction across the plurality of inner cylindrical surfaces, and the wire is wound in the axial direction a same number of times for each layer among N layers which are wound only in the smallest diameter one.

* * * * *